United States Patent
Gould et al.

(10) Patent No.: US 6,839,669 B1
(45) Date of Patent: Jan. 4, 2005

(54) PERFORMING ACTIONS IDENTIFIED IN RECOGNIZED SPEECH

(75) Inventors: Joel M. Gould, Winchester, MA (US); Paul G. Bamberg, Marlborough, MA (US); Charles E. Ingold, Bedford, MA (US); Kenneth J. Bayse, Sutton, MA (US); Michael L. Elkins, Framingham, MA (US); Roger L. Matus, Boxborough, MA (US); Eric Fieleke, Medford, MA (US)

(73) Assignee: ScanSoft, Inc., Peabody, MA (US)

( * ) Notice: Subject to any disclaimer, the term of this patent is extended or adjusted under 35 U.S.C. 154(b) by 0 days.

(21) Appl. No.: 09/432,155

(22) Filed: Jun. 10, 1999

Related U.S. Application Data

(60) Provisional application No. 60/107,253, filed on Nov. 5, 1998.

(51) Int. Cl.[7] ............................................. G10L 21/00
(52) U.S. Cl. ...................................... 704/246; 704/275
(58) Field of Search ................................ 704/246, 249, 704/270, 275, 276

(56) References Cited

U.S. PATENT DOCUMENTS

| | | | | |
|---|---|---|---|---|
| 5,477,511 A | * | 12/1995 | Englehardt ............... | 369/25.01 |
| 5,479,481 A | * | 12/1995 | Koivunen ................. | 455/422 |
| 5,732,216 A | * | 3/1998 | Logan et al. ............. | 704/201 |
| 5,774,859 A | * | 6/1998 | Houser et al. ............ | 704/275 |
| 5,832,429 A | * | 11/1998 | Gammel et al. .......... | 704/255 |
| 5,875,448 A | * | 2/1999 | Boys et al. ................ | 704/201 |
| 5,915,001 A | * | 6/1999 | Uppaluru ................. | 379/88.17 |
| 5,924,070 A | * | 7/1999 | Ittycheriah et al. ....... | 704/275 |
| 5,995,936 A | * | 11/1999 | Brais et al. ............... | 369/25.01 |
| 6,122,614 A | * | 9/2000 | Kahn et al. ............... | 704/235 |
| 6,138,098 A | * | 10/2000 | Shieber et al. ............ | 704/257 |
| 6,163,768 A | * | 12/2000 | Sherwood et al. ........ | 704/235 |

FOREIGN PATENT DOCUMENTS

| | | |
|---|---|---|
| EP | 0 805 455 | 11/1997 |
| GB | 2 323 694 A | 9/1998 |

OTHER PUBLICATIONS

Olympus DS–150 Portable Voice Recorder Manual (and related product articles), Jun. 1998.*
A. Kellner et al.; "PADIS—An automatic telephone switchboard and director information system", 1997, Speech Communication.
P.J. Wyard, et al. "Spoken language systems—beyond prompt and response", Jan. 14, 1996; No. 1, BT Technology Journal.
PCT International Search Report, Mar. 14, 2000.

* cited by examiner

*Primary Examiner*—Vijay Chawan
*Assistant Examiner*—Michael N. Opsasnick
(74) *Attorney, Agent, or Firm*—Fish & Richardson P.C.

(57) ABSTRACT

A computer is used to perform recorded actions. The computer receives recorded spoken utterances of actions. The computer then performs speech recognition on the recorded spoken utterances to generate texts of the actions. The computer then parses the texts to determine properties of the actions. After parsing the texts, permits the user to indicate that the user has reviewed one or more actions. The computer then automatically carries out the actions indicated as having been reviewed by the user.

45 Claims, 68 Drawing Sheets

1500 ACTION ITEM GENERATION PROCEDURE 1502 retrieve utterance
    get utterance 1504 initialize best score and command pattern pointer
    p = 0
    best_scoring_pattern = 0
    best_score = INFINITY 1506 parse utterance and current command pattern
    pattern_score[p] = parse(utterance, patternset[p], notraceback)

1508 save score if best pattern
    if pattern_score[p] < best_score
        best_scoring_pattern = p
        best_score = pattern_score[p]
    endif 1510 process next pattern, if any
    p = p+1
    if p < pattern_count
        goto 1506
    endif 1512 parse best pattern with traceback
    best_score = parse(utterance, patternset[best_scoring_pattern], traceback)

1514 analyze traceback 1516 parse each field of best pattern 1518 generate action item

FIG. 15A

1550 ACTION ITEM GENERATION WITH FORCED DISPOSITIONS

1552 retrieve utterance
   get utterance

1554 initialize variables
   r = 0
   m_nr = number of words in utterance

1556 skip first word(s) if item identifier (e.g., "Jabberwocky")
   if utterance[r, length(command identifier)] = command identifier
      r = r + length(command identifier)
   endif

1558 if next word is "create", look for first occurrence of "create" forcing word ("meeting", "appointment", "task", "to-do", "call", "email", "e-mail", "text", "document", "audio", "recording", "note", "history", "contact") and force accordingly; don't force if no forcing word found

```
if utterance[r] = "create"
    do while r < m_nr and utterance[r] <> create_forcing_word
        r = r+1
    enddo
    if r < m_nr
        do case
            case utterance[r] = "meeting" or "appointment"
                force a meeting
            case utterance[r] = "task", "to-do" or "call"
                force a task and set the category equal to utterance[r]
            case utterance[r] = "email" or "e-mail"
                force an email
            case utterance[r] = "text" or "document"
                force a new text file
            case utterance[r] = "audio" or "recording"
                force an audio file
            case utterance[r] = "note" or "history"
                force a note
            case utterance[r] = "contact"
                force a contact
        endcase
    endif
    goto 1504
endif
```

FIG. 15B

1560 if "schedule", look for first occurrence of "schedule" forcing word ("meeting", "appointment", "task", "to-do", "call") and force accordingly; don't force if no forcing word found
```
if utterance[r] = "schedule"
    do while r < m_nr and utterance[r] <> schedule_forcing_word
        r = r+1
    enddo
    if r < m_nr
        do case
            case utterance[r] = "meeting" or "appointment"
                force a meeting
            case utterance[r] = "task", "to-do" or "call"
                force a task and set the category equal to utterance[r]
        endcase
    endif
    goto 1504
endif
```

1562 if "remember", parse as task
```
if utterance[r] = "remember"
    force a task
    goto 1504
endif
```

1564 if disposition type, parse accordingly
```
do case
    case utterance[r] = "meeting" or "appointment"
        force a meeting
    case utterance[r] = "task," "to-do" or "call"
        force a task and set the category equal to utterance[r]
    case utterance[r] = "email" or "e-mail"
        force an email
    case utterance[r] = "text" or "document"
        force a new text file
    case utterance[r] = "audio" or "recording"
        force an audio file
    case utterance[r] = "note" or "history"
        force a note
    case utterance[r] = "contact"
        force a contact
endcase
goto 1504
```

FIG. 15C

1600 COMMAND PATTERN PARSING PROCEDURE

1602 initialize variables/create priority queue
m_nr = number of words in utterance
m_nc = number of fields in pattern
r = c = 0
i = 1
create pQueue

1604 define macro used to place information in priority queue
NODE(score,i,r,c) (((score)<<20) + ((i)<<16) + ((r)<<8) + (c))

1606 initialize all scores to be bad
for r < m_nr
    for c < m_nc
        err1[r][c] = err2[r][c] = err3[r][c] = INFINITY
        if traceback needed
            type1[r][c] = type2[r][c] = type3[r][c] = TYP_UNDEFINED
        endif
        c = c + 1
    endfor
    c = 0
    r = r + 1
endfor

1608 give the starting node a good score
err1[0][0] = 0;
if traceback needed
    type1[0][0] = TYP_START
endif

1610 put starting node in priority queue
insert NODE(0,1,0,0) on pQueue

1612 begin loop that continues until the queue is empty

1614 remove best-scoring node from the queue and unpack it
theNode = smallest entry from pQueue
remove smallest entry from pQueue
nodeScr = theNode >> 20
rb = (theNode & 0x0000ff00) >> 8
cb = theNode & 0x000000ff
i = (theNode & 0x000f0000) >> 16

FIG. 16A

1616 only process node if it has the best score for the word/field pair and its
score is better than the best final score
if (i=1 and nodeScr > err1[rb][cb]) or
    (i=2 and nodeScr > err2[rb][cb]) or
    (i=3 and nodeScr > err3[rb][cb]) or
    (nodeScr >= err1[m_nr][m_nc])
        goto 1680
endif 1618 don't process if this node represents a final score
if (rb = m_nr and cb = m_nc)
    goto 1680
endif 1620 initialize score for node to begin dynamic programming for the node to
update all nodes that can be reached by deletion, insertion, or substitution
scr = INFINITY 1622 perform post-insertion (state 3) processing, if applicable
if i = 3
    scr = err3[rb][cb]
    if traceback needed
        type = type3[rb][cb]
    endif
endif 1624 get score for single-word post-insertion
    addscr = getPostInsertScore(utterance[rb], pattern[cb])

1626 save score and node if better than current score for word/field pair
if (scr + addscr < err3[rb+1][cb])
    err3[rb+1][cb] = scr + addscr
    if traceback needed
        type3[rb+1][cb] = TYP_POSTINSERT
    endif
    insert NODE(scr+addscr,3,rb+1,cb) on pQueue
endif

FIG. 16B

1628 get score for double-word post-insertion, if applicable
```
if (rb < m_nr - 1)
    addscr = getDoublePostInsertScore(utterance[rb], pattern[cb])
```

1630 save score and node if better than current score for word/field pair and the pair of words was a valid pair
```
    if (addscr < LARGE_SCORE) and (scr + addscr < err3[rb+2][cb])
        err3[rb+2][cb] = scr + addscr
        if traceback needed
            type3[rb+2][cb] = TYP_DOUBLEPOSTINSERT
        endif
        insert NODE(scr+addscr,3,rb+2,cb) on pQueue
    endif
endif
```

1632 get score for triple-word post-insertion, if applicable
```
if (rb < m_nr - 2)
    addscr = getTriplePostInsertScore(utterance[rb], pattern[cb])
```

1634 save score and node if better than current score for word/field pair and the three words are valid
```
    if (addscr < LARGE_SCORE) and (scr + addscr < err3[rb+3][cb])
        err3[rb+3][cb] = scr + addscr
        if traceback needed
            type3[rb+3][cb] = TYP_TRIPLEPOSTINSERT
        endif
        insert NODE(scr+addscr,3,rb+3,cb) on pQueue
    endif
endif
```

1636 advance state 3 score to state 1 score for next field
```
    cb = cb + 1
endif
```

FIG. 16C 1638 perform deletion (state 1) processing using state 1 score or state 3 score
   if i=1 or i=3

1640 use state 1 score if better, or save state 3 score as state 1 score
       if (scr >= err1[rb][cb])
           scr = err1[rb][cb]
           if traceback needed
               type = type1[rb][cb]
           endif
       else
           err1[rb][cb] = scr
           if traceback needed
               type1[rb][cb] = type
           endif
       endif 1642 get deletion score
       addscr = getDeleteScore(pattern[cb])

1644 save score and node if better than current score for word/field pair
       if (scr + addscr < err1[rb][cb+1])
           err1[rb][cb+1] = scr + addscr
           if traceback needed
               type1[rb][cb+1] = TYP_DELETE
           endif
           insert NODE(scr+addscr,1,rb,cb+1) on pQueue
       endif
endif

FIG. 16D

1646 perform substitution/pre-insertion (state 2) processing using state 2 score or state 1 score
if i=1 or i=2 or i=3

1648 use state 2 score if better, or save state 1 score as state 2 score
    if (scr >= err2[rb][cb])
        scr = err2[rb][cb]
        if traceback needed
            type = type2[rb][cb]
        endif
    else
        err2[rb][cb] = scr
        if traceback needed
            type2[rb][cb] = type
        endif
    endif

1650 verify that a word remains to perform a substitution or pre-insertion
    if (rb < m_nr and cb < m_nc)

1652 get single substitution score
        addscr = getSubstScore(utterance[rb], pattern[cb])

1654 save score and node if better than current score for word/field pair
        if (scr + addscr < err3[rb+1][cb])
            err3[rb+1][cb] = scr + addscr
            if traceback needed
                type3[rb+1][cb] = TYP_SUBST
            endif
            insert NODE(scr+addscr,3,rb+1,cb) on pQueue
        endif

1656 get single pre-insertion score
        addscr = getPreInsertScore(utterance[rb], pattern[cb])

FIG. 16E 1658 save score and node if better than current score for word/field pair
```
if (scr + addscr < err2[rb+1][cb])
    err2[rb+1][cb] = scr + addscr
    if traceback needed
        type2[rb+1][cb] = TYP_PREINSERT
    endif
    insert NODE(scr+addscr,2,rb+1,cb) on pQueue
endif
```

1660 verify that two words remain to perform a double substitution or pre-insertion
```
if (rb < m_nr-1)
```

1662 get double substitution score
```
addscr = getDoubleSubstScore(utterance[rb], pattern[cb])
```

1664 save score and node if better than current score for word/field pair and the pair of words was a valid pair
```
if ((addscr < LARGE_SCORE) and scr + addscr < err3[rb+2][cb])
    err3[rb+2][cb] = scr + addscr
    if traceback needed
        type3[rb+2][cb] = TYP_DOUBLESUBST
    endif
    insert NODE(scr+addscr,3,rb+2,cb)) on pQueue
endif
```

1666 get double pre-insertion score
```
addscr = getDoublePreInsertScore(utterance[rb], pattern[cb])
```

1668 save score and node if better than current score for word/field pair and the pair of words was a valid pair
```
if ((addscr < LARGE_SCORE) and scr + addscr < err2[rb+2][cb])
    err2[rb+2][cb] = scr + addscr
    if traceback needed
        type2[rb+2][cb] = TYP_DOUBLEPREINSERT
    endif
    insert NODE(scr+addscr,2,rb+2,cb) on pQueue
endif
```

FIG. 16F 1670 verify that three words remain to perform a triple substitution or
pre-insertion
if (rb < m_nr - 2)

1672 get triple substitution score
        addscr = getTripleSubstScore(utterance[rb], pattern[cb])

1674 save score and node if better than current score for word/field
        pair and the three words are valid
        if ((addscr < LARGE_SCORE) and scr + addscr < err3[rb+3][cb])
            err3[rb+3][cb] = scr + addscr
            if traceback needed
                type3[rb+3][cb] = TYP_TRIPLESUBST
            endif
            insert NODE(scr + addscr,3,rb+3,cb) on pQueue
        endif 1676 get triple pre-insertion score
        addscr = getTriplePreInsertScore(utterance[rb], pattern[cb])

1678 save score and node if better than current score for word/field
        pair and the three words are valid
        if ((addscr < LARGE_SCORE) and scr + addscr < err2[rb+3][cb])
            err2[rb+3][cb] = scr + addscr
            if traceback needed
                type2[rb+3][cb] = TYP_TRIPLEPREINSERT
            endif
            insert NODE(scr+addscr,3,rb+3,cb) on pQueue
        endif
        endif
    endif
endif 1680 continue processing until priority queue is empty
    if entry left in pQueue
        goto 1612
    endif 1682 return final score
    return err1[m_nr][m_nc]

FIG. 16G 1700 stop processing pattern is best score from priority queue is no better than
the final score for the best scoring pattern
if (nodeScr >= best_score)
    goto 1682
endif 1616 only process node if it has the best score for the word/field pair and its
score is better than the best final score
if (i=1 and nodeScr > err1[rb][cb]) or
   (i=2 and nodeScr > err2[rb][cb]) or
   (i=3 and nodeScr > err3[rb][cb]) or
   (nodeScr >= err1[m_nr][m_nc])
        goto 1680
endif 1618 don't process if this node represents a final score
if (rb = m_nr and cb = m_nc)
    goto 1680
endif 1620 initialize score for node to begin dynamic programming for the node to
update all nodes that can be reached by deletion, insertion, or substitution
scr = INFINITY 1622 perform post-insertion (state 3) processing, if applicable
if i = 3
    scr = err3[rb][cb]
    if traceback needed
        type = type3[rb][cb]
    endif
endif 1624 get score for single-word post-insertion
addscr = getPostInsertScore(utterance[rb], pattern[cb])

1626 save score and node if better than current score for word/field pair
if (scr + addscr < err3[rb+1][cb])
    err3[rb+1][cb] = scr + addscr
    if traceback needed
        type3[rb+1][cb] = TYP_POSTINSERT
    endif
    insert NODE(scr+addscr,3,rb+1,cb) on pQueue
endif

FIG. 17

1800 ACTION ITEM GENERATION PROCEDURE WITH COMBINED PARSING PROCEDURE

1502 retrieve utterance
   get utterance 1805 parse utterance using combined priority queue
   best_scoring_pattern = combinedparse(utterance, patternset)

1512 parse best pattern with traceback
   best_score = parse(utterance, patternset[best_scoring_pattern], traceback)

1514 analyze traceback 1516 parse each field of best pattern 1518 generate action item

FIG. 18

1900 COMBINED COMMAND PATTERN PARSING PROCEDURE

1902 initialize variables/create priority queue
m_np = number of patterns in patternset
m_nr = number of words in utterance
m_nc[m_np] = array storing number of fields in each pattern
p = r = c = 0
i = 1
bestscore = INFINITY
bestpattern = m_np
create pQueue

1904 define macro used to place information in priority queue
NODE(score,i,p,r,c) (((score)<<28) + ((i)<<24) + ((p)<<16) + ((r)<<8) + (c))

1906 initialize all scores to be bad
for p < m_np
   for r < m_nr
      for c < m_nc[p]
         err1[p][r][c] = err2[p][r][c] = err3[p][r][c] = INFINITY
         c = c + 1
      endfor
      c = 0
      r = r + 1
   endfor
   r = 0
   p = p + 1
endfor

1908 give the starting node for each pattern a good score
p = 0
for p < m_np
   err1[p][0][0] = 0;

1910 put starting node for each pattern in priority queue
   insert NODE(0,1,p,0,0) on pQueue
   p = p + 1
endfor

1912 begin loop that continues until the queue is empty

FIG. 19A 1914 remove best-scoring node from the queue and unpack it
    theNode = smallest entry from pQueue
    remove smallest entry from pQueue
    nodeScr = theNode >> 28
    pb = (theNode & 0x000ff0000) >> 16
    rb = (theNode & 0x00000ff00) >> 8
    cb = theNode & 0x000000ff
    i = (theNode & 0x000f00000) >> 24

1916 only process node if it has the best score for the word/field pair and its
    score is better than the best final score
    if (i=1 and nodeScr > err1[pb][rb][cb]) or
       (i=2 and nodeScr > err2[pb][rb][cb]) or
       (i=3 and nodeScr > err3[pb][rb][cb]) or
       (nodeScr >= bestscore)
           goto 1980
    endif 1918 don't process if this node represents a final score
    if (rb = m_nr[pb] and cb = m_nc)
        goto 1980
    endif 1920 initialize score for node to begin dynamic programming for the node to
    update all nodes that can be reached by deletion, insertion, or substitution
    scr = INFINITY 1922 perform post-insertion (state 3) processing, if applicable
    if i = 3
        scr = err3[pb][rb][cb]

1924 get score for single-word post-insertion
        addscr = getPostInsertScore(utterance[rb], patternset[pb,cb])

1926 save score and node if better than current score for word/field pair
        if (scr + addscr < err3[pb][rb+1][cb])
            err3[pb][rb+1][cb] = scr + addscr
            insert NODE(scr+addscr,3,pb,rb+1,cb) on pQueue
        endif

FIG. 19B 1928 get score for double-word post-insertion, if applicable
   if (rb < m_nr - 1)
      addscr = getDoublePostInsertScore(utterance[rb], patternset[pb,cb])

1930 save score and node if better than current score for word/field pair
         and the pair of words was a valid pair
      if (addscr < LARGE_SCORE) and (scr + addscr < err3[pb][rb+2][cb])
         err3[pb][rb+2][cb] = scr + addscr
         insert NODE(scr+addscr,3,pb,rb+2,cb) on pQueue
      endif
   endif 1932 get score for triple-word post-insertion, if applicable
   if (rb < m_nr - 2)
      addscr = getTriplePostInsertScore(utterance[rb], patternset[pb,cb])

1934 save score and node if better than current score for word/field pair
         and the three words are valid
      if (addscr < LARGE_SCORE) and (scr + addscr < err3[pb][rb+3][cb])
         err3[pb][rb+3][cb] = scr + addscr
         insert NODE(scr+addscr,3,pb,rb+3,cb) on pQueue
      endif
   endif 1936 advance state 3 score to state 1 score for next field
      cb = cb + 1
   endif 1938 perform deletion (state 1) processing using state 1 score or state 3 score
   if i=1 or i=3

1940 use state 1 score if better, or save state 3 score as state 1 score
      if (scr >= err1[pb][rb][cb])
         scr = err1[pb][rb][cb]
      else
         err1[pb][rb][cb] = scr
      endif 1942 get deletion score
      addscr = getDeleteScore(patternset[pb,cb])

FIG. 19C 1944 save score and node if better than current score for word/field pair
    if (scr + addscr < err1[pb][rb][cb+1])
        err1[pb][rb][cb+1] = scr + addscr
        insert NODE(scr+addscr,1,pb,rb,cb+1) on pQueue 1945 if score is a final score and is better than the best score, save it as the best score
    if (rb = m_nr[pb]) and (cb = m_nc) and err1[pb][rb][cb+1] < bestscore
        bestscore = err1[pb][rb][cb+1]
        bestpattern = pb
    endif
        endif
    endif 1946 perform substitution/pre-insertion (state 2) processing using state 2 score or state 1 score
    if i=1 or i=2 or i=3

1948 use state 2 score if better, or save state 1 score as state 2 score
    if (scr >= err2[pb][rb][cb])
        scr = err2[pb][rb][cb]
    else
        err2[pb][rb][cb] = scr
    endif 1950 verify that a word remains to perform a substitution or pre-insertion
    if (rb < m_nr and cb < m_nc[pb])

1952 get single substitution score
    addscr = getSubstScore(utterance[rb], patternset[pb,cb])

1954 save score and node if better than current score for word/field pair
    if (scr + addscr < err3[pb][rb+1][cb])
        err3[pb][rb+1][cb] = scr + addscr
        insert NODE(scr+addscr,3,pb,rb+1,cb) on pQueue
    endif 1956 get single pre-insertion score
    addscr = getPreInsertScore(utterance[rb], patternset[pb,cb])

FIG. 19D 1958 save score and node if better than current score for word/field pair
```
if (scr + addscr < err2[pb][rb+1][cb])
    err2[pb][rb+1][cb] = scr + addscr
    insert NODE(scr+addscr,2,pb,rb+1,cb) on pQueue
endif
```

1960 verify that two words remain to perform a double substitution or pre-insertion
```
if (rb < m_nr-1)
```

1962 get double substitution score
```
addscr = getDoubleSubstScore(utterance[rb], patternset[pb,cb])
```

1964 save score and node if better than current score for word/field pair and the pair of words was a valid pair
```
if ((addscr < LARGE_SCORE) and scr + addscr < err3[pb][rb+2][cb])
    err3[pb][rb+2][cb] = scr + addscr
    insert NODE(scr+addscr,3,pb,rb+2,cb)) on pQueue
endif
```

1966 get double pre-insertion score
```
addscr = getDoublePreInsertScore(utterance[rb], patternset[pb,cb])
```

1968 save score and node if better than current score for word/field pair and the pair of words was a valid pair
```
if ((addscr < LARGE_SCORE) and scr + addscr < err2[pb][rb+2][cb])
    err2[pb][rb+2][cb] = scr + addscr
    insert NODE(scr+addscr,2,pb,rb+2,cb) on pQueue
endif
```

1970 verify that three words remain to perform a triple substitution or pre-insertion
```
if (rb < m_nr - 2)
```

1972 get triple substitution score
```
addscr = getTripleSubstScore(utterance[rb], patternset[pb,cb])
```

1974 save score and node if better than current score for word/field pair and the three words are valid
```
if ((addscr < LARGE_SCORE) and scr + addscr < err3[pb][rb+3][cb])
    err3[pb][rb+3][cb] = scr + addscr
    insert NODE(scr + addscr,3,pb,rb+3,cb) on pQueue
endif
```

FIG. 19E 1976 get triple pre-insertion score
    addscr = getTriplePreInsertScore(utterance[rb], patternset[pb,cb])

1978 save score and node if better than current score for word/field
    pair and the three words are valid
        if ((addscr < LARGE_SCORE) and scr + addscr < err2[pb][rb+3][cb])
            err2[pb][rb+3][cb] = scr + addscr
            insert NODE(scr+addscr,3,pb,rb+3,cb) on pQueue
        endif
      endif
     endif
    endif
   endif 1980 continue processing until priority queue is empty
    if entry left in pQueue
        goto 1912
    endif 1982 return best scoring pattern
    return bestpattern

FIG. 19F

2000 ACTION ITEM GENERATION PROCEDURE WITH PATTERN TREE

2005 order patterns lexicographically
    sorted_patternset = patternset sorted by field names

2010 initialize pattern_tree array
    initialize pattern_tree[number of patterns in sorted_patternset]

2015 build pattern tree
    pattern_tree[0] = buildtree(sorted_patternset)

2020 retrieve utterance
    get utterance

2025 parse utterance using pattern_tree
    best_scoring_pattern = treeparse(utterance, pattern_tree, sorted_patternset)

2030 parse best pattern with traceback
    best_score = parse(utterance, sorted_patternset[best_scoring_pattern], traceback)

2035 analyze traceback

2040 parse each field of best pattern

2045 generate action item

FIG. 20

2100 PATTERN TREE BUILDING PROCEDURE (buildtree)

2105 designate first pattern as root
    root_p = pattern index of first pattern in received subset of sorted_patternset
    root = sorted_patternset[root_p]

2110 initialize variables
    last_p = pattern index of last pattern in received subset of sorted_patternset
    root_m_nc = number of fields in root
    partition_num = root_m_nc
    p = root_p + 1

2115 initialize pointer array for root
    initialize root_array[root_m_nc+1] with all null values 2120 partition patterns based on prefixes shared with root
    for p <= last_p and partition_num > 0

2125 current pattern is first pattern in partition if fields match
            if sorted_patternset[p] matches root through field partition_num - 1
                root_array[partition_num] = p 2130 find last pattern in partition
                for p <= last_p
                      p = p + 1
                      if sorted_patternset[p] does not match root through field
                          partition_num - 1
                              goto 2135
                      endif
                endfor 2135 build tree for partition
                pattern_tree[root_array[partition_num]] =
                      buildtree(sorted_patternset[root_array[partition_num] through p - 1])

2140 decrement partition_num if current pattern doesn't match
            else
                partition_num = partition_num - 1
            endif
    endfor

FIG. 21A

2145 include any remaining patterns in partition 0
if partition_num = 0
   root_array[0] = p
   pattern_tree[p] = buildtree(sorted_patternset[p through last_p])
endif

2150 return pointer array
   return root_array

FIG. 21B

2200 TREE_BASED COMMAND PATTERN PARSING PROCEDURE

1902 initialize variables/create priority queue
   m_np = number of patterns in patternset
   m_nr = number of words in utterance
   m_nc[m_np] = array storing number of fields in each pattern
   p = r = c = 0
   i = 1
   bestscore = INFINITY
   bestpattern = m_np
   create pQueue 1904 define macro used to place information in priority queue
   NODE(score,i,p,r,c) (((score)<<28) + ((i)<<24) + ((p)<<16) + ((r)<<8) + (c))

1906 initialize all scores to be bad
   for p < m_np
      for r < m_nr
         for c < m_nc[p]
            err1[p][r][c] = err2[p][r][c] = err3[p][r][c] = INFINITY
            c = c + 1
         endfor
         c = 0
         r = r + 1
      endfor
      r = 0
      p = p + 1
   endfor 2208 give the starting node for each pattern a good score
   p = 0
   for p < m_np
      err1[p][0][0] = 0;
      p = p + 1
   endfor 2210 put starting node for the root pattern in priority queue
   insert NODE(0,1,0,0,0) on pQueue 1912 begin loop that continues until the queue is empty

FIG. 22A 1914 remove best-scoring node from the queue and unpack it
    theNode = smallest entry from pQueue
    remove smallest entry from pQueue
    nodeScr = theNode >> 28
    pb = (theNode & 0x000ff0000) >> 16
    rb = (theNode & 0x0000ff00) >> 8
    cb = theNode & 0x000000ff
    i = (theNode & 0x000f00000) >> 24

1916 only process node if it has the best score for the word/field pair and its score is better than the best final score
    if (i=1 and nodeScr > err1[pb][rb][cb]) or
       (i=2 and nodeScr > err2[pb][rb][cb]) or
       (i=3 and nodeScr > err3[pb][rb][cb]) or
       (nodeScr >= bestscore)
          goto 2280
    endif 1918 don't process if this node represents a final score
    if (rb = m_nr[pb] and cb = m_nc)
       goto 1980
    endif 2219 if node is state 1 node, and the pattern has a partition for this field, add a new node for the first pattern of the partition to the queue
    if (i = 1) and (pattern_tree[pb,cb] has a value)
       insert NODE(nodescr,1,pattern_tree[pb,cb],rb,cb) on pQueue
    endif 1920 initialize score for node to begin dynamic programming for the node to update all nodes that can be reached by deletion, insertion, or substitution
    scr = INFINITY 1922 perform post-insertion (state 3) processing, if applicable
    if i = 3
       scr = err3[pb][rb][cb]

1924 get score for single-word post-insertion
       addscr = getPostInsertScore(utterance[rb], patternset[pb,cb])

1926 save score and node if better than current score for word/field pair
       if (scr + addscr < err3[pb][rb+1][cb])
          err3[pb][rb+1][cb] = scr + addscr
          insert NODE(scr+addscr,3,pb,rb+1,cb) on pQueue
       endif

| Frame | 840 ("A") | 805 ("B") | 810 ("C") | 815 ("D") | Next Node ("N") |
|---|---|---|---|---|---|
| 900 — 0 | 0 | — | — | — | — |
| 905 — 1 | $S_{A1} = A_{A1}$ | $S_{B1} = A_{B1}$ | — | — | — |
| 910 — 2 | $S_{A2} = S_{A1} + A_{A2}$ | $S_{B2} = \min(S_{B1} + \text{stay}_B, S_{A1}) + A_{B2}$ | $S_{C2} = S_{B1} + \text{leave}_B + A_{C2}$ | — | — |
| 915 — 3 | $S_{A3} = S_{A2} + A_{A3}$ | $S_{B3} = \min(S_{B2} + \text{stay}_B, S_{A2}) + A_{B3}$ | $S_{C3} = \min(S_{C2} + \text{stay}_C, S_{B2} + \text{leave}_B) + A_{C3}$ | $S_{D3} = S_{C2} + \text{leave}_C + A_{D3}$ | — |
| 920 — 4 | $S_{A4} = S_{A3} + A_{A4}$ | $S_{B4} = \min(S_{B3} + \text{stay}_B, S_{A3}) + A_{B4}$ | $S_{C4} = \min(S_{C3} + \text{stay}_C, S_{B3} + \text{leave}_B) + A_{C4}$ | $S_{D4} = \min(S_{D3} + \text{stay}_D, S_{C3} + \text{leave}_C) + A_{D4}$ | $S_{N4} = S_{D2} + \text{leave}_D + A_{D4}$ |
| 925 — n | $S_{An} = S_{An-1} + A_{An}$ | $S_{Bn} = \min(S_{Bn-1} + \text{stay}_B, S_{An-1}) + A_{Bn}$ | $S_{Cn} = \min(S_{Cn-1} + \text{stay}_C, S_{Bn-1} + \text{leave}_B) + A_{Cn}$ | $S_{Dn} = \min(S_{Dn-1} + \text{stay}_D, S_{Cn-1} + \text{leave}_C) + A_{Dn}$ | $S_{Nn} = \min(S_{Nn-1} + \text{stay}_M, S_{Mn-1} + \text{leave}_M) + A_{Nn}$ |

FIG. 31

| Frame | 810 ("A") | 805 ("B") | 810 ("C") | 815 ("D") | Next Node ("N") |
|---|---|---|---|---|---|
| 900 — 0 | $S_{A0} = 0$ | — | — | — | — |
| 905 — 1 | $S_{A1} = f(S_{A0}, A_{A1})$ | $S_{B1} = f(S_{A0}, A_{B1})$ | — | — | — |
| 910 — 2 | $S_{A2} = f(S_{A1}, A_{A2})$ | $S_{B2} = f(S_{B1}, \text{stay}_B, S_{A1}, A_{B2})$ | $S_{C2} = f(S_{B1}, \text{leave}_B, A_{C2})$ | — | — |
| 915 — 3 | $S_{A3} = f(S_{A2}, A_{A3})$ | $S_{B3} = f(S_{B2}, \text{stay}_B, S_{A2}, A_{B3})$ | $S_{C3} = f(S_{C2}, \text{stay}_C, S_{B2}, \text{leave}_B, A_{C3})$ | $S_{D3} = f(S_{C2}, \text{leave}_C, A_{D3})$ | — |
| 920 — 4 | $S_{A4} = f(S_{A3}, A_{A4})$ | $S_{B4} = f(S_{B3}, \text{stay}_B, S_{A3}, A_{B4})$ | $S_{C4} = f(S_{C3}, \text{stay}_C, S_{B3}, \text{leave}_B, A_{C4})$ | $S_{D4} = f(S_{D3}, \text{stay}_D, S_{C3}, \text{leave}_C, A_{D4})$ | $S_{N4} = f(S_{D3}, \text{leave}_D, A_{D3})$ |
| 925 — n | $S_{An} = f(S_{An-1}, A_{An})$ | $S_{Bn} = f(S_{Bn-1}, \text{stay}_B, S_{An-1}, A_{Bn})$ | $S_{Cn} = f(S_{Cn-1}, \text{stay}_C, S_{Bn-1}, \text{leave}_B, A_{Cn})$ | $S_{Dn} = f(S_{Dn-1}, \text{stay}_D, S_{Cn-1}, \text{leave}_C, A_{Dn})$ | $S_{Nn} = f(S_{Dn-1}, \text{leave}_N, A_{Nn})$ |

US 6,839,669 B1

PERFORMING ACTIONS IDENTIFIED IN RECOGNIZED SPEECH

This application claims benefit of prior U.S. Provisional Application No. 60/107,253, filed Nov. 5, 1998.

TECHNICAL FIELD

The invention relates to recognizing recorded speech and performing actions identified in the speech.

BACKGROUND

A speech recognition system analyzes a user's speech to determine what the user said. Most speech recognition systems are frame-based. In a frame-based system, a processor divides a signal descriptive of the speech to be recognized into a series of digital frames, each of which corresponds to a small time increment of the speech.

A continuous speech recognition system can recognize spoken words or phrases regardless of whether the user pauses between them. By contrast, a discrete speech recognition system recognizes discrete words or phrases and requires the user to pause briefly after each discrete word or phrase. Continuous speech recognition systems typically have a higher incidence of recognition errors in comparison to discrete recognition systems due to complexities of recognizing continuous speech.

In general, the processor of a continuous speech recognition system analyzes "utterances" of speech. An utterance includes a variable number of frames and may correspond to a period of speech followed by a pause of at least a predetermined duration.

The processor determines what the user said by finding acoustic models that best match the digital frames of an utterance, and identifying text that corresponds to those acoustic models. An acoustic model may correspond to a word, phrase or command from a vocabulary. An acoustic model also may represent a sound, or phoneme, that corresponds to a portion of a word. Collectively, the constituent phonemes for a word represent the phonetic spelling of the word. Acoustic models also may represent silence and various types of environmental noise.

In a typical speech recognition system, a user dictates into a microphone connected to a computer. The computer then performs speech recognition to find acoustic models that best match the user's speech. The words or phrases corresponding to the best matching acoustic models are referred to as recognition candidates. The computer may produce a single recognition candidate (i.e., a single sequence of words or phrases) for an utterance, or may produce a list of recognition candidates. Typically, the best recognition candidate is immediately displayed to the user or an action corresponding to the best recognition candidate is performed. The user generally is permitted to correct errors in the recognition. Other recognition candidates may also be displayed.

SUMMARY

The invention provides techniques that take speech recognition away from the desktop and provide users with the benefits of large vocabulary continuous speech recognition in a mobile environment. The techniques leverage the power of continuous speech recognition systems, such as Dragon NaturallySpeaking available from Dragon Systems, Inc. of Newton, Mass., the capabilities of digital recorders, and the advantages of using a contact manager or similar system for personal information management.

The techniques permit users to enter information into their contact manager or similar software and to create actions (such as sending electronic mail) easily and at a convenient time (i.e., when an idea occurs to a user). They are able to create actions quickly, regardless of whether a computer is immediately available. The techniques then provide for quick and reliable performance of the requested actions.

The techniques operate according to a simple process. First, a user turns on a recorder and states what he wants to have happen. For example, the user might say "schedule an appointment with Joel for tomorrow at 3 o'clock" or "send an email to Paula Paula, please review the following . . . " or "take down a note I just met with Mr. Smith and the result of the meeting . . . ". When the user returns to his office, or is otherwise able to access his computer, he connects the recorder to his computer and clicks one button to have the system automatically transcribe the recorded information. The user then reviews the transcription and clicks a second button to instruct the computer to perform the actions represented by the transcription. The computer then automatically sends the email, schedules the appointment, adds the notes to the appropriate contact records, and performs any other necessary action. Thus, the techniques provide the user with a portable, pocket-sized assistant that uses speech recognition software and a contact manager or similar product to make actions happen.

The system may employ a telephone or other communication device instead of a recorder. In this variation, the user calls into the computer using the telephone and dictates the action item. The computer processes the action item and displays it to the user when the user returns to the office. Alternatively, the computer may provide audio feedback to permit the user to review the action item and to cause the computer to perform the action immediately. Interactive correction may be provided using spoken commands and by pressing appropriate telephone keys.

The techniques promise to provide enhanced productivity through ease of use and reduced access time. Use of a portable recorder or telephone to initiate actions avoids delays associated with waiting for a computer to boot up and an application to load when using a notebook computer. It also avoids difficulties associated with entering information into personal digital assistants ("PDAs"), which may be slow and error-prone because of tiny keys or handwriting recognition systems that require learning a new alphabet. Also, by eliminating the need to observe a display screen while entering information, the techniques promise to provide enhanced multitasking, such as, for example, permitting safe initiation of actions while driving.

The techniques also provide ease of use by permitting a user to enter information without first selecting which application is appropriate for the data being entered, and without requiring the user to enter data field by field, with little flexibility. Instead, the user is permitted to enter free-form commands that the system then interprets. For example, a user could say "Set up a meeting with Rich and Roger at 3 p.m. next Friday" into a portable recorder or telephone, instead of keying or writing and tabbing from field to field to enter the information.

Using speech as an input mechanism is fast, eyes-free, and intuitive. Using a portable recorder or telephone for speech input permits easy capture of spontaneous ideas and thoughts, without requiring visual monitoring of a display screen or waiting for a computer to boot up, and while performing other actions. Speech input is so convenient that users are much more motivated to complete what were previously time-consuming tasks, such as entering notes on a recent meeting, or writing a "thank you" letter.

The techniques permit speech input to seamlessly integrate with contact management, electronic mail, word processing and fax software, so that a user can synchronize and feel confident that a dictated fax or electronic mail message will be sent to the correct person, in the correct format, and with the intended message. Thus, the techniques provide a portable, "eyes free" solution that is available the instant that information needs to be entered.

In one general aspect, a computer performs recorded action items after receiving recorded spoken utterances identifying action items. The computer performs speech recognition on the recorded spoken utterances to generate texts of the action items. Next, the computer parses the texts to determine properties of the action items. After parsing the texts for multiple action items, the computer permits the user to indicate that the user has reviewed one or more action items. Finally, the computer automatically carries out the action items indicated as having been reviewed by the user.

Embodiments may include one or more of the following features. Spoken utterances identifying action items may be recorded using, for example, a portable digital recorder, a portable analog recorder, or a telephone, to produce the recorded spoken utterances. The recorded spoken utterances then are transferred from the portable recorder or other device to the computer.

The portable recorder may generate a time stamp indicative of a date and time at which the recorded spoken utterance was produced. This time stamp may be transferred from the recorder to the computer, and may be used in parsing the text of the associated action item. For example, when the text of an action item includes a relative date or time, parsing the text may include evaluating the relative date or time relative to the time stamp. When no time stamp is available, parsing of relative dates and times may include evaluating the dates and times relative to a date and time (e.g., the current system time) stored in the computer. When a telephone is used, a time stamp may be generated based on the time of the call.

When a telephone or similar device is used to generate the recorded spoken utterance, speech recognition may be performed immediately after the spoken utterance has been recorded. However speech recognition and subsequent processing may be deferred until multiple spoken utterances have been recorded. For example, the computer may perform speech recognition on multiple recorded spoken utterances without user interaction.

One example of an action item performed by the computer in response to a recorded spoken utterance is the scheduling of an appointment in an electronic calendar. The appointment may be a meeting involving one or more contacts. The computer may automatically send an e-mail confirmation of the meeting to the contacts.

Multiple action items may be received, recognized, parsed, and displayed in response to a single command from the user and without further user intervention. For example, the user may attach the recorder to the computer and click on a "Get Items" button on the display. The computer responds by processing all of the action items prior to displaying them for review by the user.

Similarly, multiple action items may be carried out in response to a single command from the user and without further user intervention. For example, after reviewing several action items, the user can click on a "Send Items" button on the display. The computer responds by performing the actions associated with the reviewed action items. The computer saves unreviewed action items for later review.

The computer may visually display the properties of the action items for review by a user, and may display reviewed action items differently from unreviewed action items. For example, the computer may display reviewed action items in a color different from a color used to display unreviewed action items.

Parsing the text may include a two step process. In the first step, the computer performs a syntactic parsing of the text to assign different words to different properties of the action item. The computer then performs a semantic parsing of the words assigned to each property of the action item to generate a value for the associated property. The syntactic parsing may include evaluating the text relative to a set of patterns representative of different types of action items. The syntactic parsing may employ a priority queue for increased performance.

The computer may permit a user to force an action to be of a particular type by stating a designated word at or near the beginning of a spoken utterance of an action item. For example, the user may start an utterance of an action item with "appointment" to force the action item to be an appointment. When forced action item types are permitted, parsing may include looking for the designated word at or near the beginning of the text. When the designated word is found, the syntactic parsing is performed using only a subset of the set of patterns, with the subset including only patterns associated with the action item type corresponding to the designated word.

A number of approaches may be employed to improve parser efficiency. For example, in the syntactic parsing step, processing of an utterance relative to a pattern may be stopped when it becomes apparent that the pattern will be unable to match the utterance as well as a previously-considered pattern. When a priority queue is used, this condition will be true when the best-scoring entry in the priority queue does not score as well as a previously-considered pattern. This approach provides considerable reductions in the processing associated with parsing an utterance, particularly when an early pattern scores well.

Another approach processes all of the patterns simultaneously using a single priority queue. The priority queue is initialized with an entry for each pattern, and processing stops when the end field for any pattern is reached. This variation substantially reduces the processing associated with parsing an utterance since only a single pattern is parsed to completion. Other patterns are parsed only to a level sufficient to ensure that they will not score as well as the best-scoring pattern.

Further processing efficiency may be achieved when using a single priority queue by eliminating redundant processing of overlapping pattern components. This is achieved by finding all patterns that share a common prefix, and scoring the prefix portion of only one of the patterns.

Other features and advantages will be apparent from the following description, including the drawings, and from the claims.

DESCRIPTION OF DRAWINGS

FIGS. 15A–15C and 16A–16G are flow charts of procedures implemented by a parser of the system of FIG. 1.

FIGS. 17–22B are flow charts of procedures implemented by alternative parsers of the system of FIG. 1.

FIGS. 30 and 31 are charts of scores corresponding to the states of the state graphs of FIGS. 29A–29C.

DETAILED DESCRIPTION

Figure 1:
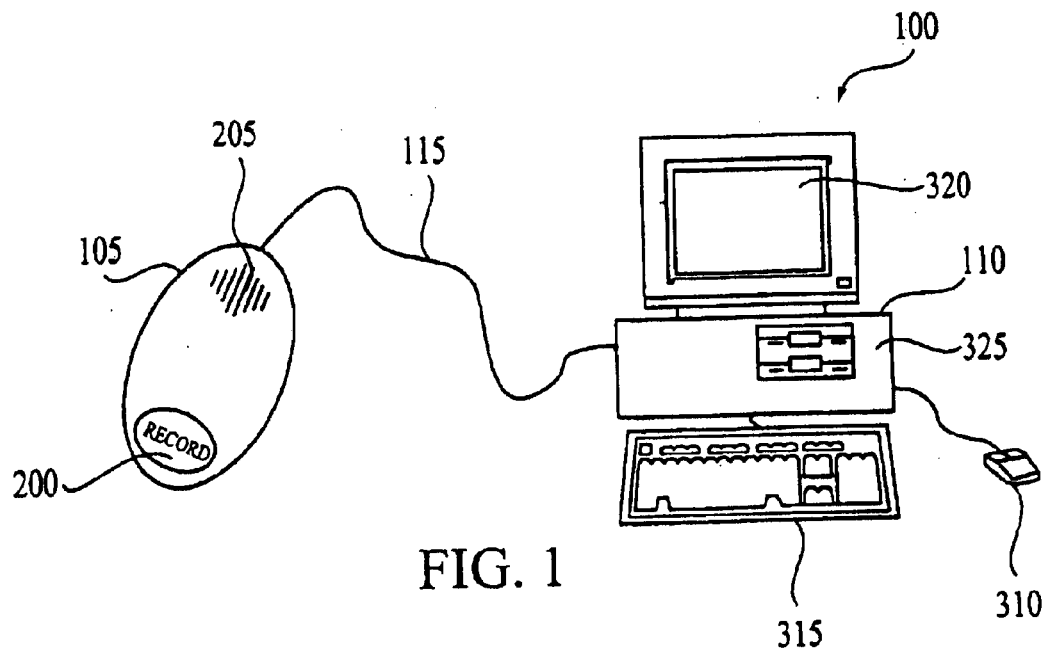
FIG. 1 is a block diagram of a speech recognition system.

Referring to FIG. 1, a system 100 for performing recorded actions includes a pocket-sized recorder 105 and a computer 110 (not shown to scale). When data is to be transmitted, the recorder 105 may be connected to the computer 110 using a cable 115. Other data transmission techniques, such as infrared data transmission, also may be used.

In the described implementation, the recorder 105 is a digital recorder having time stamp capabilities. One recorder meeting these criteria is the Dragon Naturally Mobile Pocket Recorder R1 manufactured for Dragon Systems, Inc., of Newton, Mass. by Voice It Worldwide, Inc. In other implementations, the recorder may be a digital recorder lacking time stamp capabilities, or an analog recorder using a magnetic tape.

Figure 1A:
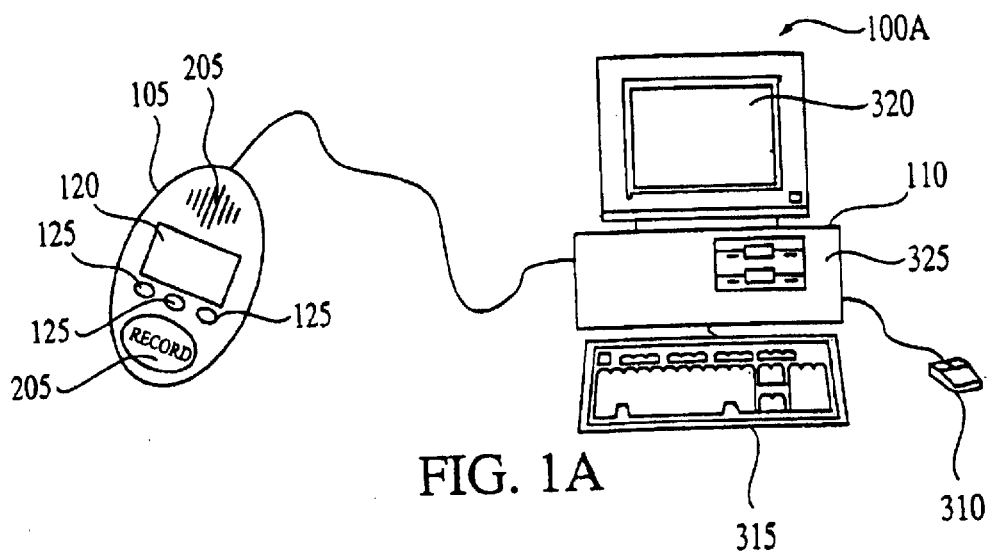
FIGS. 1A–1C are block diagrams of other implementations of the system of FIG. 1.

FIG. 1A illustrates a variation 100A of the system in which an output device 120 is attached to the recorder 105. Information about action items recorded using the recorder 105 and processed by the computer 110 is transferred automatically via the cable 115 for display on the output device 120. This variation permits the user to access, for example, appointments and contact information using the display 120. Keys 125 on the recorder are used to navigate through displayed information.

Figure 1B:
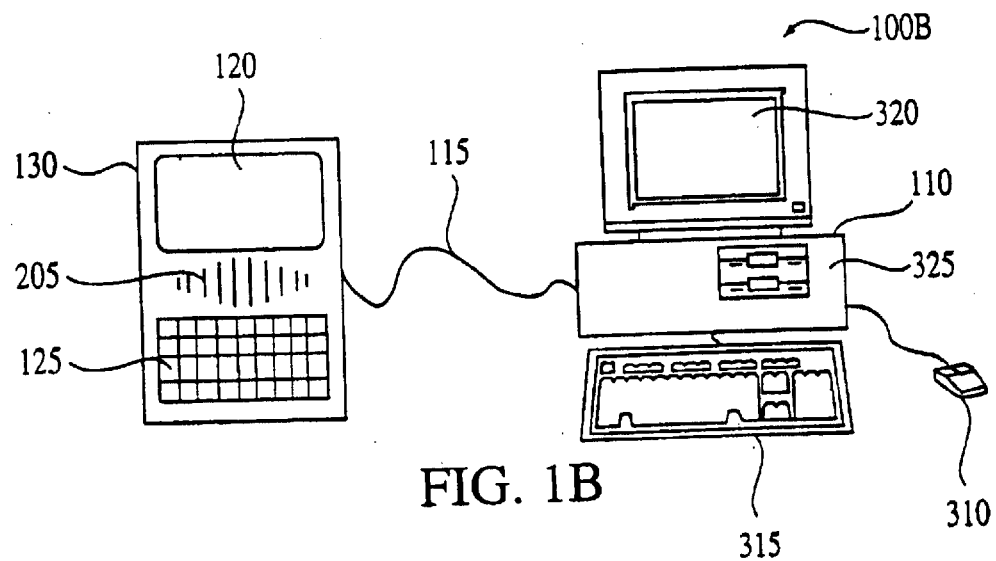

FIG. 1B illustrates another variation 100B in which the recording and output functionality are implemented using a PDA or a handheld computer 130. With this variation, it is contemplated that some instances of the handheld computer 130 may have sufficient processing capacity to perform some or all of the speech recognition, parsing, and other processing tasks described below.

Figure 1C:
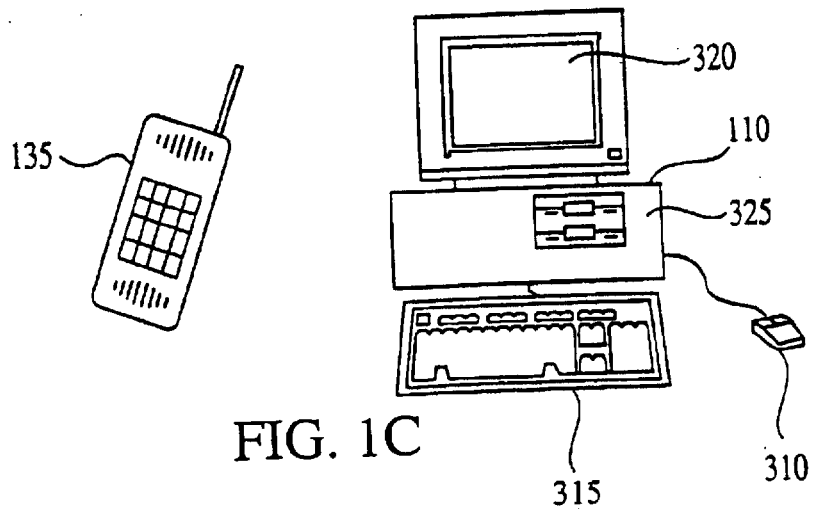

FIG. 1C illustrates another variation 100C in which the user's speech is immediately transmitted to the computer 110 using, for example, a cellular telephone 135. This variation permits the user to dictate actions over an extended period that might exceed the capacity of a recorder. Audio feedback may be provided to permit immediate review of an action item, interactive correction, and performance of the action item. The interactive correction may be provided using spoken commands, telephone key strokes, or a combination of the two.

Figure 2:
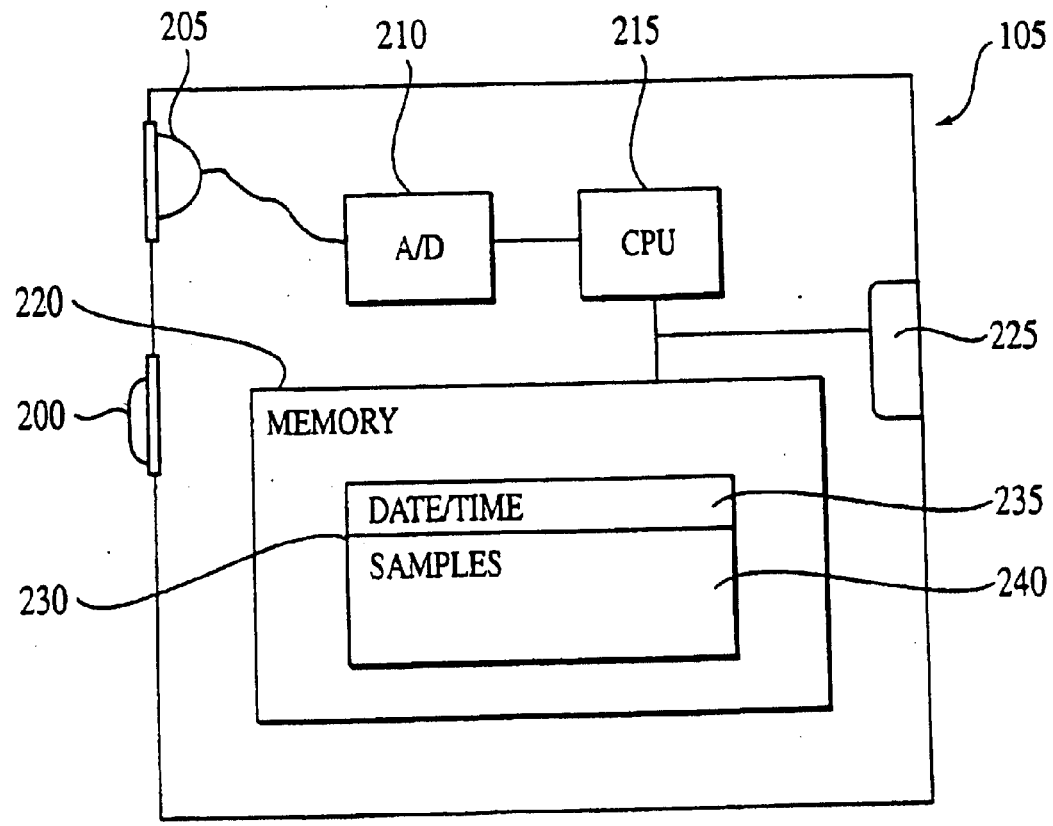
FIG. 2 is a block diagram of a recorder of the system of FIG. 1.

Referring to FIGS. 1 and 2, the recorder 105 includes a record button 200 that activates the recorder, a microphone 205 that converts a user's speech into an analog electrical signal, an analog-to-digital converter 210 that converts the analog electrical signal into a series of digital samples, a processor 215, a memory 220, and an output port 225 for connection to the cable 115. When the user presses the record button 200 and speaks into the microphone 205, the processor creates a file 230 in memory 220 and stores in the file a time stamp 235 corresponding to the time at which the button was pressed in the file. The processor then stores the digital samples 240 corresponding to the user's speech in the same file. In some implementations, the processor uses compression techniques to compress the digital samples to reduce storage and data transfer requirements. In general, each file corresponds to an action item and may be designated as such. The user may use the recorder multiple times before transferring data to the computer 110, so that multiple action items may be stored in memory 220.

Figure 3:
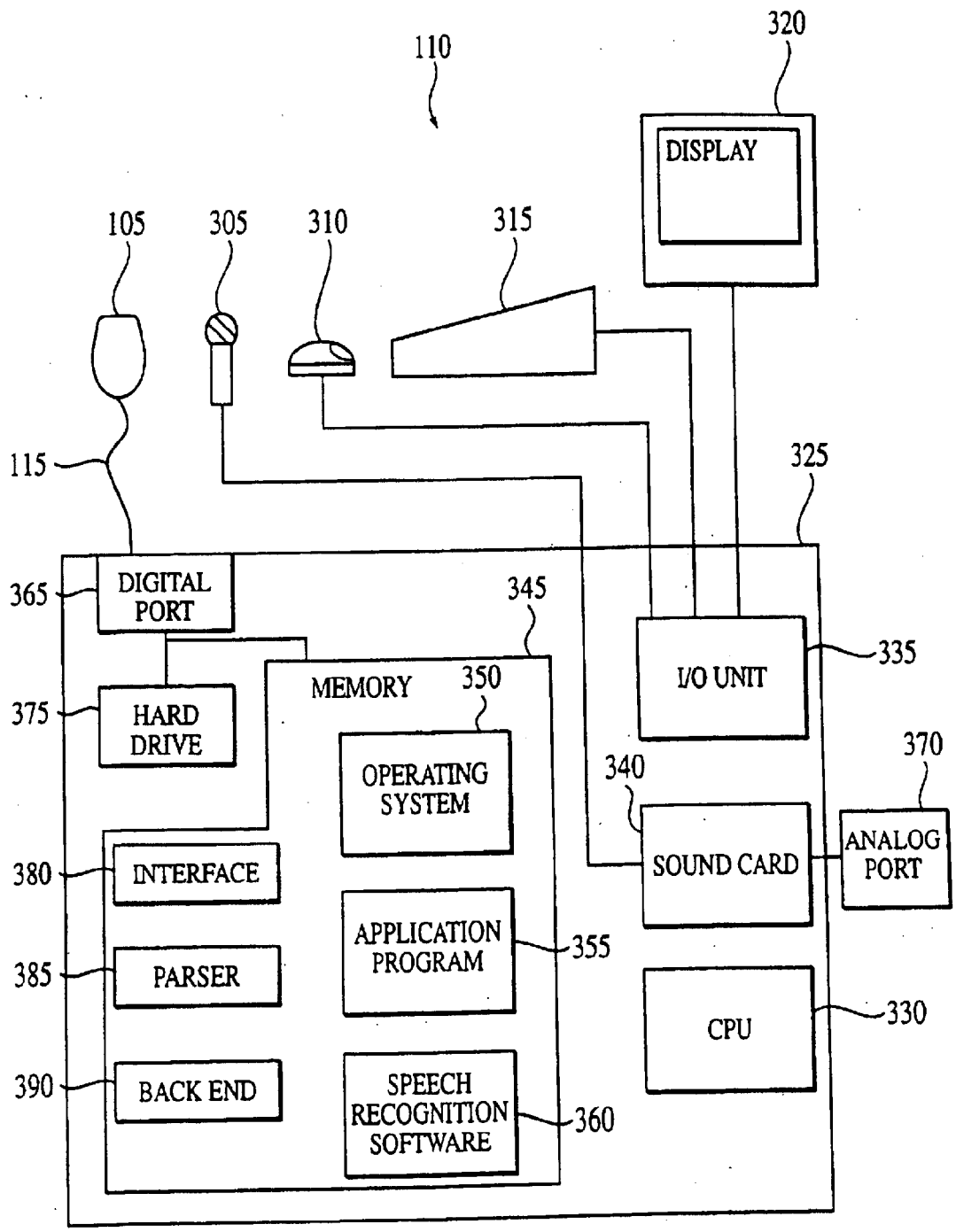
FIG. 3 is a block diagram of a computer of the system of FIG. 1.

Referring also to FIG. 3, the computer 110 may be a standard desktop computer. In general, such a computer includes input/output (I/O) devices (e.g., microphone 305, mouse 310, keyboard 315, and display 320) and a console 325 having a processor 330, an I/O unit 335 and a sound card 340. A memory 345 stores data and programs such as an operating system 350, an application program 355 (e.g., a word processing program), and speech recognition software 360. A computer suitable for one implementation of the system includes a 200 MHz Pentium® processor, 64 MB memory, 200 MB of available hard drive space. The computer runs Windows 95, Windows 98, or Windows NT 4.0 as an operating system.

The computer 110 may be used for traditional speech recognition. In this case, the microphone 305 receives the user's speech and conveys the speech, in the form of an analog signal, to the sound card 340, which in turn passes the signal through an analog-to-digital (A/D) converter to transform the analog signal into a set of digital samples. Under control of the operating system 350 and the speech recognition software 360, the processor 330 identifies utterances in the user's continuous speech. Utterances are separated from one another by a pause having a sufficiently-large, predetermined duration (e.g., 160–250 milliseconds). Each utterance may include one or more words of the user's speech.

The system also includes a digital recorder port 365 and/or an analog recorder port 370 for connection to the cable 115. The digital recorder port 365 is used to transfer files generated using the recorder 105. These files may be transferred directly into memory 345, or to a storage device such as hard drive 375. The analog recorder port 370 is connected to the sound card 340 and is used to transmit speech recorded using an analog or digital recorder to the sound card. The analog recorder port may be implemented using a line in port. The handheld recorder is connected to the port using a cable connected between the line in port and a line out or speaker port of the recorder. The analog recorder port also may be implemented using a microphone, such as the microphone 305. Alternatively, the analog recorder port 370 may be implemented as a tape player that receives a tape recorded using a handheld recorder and transmits information recorded on the tape to the sound card 340.

To implement the speech recognition and processing functions of the system 100, the computer 110 runs interface software 380, the speech recognition software 360, a parser 385, and back-end software 390. Dragon NaturallySpeaking Preferred Edition 3.1, available from Dragon Systems, Inc. of Newton, Mass., offers one example of suitable speech recognition software. The interface software 380 provides a user interface for controlling the transfer of data from the digital recorder and the generation of action items for use by the back-end software 390. In general, the user interface may be controlled using input devices such as a mouse or keyboard, or using voice commands processed by the speech recognition software.

After transferring data from the recorder, the interface software 380 provides the digital samples for an action item to the speech recognition software 360. If the digital samples have been stored using compression techniques, the interface software 380 decompresses them prior to providing them to the speech recognition software. In general, the speech recognition software analyzes the digital samples to produce a sequence of text, and provides this sequence to the interface software 380. The interface software 380 then transfers the text and the associated-time stamp, if any, to the parser 385, which processes the text in conjunction with the time stamp to generate a parsed version of the action item. The parser returns the parsed action item to the interface software, which displays it to the user. After any editing by the user, and with user approval, the interface software then transfers the action item to the appropriate back-end software 390. An example of back-end software with which the system works is contact management software, such as Symantec ACT! version 4.0, which is available from Symantec Corporation. Another example is personal information management software, such as Microsoft Outlook, which is available from Microsoft Corporation of Redmond, Wash. Other suitable back-end software includes time management software, expense reporting applications, electronic mail programs, and fax programs.

System Operation

Figure 4:
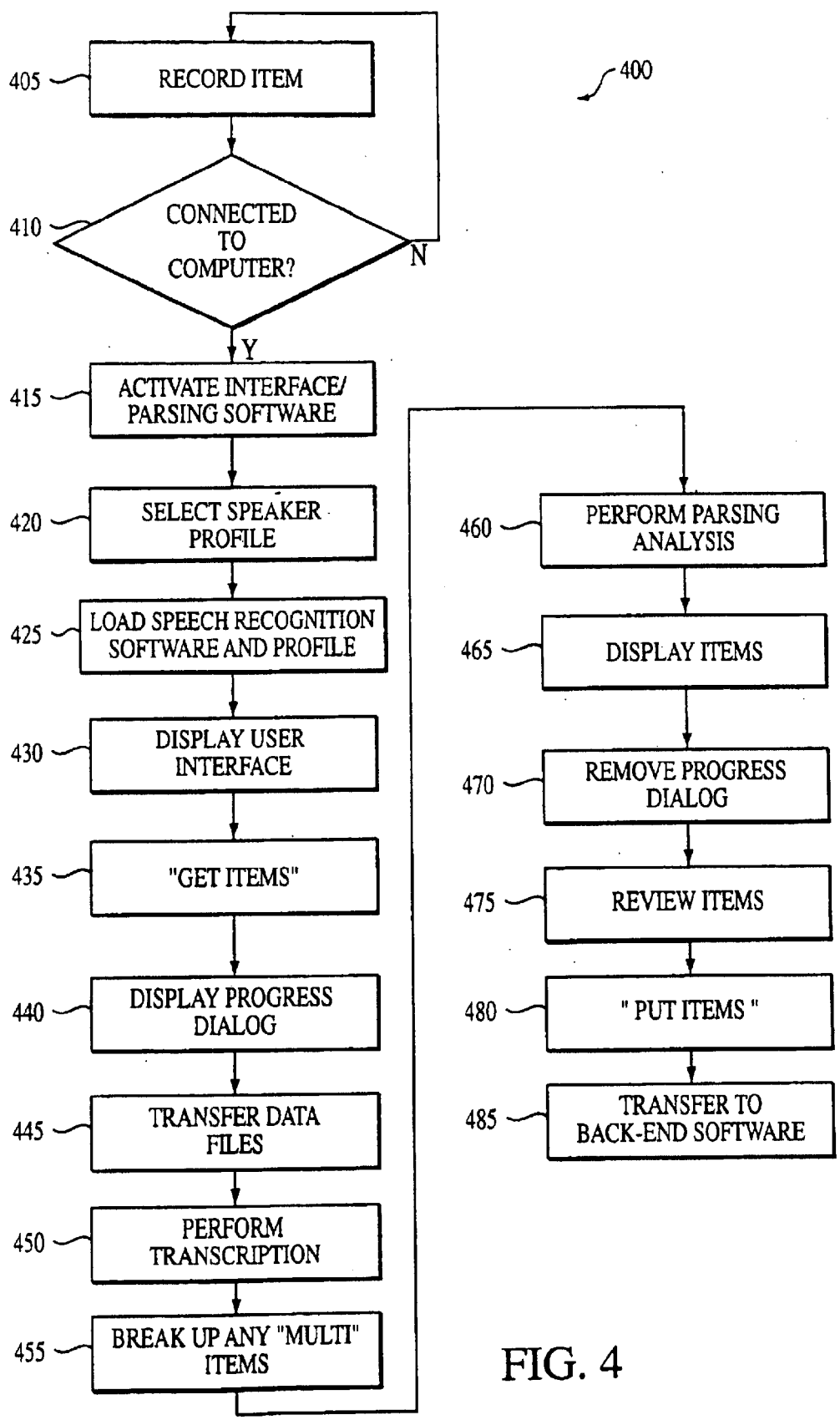
FIG. 4 is a flow chart of a procedure implemented by the system of FIG. 1.

Referring to FIG. 4, the system 100 operates according to a procedure 400. In general, work flow using the system includes two portions: the portion (i.e., step 405) performed using the recorder 105 (or a telephone or another communication device), and the portion (i.e., steps 410–485) performed using the computer 110.

To capture an action item when using a recorder, the user takes the recorder 105 out of his pocket, presses the record button 200, and starts speaking into the microphone 205 (step 405). For example, the user might say "remember to pick up my laundry tomorrow", or "schedule a meeting with Roger for tomorrow at 4 p.m. to discuss product plans".

When the user has finished dictating the action item, the user presses the record button a second time to stop recording. As noted above, the recorder 105 automatically places each action item into a separate file for easier processing. The recorder also automatically time stamps each action item when the item is created. This information is used by the parser 385.

To capture an action item when using a telephone, the user dials into the computer 110 using the telephone. The user then speaks into the telephone in the same manner as described above. In one implementation, the user ends the call after dictating the action item. In other implementations, the computer provides audio feedback and interactive correction of the action item so that the user can cause the action item to be performed before ending the call The interface software 380 and the parser 385 expect the user to speak a command at the beginning of every action item. For example, when the user says "send e-mail to Roger Roger, I would like to talk to you . . . ", the parser 385 extracts the phrase "send e-mail to Roger" at the beginning of the recording to determine the disposition of the action item.

The user can give relatively complex instructions to control the disposition of the item. For example, the user can say something like "schedule a meeting with Jim and Janet for 3 p.m. next Tuesday portable recorder product discussion". The parser then extracts the fact that the action item is a meeting, that both Jim and Janet should be scheduled for the meeting, that the meeting should take place the Tuesday in the week following the day that the action item is recorded, and that the meeting should take place at 3 p.m. The remainder of the recording is assumed to be the description of the meeting ("portable recorder product discussion" in this example). The system also supports instructions including imbedded descriptions, such as "schedule a meeting about new product plans for next Tuesday at 3," where "new product plans" would be the description.

The user can also add command information to an action item after beginning to dictate the text of the action item. The user can do this by using a user-designated trigger phrase to tell the parser that the information following the trigger phrase is a command. For example, the user could say "send e-mail to Roger Roger, I want to meet with you tomorrow. Computer please copy this to Paula". In this example, the phrase "computer please" was used to introduce the command "copy this to Paula". After saying "computer please", the user could say even a complex command using the same syntax used with command phrases recorded at the beginning of an action item.

The beginning of each action item is distinguished automatically by the recorder when the user stops and then starts recording again. If the user does not want to turn off the recorder to start a new action item, or if the user is using a recorder which does not record the start and end of action items, or a telephone, then the user can issue a trigger command, such as "Jabberwocky," to signal a break between action items. In addition, to simplify use of the system, the user may also use a user-designated keyword synonym for "Jabberwocky", such as "computer please new item".

For most action items, an arbitrary block of text follows the initial introductory command. This text is transcribed as dictated and usually constitutes the body of the item. For some items, like electronic mail, where there is both a subject and a body, the subject is formed programmatically from the body text. For example, the initial words of the body may be used as the subject. More complex rules also may be applied to distinguish the subject from the body.

The user is free to dictate as many action items as desired over an extended period of time. When the user is ready to process the action items, he connects the recorder 105 to the computer 110 using the cable 115 (step 410). Similarly, in a system using infrared data transmission, the user would place the recorder adjacent to the computer and press a transmit button. Of course, the user does not need to perform this step when generating action items using a telephone.

To transcribe and execute the action items, the user activates the interface software 380 (step 415). The interface software 380 then selects an appropriate speaker profile for the speech recognition software (step 420). If multiple speaker profiles are associated with the software (i.e., if multiple speakers use the software), then the interface software asks the user to identify a profile. As an alternative, a particular speaker profile may be associated with a particular recorder, and the interface software 380 may select automatically the appropriate profile upon connection of the recorder to the cable. Next, the interface software 380 loads the speech recognition software 360 and the speech files associated with the selected profile into memory (step 425).

This discussion assumes that the user has already prepared a speaker profile appropriate for the recorder being used. If not, then the interface software instructs the user to use the speech recognition software to prepare such a profile. Techniques for using a portable recorder to enroll a user in a speech recognition system are described in U.S. application Ser. No. 09/094,609, filed Jun. 15, 1998 and titled "NON-INTERACTIVE ENROLLMENT IN SPEECH RECOGNITION", which is incorporated by reference.

Figure 5A:
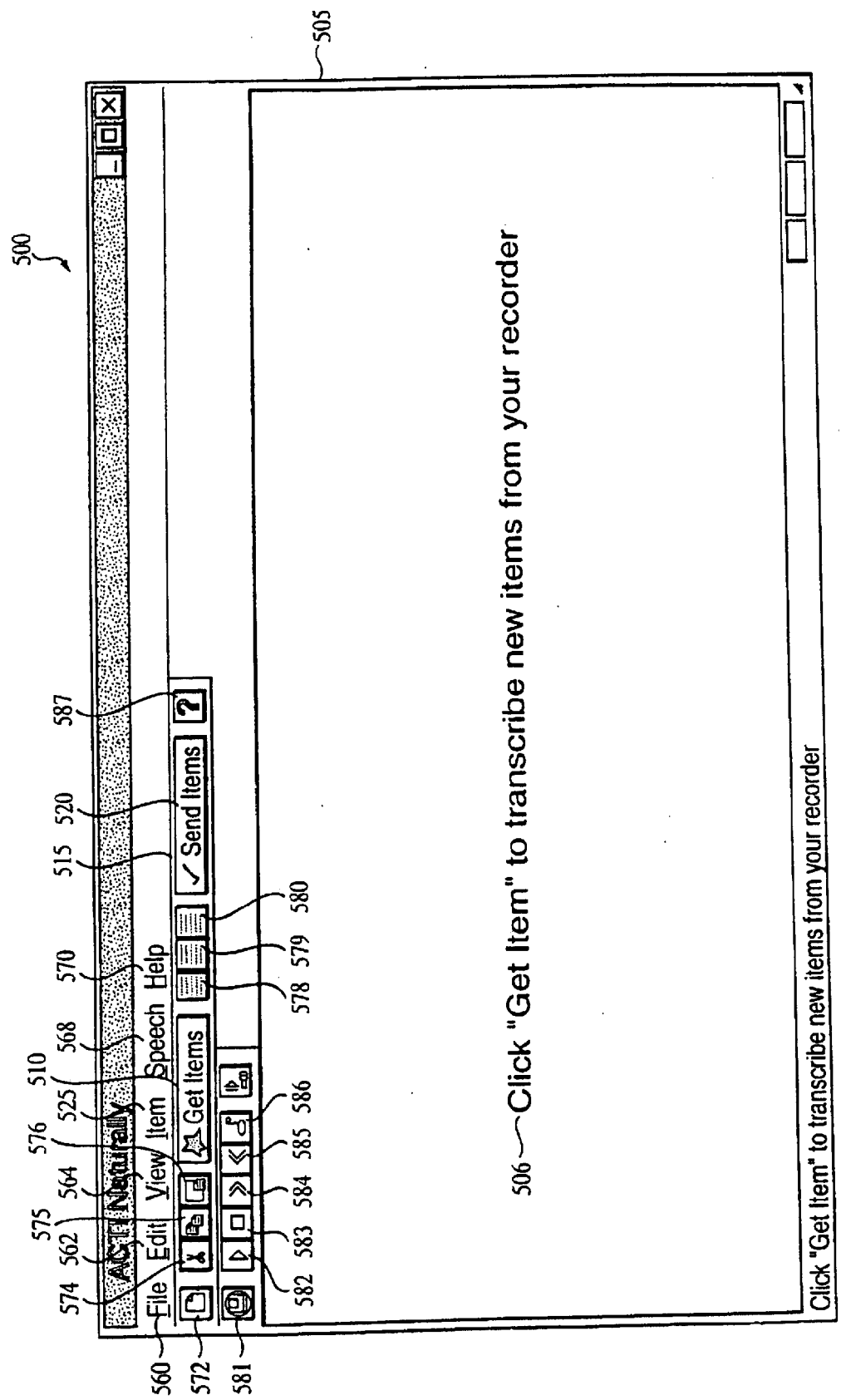
FIGS. 5A–5E are screen displays of a user interface of the system of FIG. 1.

Referring also to FIG. 5A, the interface software 380 then displays a user interface 500 including an action item review window 505 (step 430). Normally, as shown in FIG. 5A, the action item review window initially is empty and is covered by a user prompt 506 saying "Click Get Items to transcribe new items from your recorder." When the system includes action items that were not processed in previous sessions, these action items are listed in the action item review window upon activation of the interface software 380.

To enter new action items, the user clicks the "Get Items" button 510 from the toolbar 515 (step 435). The interface software 380 responds by implementing a transcription dialog that allows the user to select data transfer using the digital port 365 or the analog port 370, or to use data stored already in memory 345 (step 437). Data may be stored in memory, for example, when the user had previously generated action items using a telephone.

Figure 5B:
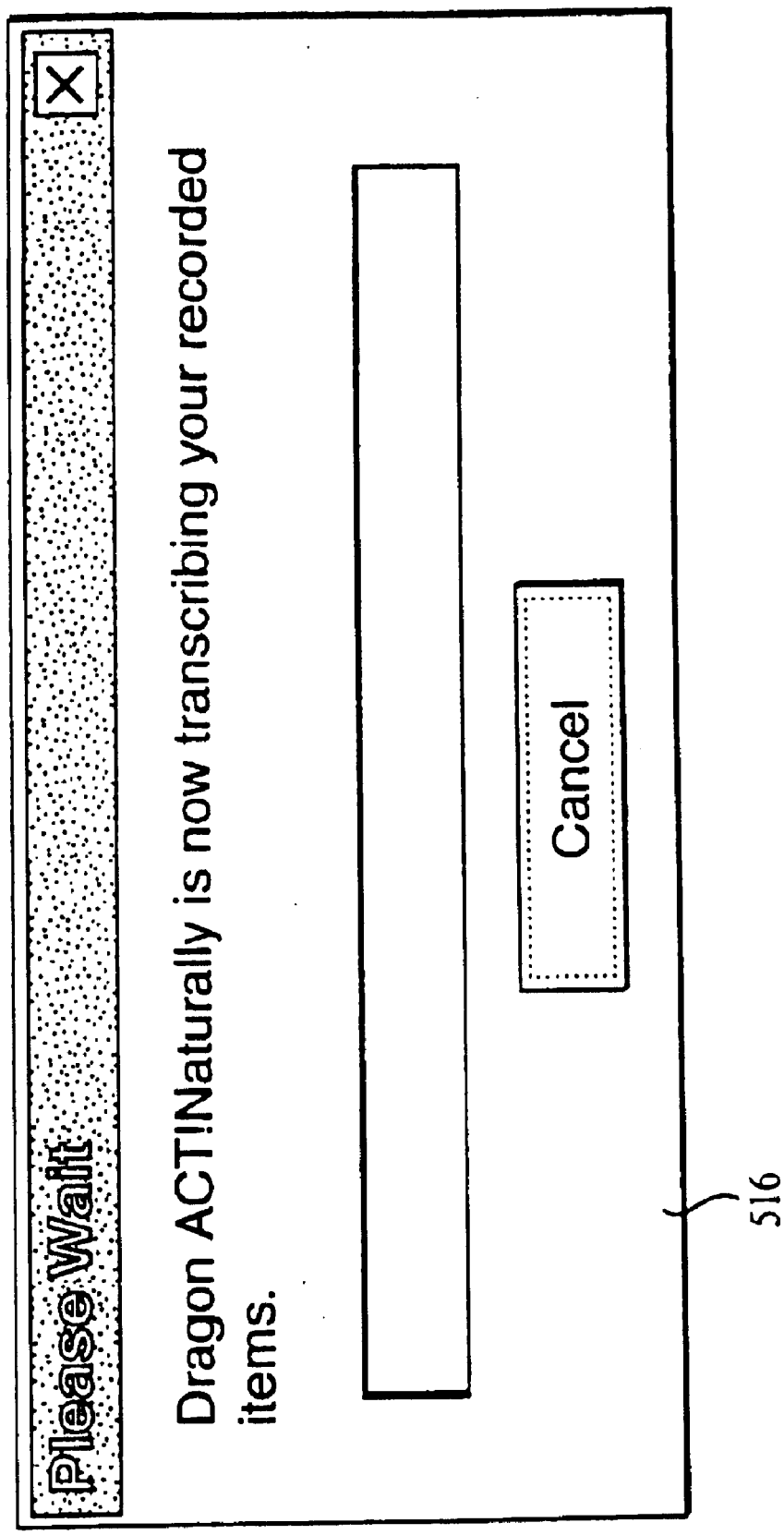

Next, as shown in FIG. 5B, the interface software 380 displays a progress dialog 516 that indicates the status of data transfer, recognition, and parsing (step 440). The software 380 then invokes a transfer program to transfer all of the data files stored in the memory of the recorder to the computer (step 445).

After the transfer is completed, the interface software 380 automatically starts the transcription process. First, the interface software 380 sends the data samples for each action item to the speech recognition software 360, which processes the data samples to convert each action item into a sequence of text (step 450).

After the action items are converted into text, the interface software 380 scans the recognized text for the trigger phrase "Jabberwocky" or another trigger phrase (e.g., "computer please new item") used to delineate the presence of multiple action items in a single file (step 455). If any such phrases are encountered, the interface software 380 generates new action items using the detected trigger phrases as the starting points for the action items. This step is particularly important when analog recorders, telephones, or digital recorders lacking time stamps are used, since these devices may not provide a mechanism for separating action items into different files. However, even when using a time-stamping recorder, which automatically inserts item boundaries in response to actuation of the record button, the user may employ a trigger phrase to dictate multiple items without actuating the record button between the items.

After identifying all action items, the interface software 380 calls the parser 385, which parses the items (step 460). The parser extracts all of the commands associated with an item and determines the final disposition of each item. The parser returns this information to the interface software 380, which displays the disposition (i.e., the action to be performed) and the text of each item in the action item review window (step 465).

During the downloading and parsing process (steps 440–465), the user is not required to interact with the interface software 380. Instead, the progress dialog 516 informs the user of the progress of the recognition and parsing of the downloaded speech.

Figure 5C:
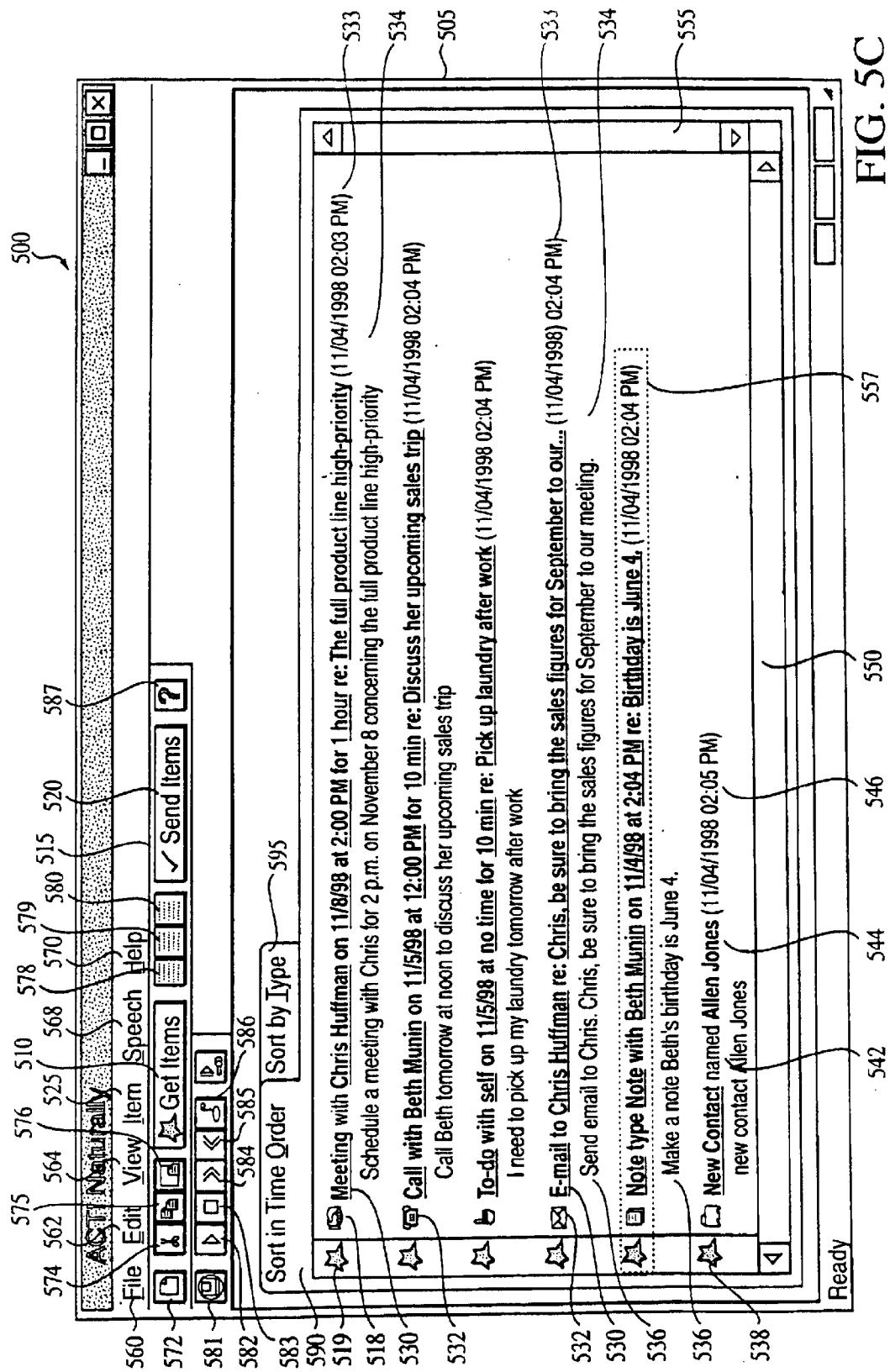

Referring also to FIG. 5C, once the processing is complete, the interface software displays all of the items in the action item review window and removes the progress dialog (step 470) to enable the user to access the user interface.

The user then reviews the items using review tools provided by the user interface (step 475). These review tools are discussed in detail below. In general, the user examines the transcribed text for each item and corrects any misrecognitions. The interface software automatically instructs the parser to reparse the item and to correct the disposition based on the correction of misrecognitions in the text. The user can change the disposition if the parser still misclassifies the action item. Thus, though the parsing analysis automatically determines the disposition of each item based on parsing the initial instructions in the items, the user can override these dispositions during the review process.

Figure 5D:
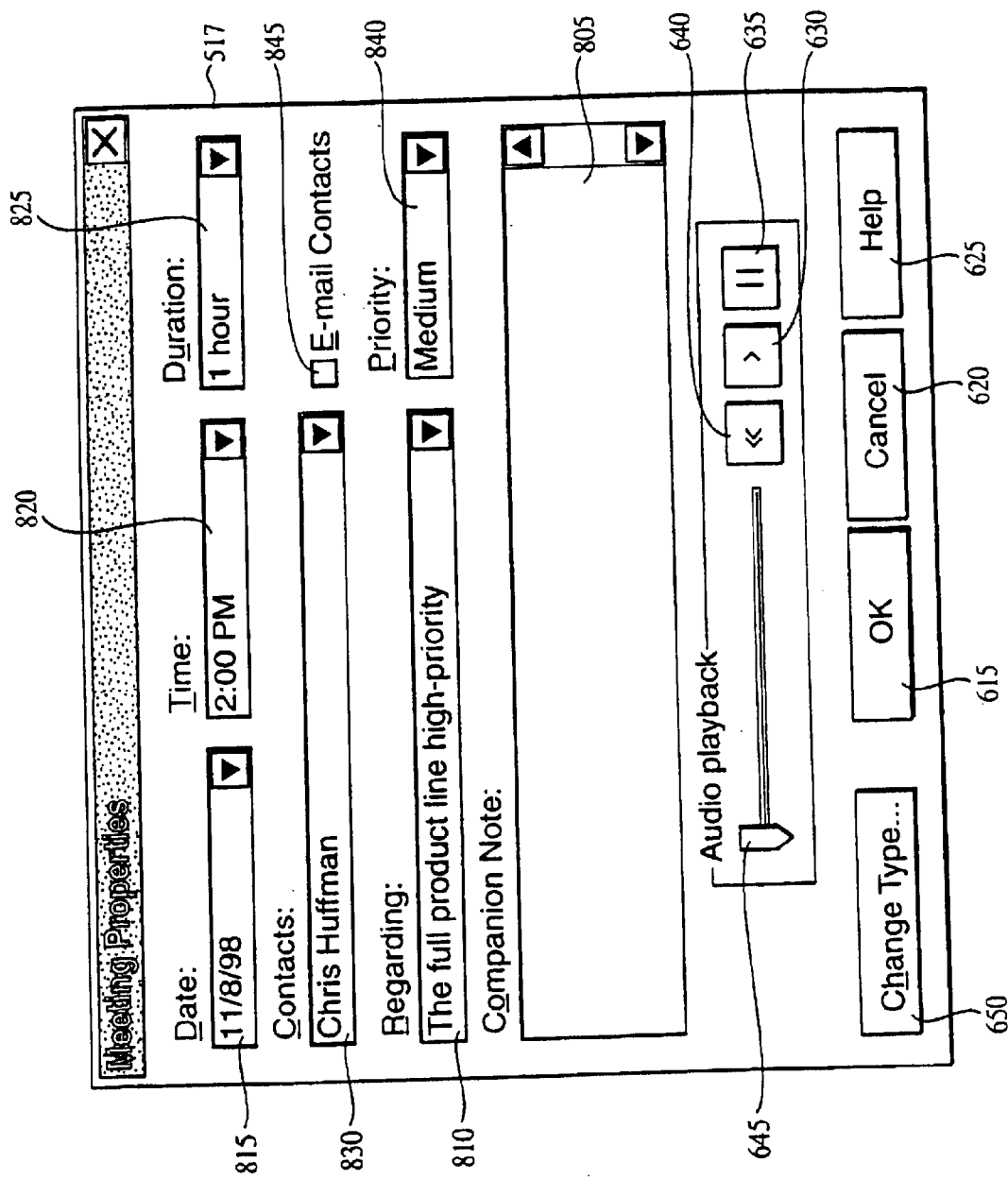

Among other review tools, the interface software provides special properties dialogs that permit the user to edit particular properties of different types of action items. For example, FIG. 5D illustrates the properties dialog 517 for a meeting or appointment item 518 from the action item review window 505.

Figure 5E:
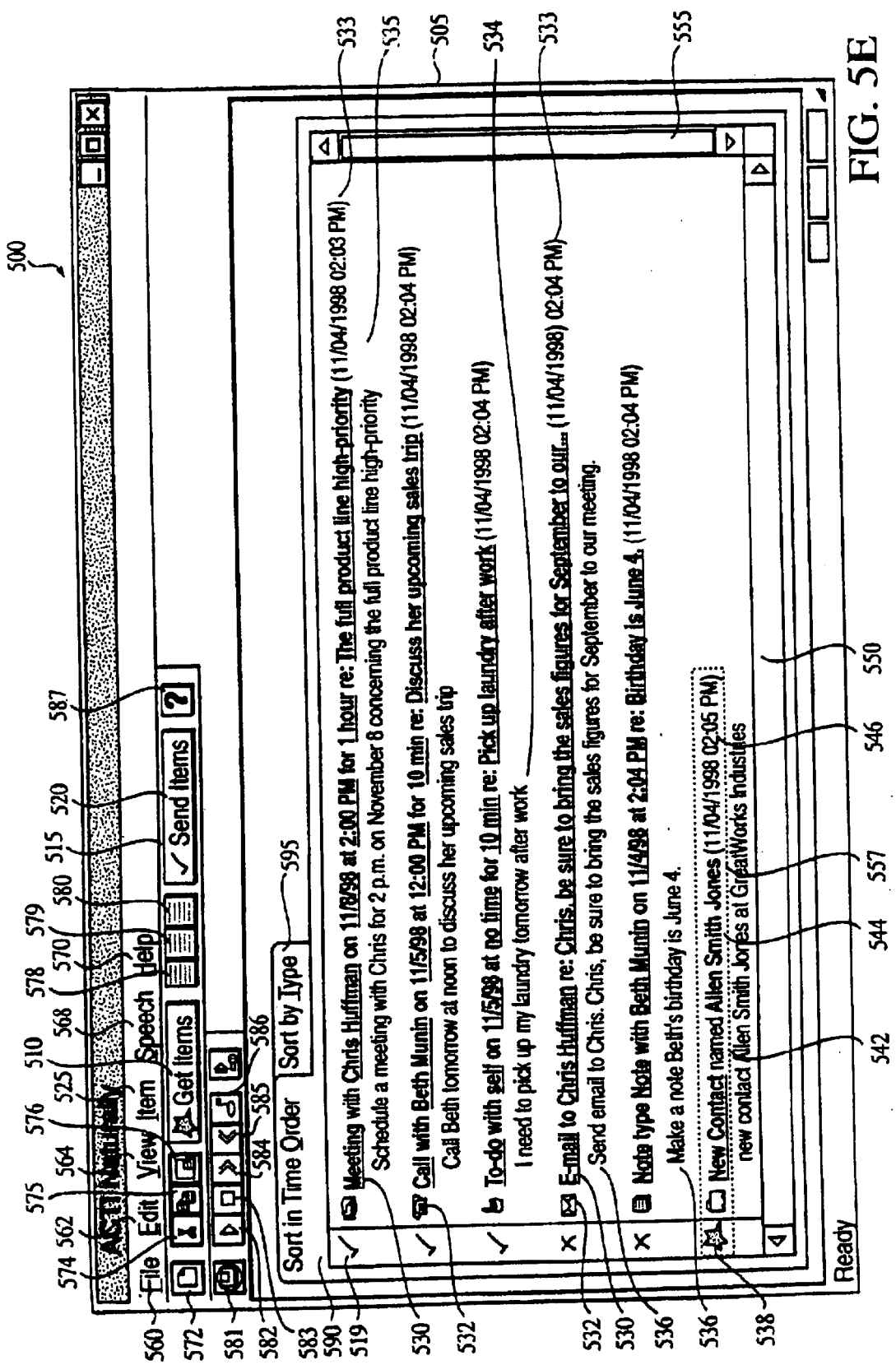

Once the user has reviewed an item, the interface software marks that item on the user interface as having been reviewed. Thus, as shown in FIG. 5E, the status icon 519 for the item 518 changes from a star (FIG. 5C) to a check mark (FIG. 5E).

After reviewing one or more items, the user clicks the "Send Items" button 520 (step 480). The interface software 380 responds by automatically transferring all reviewed action items to the appropriate back-end software (step 485). Thus, for example, electronic mail is sent and appointments are scheduled. The interface software does not act on any items which are not marked as having been reviewed, and instead leaves those items in the action item review window for subsequent processing. If the user marks any of the items to be deleted (indicated by an X in the status icon), the marked items are deleted and removed from the review window upon the user's clicking of the "Send Items" button 520.

The user can iterate through this process, reviewing additional items, and then clicking the "Send Items" button 520 to execute the appropriate actions. When the user is finished, the user can close the action item review window. Any unreviewed items are saved automatically until the next time the user opens the window.

Figure 4A:
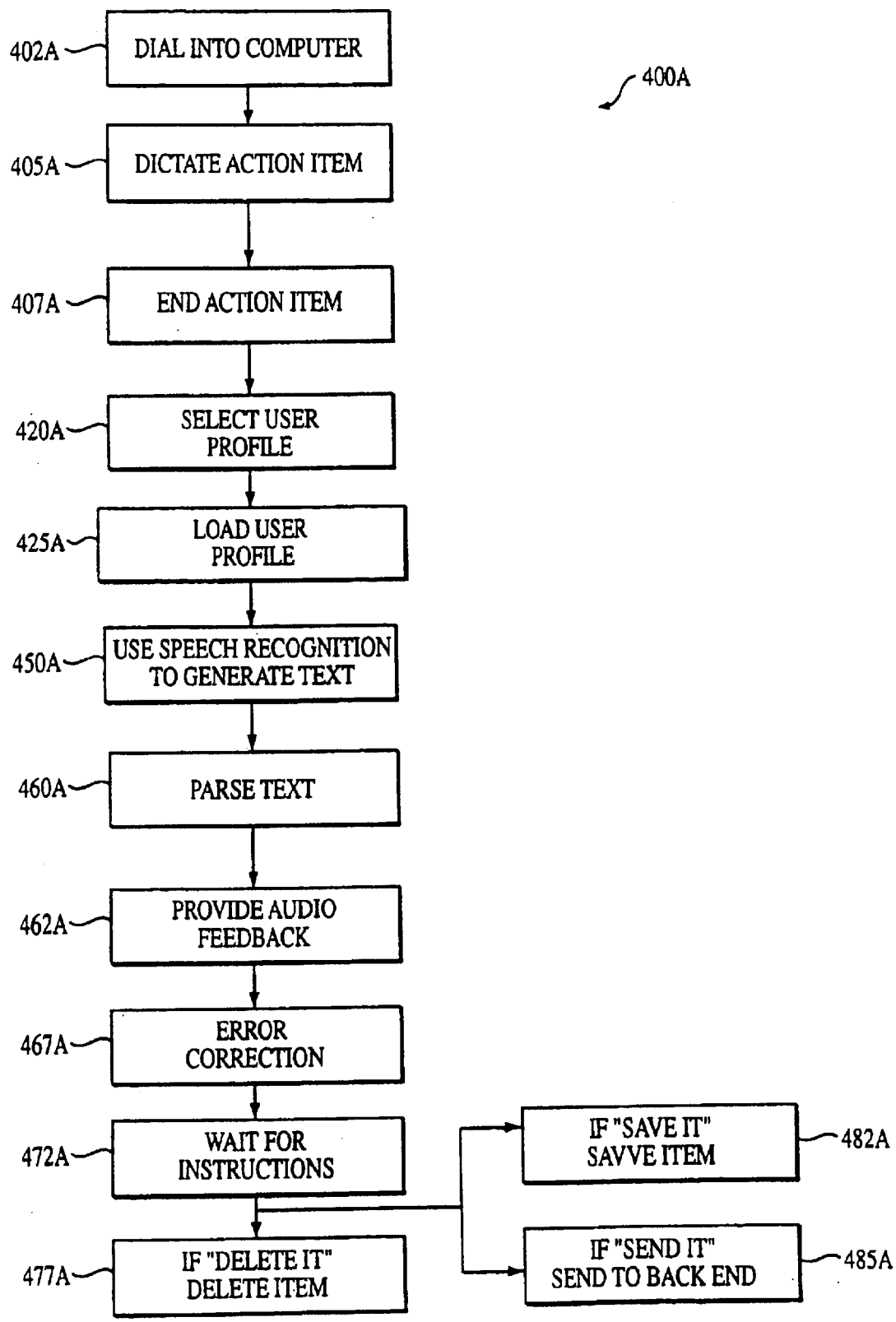
FIG. 4A is a flow chart of an alternative to the procedure of FIG. 4.

Referring to FIG. 4A, a procedure 400A is implemented by a system, such as the system 100C of FIG. 1C, that uses a telephone or similar communication device instead of a recorder. The procedure 400A is quite similar to the procedure 400, and includes many steps that are carried out identically to the steps of procedure 400. These steps are described using the same reference numbers with an "A" added at the end of each reference number.

Initially, the user dials into the computer using the telephone (step 402A). After connecting to the computer, the user dictates an action item into the telephone (step 405A). The user indicates that the action item is complete (step 407A) by pausing, or by pressing an appropriate key (e.g., the "#" key).

Next, the computer selects a user profile (step 420A) and loads the user profile into memory (step 425A). These steps may be carried out immediately upon receiving the call from the user or, particularly when only a single user is associate with the computer, before the call is even received. When multiple users are associated with the computer, the computer may select a profile based on key entries by the user, or based on caller identification information associated with the call.

The computer then processes the data from the call using speech recognition software to produce a sequence of text (step 450A) and parses the text (step 460A) as described above. Next, the computer uses voice synthesis to provide audio feedback to the user (step 462A). The audio feedback tells the user what text was recognized in the user's speech and how the text was parsed.

The computer then permits the user to correct any errors in the recognition or parsing (step 467A). Correction mechanisms may include both spoken corrections and corrections entered using the telephone keys. For example, the user may correct a disposition that was incorrectly identified as an appointment by saying "that was supposed to be an e-mail", or by pressing a key (e.g., the "3" key) in response to an audible prompt from the computer.

After corrections are complete, the computer waits for instructions from the user as to how to dispose of the item (step 472A). These instructions may include spoken commands, such as "delete it", "save it", or "send it", as well as corresponding key strokes.

The computer responds to the "delete it" command by deleting the action item (step 477A).

The computer responds to the "save it" command by saving the action item in memory (step 482A). The saved action item can be processed later using, for example, the procedure 400 illustrated in FIG. 4.

The computer responds to the "send it" command by sending the action item to the appropriate back-end software (step 485A).

Disposition Types

In general, the system is designed to handle two different types of action item dispositions. The first type are the built-in dispositions, which correspond to standard contact manager or personal information manager functions. The second type are referred to as external dispositions. These are implemented by plug-in modules and can support virtually any desired functionality.

Built-in dispositions are parsed by the parser 385. Once parsed, they are acted upon by special plug-ins which connect directly to the target contact managers or personal information manager. For example, the interface software 380 may include plug-ins for Symantec ACT! and Microsoft Outlook. Built in dispositions include text files, audio clips, appointments, tasks, notes, electronic mail, and contacts.

Examples of external dispositions include a fax disposition that permits a user to automatically send a fax instead of an email, a time entry disposition which allows the user to record the start and stop time of work on various projects for billing purposes, and an expense disposition which records expenses for use in generating expense reports. Examples of time entry dispositions include "start working on Fooberman contract" and "stop working on Fooberman contract." For these dispositions, the actual time at which the work starts and stops is indicated by the associated time stamps. The amount of time spent can be determined from the difference between the time stamps. An example of an expense disposition would be "just spent two dollars on tolls".

The system provides a properties dialog for each disposition type. The properties dialog can be displayed by selecting Properties from the Item menu 525 of the review window 505. A properties dialog also can be displayed by double-clicking on the displayed disposition 530 of an item. In addition, a type icon 532 displayed with the item may be double clicked. The type icon 532 shows a picture of the item type and is located on the left-hand side of the displayed disposition 530. In general, a properties dialog includes a field for each piece of information that the system supports for the corresponding disposition type. These fields are described separately for each property dialog below.

Figure 6:
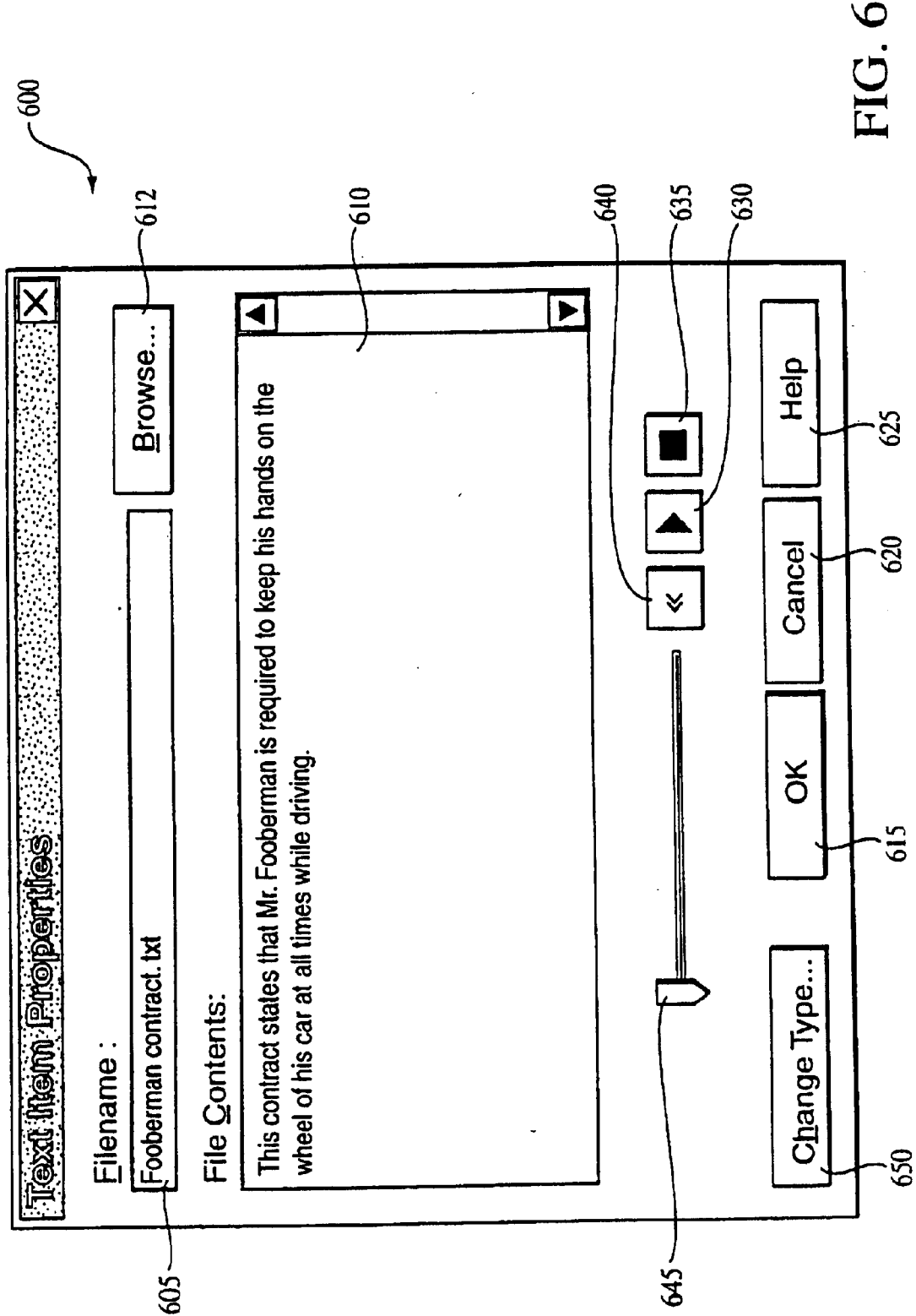
FIGS. 6–12 are screen displays of properties dialogs of the user interface of FIG. 5.

FIG. 6 illustrates a properties dialog 600 for a text file disposition. A text file disposition is a very simple action item that represents a file on disk. The user is allowed to specify a file name for a document, and to dictate the draft of the document. The interface software then saves that file on the user's disk in a designated directory. For simplicity, all files saved by the system 100 are saved into the same directory, unless the target directory is overridden during the review process. To this end, the dialog box includes a Browse button 612 that the user may click to access the computer's directory structure. If the user dictates to a file which already exists, the new text is appended to the file.

In general, a text file disposition includes two properties: a file name 605 and text file contents 610. The file name 605 is an arbitrary string which the user dictates as part of the command grammar. The system 100 supports long filenames so the filename can be a phrase. The user is not allowed to dictate directory paths, although the user can add a directory path during the review process. The system automatically reads the target directory before recognition starts, and includes the name of all existing files automatically in the grammar used by the speech recognition software. Also, no extension needs to be dictated with the file name, since an extension of "txt" is always used. Any portion of the dictated text which is not a command is stored as text in the target file.

The properties dialog 600, like all other properties dialogs, includes an OK button 615, a Cancel button 620, and a Help button 625. If the user clicks the OK button 615, then the properties dialog closes and any changes which the user has made to the properties are reflected in the disposition of the item being edited. If the user has added values to any fields of the disposition which were previously blank, then the disposition line is changed to include those new values in the main review window. In addition, any changes the user makes to other fields of the disposition are reflected in the disposition line in the main review window. If the user clicks the Cancel button 620, then the dialog is closed and any modifications made to the fields are discarded. If the user clicks the Help button 625, then an appropriate help dialog is displayed with help specific to the current properties dialog.

When a properties dialog first loads, the field which represents the body or text of the item is filled with all of the noncommand text currently displayed in the review window. This means that the properties dialog displays only real text and, therefore, does not display everything that was transcribed. If the user makes any changes to the text, and then clicks the OK button 615, the text of the item in the review window is changed to reflect the text from the properties dialog. As a result of this change, all of the transcribed commands are discarded, and any speech associated with the item is discarded. (Though a separate recording is still available from the properties dialog.) If the user makes no changes to the text of the item in the properties dialog, then clicking the OK button 615 does not cause the text displayed in the review window to be modified.

Each properties dialog has controls which allow the user to play back recorded speech associated with the item. These include a play button 630 which starts playback, a stop button 635 which stops playback, and a rewind button 640 which resets the current playback position to the beginning. There is also a slider control 645 which represents the current position in the playback of the item. The user can use the slider control 645 to reposition the current location in the saved speech, and may do so regardless of whether the playback is running or stopped.

Playback is not performed using the speech samples 240 used by the speech recognition software. Instead, as the item is transcribed, a copy of the speech is made and saved for the item. This copy of the speech is played back. Though it represents the original transcribed speech, it does not reflect any additional changes made to the text by voice or by keyboard from the review window.

Each properties dialog also has a "Change Type" button 650. Clicking this button causes a pop-up list box to be displayed. The pop-up list box lists the available disposition types and allows the user to change the disposition type of the current item. If the user changes the disposition of an item by using the Change Type button 650, the system re-parses the original transcribed text as if it corresponds to the new disposition type and displays a new properties dialog for the new disposition type. If the user subsequently presses the Cancel button 620, then the original disposition type is restored along with all of the original disposition fields. If the user clicks the OK button 615, then all of the original disposition information from the old type is lost and the review window is updated to reflect the new type and disposition fields for the new type.

Figure 7:
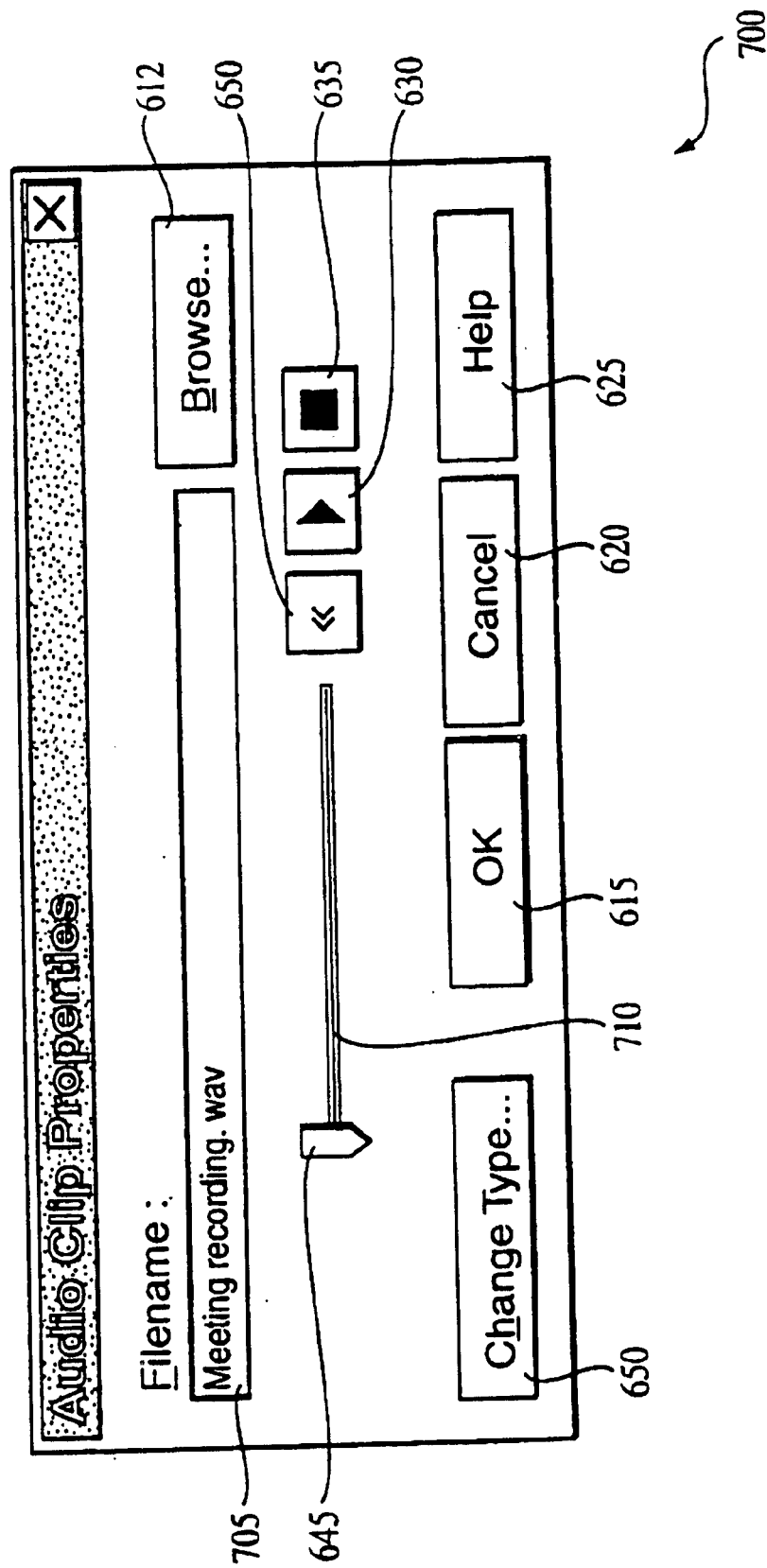

FIG. 7 illustrates a properties dialog 700 for an audio clip disposition. An audio clip disposition is just like a text file except that the data is stored as a wave file instead of as a text file. The system recognizes all of the speech to determine the disposition type, but does not save the recognized text.

In general, an audio file disposition includes two properties: a file name 705 and audio 710. All of the file name rules discussed above for text files also apply to audio clips, except that the extension of "wav" is used. The speech for the entire item is saved in the audio clip file. The system does not strip out any of the speech, which means that the spoken command is included in the audio clip.

Figure 8:
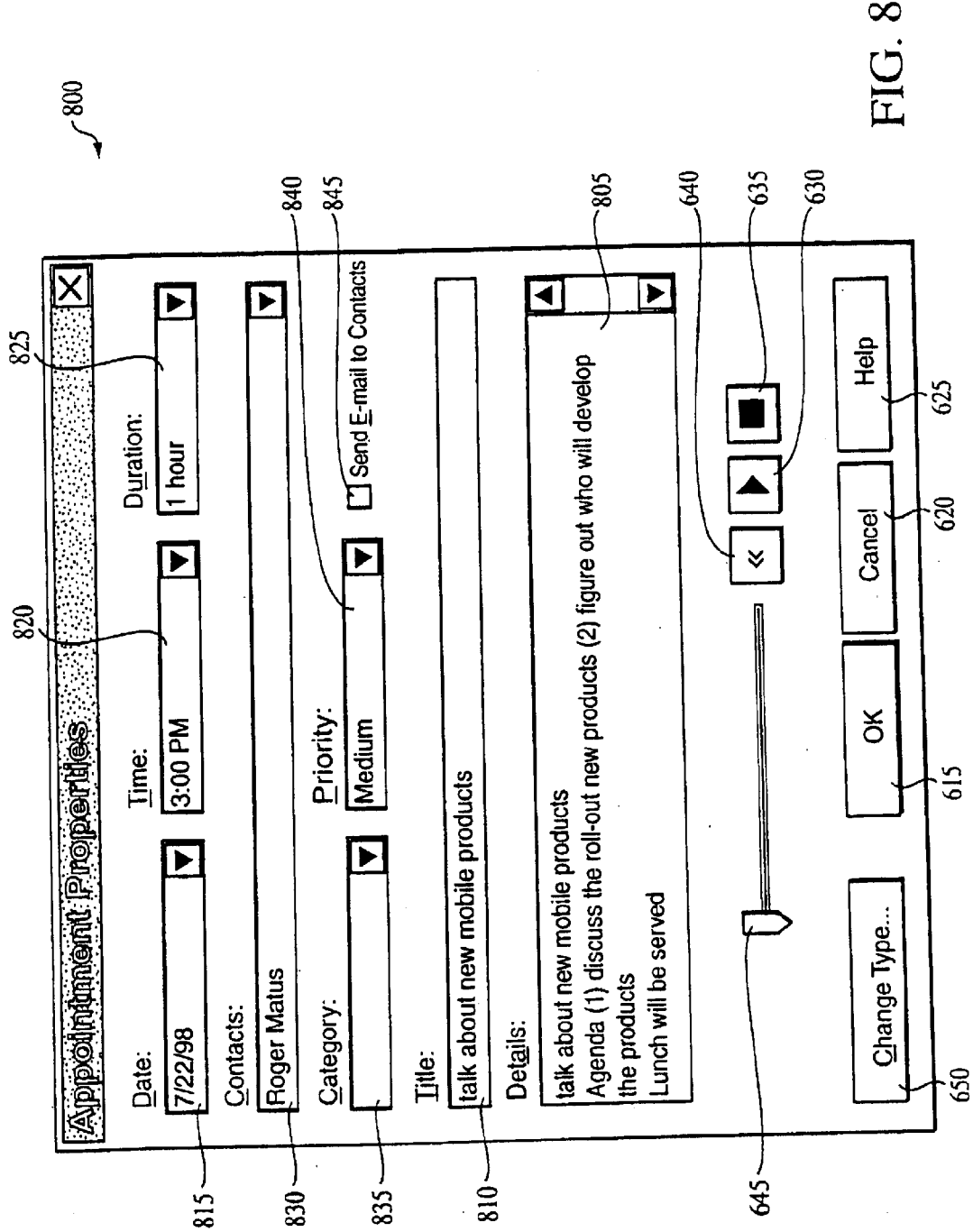

FIG. 8 illustrates a properties dialog 800 for an appointment disposition. An appointment disposition is a scheduled meeting with zero or more people on a specified date. In general, an appointment disposition includes nine properties: text 805, title 810, date 815, time 820, duration 825, contact(s) 830, category 835, priority 840, and a send email flag 845. Except where noted, these properties may be left unspecified.

The text 805 represents the description of the appointment.

The title 810 is used with personal information managers that support the concept of a brief title which is different from the text of an appointment. For example, the popular PalmPilot personal information manager displays the title of an appointment in the calendar with the entire text of the appointment attached as a note. The system automatically computes a title by extracting the first 60 characters of the text. However, the user can change the title using the properties dialog box.

The date 815 is extracted from the commands in the action item. The date can be dictated as relative to the current day. When a time-stamping recorder is used, the date is computed relative to when the recording was made. For recorders which do not have time stamps, the date is relative to the date that the recording is transcribed.

The time 820 is also extracted from the commands in the item. An appointment may have no time, in which case the appointment is assumed to last all day.

The duration 825 of the appointment is extracted from the commands in the item. If there is no duration specified, but there is a time, then a duration of one-hour is assumed.

Appointments can optionally be associated with one or more contacts 830. The contacts are automatically extracted from the back-end software, and only contacts which are currently defined in the target back-end software are legal.

An appointment also may be designated as belonging to a category 835. A list of valid appointment categories are obtained from the back-end software and are used as part of the recognition grammar employed by the speech recognition software. Some implementations do not employ appointment categorization.

Appointments can have a priority 840 of low, medium or high. If no priority is specified, a priority of medium is assumed.

The send email flag 845 is an optional flag for each appointment that, when set, causes the back-end software to send the appointment via electronic mail to the contacts associated with the appointment. This flag may be triggered by a command, or set from the properties dialog box during the review process.

Figure 9:
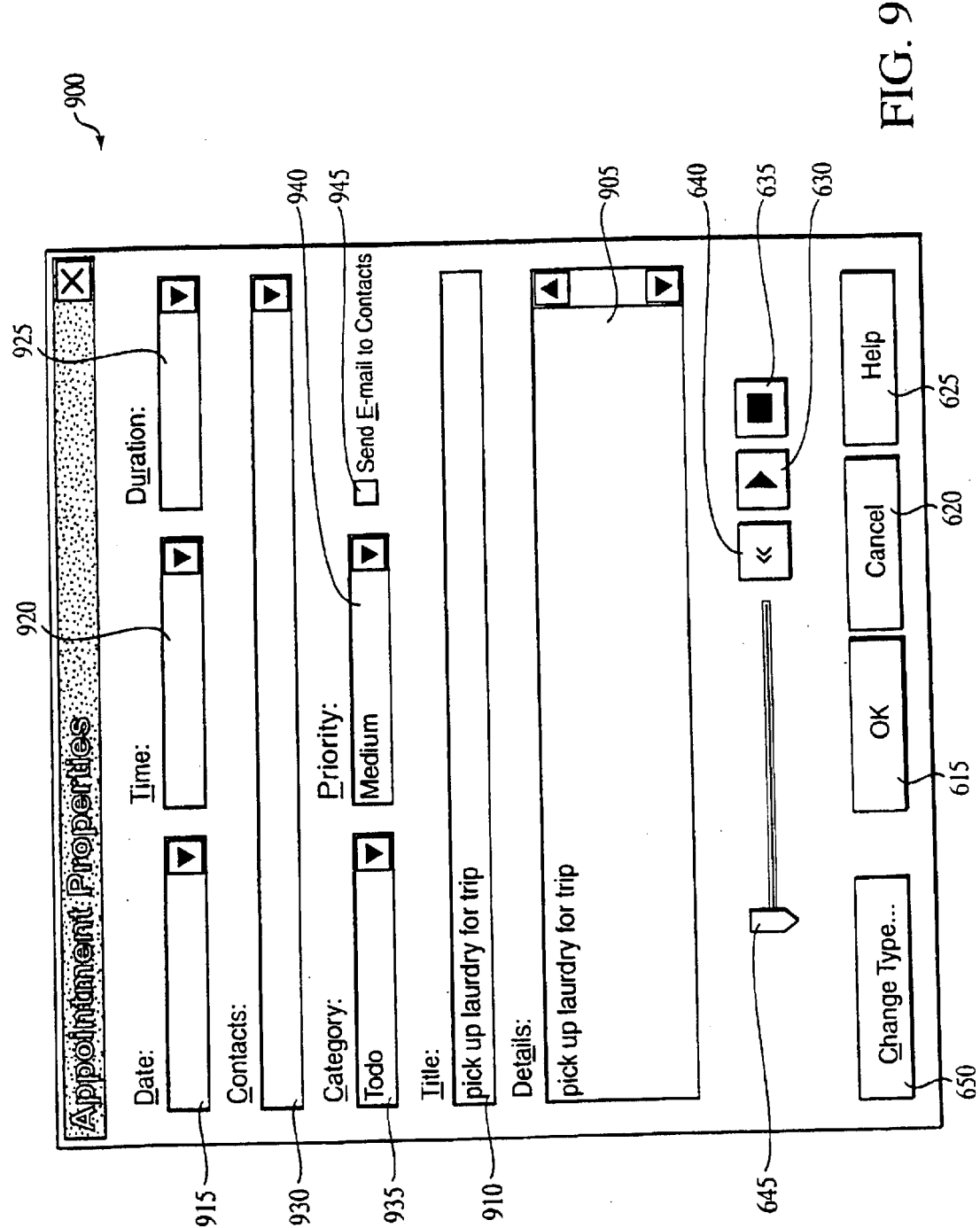

FIG. 9 illustrates a properties dialog 900 for a task disposition. Task dispositions are similar to appointments, except that tasks do not require a date. Tasks may include both to-do list entries and calls to be made. Tasks are separated from appointments to support back-end software in which calendars are separated from to-do lists. In general, a task disposition includes ten properties: text 905, title 910, date 915, time 920, duration 925, contact(s) 930, category 935, priority 940, and a send email flag 945. The date 915 is an optional date on which the task may be scheduled to first appear in to-do lists. Though not shown, a task also may include a due date on which the task can be scheduled to be completed. The remaining properties are described above with respect to appointment dispositions.

Figure 10:
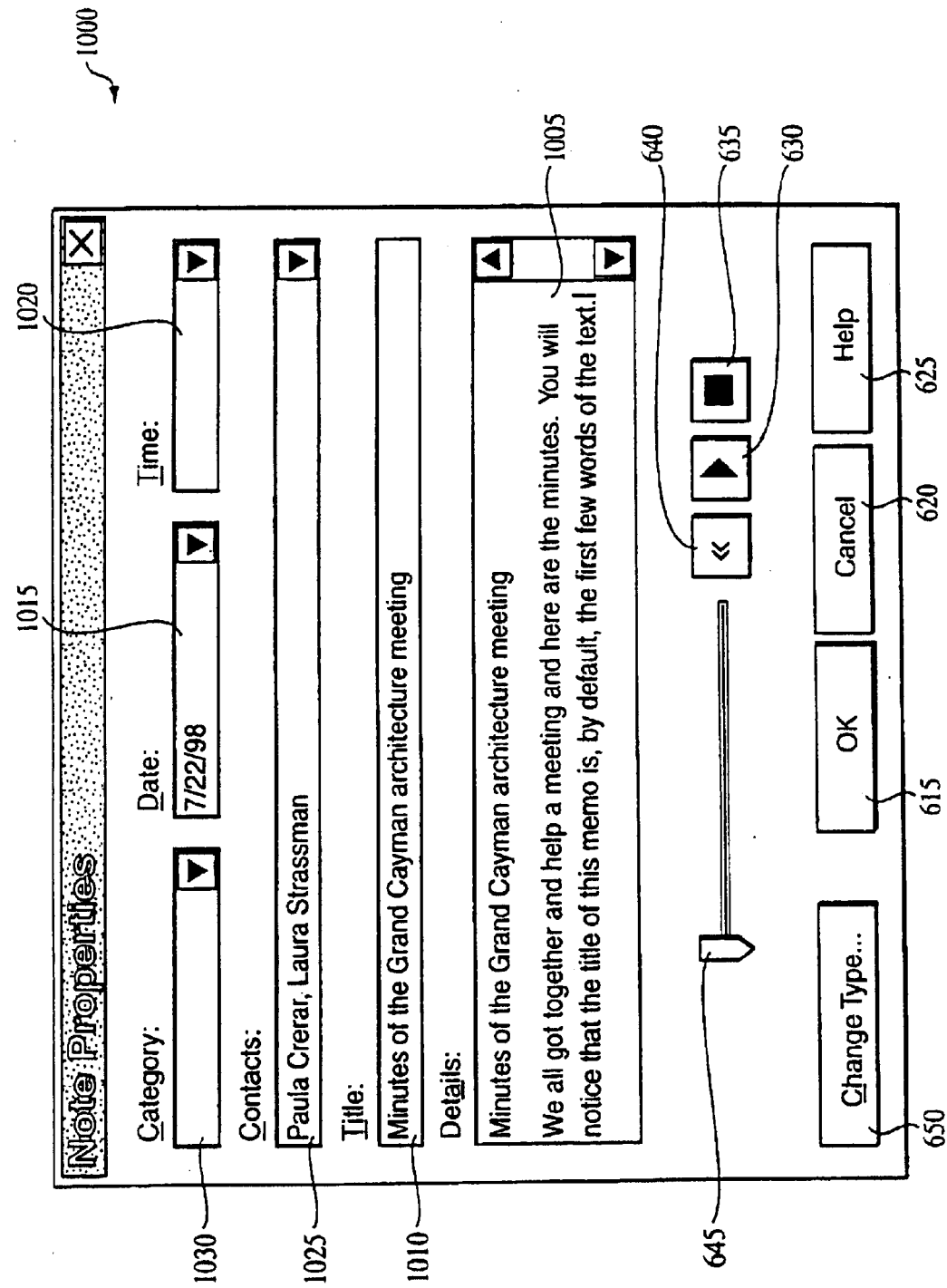

FIG. 10 illustrates a properties dialog 1000 for a note disposition. A note disposition is a short document or block of text which is stored by the back-end software. Notes only require text 1005, but also may include a title 1010, the date 1015 when the note was written, the time 1020 when the note was written, the contact(s) 1025 associated with the note, a category 1030 assigned to the note, and the name 1035 of an attached file (not shown). The file name 1035 is a phrase which is part of the command. In one implementation, text files must be located in a preselected directory, with the user being able to modify the directory using the properties dialog box.

Figure 11:
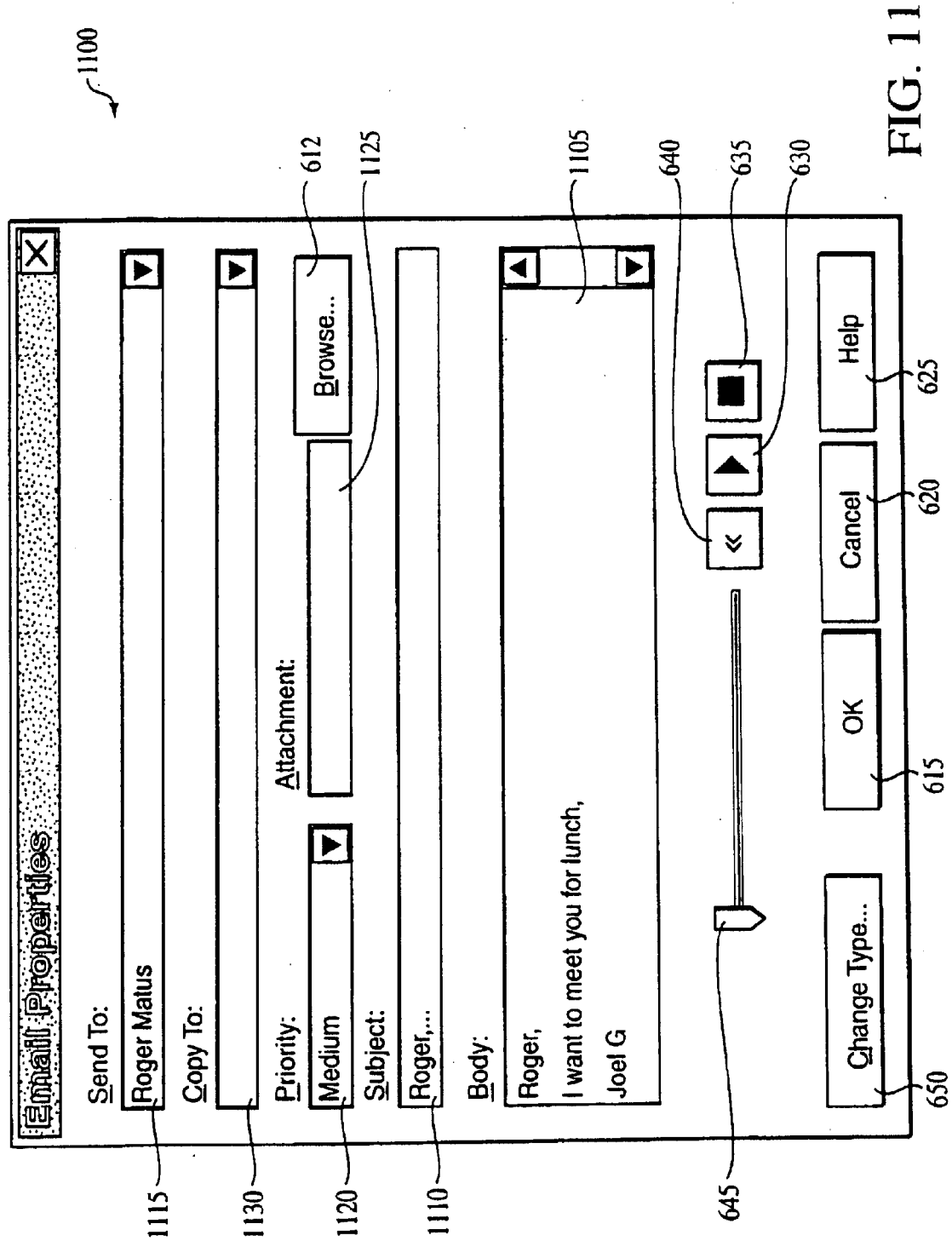

FIG. 11 illustrates a properties dialog 1100 for an email disposition. An email disposition is a message which is automatically sent to one or more contacts. The user dictates the contact names and the body of the email. After the user has reviewed the email, the back-end software automatically transmits the email to the target contacts. Emails also can be copied to additional contacts, and can have optional attached files. An email includes six properties: text 1105, subject 1110, send to contact(s) 1115, priority 1120, an attachment file name 1125, and copies to contact(s) 1130. The default title 1110 is the first 60 characters of the dictated text 1105, but the user can change the title of the email message from the properties dialog box.

Email messages must be associated with one or more contacts 1115 to whom the messages are sent. A list of possible contacts is automatically extracted from the back-end software. The actual email address is supplied by the back-end software based on the contact name. However, the user can override the contact name and supply an explicit email address using the properties dialog box. The copies to property 1130 permits a user to supply a list of additional contacts to whom the email should be copied.

Figure 12:
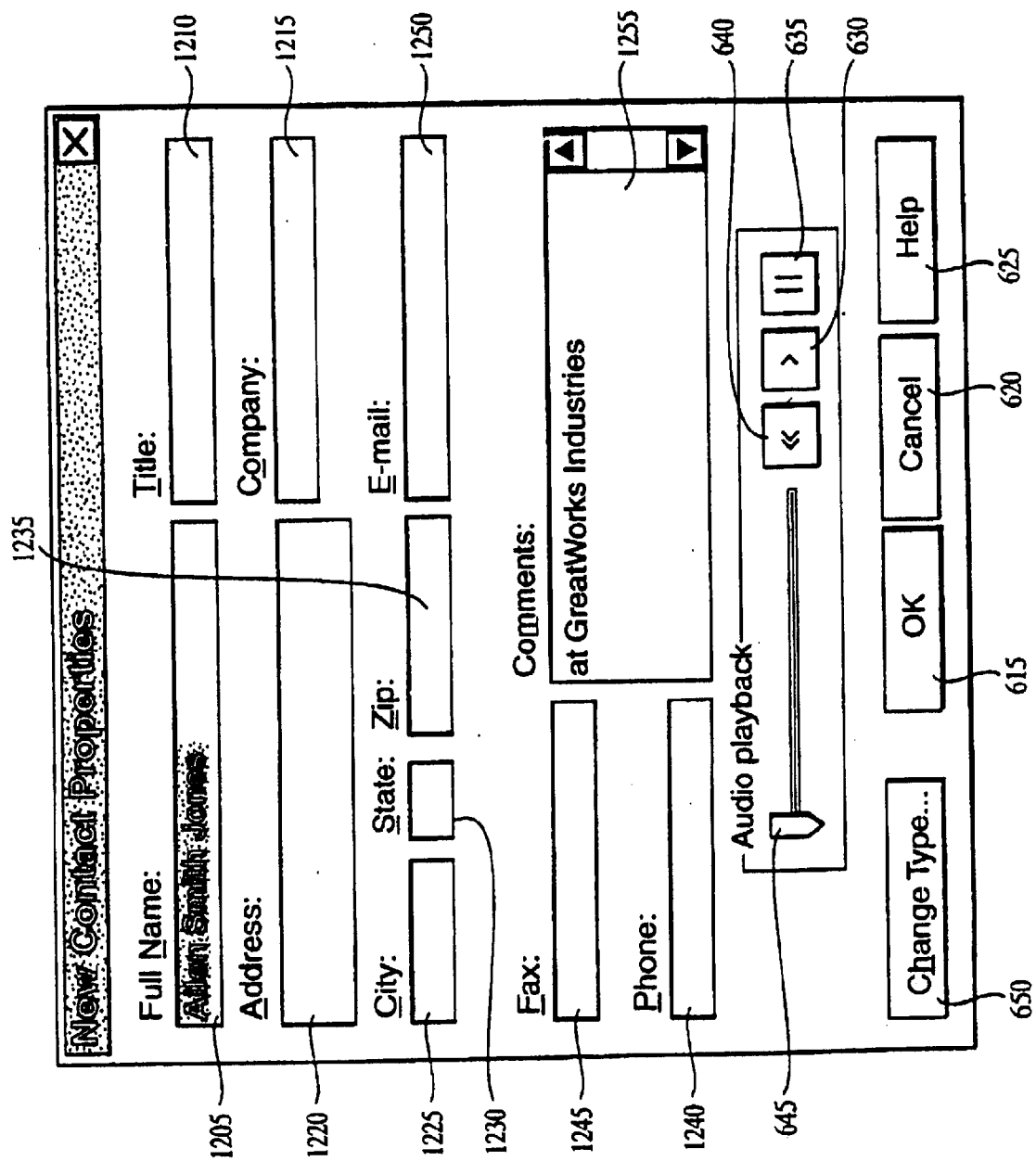

FIG. 12 illustrates a properties dialog 1200 for a contact disposition. A contact disposition enables the user to enter a new contact using the hand-held recorder. Thus, if the user has a meeting with a new contact, he is able to dictate the contact's business card into the hand-held recorder so that information eventually ends up in the back-end software. A contact disposition includes eleven properties: full name 1205, title 1210, company 1215, address 1220, city 1225, state 1230, zip code 1235, telephone 1240, fax 1245, email address 1250, and comments 1255.

User Interface

Referring again to FIG. 5E, the main component of the user interface 500 for the system is the review window 505. The review window is automatically displayed upon starting the program. The review window displays all of the items which have been transcribed from the recorder for review by the user.

The review window 505 supports three different display modes: a single line mode, a four line mode, and a full text mode. The four line mode is the default. In this mode, each item is shown with a single line disposition 533, followed by the first three lines of the transcribed text 534 (only one line is shown in FIG. 5E, since each of the illustrated items includes only a single line of text). The text display shows exactly what the speech recognition software recognized in the recorded text. Within the text display, any sections 536 which were determined by the parser to be commands are displayed in italicized grey. The remainder of the text is displayed in black and represents the "text" part of the item.

The disposition line 533 represents a summary of fields automatically extracted from the text. The beginning of the line contains a status icon 538 which represents the current status of the disposition. This icon has three states, "unreviewed", "approved", and "delete". The state of each new item transcribed from the recorder is automatically set to unreviewed (indicated by a star). The user can change the state by clicking on the state icon. One click changes the state from unreviewed to approved (indicated by a check mark), the next click changes the state from approved to delete (indicated by an X), and a third click changes the state from delete back to unreviewed. The state of the item automatically changes from unreviewed to approved when the user modifies any of the fields in the disposition line.

The type icon 532 represents the type of the item and is positioned next to the icon 538 which represents the state of the item. There are seven different icons representing the seven built-in disposition types. If an external plug-in is used, then the external plug-in supplies its own icon to represent its type of disposition. The disposition type icon can be changed by changing the disposition type field 530. Double-clicking on the disposition type icon 532 causes the interface to display the appropriate properties dialog, which allows the user to enter information for all of the fields of that type of disposition in a conventional manner. Typically, the seven different icons feature different colors to make it easier to distinguish the types of items in the display.

A summary 542 of the disposition follows the two icons. Disposition summaries always begin with the disposition type 530, followed by any significant fields 544 which were extracted by the parser. For example, an email disposition may say "Email to Roger Jones copy to Jim Smith" where the name "Roger Jones" and the name "Jim Smith" are extracted from the text by the parser or converted from contacts (e.g., "Roger" and "Jim") extracted from the text.

Not every field is shown on the disposition summary line. For example, if no date was extracted from the text or added later by the user, then a date is not shown in the disposition summary. In some implementations, mandatory fields for which data have not been provided may be displayed as having values of "<missing>" so that the user can quickly determine that needed values are missing and provide appropriate corrections.

Any fields in the disposition summary which can be modified by the user are underlined. To modify any of those fields, the user clicks on the field. When the user clicks on the field, the field is replaced by an appropriate control which allows the user to modify the field. Usually, this involves the system drawing a box around the selected field, selecting the text, and displaying a drop-down list button to the right of the field. The different controls which are used to modify the disposition fields in the review window are discussed in more detail below.

The date and time stamp 546 from the recording, if present, is displayed at the end of the disposition line. The date and time stamps at the end of the line are included for informational purposes only and are not directly used when the item is transferred to the appropriate back-end. For example, the date and time stamp is not used if the text of the recording does not include a date and time. However, the date and time stamp supplied by the recorder is used to disambiguate statements such as "tomorrow".

The disposition line is shown in bold black text when the state of the item is "approved", bold red text when the state of the item is "unreviewed", and bold gray text when the state of the item is "delete". The date and time stamp is shown in the same colors as the disposition, but is not bolded.

The three lines of text 534 are indented from the left-hand side of the screen and displayed in non-bolded black plus italicized gray for the commands. If there is not enough text to make up three lines, then the item takes up less than four lines of the screen. If there is more text than can be displayed in three lines, then a button is included at the end of the block of text to allow the user to expand the text to its full size.

As noted above, the review window supports two other display modes. In the single line display mode, only the disposition line is shown for each item. In this display, fields in the disposition line are not underlined, and the disposition line cannot be edited. If the user clicks on the disposition line when the display is in single line display mode, the selected item is expanded to a four line view and the disposition fields become editable.

In the full text display mode, the text for each item is expanded to its full size. Otherwise, the behavior of the full text display mode is the same as the behavior of the four line display mode. Note that it is possible for a user to expand individual items so that, in the one line display mode, some items are shown in their four line or fully expanded form, and, in the four line display mode, some items are shown in the fully expanded form. Switching the display to the one line or four line display mode automatically contracts any expanded items.

The text 534 displayed on the screen is also editable. If the user clicks the mouse within the text block, then the text fields are given a black border and the interface behaves like a standard edit control. If only the first three lines of the text are shown, then the edit control automatically scrolls as if it were a standard three line edit control with a larger block of text. Note that the edit control used is a rich edit control that allows some of the text to be displayed in italicized grey. No other formatting is available to the user.

The parser decides what strings of text within the transcribed text from the recorder are commands, and what strings of text within the transcribed text represent actual "text" for the item. Text which the parser will include in the body of the item is displayed in black. Other text, including text in the title, is not displayed in black. For example, the phrase "Jabberwocky" is a command that, when recognized and transcribed, may be displayed in italicized grey. When the disposition is sent to the back-end, only the text displayed in black is included in the body of the item.

In editing the recognized speech, the user can select a range of speech using the mouse, and can indicate that the selected speech is either text or a command. Otherwise, the type of speech (italicized grey commands or normal black text) only changes when the system re-parses the item.

The review window has a horizontal scroll bar 550 so that the window can be scrolled to display the end of very long disposition lines. However, the width of each block of text is automatically sized so that when the window is scrolled completely to the left, the entire text block fits on the screen. If the user resizes the window horizontally, then the width of each display text block changes to reflect the new window width. Dispositions are always displayed on a single line. If the disposition is too long for the line, the user can view it by scrolling the window horizontally to the right. The window also has a vertical scroll bar 555 when there are more items in the window than can be shown on a single screen.

In the review window, something always must have focus (i.e., will be active). If the user clicks the mouse in an edit control which contains transcribed text, then that edit control gets a black border and has the focus. If the user clicks the mouse on a disposition entry which is underlined, then that disposition entry gets a black border and has the focus. If the user clicks the mouse elsewhere in the review window, then the focus is removed from the edit control or disposition field. If no edit control or disposition field has the focus, then one item in the window has the focus.

When an item has the focus, a focus rectangle 557 is drawn around the entire disposition line. This means that the item is selected, but that no field within the item is selected. When an item has the focus, typing other than navigation keys has no effect. However, because an item has the focus, the entries on the Item menu 525 (discussed below) in the review window have meaning and apply directly to the item.

When an edit control or a disposition field is given the focus, the focus rectangle is removed from the item. To remove the focus from an edit control or disposition field, the user can either click somewhere on the disposition line (other than on an editable field) to give the focus to that item, click somewhere else on the window to give the focus to the item which was being edited, or press the Esc key to give the focus to the item which was being edited.

Data Entry Controls

The data entry controls allow the user to change the disposition fields for any particular item. Disposition fields are used in two places. First, in the summary lines, each editable disposition is represented by underlined text. When the user clicks on the underlined text, the text is replaced with the appropriate data entry control. Second, in the properties dialog for each item type, the various fields are implemented using data entry controls.

Visually, each field looks like an edit control with a down arrow on the right side. However, pressing the down arrow does not always display a list box.

When the user clicks on underlined text, the underlined text is replaced with the appropriate control, but no list box or other pop-up window is displayed unless the user explicitly clicks the down arrow. When the user clicks the down arrow, the appropriate list box, dialog box, or control is displayed. In most cases, the pop-up list box or control is dismissed automatically if the user clicks the mouse anywhere else on the screen.

Particular data entry controls are discussed below.

The data entry control for the disposition type 532 (FIG. 5) is a simple drop-down combo box. The user can select a disposition from the combo box by entering the first character of the disposition type or by clicking the down arrow to display a list box with the various disposition types. The user cannot enter a type which is not listed in the list box. For built-in dispositions, the list box contains "text file", "audio clip", "meeting" (or "appointment"), "task" (or "to-do" or "call"), "note", "email" and "contact".

The data entry control for contact name fields is an edit control. The user is allowed to type one or more contact names, separated by commas. If the user pauses for more than a few seconds while typing a contact name, the system automatically tries to complete the contact name by examining the list of legal contact names for names starting with the typed characters. The system then displays the completed contact name with the added text selected so that more typing by the user replaces the selected text.

If the selected text is at the end of the edit control, and the user types a comma, then the selection is not replaced. Rather, the comma is appended to the end of the edit control as if nothing was selected. This is an optimization which allows a user to accept a computer completed name by simply typing a comma.

The user can also click the down arrow to display a list box containing all of the current legal contact names. Any contact name selected from the list box is added to the edit control. Specifically, if the current insertion point is at the end of the edit control, then selecting a contact name from the list box causes that contact name to be appended to the end of the edit control, with the name being preceded by a comma if appropriate. However, if the current insertion point is not at the end of the edit control, or if a range of characters is selected, then selecting a contact name from the list box replaces the contact name containing the current insertion point.

The user also may type a contact name which is not in the list. In this case, the contact name may be rejected by the back-end when the item is stored.

The data entry control for date fields includes an edit control and a pop-up calendar. The user is allowed to type a date in the edit control in any date format. Once the user types in a date and focus is lost, the system automatically converts the date to a standard format (e.g., "MM/DD/YY"). The user also can click the down arrow to cause display of a calendar window. The user can then select an appropriate single date from the calendar control.

The pop-up calendar control is a simple control which displays a single month at a time, and allows the user to click an appropriate arrow to view the previous month or the next month, or to click on a particular day of the month to select that day.

The data entry control for time fields includes an edit control and a pop-up list box. The user is allowed to type a time in the edit control in any reasonable time format. Once the user types in a time and focus is lost, the system automatically converts the time to a standard format (e.g., "HH:MM PM"). The user can also click the down arrow to display a list box containing a list of all of the times for each hour and half-hour increment during the day (e.g., "6:00 a.m.", "6:30 a.m.", . . . "11:30 p.m."). If the user selects a time from the list box. then that time replaces the contents of the edit control. The user is also allowed to select a time of "NONE", or to delete the time from the edit control.

The data entry control for duration fields includes an edit control and a pop-up list box. The user is allowed to type a duration in the edit control in any reasonable duration format. Once the user types in a duration and focus is lost, the system automatically converts the duration to a standard format (e.g., "HH hours" or "MM minutes"). The user can also click the down arrow to display a list box containing a list of standard durations (e.g., "5 minutes", "10 minutes", "15 minutes", "30 minutes", "45 minutes", "1 hour", "90 minutes", "2 hours", . . . "8 hours", "all day"). If the user selects a duration from the list box, then that duration replaces the contents of the edit control.

The data entry control for category fields includes an edit control and a pop-up list box. The user is allowed to type in the name of any category. The user is also allowed to click the down arrow to display a list containing all of the categories currently known to the back-end. If the user selects an entry from the list box, then that entry replaces the contents of the edit control.

The user is also allowed to enter categories which are not included in the list box. These categories may be rejected by the back-end when the item is stored.

The data entry control for the priority field is a simple combo box. The list box contains three priorities—"high", "medium" and "low". If the user types the first letter of one of the priorities, or selects the appropriate priority from the drop-down list box, then that priority is entered in the priority field. The user is not permitted to select a priority other than the indicated three.

The data entry control for attachment fields is an edit control. The user is allowed to type any valid file name into this edit control. If the user clicks the down arrow next to the edit control, then a standard Windows file open dialog is displayed to allow the user to select an existing file. When the user clicks "Open" in the file open dialog, the selected file name is written into the edit control part of the attachment field. The user must select an existing file for the attachment field.

Note that the file open dialog is displayed modally to the review window. This means that the user can not dismiss the file open dialog by clicking the mouse elsewhere in the review window (like with most of the other fields). Instead, the user must click "Open" or "Cancel" to dismiss the file open dialog before control is returned to the review window.

The data entry control for file name fields is an edit control. The user is allowed to type any valid filename into this edit control. If the user clicks the down arrow next to the edit control, then a standard Windows file save dialog is displayed to allow the user to select an existing file. When the user clicks "Save" in the open file dialog, the selected file name is written into the edit control part of the attachment field. The user may select an existing file name or enter a new file name. Like the file open dialog, the file save dialog is displayed modally to the review window.

Menus and Toolbar Buttons

The following outline indicates the entries in the menus of the review window 505. For each case, the menu entry is shown along with any hot key which is assigned to that menu item.

File (560)

New Item Ctrl+N (572)

Selecting this menu item creates a new item at the bottom of the window with a blank disposition line and an empty edit control. The edit control is then given the focus. This allows the user to manually type in a new item, or to dictate a new item. When the user clicks elsewhere on the screen such that the edit control loses the focus, then the system processes the contents of the edit control as if that information were dictated into the recorder. If the edit control is empty, then the new item is deleted. Otherwise, the disposition line is filled in. The user may dictate multiple items by separating them with, for example, the phrase "Jabberwocky", in which case multiple items are added to the review window when the edit control loses the focus. When new items are created, they are not moved within the window even if the window is sorted by item type. To rearrange the review window so that new items are in their appropriate place, the user must view the window in time order, and then view the window sorted by type.

Get Items Alt+G (510)

This menu item is equivalent to clicking the button 510 labeled "Get Items". Selecting this menu item causes the Audio Source Dialog to be displayed to permit the user to select the source of the items to be transcribed. Once the source of the items is selected, then the system proceeds to transcribe the selected recording(s), parse the transcribed text, and display the new items in the review window 505. Following a successful "Get Items" operation, the review window is re-ordered if it is viewed sorted by type.

Send Items Alt+S (520)

This menu item is equivalent to clicking the button 520 labeled "Send Items". Selecting this menu item causes the system to delete all items which are marked to be deleted, and to store all items which have been marked as approved in the appropriate back-end. Once the items have been stored or deleted, they are removed from the review window. If an error occurs during this process, the items which have not been stored in the back-end remain in the review window. However, items which have already been stored in the back-end or have already been deleted are not restored to the review window.

Save Speech Files (581)

Selecting this menu item instructs the speech recognition server to save the user speech files. Before saving speech files, a message box is displayed giving the user the option of canceling this operation.

Print Ctrl+P

Selecting this menu item instructs the system to print the current contents of the review window to the currently selected default printer. No dialog is displayed, and there is no print preview function.

Exit Ctrl+F4

Selecting this menu item causes the system to terminate. Any items currently in the review window are saved to disk so that they can be reloaded the next time that the system is started. However, any saved speech data is lost, which means that items restored the next time the system is started will not have any recordings associated with them.

Edit (562)

The first six Edit menu items apply to the currently active edit control. This includes both the edit controls where the user modifies the text which was recognized, and the edit controls which are displayed when the user clicks on a disposition field. If no edit control is active, then the menu items which refer to edit controls are grayed out and unavailable.

Undo Ctrl+Z

Selecting this menu item performs an undo operation for the currently active edit control. After having performed an undo operation, selecting this menu item a second time performs a redo (undo the undo).

Cut Ctrl+X (574)

Selecting this menu item performs a standard cut operation on the currently selected text in the currently active edit control. This menu item is grayed out if no text is selected.

Copy Ctrl+C (575)

Selecting this menu item performs a standard copy operation on the currently selected text in the currently active edit control. This menu item is grayed out if no text is selected.

Paste Ctrl+V (576)

Selecting this menu item performs a standard paste operation on the currently selected edit control at the current insertion point. If text is selected, then the paste operation causes that text to be replaced.

Clear Del

Selecting this menu item performs a standard delete operation on the currently selected text in the currently active edit control. This menu item is grayed out if no text is selected.

Select All Ctrl+A

Selecting this menu item selects all of the text in the currently active edit control.

Find Ctrl+F

Selecting this menu item causes a standard Windows Find Dialog to be displayed. The Find Dialog is displayed modally to the review window, and allows the user to search all of the text in the review window for a given string.

Find Next F3

Selecting this menu item cause the system to repeat the previous search for the previously-specified text from the current insertion point.

Replace Ctrl+H

Selecting this menu causes a standard Windows Replace Dialog to be displayed. The Replace Dialog is displayed modally to the review window, and allows the user to replace all occurrences of one string in all of the text of the review window with a second string.

Keywords

Selecting this menu item causes a keywords dialog to be displayed. The keywords dialog has three views. The first view provides a list of nicknames and maps the nicknames to contact names. For example, the nickname "George" might be mapped to the contact name "George Washington".

The second view provides a list of verbs and maps the verbs to specific disposition types and categories. For example, the user can map "visit" to correspond to a task disposition with a category of "place to visit" or "buy" to correspond to a task disposition with a category "errands".

The third view provides a list of words that may appear in the title of a disposition and maps those words to specific categories. For example, if the word "Fooberman" is mapped to the category "customers", then any disposition including the word "Fooberman" in the title will be given the category "customers".

Options . . .

Selecting this menu item causes the Options Dialog to be displayed. Options that the user may control using the Options Dialog include the default file directory for attachments, the phrase to start a new item (e.g., "Jabberwocky"), and the phrase to start a command (e.g., "computer please").

View (564)

Toolbar

This menu item is a toggle that controls the display of the toolbar 515 in the review window 505. If the toolbar 515 is currently displayed, then a check mark is displayed next to this menu item. Selecting this menu item toggles its state.

Status Bar

This menu item is a toggle that controls the display of the status bar 566 at the bottom of the review window 505. If the status bar 566 is currently displayed, then a check mark is displayed next to this menu item. Selecting this menu item toggles its state.

One Line Summary Ctrl+1 (578)

Selecting this menu item causes each item in the review window to be displayed in the single line summary display mode.

Four line Summary Ctrl+2 (579)

Selecting this menu item causes every item in the review window to be displayed in the four line summary display mode.

Expand All Ctrl+3 (580)

Selecting this menu item causes every item in the review window to be displayed in the completely expanded mode.

Item (525)

The entire Item menu refers to the currently selected item. In addition to being displayed from the main menu of the review window, the Item menu is displayed as a pop-up menu if the user clicks the right mouse button. In that event, the item under the current cursor location is identified as the currently selected item, and the Item menu is displayed as a pop-up menu with its upper left-hand corner at the current mouse cursor location. (Although the menu is moved if there is not enough. room to display the menu to the right and below the current mouse cursor location.)

Expand Text

Selecting this menu item fully expands the text of the currently selected item regardless of the current viewing mode.

Collapse Text

Selecting this menu item fully collapses the text of the currently selected item so that the item is displayed in its one line summary form regardless of the current viewing mode.

Split Item

This menu item is only available when the edit control which contains the transcribed text has the focus (otherwise this menu item is grayed out). Selecting this menu item causes the current item to be split into two items at the current insertion point. If a range of characters are selected in the edit control, then the current item is split into two items at the beginning of the range. All of the text following the split point is used to create a new item and the parser is run on the new item to compute the disposition. The disposition of the previous item is not changed. The split item operation is ignored if the insertion point is at the beginning or the end of the edit control since there would be no text to split.

Join With Previous

This menu item is only available when the review window is sorted in time order, or when the currently selected item immediately follows the previous item in time order. Otherwise this menu item is grayed out. This menu item is also grayed out when the currently selected item is the first item. Selecting this menu item causes the currently selected item to be merged with the previous item in the current view. The disposition of the selected item is lost, and all of the text for the selected item is inserted at the end of the text of the previous item. The disposition of the previous item is re-computed if and only if the previous item is in the "unreviewed" state.

Join With Next

This menu item is only available when the review window is sorted in time order, or when the currently selected item immediately precedes the following item in time order. Otherwise this menu item is grayed out. This menu item is also grayed out when the currently selected item is the last item. Selecting this menu item has exactly the same effect as selecting the next item in the view, and then selecting Join with Previous from the menu.

Recompute Details

Selecting this menu item causes the disposition to be re-computed by sending the text of the item back into the parser.

Mark Unreviewed Ctrl+U

Selecting this menu item marks the current item as "unreviewed".

Mark Approved Ctrl+R

Selecting this menu item marks the current item as "reviewed".

Mark Delete Ctrl+D

Selecting this item marks the current item as "delete".

Make Command

This menu item is only available when the edit control which contains the transcribed text has the focus, and when a range of characters is selected. Selecting this menu item causes the range of selected characters to be displayed as if it were a command (italicized grey text), and correspondingly removes the selected text from the text which is sent to the back end.

Make Text

This menu item is only available when the edit control which contains the transcribed text has the focus, and when a range of characters is selected. Selecting this menu item causes the range of selected characters to be displayed as if it were text (non-italics black), and correspondingly adds the selected text to the text which is sent to the back end.

Correct That (-) (586)

Selecting this menu item causes a correction dialog box to be displayed. The box includes the words recognized by the speech recognition software along with a list of other possible interpretations. The user can select a desired interpretation from the list. The user can also use voiced correction commands, such as "Select" and "Correct That". These commands are described in detail below. This menu item is only available when an edit control containing transcribed text has the focus.

Play That Back Ctrl+S (582)

This menu item is only available when an edit control which contains transcribed text has the focus. When a block of text is selected, selecting this menu item plays the speech associated with the block of text along with an arrow which points to the beginning of each utterance as it is played. If no text is selected, then selecting this menu item causes the speech for the block of text starting at the insertion point and ending at the end of the edit control to be played back along with an arrow which points to the beginning of each utterance as it is played.

If there is no speech associated with a particular item (e.g., the item text was changed from a properties dialog), then selecting play that back from the menu causes the system to play back the recording of the item which was made separately when the item was transcribed. If this recording is used instead, then playback always begins at the beginning of the item regardless of the position of the insertion point or selection, and proceeds to the end unless stopped. Also, for this type of playback, there is no arrow pointing to the beginning of utterances, nor can the faster or slower controls (described below) be used to modify the playback.

Stop Playback Esc (584)

This menu item is only available during playback. Selecting this menu item terminates any current playback operation.

Properties . . . Ctrl+Enter

Selecting this menu item displays the properties dialog for the currently selected item. There is a different properties dialog for each type of item, and the appropriate properties dialog is displayed based on the disposition type of the current item.

Speech (568)

Each item on the speech menu displays dialogs which are implemented by the speech recognition software (e.g., Dragon NaturallySpeaking).

New User . . .

Selecting this menu item causes the Dragon NaturallySpeaking New User Wizard to be displayed, which allows the user to create a new speech profile in Dragon NaturallySpeaking.

Open User . . .

Selecting this menu item causes the Dragon NaturallySpeaking Open User dialog to be displayed, which allows the user to select a different speech profile in Dragon NaturallySpeaking. The Open User Dialog is implemented by calling the appropriate Dragon NaturallySpeaking COM interfaces. The Open User Dialog displays a list of the known Dragon NaturallySpeaking users and the user is expected to select the appropriate user for the session. Once a user has been selected, that user is loaded into memory and the user name is displayed on the title bar of the system application window.

New Vocabulary . . .

Selecting this menu item causes the Dragon NaturallySpeaking New Vocabulary dialog to be displayed, which allows the user to create a new topic in Dragon NaturallySpeaking.

Open Vocabulary . . .

Selecting this menu item causes the Dragon NaturallySpeaking Open Vocabulary dialog to be displayed, which allows the user to change topics in Dragon NaturallySpeaking.

Vocabulary Editor

Selecting this menu item causes the Dragon NaturallySpeaking Vocabulary Editor dialog to be displayed, which allows the user to edit the words in the current topic in Dragon NaturallySpeaking.

Vocabulary Builder

Selecting this menu item causes the Dragon NaturallySpeaking Vocabulary Builder dialog to be displayed, which allows the user to modify the language model of the current topic in Dragon NaturallySpeaking.

Mobile Training

Selecting this menu item causes the Dragon NaturallySpeaking Mobile Training program to be displayed, which allows the user to train his speech profile from a recorder.

Options . . .

Selecting this menu item causes the Dragon NaturallySpeaking Options dialog to be displayed, which allows the user to adjust the options which control recognition in Dragon NaturallySpeaking.

Help (570)

Help Topics F1 (587)

Selecting this menu item displays the contents screen for the on-line help file for the system.

Tip of the Day

Selecting this menu item displays the Tip of the Day Dialog for the system. Each time the Tip of the Day Dialog is displayed, a different tip is shown.

Dragon NaturallySpeaking Help

Selecting this menu item causes the contents screen for the on-line help file for Dragon NaturallySpeaking to be displayed.

About The system

Selecting this menu item causes the About Dialog for the system to be displayed. The About Dialog for the system includes the bitmap shown when the system starts (the Splash Screen).

Toolbar (515)

The following list of items are the names of the buttons on the toolbar in the review window of the system. In each case, the item name is the text displayed in the tool tip for that button. Most buttons corresponds to menu items. In that case, the button is grayed out and disabled automatically when the corresponding menu item is grayed out and disabled.

New Item (572)

Clicking the New Item button 572 has the same effect as selecting New Item from the File menu 560.

Cut (574)

Clicking the Cut button 574 has the same effect as selecting Cut from the Edit menu 562. The Cut button uses the standard Windows icon for this function.

Copy (575)

Clicking the Copy button 575 has the same effect as selecting Copy from the Edit menu 562. The Copy button uses the standard Windows icon for this function.

Paste (576)

Clicking the Paste button 576 has the same effect as selecting Paste from the Edit menu 562. The Paste button uses the standard Windows icon for this function.

Get Items (510)

Clicking the Get Items button 510 has the same effect as selecting Get Items from the File menu 560. The Get Items button is oversized, and displays the phrase "Get Items", and also has a copy of the same icon (a star) which is used to indicate that items are unreviewed.

One Line Summary (578)

Clicking the One Line Summary button 578 has the same effect as selecting One Line Summary from the View menu 564.

Four Line Summary (579)

Clicking the Four Line Summary button 579 has the same effect as selecting Four Line Summary from the View menu 564.

Expand All (580)

Clicking the Expand All button 580 has the same effect as selecting Expand All from the View menu 564.

Send Items (520)

Clicking the Send Items button 520 has the same effect as selecting Send Items from the File menu 560. The Send Items button is oversized, and displays the phrase "Send Items", and also has a copy of the same icon (a check mark) which is used to indicate the items are accepted.

Save Speech Files (581)

Clicking the Save Speech Files button 581 has the same effect as selecting Save Speech Files from the File menu 560.

Play That Back (582)

Clicking the Play That Back button 582 has the same effect as selecting Play That Back from the Item menu 525.

Stop Playback (583)

Clicking the Stop Playback button 583 has the same effect as selecting Stop Playback from the Item menu 525.

Faster (584)

During playback, clicking the Faster button 584 increases the speed of playback from normal speed to fast speed. If playback is already proceeding at fast speed, then clicking this button causes playback to skip ahead some number of words. While playback is proceeding, the right arrow key can be used as an accelerator for this button.

Slower (585)

During playback, clicking the Slower button 585 decreases the speed of playback from fast speed to normal speed. If playback is already proceeding at normal speed, then clicking this button causes playback to skip backward some number of words. While playback is proceeding, the left arrow key can be used as an accelerator for this button.

Correct That (586)

Clicking the Correct That button 586 has the same effect as selecting Correct That from the Item menu 525. While playback is proceeding, the down arrow key can be used as an accelerator for this button.

Help Topics (587)

Clicking the Help Topics button 587 has the same effect as selecting Help Topics from the Help menu.

Sorting Tabs

The user interface 500 also provides two tabs 590 and 595 for use in controlling the sorting of items in the display window. Selecting the sort-in-time-order tab 590, or pressing Alt+O, causes the items in the review window to be sorted in time order. Selecting the sort-by-type tab 595, or pressing Alt+T, causes the items in the review window to be sorted by type. If the items are ready sorted by type, and new items are added at the bottom, then selecting this tab resorts the items.

Navigation Accelerator Keys

The following navigation keys are active when the review window is active but no disposition field or edit control has the focus.

Tab Key

The Tab key switches the focus to the first field of the disposition line (which is usually the disposition type).

Up Arrow Key

The up arrow causes the previous item in the review window to be selected instead of the current item. The focus rectangle is erased around the current item, and drawn around the previous item. In this case previous is always defined as the item above in the window (regardless of the sort order). If the first item in the window is the current item, then pressing the up arrow causes the system to beep.

Down Arrow Key

The down arrow causes the next item in the review window to be selected instead of the current item. The focus rectangle is erased around current item, and drawn around the next item. In this case, next is always defined as the item below in the window (regardless of the sort order). If the last item in the window is the current item, then pressing the down arrow causes the system to beep.

PgUp Key

The page up key scrolls the screen up so that the current top line of the screen becomes the bottom line of the screen after scrolling.

PgDn Key

The page down key scrolls the screen down so that the current bottom line of the screen becomes the top line of the screen after scrolling.

Ins Key

The insert key has the same effect as the menu item Mark Approved from the Item menu 525.

Del Key

The delete key has the same effect as the menu item Mark Delete from the Item menu 525.

Backspace Key

The backspace key has the same effect as the menu item Mark Unreviewed from the Item menu 525.

Control+Home Key

The combination of the control key and the home key scrolls the screen to the top so that the first item in the review window is shown at the top of the screen.

Control+End Key

The combination of the control key and the end key scrolls the screen to the bottom so that the last item in the review window is shown at the bottom of the screen.

Control+PgUp Key

The combination of the control key and the page up key selects the first item currently visible on the screen.

Control+PgDn Key

The combination of the control key and the page down key selects the last item currently visible on the screen.

The following navigation keys are active when edit control which contains transcribed text has the focus. In addition to the listed exceptions, all of the standard navigation keys work in the edit control as they work in any standard Windows edit control.

Esc Key

The Esc key cancels the focus of the edit control. The black border is removed, and instead a focus rectangle is drawn around the disposition line of the item which contains the edit control.

Tab Key

The Tab key has the same effect as the Esc key.

The following navigation keys are active when one of the disposition field's has the focus. In addition to the listed exceptions, all of the standard navigation keys work in the disposition field as they work in any standard Windows combo box.

Esc Key

The Esc key cancels the focus of the disposition field. The black border is removed, and instead a focus rectangle is drawn around the disposition line of the item which contains the disposition field.

Tab Key

The Tab key causes the next disposition field immediately to the right of the current disposition field to gain the focus. If the rightmost disposition field currently has the focus, then the focus shifts to the edit control which contains the transcribed text.

Action Item Formatting Guidelines

The system permits action items to be entered using natural English sentences. The implementation of the system described below organizes information in terms of contacts. The system user is the default contact, but many of the things that the user says will involve one or more other contacts. The system is aware of the user's contact list.

There are two, and sometimes three, ways to refer to a contact. Using Dwight D. Eisenhower, nicknamed Ike, as an example, the first way of identifying him is to speak the first name plus the last name (i.e., "Dwight Eisenhower"). The second way is to speak the first name only (i.e., "Dwight"). The third way is to speak the contact's nickname (i.e., "Ike").

The user is likely to have duplicate first names in the contact list. In that case, there is no simple rule for predicting which contact will be selected when only a first name is used. One way out of this dilemma is to always use the last name. A second way out is to exploit the rule that a nickname always wins over a first name. Thus, if the user has three contacts named George, but only George Washington has George specified in the nickname field, then "George" is guaranteed to refer to George Washington.

The system permits the user to arrange activities with the user's contacts. The system enters these activities into the user's database so that they show up on the user's calendar. When the user schedules an activity, the user can string together as many contacts as desired (e.g., "with Ike, George and James Buchanan").

There are three basic categories of activity: meetings, calls, and to-dos. Anything that's not a meeting or a call is classified as a to-do.

When a user talks about a meeting, the user is usually putting it on his calendar. The system insists on knowing the date of the meeting. It would like also to know the time, the duration, and the contacts who will be present, and it is willing to take note of a priority. In addition, it will record as much free text as the user wishes, usually about the purpose of the meeting. This free text can easily be built into an e-mail message that the system will send to all the contacts.

In general, the user can specify the date using any way acceptable in written or not-too-casual spoken English. However, since the system is setting up a calendar, the system needs something more precise than "next week" or "in February." Furthermore, in implementations that do not search the calendar for free time, descriptions such as "as early as possible on Friday" won't work. As long as the user specifies the date precisely, there are many ways to say it. If the user has a calendar at hand (or in his head), something like "on Jan. 25$^{th}$, 1999" or "on the 25$^{th}$ of November" is probably the simplest. If the user doesn't have a calendar handy, the user can specify the date relative to some other date. The simplest examples are "tomorrow" and "the day after tomorrow", but most anything that people use in everyday transactions will work, like "on the second Friday in November" or "two weeks from next Tuesday."

People tend to disagree about the precise interpretation of "this", "next", and "last" with respect to dates. In one implementation of the system, "this" means "of this week" and hence may refer to the past. "Next" means "of next week" and "last" means "of last week". "This coming" may be used to specify unambiguously the first occurrence in the future of a certain day of the week. If today is Wednesday, "this coming Friday" falls in this week, but "this coming Tuesday" falls in next week.

Ordinarily, the user does not need to specify the year. The system picks a date in the future. The only cases in which the user needs to specify the year are for meetings that are more than a year in the future or ones that for some reason the user wants to schedule retroactively.

Some implementations of the system do not support holidays. In these implementations, statements such as "a week after Thanksgiving" or "on the Wednesday before Easter" do not work.

With respect to times, one option is to say nothing, in which case the system will create a timeless appointment on the calendar for the specified day. Otherwise, anything that the user says ought to work, subject to the minor restriction that times must be at multiples of five minutes after the hour. So the user can say (or type "at noon", "at twenty past 10 am", "at 10:25 am", "at 11 in the morning" or even "at 0810 hours". Since specifying "am" or "pm" all of the time is a nuisance, the system assumes that ambiguous times refer to most people's business hours (i.e., from 7 am to 6 pm). Thus, "schedule a meeting with Ike for 2 tomorrow" will result in an afternoon appointment, rather than one at 2 am.

With respect to durations, the easiest thing to do is to say nothing, in which case the duration will default to one hour for a meeting, ten minutes otherwise. If that's not how long the meeting should last, the user just needs to say something like "for half an hour," "for three hours," "for an hour and three quarters," or "for two days." The only significant restriction is that durations must be in multiples of five minutes.

An alternative to specifying starting date and time plus duration for a meeting is to specify starting date and time plus ending date and time. This is especially natural when the duration is long, as in "from 9 am next Monday until noon next Thursday." Generally, a user employing this style should observe three precautions. First, the order of time and date should be kept consistent (e.g., "from 3 today until next Monday at 4 pm" is not recommended). Second, the user should not assume that "next"on the end date will carry back to the start date (e.g., "Schedule a meeting from Monday until Wednesday of next week" will produce a nine-day meeting). Third, particularly with times, "until" should be used instead of "to". Phrases like "from 1 to 5" tend to get recognized as "from 125," which is a valid time. Saying "from 1 until 5" or "starting at 1 and ending at 5" removes the ambiguity.

The default priority is "medium priority." The other alternatives are "high priority" and "low priority." The system looks for adjectives like "urgent" or "unimportant" that imply priority (e.g., "schedule an important meeting" will result in a high priority).

Free text may be recorded in a "regarding" field associated with an item. Further details can go into a "companion note" generated by the system. The system identifies free text as all text following a period dictated (or typed) by the user. If the user leaves out the period and just starts talking about things that are not dates, contacts, or the like, the system will attempt to decide where the free text starts. However, the period is the infallible indicator.

Any text that follows "regarding," "concerning," "about," or a similar word is assumed to be free text up to the start of something like a date or priority. In addition, words that immediately precede a noun like "meeting" or "appointment," if they cannot be interpreted as something like a duration, time, or priority, are taken to be free text. For example, if the user says "a high-priority international sales meeting", the words "international sales" are free text.

There are three ways to create, for example, a meeting. The user can view the meeting itself as fundamental, the contact(s) as fundamental, or the block of time as fundamental.

The first style is the most flexible, and is sufficient for any meeting that the user wants to schedule. It has the advantage that it is easy to use many adjectives to describe the meeting. In this style, the user must start with a verb like "schedule" or "arrange." Then come adjectives describing details such as priority, duration, and/or time, then optional free text that describes the nature of the meeting, followed by the word "meeting" or a synonym. After that, the user specifies the date (plus time and duration if the user did not include them earlier), and any other details the user wants to supply, such as contacts or "regarding". Last among these details should be a specification of priority and/or an indication that an e-mail should be generated and sent to all contacts (e.g., "and send e-mail confirmation" or words to that effect). After a period, the user may add as much more free text as desired. Examples of this type of items include:

"Schedule a high-priority three-hour Allied command meeting with Ike and Franklin at 11:30 on May 23 regarding the planned invasion of Normandy and send email confirmation. This meeting should be kept top secret."

"Create an appointment with Bill Clinton regarding the line-item veto from 9 am until 11 on the second Friday of next month and make it high priority. This has to be settled before Congress adjourns."

The second style is more concise because it does not use a noun like "meeting," but it only works if the user is going to specify at least one contact. The user starts with a "meeting" verb, followed by the contact(s) (e.g., "meet George" or "get together with Dwight and Franklin"). The user follows that up with the date/time/duration and the "regarding" phrase, in whichever order the user prefers. As before, the user finishes up with priority and/or a request for email. Then, after a period, the user adds as much free text as needed. Examples of this style include:

"Meet with Ronald Reagan and George Bush at 2 pm tomorrow concerning recent activities of Oliver North and send email confirmation. We could have a real problem on our hands."

"Get together with Herbert about dealing with the stock market crash this coming Thursday from noon until 2:30."

The third style is rarely used, but is occasionally useful. In this style, the time period (the duration) is central. An appropriate verb with which to start the sentence is "reserve" or a synonym like "set aside." The time period comes next, then the contacts, the "regarding" field, and the date and time may follow in whatever order the user finds convenient. The priority and the email flag, if any, should be at the end. An example of this style is as follows:

"Set aside two hours with Abe at quarter past two next Tuesday regarding the draft of his speech for Gettysburg and make it high priority. This speech has to be at last twice as long in order to cover all the issues."

Element may go together in any reasonable order. However, most, if not all, implementations do not take the time to consider every one of the thousands of different possible orders. Two restrictions to remember are that temporal information (date, time, and duration) should be kept together and that the email flag and the priority should come last.

Calls are very similar to meetings, and generally just use a "telephone" verb or noun where a meeting employs a "meeting" verb or noun. Calls generally follow either the "activity is central" or the "contact is central" style. Examples of calls include:

"Arrange a telephone call to Gerald Ford at 10 before 9 on the second Thursday of September concerning final details of our fall golf match."

"Urgent phone Harry tomorrow at 5 am about the military implications of the test at the Trinity site."

For tasks that are not meetings (when all contacts gather in a room at a preassigned time) or calls (which use the telephone), the system cannot know in advance what nouns or verbs the user may use to describe the task that the user is putting on the calendar. Unless the user uses the word "task" or a synonym like "assignment," it is a big help to provide a hint that the user is creating a task. The phrase "Create a task" accomplishes this purpose. Alternatively, the user can say something that implies a sense of future obligation to do something, such as "I must" or "Need to". In practice, these preambles are most important when the user is not providing a lot of date, time, and duration information. If the user speaks a date and time, the system will probably realize anyway that what the user is describing could only be a "to-do."

There are three basic styles for specifying a to-do. The first of these just uses "task" or "to-do" where the user would have used "assignment" or "meeting". An example of this style is "Create a high-priority two hour task to weed the garden this coming Tuesday at quarter past four".

The second style uses the "contact is central" style, preferably with a preamble. Examples of this include:

"Remember to buy a present for Jimmy Carter's inauguration."

"I need to admonish Richard Nixon about abuse of the FBI at 3:35 next Wednesday this is important."

The third style uses a verb that describes the task, often with an accompanying preamble. Examples of this include:

"I have to sign the omnibus budget bill at half past noon on Friday of next week."

"Remember to declare a bank holiday on the second Friday of next month. This will prevent a depression."

The preamble "remember to" has a unique property, in that it makes the date, time and duration (if any) be part of the "regarding" field. This is useful if the user wants to create a task that will show up on the user's calendar today to remind the user of something in the future. An example of this is "Remember to make a reservation for our anniversary dinner next Tuesday at 7:30", which will show up by default as a task on the date on which it is entered.

The user may use the system to add contacts to the contact list. One implementation of the system does not transcribe data about the new contact's address, company, and so forth. There are several ways of describing a new contact, but the simplest is just to use the phrase "new contact" followed by the name, then by a period. What follows the period is free text that will be attached as a note to the new contact's record. This is a good place to record information that can go into other fields of the database record. An example of such an entry is "Create a new contact named Warren Harding. He lives at 1600 Pennsylvania Ave. in Washington."

The user also may use the system to create a new text file. In this case, the free text is what matters, and the user's job is to provide the all-important period so that the system can tell where the file name ends and the text begins. An example of such an entry is:

"Create a document titled contract with America. This is a blueprint for the legislation to be enacted by the next Congress."

This will create a document called "contract with America.txt". The user can say "dot text" to end the file name, in which case the user can dispense with saying "period".

Another case for which free text is the most important thing is in an e-mail message. In this case, the user needs to be careful to separate the "regarding" field (which becomes the title of the e-mail) from the rest of the free text, which becomes the body of the e-mail. The user starts with "Send e-mail to" or something similar, and continues with a list of recipients, "regarding" and a list of text files (if any) that the user wants to attach to the e-mail. Then comes a period, then the text of the e-mail. An example of such an item is:

"Send e-mail to Richard, Gerald, Ronald, and George Bush about strategies for continuing the dynasty and attach Republican Rule dot text. Gentlemen, we've been in the White House for a long time and want to keep it that way."

The last type of item is called a note. It includes two subcases, notes and histories, and perhaps is best characterized as a note/history. Unlike an activity, a note/history doesn't require the user to specify a date, time, or duration, and instead uses the date and time recorded by the recorder. This means that, as with tasks that start "remember to," the user can include dates, times, and even durations in the free text of a note. Furthermore, a note/history can have only one contact.

The first type of note/history is a pure "note." This is often a statement about a contact, in which case the easiest thing to do is to start out with the contact name (e.g., "George Washington was the first president." or "Regarding Calvin Coolidge his reputation is on the rise.").

If the note concerned something that the user did relating to the contact, then the contact name would not appear first. In this case, the system may have a hard time determining whether the user is talking about a note or a task. The user can provide a useful hint in the form of a preamble, something like "take a note" that uses the word "note." Examples of suitable statements include:

"Take a note I helped Harry plan his 1948 reelection campaign."

"Note I worked with Lyndon to plan security for the convention."

On occasion, notes like this are classified by the system as "To-do done," a type of history.

A special case occurs when what the contact did is to telephone the user, or where what the user did was to receive a telephone call from the contact. The system regards this as a history of type "Call Received."

All of the remaining "history" types involve an activity that either was done or not done. The system concludes that the user is talking about a meeting if the user uses one of the "meeting" nouns or verbs that the user would use in scheduling a meeting. It will conclude that the user is talking about a call if the user uses a "call" verb or noun. Otherwise it concludes that the activity in question must be a "to-do."

Failure to carry out an activity is the easier case. The user just starts with "Failed to," "forgot to," "did not" or words to that effect:

"Did not meet with Teddy to hear about San Juan Hill." (Meeting not held)

"Forgot to review the draft of the State of the Union address" (To-do not done)

"Failed to reach Jack to advise him against the Bay of Pigs idea" (Call attempted)

Since the system characterizes a call that does not happen as a "Call Attempted," the verb "reach" is appropriate in place of "call" in the third example. If the user says "I forgot to call", the system will give the user credit for having tried to call even though the user does not deserve it.

It also is easy to tell the system that a meeting or a call happened by using a "meeting" or "call" verb in the past tense:

"Met with Woodrow regarding the League of Nations."

"Telephoned Franklin to congratulate him on his reelection."

What's harder is to convey the idea that a "to-do" happened, since the system does not know what verbs describe all the tasks that the user might do. In this case a preamble will generally distinguish a note from a task, though it is hard to draw the line between a "To-do" done and a plain old note. The most reliable preamble is one that indicates success, like "Succeeded in" or one that suggests activity in the recent past, like "Finally" or "I just." Examples include the following:

"Finally played a round of golf with Gerry" (cf. the task "I need to play golf with Gerry next Monday")

"I just helped Thomas draft the Declaration of Independence" (cf. "Create a task to help Thomas draft the Declaration of Independence")

One last thing that the user can do by means of a note/history is to attach a text file to a contact's record. Since the system knows all of the file names in the default folder or directory, it will have little trouble interpreting something like "Attach the file Enemies List to Richard Nixon's record."

Action Item Disposition Formats

Examples of disposition formats are provided below. The examples provided do not constitute an exhaustive set, but represent a reasonable sample set. In general, each example is assumed to occur at the beginning of the item unless the example begins with a phrase "computer please". The phrase "computer please" is used to introduce a command, and can be used at the beginning of an item or anywhere in the middle of an item. As noted above, the user may reconfigure the system using the options dialog to replace this phrase with any desired word or phrase. A separate phrase (e.g., "Jabberwocky") is used to start a new item.

Parsing is linear. This means that if the user presents contradictory information, the second command is used instead of the first. An example of this is if the user says "schedule a meeting for three o'clock Tuesday" and then during the same item says "computer please schedule this for five o'clock". In that case, a time of five o'clock is used because that was the later command. Similarly, users are allowed to change the disposition type with a command like "computer please this is a file". When the disposition is changed, the parser does not go back and re-parse previous commands. If the user has already identified a contact or a date, and the contact or date applies to the new disposition type, then the system continues to use the identified contact or date. Fields that do not apply to the new disposition type are discarded. For example, if the user starts by creating an e-mail that includes a contact name and then changes the disposition to be a text file, the contact name is discarded as not applying to the text file.

Examples of text file disposition formats include the following:

"create a file"

"start a new file"

These formats identify the item as a text file. All of the text following these commands is stored in the text file itself. If no file name is specified, the file is stored into a default file.

"create a draft document called Fooberman contract"

This format identifies the item as a text file, and sets the file name to "Fooberman contract".

"continue the document called Fooberman contract"

This format identifies the item as a text file, and sets the filename to be "Fooberman contract". Since existing text files are automatically appended by the system, the additional command "continue" has no additional effect.

"computer please file this as Fooberman contract"

"computer please call this the Fooberman contract"

These commands set the file name to be "Fooberman contract". If the file name had been set by a previous command, then either of these commands would override the effect of the previous command. Note that the word "the" is ignored when establishing the filename of the file.

"continue the last document"

This format identifies the item as a text file, and sets the file name to be the same as the last file name used by the system in this session or in a previous session. Since existing text files are automatically appended by the system, the additional command "continue" has no additional effect.

"start a new document called this is a new document period It was dictated by voice"

"start a new document called this is a new document dot text It was dictated by voice"

These commands all set the file name to be "this is a new document", and the beginning of the text to be "it was dictated by voice". The phrases "dot text" or period can be used to identify the end of the filename. (Note that the phrase dot text would be transcribed as ".TXT".)

"computer please make this a file"

This command changes the disposition of the current item to be a text file.

Examples of audio clip file disposition formats include the following:

"create an audio file"

"start recording"

These commands identify the item as an audio clip.

"create an audio file called Fooberman contract"

This command identifies the item as an audio clip with a filename of "Fooberman contract".

"start an audio file called Fooberman contract dot wave It was dictated by voice"

This command identifies the item as an audio clip with a filename of "Fooberman contract". The phrase "dot wave" can be used with an audio clip to identify the end of the filename. The user can also say "period" to end the file name. (Note that the phrase dot wave would be transcribed as ".WAV".)

"computer please save this as audio"

This command changes the disposition of the current item to be an audio clip. For example, the user could have started to create a text file, and then changed his mind and decided to turn the item into an audio clip.

Examples of appointment disposition formats include the following:

"create an appointment"

Identifies the item as an appointment.

"schedule a meeting with Roger for 2 p.m. tomorrow"

This format identifies the item as an appointment, schedules the appointment for 2 p.m. on the day following the day that the recording was made (based on the time stamp), and files the appointment with contact designated as Roger.

"schedule a meeting for tomorrow at 6 with Jim Janet and Roger"

This format identifies the item as an appointment, schedules the appointment for 6 p.m. on the day following the day that the recording was made, and files the appointment with contacts designated as Roger, Jim, and Janet.

"schedule a two hour meeting for Tuesday at 330"
This format identifies the item as an appointment, schedules the appointment for 3:30 p.m. on the Tuesday following the day that the recording was made, and sets the duration to two hours. The user may dictate an unformatted number as the time, with ambiguous times being mapped to daylight hours. The default duration is one hour. If the duration is not specified, it is not displayed in the disposition summary.

"reserve three hours next Wednesday starting at 10"
The word "deserve" is a synonym for creating an appointment. This format sets the duration to 3 hours, the time to 10 a.m. and the date to the Wednesday following the day the day that the recording was made.

"schedule a meeting with Jim and Janet and send them email"
This format creates an appointment with contacts designated as Jim and Janet. It also sets the flag which tells the application software to send the appointment (via email) to those contacts.

"create a low priority three hour meeting starting at two next Wednesday"
The phrase "low priority" causes this appointment to have a priority of low. The default priority is medium and unspecified priorities are not displayed in the disposition summary.

"computer please schedule this for 5 a.m."
This format changes or sets the appointment time to 5 a.m.

"computer please invite Paula to the meeting"
This format adds contact designated as Paula to the list of contacts under which the appointment is filed. If the email flag was set, the back-end software also sends an email concerning the appointment to Paula.

"computer please send email confirmation"
This format sets the flag which tells the application software to send an email concerning the appointment to the contacts associated with the appointment.

"computer please make this high priority"
This format changes the priority to high, overriding the previous specification of priority.

"computer please make this an appointment"
This format changes the disposition of the item to be an appointment.

Examples of task disposition formats include the following:

"create a task"
This format identifies the item as a task. Generally, a task is either a "to-do" or a "call", with a "to-do" being the default unless "call" or a related verb is explicitly used.

"remember to pick up my laundry"
This format creates a task, with the text of the task being "pick up my laundry". The user does not have to pause between the command "remember to" and the text.

"remember to ask Laura to pick up my laundry"
This format creates a task, with the text being "ask Laura to pick up my Laundry". This task is also associated with the contact designated as Laura, which is the first contact name found in the text. This is unusual because most dispositions fields are not extracted from the text but from explicit commands. This is only done for contacts for tasks.

"remember to pick up my laundry before next Tuesday"
This format creates a task, with the text being "pick up my laundry before next Tuesday". The date is not extracted from the text since that might cause the task to not appear in the user's daily to-do list.

"remember to email Laura about Roger"
This format creates a task, with the text being "email Laura about Roger", and associates the task with the contact designated as Laura, which is the first contact name found in the text. The keyword "email" in the text is ignored, this command does not send email since it begins with "remember to".

"remember next Tuesday to tell Laura about my laundry"
This format creates a task, scheduled for the Tuesday following the day that the recording was made. The text is "tell Laura about my laundry". The format associates the task with the contact designated as Laura.

"create a task for tomorrow with Laura"
This format creates a task, scheduled for the day after the day that the recording was made, and associates the task with the contact designated as Laura. (The text follows the word Laura.)

"schedule a call to Roger at 3 p.m. tomorrow"
"call Roger at 3 tomorrow"
"remember tomorrow to call Roger at 3 p.m."
All three of these commands create a task which is scheduled for 3 p.m. on the day after the day that the recording was made and which is associated with the contact designated as Roger. All three commands also set the type to "call" instead of the default "to-do".

"schedule a 15 minute task for tomorrow at 3"
This format creates a task, scheduled for the day after the day that the recording was made, and sets the time to 3 p.m. (the default is to schedule an all-day task) and the duration of 15 minutes.

"computer please schedule this for today"
Changes the task date to be the day that the recording was made.

"computer please make this a high priority call"
Changes the priority of the task to be high priority.

"computer please send an email confirmation"
This format sets the flag that tells the back-end software to send the task to the associated contacts (via email).

"computer please delegate this to Roger"
This format sets the flag that tells the application software to send the task to the associated contact and adds the contact designated as Roger to the list of associated contacts.

"computer please make this a task"
This format changes the disposition of the item to be a task.

Examples of note disposition formats include the following:

"create a note"
"take a note"
These commands identify this item as a note. The date and time at which the note was recorded are associated with the note unless the user provides a different date or time.

"attach a copy of the Fooberman contract to Roger's record"
This format identifies the item as a note, associates the item with the contact designated as Roger, and attaches the file with the file name "Fooberman contract" to the note.

"concerning Roger"
This format creates a note and associates the note with the contact designated as Roger.

"completed a call with Roger at 3 p.m. today"
This format creates a note and associates the note with the contact designated as Roger, sets the date to be the day that the recording was made and the time to be 3 p.m., and sets the type to be "completed call".

"Roger just called this is what happened"
This format creates a note with the text "this is what happened" associated with the contact designated as Roger, and sets the type to be "called". The keyword "just" causes the date and time to be set to match the time stamp.

"just left message for Roger this is what happened"
This format creates a note with the text "this is what happened" associated with the contact designated as Roger, and sets the type to be "left message". The keyword "just" causes the date and time to be set to match the time stamp.

"held a meeting with Roger today at 10 this is what happened"
This format creates a note with the text "this is what happened" associated with the contact designated as Roger, sets the type to be "called", sets the date to be the day that the recording was made, sets the time to be 10 a.m.

"computer please file this for Paula"
This format associates the note with the contact designated as Paula. It overrides any previous association for this note.

"computer please make this a note"
This format changes the disposition of the item to be a note.

Examples of email disposition formats include the following:

"create an email"
This format identifies the item as an email message.

"send email to Roger"
"email Roger"
This format identifies the item as an email message and sets the target recipient to be the contact designated as Roger.

"send email to Jim Janet and Roger"
This format identifies the item as an email message, and sets the target recipients to be the contacts designated as Jim, Janet, and Roger.

"send an urgent email to Roger"
This format identifies the item as an email message and sets the target recipient to be the contact designated as Roger. It also sets the priority of the message to be high. As noted above, the priority on an email message defaults to medium.

"send this to Jim and Janet and copy Roger and Renee flag as high priority"
This format identifies the item as an email message, and sets the target recipient to be the contacts designated as Jim and Janet. It also causes a copy of the message to be sent to the contacts designated as Roger and Renee, and flags the priority of the message to be high.

"send the Fooberman contract to Roger period Roger here is a copy"
This format identifies the item as an email message to be sent to the contact designated as Roger. It also attaches the document named "Fooberman contract" to the message. The body of the message begins "Roger here is a copy".

"computer please make this low priority"
This format sets the priority of the message to low.

"computer please also send this to Janet"
This format adds the contact designated as Janet to the list of people receiving this message (send to list, not copy to list).

"computer please attach the Fooberman contract and Standard Terms and Conditions"
This format attaches the document named "Fooberman contract" and the document named "Standard Terms and Conditions" to the email message. Note that the word "and" can be unambiguously identified as being part of the filename because the files named "Fooberman contract" and "Standard Terms and Conditions" are known to exist in a specially identified directory.

"computer please copy this to Jim"
This format adds the contact designated as Jim to the list of people receiving a copy of the message.

"computer please make this an email"
This format changes the disposition of this item to be an email message.

Examples of contact disposition formats include the following:

"create a contact"
This format identifies the item as a new contact. In one implementation, no additional information is extracted from the recording, and the user is required to fill out the fields of the disposition manually. In another implementation, the user can dictate a business card and the system places information from the dictation into the appropriate fields.

System Architecture

Figure 13:
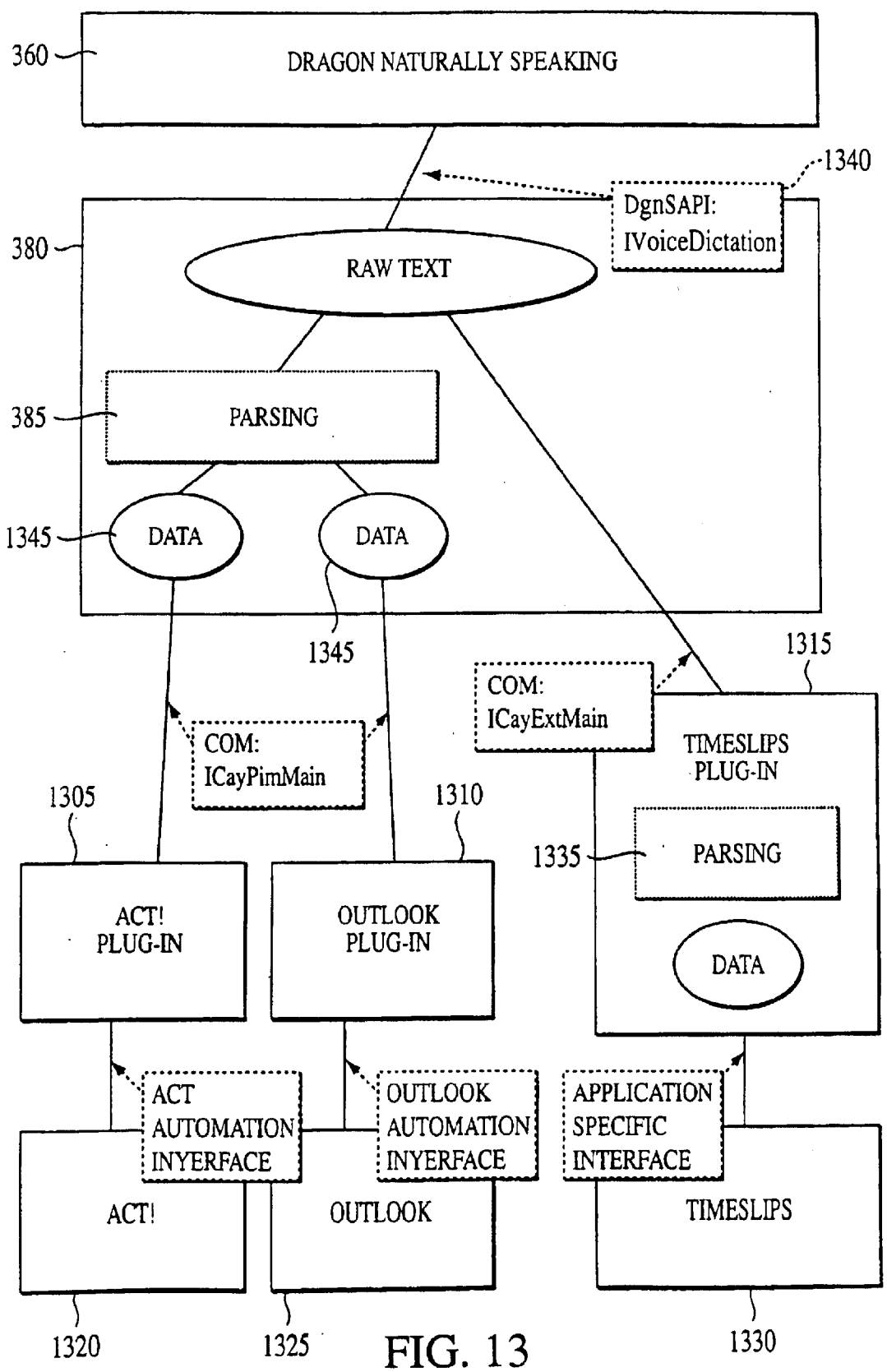
FIG. 13 is a block diagram of a system architecture of the system of FIG. 1.

The system is designed to make it easy to add additional functionality later. Referring to the system architecture diagram illustrated in FIG. 13, one implementation of the system includes the following modules: the main interface module 380, including the parser 385; speech recognition software 360, implemented using Dragon NaturallySpeaking (Preferred Edition); a Symantec ACT! plug-in 1305; a Microsoft Outlook plug-in 1310; a TimeSlips plug-in 1315; and back-end software including Symantec ACT! 1320, Microsoft Outlook 1325, and Timeslips 1330.

The Timeslips plug-in 1315 is representative of external plug-ins that may be added to the system. As shown, the Timeslips plug-in includes its own parser 1335.

The main interface module 380 constitutes the main system executable program. The term "back-end" refers to third party applications into which the system may store information. These include Symantec ACT!, Microsoft Outlook, Timeslips, and other possible back ends. The term "plug-in" refers to a dynamic link library ("DLL") which interfaces between the system and a back-end. Each plug-in is specific to a single back-end.

Plug-ins come in two types. PIM plug-ins are designed to support built-in dispositions (i.e., text files, audio clips, appointments, tasks, notes, contacts, and email messages). PIM plug-ins include no parsing or user interface code, and simply provide an interface between the system and the appropriate contact management or personal information management back-end.

Full plug-ins are designed to support external dispositions. Each full plug-in contains its own parsing logic, data structures, and code to interface to a back-end. This allows the system to be expanded with additional parsing logic and dispositions other than the built-in dispositions which interface to contact management or personal information management software.

The main program module 380 provides the user interface (i.e., the review window and the properties dialog box for all of the built-in dispositions), the parser 385, the interface 1340 with Dragon NaturallySpeaking, and the data structures 1345 which contain the information visually represented to the user in the review window.

The interface between the main program module and Dragon NaturallySpeaking uses Dragon NaturallySpeaking's expanded SAPI COM-based interface. Dragon NaturallySpeaking is used as a server for the system. When the system is running, Dragon NaturallySpeaking's own user interface is not displayed.

The interface 1350 between the main program module and the PIM plug-ins is a custom designed COM-based interface, as is the interface 1355 between the main program and the full plug-ins. This allows additional plug-ins to be specified in the registry by supplying an appropriate Class ID GUID.

Parser

The basic goal of the parser 385 (FIG. 3) is to convert a sequence of text into a meaningful disposition of the type intended by the user. To accomplish this goal, the parser compares the text of an utterance, such as:

"Please schedule a meeting with Jim at half past 9 a.m. on Sep. 8, 1998, to discuss the patent disclosure.", with a set of possible command patterns, such as:

"<preamble> <appointmentVerb> <appointmentNoun> <contact> <time> <date> <body>", to identify the command pattern that best corresponds to the text. Each command pattern is a sequence of "fields". After identifying the command pattern that best corresponds to the text of an utterance, the parser identifies the words corresponding to each field of the command pattern. Finally, the parser interprets the words for each field to generate a disposition. Thus, the parser 385 performs three basic tasks, which may be referred to as the recognition task (i.e., identifying the "best" command pattern), the traceback task (i.e., identifying the words corresponding to each field of the command pattern), and the interpretation task (interpreting the words corresponding to each field of the command pattern).

In performing the recognition task, the parser determines which command pattern best corresponds to the text of the utterance (i.e., has the highest likelihood of generating the utterance). In general, the parser uses a scoring algorithm such that the most likely command pattern is the best-scoring command pattern.

In performing the traceback task, the parser 385 identifies, for a given utterance and a given command pattern (e.g., the best-scoring command pattern for the utterance), the sequence of words in the utterance corresponding to each field of the command pattern. In the above example, <preamble> generates "please", <appointmentVerb> generates "schedule", <appointmentNoun> generates "a meeting", <contact> generates "with Jim", <time> generates "at half past 9 a.m.", <date> generates "on Jul. 22 1998", and <body> generates "to discuss the patent disclosure".

The parser then interprets the words corresponding to each field to determine the disposition of the utterance. In particular, the parser interprets the words to fill in the data structures that get passed to the back-end software, and to identify the "non-command" text (i.e., the "body" of the disposition).

Figure 14:
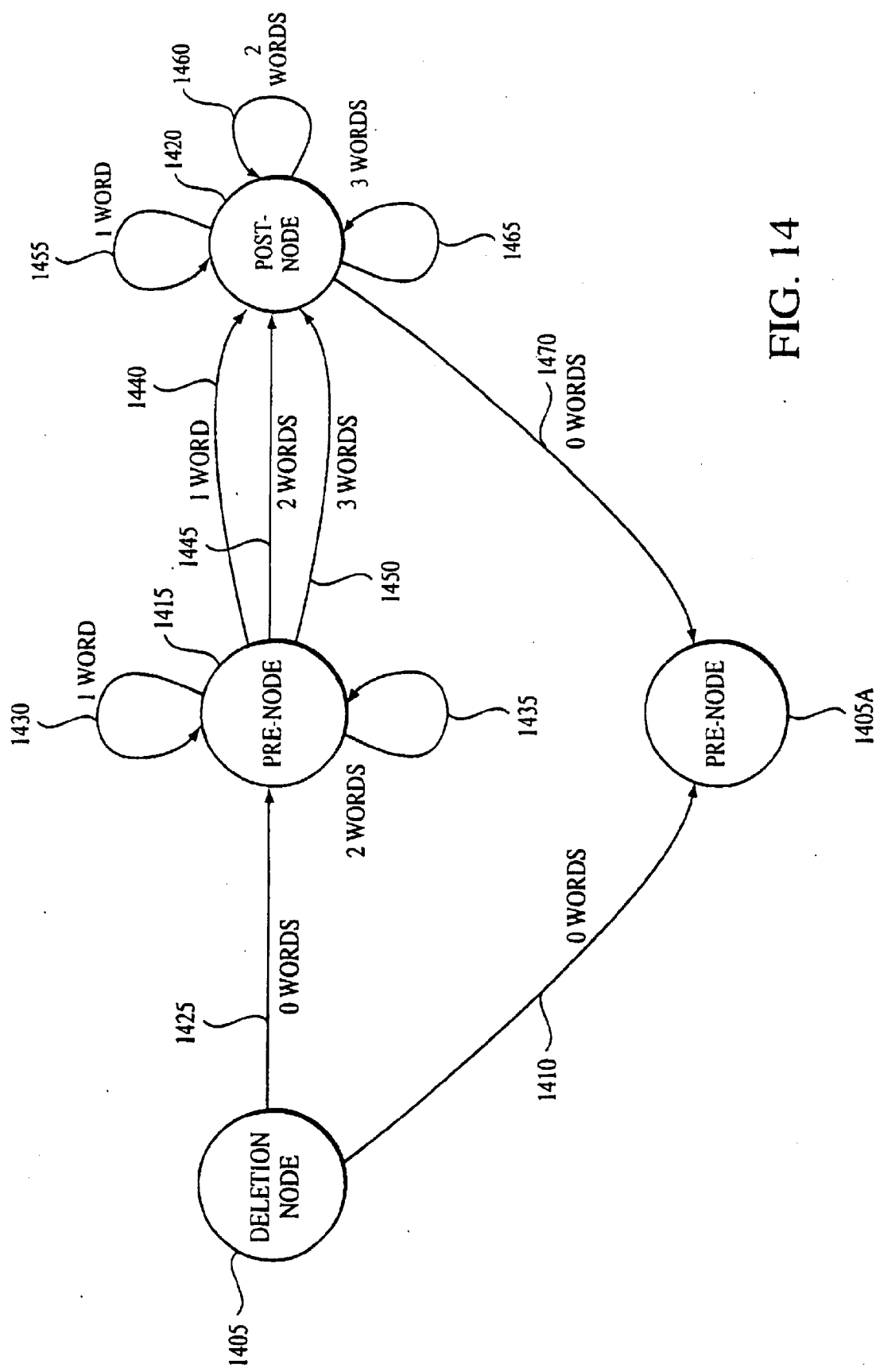
FIG. 14 is a state diagram of a model used by a parser of the system of FIG. 1.

Referring to FIG. 14, the parser uses a model 1400 of a command pattern in comparing the command pattern to the text of an utterance. The parser 385 maps the text of the utterance to the model 1400 and generates a score based on the way in which the words of the text map to the model.

The parser 385 models each field of a command pattern using three nodes. The first node 1405, which may be referred to as the deletion node, indicates that no words have been assigned to the field, and is used to account for the situation in which a field is skipped or deleted in the user's utterance of a command corresponding to the command pattern. Such a deletion is modelled by a transition from the first node 1405 for one field to the first node 1405A for a subsequent field along a no-word-arc 1410. The no-word-arc 1410 represents zero words and indicates that the user has skipped the associated field. The score for a command pattern may be adjusted (i.e., penalized) for skipping a field, with the adjustment varying based on the importance of the field. For example, skipping a required field would result in a larger adjustment than would skipping an optional field. In general, the no-word-arc 1410 provides a more efficient approach to modelling optional fields than would be provided by using additional command patterns with the optional fields left out.

The other two nodes for the field are referred to as the pre-node 1415 and the post-node 1420. Determining that a word will be assigned to the field causes an automatic transition from the deletion node 1405 to the pre-node 1415 along an arc 1425. The arc 1425 does not itself represent a word, and only indicates that at least one word will be assigned to the field (i.e., that the field will not be skipped using the no-word-arc 1410).

The pre-node 1415 represents the condition in which at least one word has been assigned to the field, but no essential words (also referred to as substitution words) have been assigned to the field. The pre-node 1415 is used to account for extra words included at the beginning of the text representing a field. For example, if a person said "on Wednesday, Sep. 9, 1998," the words "on" and "Wednesday" would constitute extra words accounted for by the pre-node 1415. A single initial word is represented by a transition through a single-pre-self-loop 1430 or a double-pre-self-loop 1435 extending from and to the pre-node 1415. The single-pre-self-loop 1430 represents a single word, while the double-pre-self-loop 1435 represents a pair of words. The score for the command pattern may be adjusted (i.e., penalized) for each transition through the single-pre-self-loop 1430 or the double-pre-self-loop 1435. In one implementation, this adjustment is proportional to the negative log of the probability that the word or word pair corresponds to the appropriate number of unnecessary words (i.e. small if the likelihood is high, large if it is low).

Arcs 1440–1450 represent the essential (or substitution) words for a field. The arc 1440 represents one word, the arc 1445 represents two words, and the arc 1450 represents three words. Thus, in the example noted above, the triple-word-arc 1450 would represent "Sep. 9, 1998". The score for the command pattern is adjusted based on the degree to which the words represented by one of the arcs 1440–1450 match words expected to be used with the field.

The post-node 1420 accounts for extra words included at the end of the text representing a field. Each extra ending word corresponds to a transition through a single-post-self-loop 1455, a double-post-self-loop 1460, or a triple-post-self-loop 1465 extending from and to the post-node 1420. The single-post-self-loop 1455 represents a single word, the double-post-self-loop 1460 represents a pair of words, and the triple-post-self-loop 1465 represents three words. The score for the command pattern may be adjusted (i.e., penalized) for each transition through one of the loops.

The double-post-self-loop 1460 and triple-post-self-loop 1465 represent related words. Multiple transitions through the single-post-self-loop 1455 may be used to represent a sequence of unrelated words. For example, if a person said "on Wednesday the 9th", the word "on" would constitute an extra word represented by the single-pre-self-loop 1430, the word "Wednesday" would be represented by the single-word-arc 1440, and the words "the" and "9th" would be represented by two transitions through the single-post-self-loop 1455.

The transition from the post-node 1420 of one field to the deletion node 1405A of the next field is represented by an arc 1470. The arc 1470 represents zero words and is used to represent the change in context from one field to the next.

In the example provided above (i.e., "Please schedule a meeting with Jim at half past 9 a.m. on Sep. 8, 1998, to discuss the patent disclosure."), the field <appointment-noun> generates "a" in the single-pre-self-loop 1430 and "meeting" on the single-word-arc 1440. The field <contact> generates "with" in the single pre-self-loop 1430 and "Jim" on the single-word-arc 1440. The field <time> generates "at" on the single-pre-self-loop 1430, "half past" on the double-pre-self-loop 1435, "9" on the single-word-arc 1440, and "a.m." on the single-post-self-loop 1455. The field <date> generates "on" and then "July" on the single-pre-self-loop 1430, "22" on the single-word-arc 1440, and "1998" on the single-post-self-loop 1455. Finally, the field <body> generates "to" on the single-word-arc 1440 and everything else on the single-post-self-loop 1455.

In some implementations, combined dates (e.g., "July 22") are stored. In interpretation of the example provided above by such an implementation, the field <date> would generate "on" on the single-pre-self-loop 1430, "July 22" on the single-word-arc 1440, and "1998" on the single-post-self-loop 1455. Use of combined dates increases the memory requirements associated with the <date> field, but may provide more accurate results.

A score is generated for each command pattern using a dynamic programming technique that finds the best-scoring mapping of the fields of the command pattern to the text of an utterance. Scores are assigned using log probabilities that reflect the likelihood that certain words will correspond to components of certain fields. In one implementation, these probabilities are stored for each of the model elements described above: single-word-arc, double-word-arc, triple-word-arc, single-pre-self-loop, double-pre-self-loop, single-post-self-loop, double-post-self-loop, triple-post-self-loop, and no-word-arc. Probabilities for double-word-arcs include the following:

"<contact> Tim Peters" 1
"<Preamble> open schedule" 6
"<audioNoun> voice file" 1
"<appointmentVerb> set up" 1
"<duration> lasting until" 0

Thus, "<contact> Tim Peters" 1 indicates that the score for a command pattern should be increased by one (where a low score is desirable) when "Tim Peters" is identified as corresponding to the <contact> field. Note that the names to be associated with the <contact> field are obtained from contact management or other back-end software.

Wildcards may be used to represent any word. For example, probabilities associated with the single-post-self-loop may use wildcards:

"<body> **" 5
"<contact> and" 1
"<contact> Roger" 1
"<contact> Paul" 1

In general, an exact match with a word or words corresponding to a field is required to transition through the single-word-arc, double-word-arc, or triple-word-arc. Matches with unknown words are permitted in the pre and post self-loops, but generally are given a high penalty (e.g., 100). In some instances, zero-valued scores may be used to reflect highly reliable clues.

Additional probabilities may be stored for "insertions", which correspond to words positioned between the post-node 1420 of one field and the deletion node 1405 of the next field, and which are not associated with any field. Insertions generally correspond to function words that may be inserted anywhere in an action. Many fields, such as <body>, <title>, and <filename> can generate a better score for any word than can be generated by an inter-field insertion.

Given the text of an utterance, the parser 385 identifies the best scoring command pattern. For example, for the utterance "Create a to-do item for half an hour period provide grammar data for program.", the parser might identify the best-scoring command pattern as <preamble> <taskVerb> <taskNoun> <duration> <body>, and assign a score of 40 to the pattern. The traceback for this command pattern is as follows:

| | |
|---|---|
| <preamble> (no-word-arc) | 2 |
| <taskverb> Create | 2 |
| PRE<taskNoun> a | 1 |
| PRE<taskNoun> to-do | 1 |
| <tasknoun> item | 4 |
| PRE<duration> for | 1 |
| PRE<duration> half | 2 |
| PRE<duration> an | 2 |
| <duration> hour | 0 |
| <body> . (period) | 0 |
| POST<body> provide | 5 |
| POST<body> grammar | 5 |
| POST<body> data | 5 |
| POST<body> for | 5 |
| POST<body> program | 5. |

The total score (40) for the command pattern equals the sum of the scores for the field elements.

In summary, the parser 385 identifies the command disposition that best corresponds to an utterance by comparing the text of the utterance to a set of command patterns. The parser 385 uses dynamic programming techniques to identify the best mapping between the text of the utterance and the fields of the command pattern. The best mapping for a command pattern corresponds to the mapping that generates the best score (e.g., the lowest negative logarithmic score). The best command disposition corresponds to the command pattern having the lowest score for its best mapping.

The parser 385 uses the set of command patterns to reflect the different ways that a user may describe a desired command disposition. Command patterns used by the parser are discussed below.

In general, the command patterns may be categorized according to different styles and disposition types. For example, a first style for appointment dispositions corresponds to appointment dispositions for which the contact is central, such as "Meet Roger . . . 11" or "Get together with Jim and Janet." The contact is followed by the title ("regarding" field) and the temporal field (date-time-duration) in either order. These may be followed by the priority of the appointment and a send email flag in either order. The utterance may conclude with free text used to provide details about the appointment. Since this way of scheduling an appointment is more of a reminder to the user than a command to the computer, the utterance may include a preamblie like "I should" or "I need to".

A command pattern of the first style may include explicit specification of the duration, and may require other fields to be arranged in order by time, date, and title:

APPT <taskpreamble> <contactApptVerb> <contact> <duration> <time> <duration> <date> <duration> <title> <priority> <emailFlag> <priority> <body>, where <taskpreamble> corresponds to preamble words associated with tasks, <contactApptVerb> corresponds to verbs associated with making an appointment with a contact, <contact> corresponds to one or more contact names from the back-end software, <duration> corresponds to the duration of the appointment, <time> corresponds to the time of the appointment, <date> corresponds to the date of the appointment, <title> corresponds to the title of the appointment, <priority> corresponds to the priority of the appointment, <emailFlag> indicates whether an email should be sent regarding the appointment, and <body> corresponds to free text describing the appointment. Other variations of the first style of appointment command patterns may require explicit specification of the duration, with other fields being arranged in order by date, time, and title:

APPT <taskpreamble> <contactApptVerb> <contact> <duration> <date> <duration> <time> <duration> <title> <priority> <emailFlag> <priority> <body>, by title, time, and date:

APPT <taskpreamble> <contactApptVerb> <contact> <title> <duration> <time> <duration> <date> <duration> <priority> <emailFlag> <priority> <body>, or by title, date, and time:

APPT <taskpreamble> <contactApptVerb> <contact> <title> <duration> <date> <duration> <time> <duration> <priority> <emailFlag> <priority> <body>.

A further variation may use the start and end times to specify the duration of the appointment, with other fields being arranged in order by start time, date, end time, and title:

APPT <taskpreamble> <contactApptVerb> <contact> <time> <date> <termination> <time> <title> <priority> <emailFlag> <priority> <body>, where <termination> is indicative that the following time is an end time. For example, in the phrase "from 1 until 3", the word "until" would correspond to the <termination> field. Other variations may require the fields to be arranged in order of date, start and end times, and title:

APPT <taskpreamble> <contactApptVerb> <contact> <date> <time> <termination> <time> <title> <priority> <emailFlag> <priority> <body>, by start time, end time, date, and title:

APPT <taskpreamble> <contactApptVerb> <contact> <time> <termination> <time> <date> <title> <priority> <emailFlag> <priority> <body>, by title, start time, date, and end time:

APPT <taskpreamble> <contactApptVerb> <contact> <title> <time> <date> <termination> <time> <priority> <emailFlag> <priority> <body>, by title, date, start time, and end time:

APPT <taskpreamble> <contactApptVerb> <contact> <title> <date> <time> <termination> <time> <duration> <priority> <emailFlag> <priority> <body>, or by title, start and end times, and date:

APPT <taskpreamble> <contactApptVerb> <contact> <title> <time> <termination> <time> <date> <duration> <priority> <emailFlag> <priority> <body>.

Additional command patterns may be used to represent other variations, such as when the command ends with a date (e.g., "from 9 am Tuesday until 3 pm Thursday").

A second style of appointments corresponds to those in which the activity is central, such as "Schedule a meeting" or "Set up an appointment". In this style, the duration and priority (in either order), followed by the title, may precede the appointment noun. The temporal information generally is followed by the contacts and the title, in any order. A title may properly appear both before and after the appointment noun, such as in "schedule a marketing meeting to plan the advertising campaign", where the appointment noun is meeting. The send email flag and priority, if not specified earlier, generally come at the end of the command. Since this way of describing a meeting is usually a command to create the meeting, a standard preamble like "please" or "would you" is appropriate.

This style of command patterns may include a variant in which the duration is specified explicitly, with other fields being arranged in order by time, date, and contact:

APPT <preamble> <appointmentVerb> <priority> <duration> <priority> <title> <appointmentNoun> <title> <duration> <time> <duration> <date> <duration> <title> <contact> <title> <emailFlag> <priority> <body>, where <preamble> corresponds to general preamble words, <appointmentVerb> corresponds to verbs associated with making a general appointment, and <appointmentNoun> corresponds to nouns (e.g., meeting) associated with appointment types. Other variations may require explicit specification of the duration, with other fields being arranged in order by date, time, and contact:

APPT <preamble> <appointmentVerb> <priority> <duration> <priority> <title> <appointmentNoun> <title> <duration> <date> <duration> <time> <duration> <title> <contact> <title> <emailFlag> <priority> <body>, by contact, time, and date:

APPT <preamble> <appointmentVerb> <priority> <duration> <priority> <title> <appointmentNoun> <title> <contact> <duration> <time> <duration> <date> <duration> <title> <emailFlag> <priority> <body>, or by contact, date, and time:

APPT <preamble> <appointmentVerb> <priority> <duration> <priority> <title> <appointmentNoun> <title> <contact> <duration> <date> <duration> <time> <duration> <title> <emailFlag> <priority> <body>.

Further variants may specify the start and end times, and may require other fields to be in order by start time, date, end time, and contact:

APPT <preamble> <appointmentVerb> <priority> <duration> <priority> <title> <appointmentNoun> <title> <time> <date> <termination> <time> <title> <contact> <emailFlag> <priority> <body>, by date, start time, end time, and contact:

APPT <preamble> <appointmentVerb> <priority> <duration> <priority> <title> <appointmentNoun> <title> <date> <time> <termination> <time> <title> <contact> <emailFlag> <priority> <body>, by start time, end time, date, and contact:

APPT <preamble> <appointmentVerb> <priority> <duration> <priority> <title> <appointmentNoun> <title> <time> <termination> <time> <date> <title> <contact> <emailFlag> <priority> <body>, by contact, date, start time, and end time:

APPT <preamble> <appointmentVerb> <priority> <duration> <priority> <title> <appointmentNoun> <title> <contact> <title> <date> <time> <termination> <time> <duration> <title> <emailFlag> <priority> <body>, by contact, start time, date, and end time:

APPT <preamble> <appointmentVerb> <priority> <duration> <priority> <title> <appointmentNoun> <title> <contact> <title> <time> <date> <termination> <time> <title> <emailFlag> <priority> <body>, or by contact, start time, end time, and date:

APPT <preamble> <appointmentVerb> <priority> <duration> <priority> <title> <appointmentNoun> <title> <contact> <title> <time> <termination> <time> <date> <title> <emailFlag> <priority> <body>.

A third style of appointments corresponds to those in which the time period (i.e., the duration) is central, such as "Set aside 2 hours to discuss X with Y." With this style, the title, date, time, and contacts may follow the duration in any order. An email flag and priority may optionally appear at the end of the command. Since the duration is specified, a redundant end time is not permitted. Since this style of appointment is a statement about the future, it uses a task preamble.

Command patterns may require fields to be in order by time, date, and contact:

APPT <taskpreamble> <reserveVerb> <duration> <title> <time> <date> <title> <contact> <title> <priority> <emailFlag> <priority> <body>, where <reserveVerb> corresponds to verbs associated with reserving a block of time, by date, time, and contact:

APPT <taskpreamble> <reserveVerb> <duration> <title> <date> <time> <title><contact> <title> <priority> <emailFlag> <priority> <body>, by contact, time, and date:

APPT <taskpreamble> <reserveVerb> <duration> <title> <contact> <title> <time> <date> <title> <priority> <emailFlag> <priority> <body>, or by contact, date, and time:

APPT <taskpreamble> <reserveVerb> <duration> <title> <contact> <title> <date> <time> <title> <priority> <emailFlag> <priority> <body>.

As with appointments, the first style for task dispositions corresponds to tasks in which the contact is central, such as "Ask Roger . . . 11" or "Remind Jim and Janet . . . ". The contact is followed by the title ("regarding") field and the temporal field (date-time-duration) in either order. These may be followed by the priority and an email flag, in either order, and a category, such as "category is projects" or "classify under errands", which contains a user-specified category name. The command may be followed by free text that describes the details of the task.

The command patterns for this first style of tasks are almost identical to the command patterns for the first style of appointments, with the exception of the verb used. Thus, the command patterns may include a variant in which the duration is specified explicitly, and other fields are in order by time, date, and title:

TASK <taskpreamble> <contactTaskVerb> <contact> <duration> <time> <duration> <date> <duration> <title> <priority> <emailFlag> <priority> <category> <body>, where <contactTaskVerb> corresponds to verbs associated with making a task having an associated contact. Other variations may require explicit specification of the duration, with other fields being arranged in order by date, time, and title:

TASK <taskpreamble> <contactTaskVerb> <contact> <duration> <date> <duration> <time> <duration> <title> <priority> <emailFlag> <priority> <category> <body>, by title, time, and date:

TASK <taskpreamble> <contactTaskVerb> <contact> <title> <duration> <time> <duration> <date> <duration> <priority> <emailFlag> <priority> <category> <body>, or by title, date, and time:

TASK <taskpreamble> <contactTaskVerb> <contact> <title> <duration> <date> <duration> <time> <duration> <priority> <emailFlag> <priority> <category> <body>.

Other variants may specify the start and end times, and may require other fields to be in order by start time, date, end time, and title:

TASK <taskpreamble> <contactTaskVerb> <contact> <time> <date> <termination> <time> <title> <priority> <emailFlag> <priority> <category> <body>, by date, start time, end time, and title:

TASK <taskpreamble> <contactTaskVerb> <contact> <date> <time> <termination> <time> <title> <priority> <emailFlag> <priority> <category> <body>, by start time, end time, date, and title:

TASK <taskpreamble> <contactTaskVerb> <contact> <time> <termination> <time> <date> <title> <priority> <emailFlag> <priority> <category> <body>, by title, start time, date, and end time:

TASK <taskpreamble> <contactTaskVerb> <contact> <title> <time> <date> <termination> <time> <priority> <emailFlag> <priority> <category> <body>, by title, date, start time, and end time:

TASK <taskpreamble> <contactTaskVerb> <contact> <title> <date> <time> <termination> <time> <priority> <emailFlag> <priority> <category> <body>, or by title, start time, end time, and date:

TASK <taskpreamble> <contactTaskVerb> <contact> <title> <time> <termination> <time> <date> <priority> <emailFlag> <priority> <category> <body>.

Other variants may include tasks having a termination date, such as "from 9 am Tuesday to 3 pm Thursday".

A second style of tasks corresponds to tasks in which the activity is central, such as "Create a task" or "Set up an assignment". With this style, the duration and priority (in either order), followed by the title, may precede the task noun. The task noun may be followed by temporal information, contacts, and the title, in any order. The title may appear both before and after the task noun, such as is the case in "create a national security task to plan our antiterrorist strategy", where the task noun is "task". The email flag (and priority, if not specified earlier) follow these items. Since this way of describing a task is usually a command to put the task on the calendar, a standard preamble like "please" or "would you" is appropriate.

A variant of this style explicitly specifies the duration of the task, and requires other fields to be in order by time, date, and contact:

TASK <preamble> <taskVerb> <priority> <duration> <priority> <title> <taskNoun> <title> <duration> <time> <duration> <date> <duration> <title> <contact> <priority> <emailFlag> <priority> <category> <body>, where <taskVerb> corresponds to verbs associated with making a general task, and <taskNoun> corresponds to nouns (e.g, to-do) associated with task types. Other variants require the fields to be in order by date, time, and contact:

TASK <preamble> <taskVerb> <priority> <duration> <priority> <title> <taskNoun> <title> <duration> <date> <duration> <time> <duration> <title> <contact> <priority> <emailFlag> <priority> <category> <body>, by contact, time, and date:

TASK <preamble> <taskVerb> <priority> <duration> <priority> <title> <taskNoun> <title> <contact> <duration> <time> <duration> <date> <duration> <title> <priority> <emailFlag> <priority> <category> <body>, or by contact, date, and time:

TASK <preamble> <taskVerb> <priority> <duration> <priority> <title> <taskNoun> <title> <contact> <duration> <date> <duration> <time> <duration> <title> <priority> <emailFlag> <priority> <category> <body>.

Further variants specify the start and end times, and require other fields to be in order by start time, date, end time, and contact:

TASK <preamble> <taskVerb> <priority> <duration> <priority> <title> <taskNoun> <title> <time> <date> <termination> <time> <title> <contact> <priority> <emailFlag> <priority> <category> <body>, by date, start time, end time, and contact:

TASK <preamble> <taskVerb> <priority> <duration> <priority> <title> <taskNoun> <title> <date> <time> <termination> <time> <title> <contact> <priority> <emailFlag> <priority> <category> <body>, by start time, end time, date, and contact:

TASK <preamble> <taskVerb> <priority> <duration> <priority> <title> <taskNoun> <title> <time> <termination> <time> <date> <title> <contact> <priority> <emailFlag> <priority> <category> <body>, by contact, date, start time, and end time:

TASK <preamble> <taskVerb> <priority> <duration> <priority> <title> <taskNoun> <title> <contact> <date> <time> <termination> <time> <title> <priority> <emailFlag> <priority> <category> <body>, by contact, start time, date, and end time:

TASK <preamble> <taskVerb> <priority> <duration> <priority> <title> <taskNoun> <title> <contact> <time> <date> <termination> <time> <title> <priority> <emailFlag> <priority> <category> <body> or by contact, start time, end time, and date:

TASK <preamble> <taskVerb> <priority> <duration> <priority> <title> <taskNoun> <title> <contact> <time> <termination> <time> <date> <title> <Priority> <emailFlag> <priority> <category> <body>.

A third style of tasks corresponds to tasks in which the verb is central, such as "buy a birthday card" or "debug the parsing code". These verbs can be entered and associated with categories through a keyword dialog. In this style, the title ("regarding" field) immediately follows the verb, and the verb is displayed as part of the title. The title is followed by the contact (if any) and the date-time information, in either order. These may be followed by an optional email flag and priority. The priority also may come right at the beginning (e.g., important buy a birthday card for my wife).

This style of tasks may include a variant in which the duration is specified explicitly, and other fields are in order by time, date, and contact:

TASK <priority> <taskpreamble> <keyTaskVerb> <title> <duration> <time> <duration> <date> <duration> <contact> <priority> <emailFlag> <priority> <body> where <keyTaskVerb> corresponds to verbs associated with making a verb-central task. Other variants require the fields to be in order by date, time, and contact:

TASK <priority> <taskpreamble> <keyTaskVerb> <title> <duration> <date> <duration> <time> <duration> <contact> <priority> <emailFlag> <priority> <body>, by contact, time, and date:

TASK <priority> <taskpreamble> <keytaskVerb> <title> <contact> <duration> <time> <duration> <date> <duration> <priority> <emailFlag> <priority> <body>, or by contact, date, and time:

TASK <priority> <taskpreamble> <keyTaskVerb> <title> <contact> <duration> <date> <duration> <time> <duration> <priority> <emailFlag> <priority>.

Further variants may require specification of the start and end times, and may require other fields to be in order by start time, date, end time, and contact:

TASK <priority> <taskpreamble> <keyTaskVerb> <title> <time> <date> <termination> <time> <contact> <emailFlag> <priority> <body>, by date, start time, end time, and contact:

TASK <priority> <taskpreamble> <keyTaskVerb> <title> <date> <time> <termination> <time> <contact> <emailFlag> <priority> <body>, by start time, end time, date, and contact:

TASK <priority> <taskpreamble> <keyTaskVerb> <title> <time> <termination> <time> <date> <contact> <emailFlag> <priority> <body>, by contact, date, start time, and end time:

TASK <priority> <taskpreamble> <keyTaskVerb> <title> <contact> <date> <time> <termination> <time> <duration> <emailFlag> <priority> <body>, by contact, start time, date, and end time:

TASK <priority> <taskpreamble> <keyTaskVerb> <title> <contact> <time> <date> <termination> <time> <emailFlag> <priority> <body>, or by contact, start time, end time, and date:

TASK <priority> <taskpreamble> <keyTaskVerb> <title> <contact> <time> <termination> <time> <date> <emailFlag> <priority> <body>.

The first style for note dispositions describes an action that a contact has taken, such as "Roger called . . . " or "Joel found the last bug . . . ". The verbs associated with these notes may be entered through a keyword dialog. The preamble, if present, is something like "take a note" or "new journal entry". The verb is followed by the date-time information and the title, in either order. Examples of command patterns for the first style of notes include:

NOTE <notepreamble> <contact> <contactDidVerb> <time> <date> <time> <title> <body>, and NOTE <notepreamble> <contact> <contactDidVerb> <title> <time> <date> <time> <body>, where <notepreamble> corresponds to the set of preambles specific to notes and <contactDidVerb> corresponds to the set of verbs entered by the user and associated with contact actions. A special case command pattern may be used with a "Meeting Held" note:

NOTE <notepreamble> <contact> <contactDidVerb> <appointmentNoun> <time> <date> <time> <body>.

Similarly, a special case command pattern may be used with a "To-Do Done" note:

NOTE <notepreamble> <contact> <contactDidVerb> <taskNoun> <time> <date> <time> <body>.

A second style of note dispositions describes an action that the user has taken. The verb associated with the note may be one specified by the user in a keyword dialog, and the preamble should suggest a completed action (e.g., "finally," "I just," "at last I"). The command pattern for this type of note when the action relates to a contact may be as follows:

NOTE <notepreamble> <donepreamble> <contactNoteVerb> <contact> <title> <time> <date> <time> <body>, NOTE <notepreamble> <donepreamble> <contactNoteVerb> <title> <contact> <time> <date> <time> <body>, NOTE <notepreamble> <donepreamble> <contactNoteVerb> <time> <date> <time> <contact> <title> <body>, or NOTE <notepreamble> <donepreamble> <contactNoteVerb> <time> <date> <time> <title> <contact> <body>, where <donepreamble> indicates that a task has been done and <contactNoteVerb> corresponds to verbs associated with contact-related notes. The differences between the command patterns result from differing orders of the <contact>, <title>, <date>, and <time> fields.

The command pattern when the note does not relate to a contact may be as follows:

NOTE <notepreamble> <donepreamble> <noteVerb> <title> <time> <date> <time> <body>, or NOTE <notepreamble> <donepreamble> <noteVerb> <time> <date> <time> <title> <body>, where <noteVerb> corresponds to verbs associated with non-contact-related notes, and the difference between the command patterns relates to the order of the <title> and <date>/<time> fields.

A third style of notes describes something that did not happen. In this case there are auxiliary words like "tried to" or "did not". Command patterns for a first case of this style, in which, for example, the action is "Meeting Not Held" and the reason is "my fault" would include:

NOTE <notepreamble> <noteAuxiliary> <appointment-Verb> <title> <appointmentNoun> <title> <contact> <time> <date> <time> <title> <body>, NOTE <notepreamble> <noteAuxiliary> <contactAppt-Verb> <contact> <title> <time> <date> <time> <title> <body>, or NOTE <notepreamble> <noteAuxiliary> <appointment-Verb> <title> <appointmentNoun> <title> <time> <date> <time> <title> <contact> <title> <body>, where <noteAuxiliary> corresponds to the auxiliary words, and the command patterns differ based on the type of verb and the order of the <contact>, <date> and <time> fields.

Command patterns for the case in which the failure is the contact's fault include the following:

NOTE <notepreamble> <contact> <noteauxiliary> <appointmentVerb> <title> <appointmentNoun> <title> <time> <date> <time> <title> <body>, or NOTE <notepreamble> <contact> <noteauxiliary> <appointmentVerb> <appointmentNoun> <time> <date> <time> <body>, where the difference between the command patterns corresponds to the presence or absence of a title.

Command patterns for the situation in which the action is "To-Do Not Done" or "Call Attempted" and the reason is "my fault" includes:

NOTE <notepreamble> <noteauxiliary> <keyTaskVerb> <time> <date> <time> <body>, or NOTE <notepreamble> <noteauxiliary> <contactTask-Verb> <contact> <time> <date> <time> <body>, where the command patterns differ based on the type of verb and associated fields.

Command patterns for the case in which the failure is the contact's fault would include the following:

NOTE <notepreamble> <contact> <noteauxiliary> <keyTaskVerb> <title> <time> <date> <time> <title> <body>, or NOTE <notepreamble> <contact> <noteauxiliary> <contactDidVerb> <title> <time> <date> <time> <title> <body>, where <contactDidVerb> corresponds to verbs indicative of actions by a contact.

A fourth style of note simply attaches files to an existing contact:

NOTE <notepreamble> <attach> <existingFileName> <contact> <body>, where <existingFileName> identifies a file existing in the directory associated with the program.

A fifth style of note handles the case in which the user explicitly references a contact:

NOTE <notepreamble> <time> <date> <time> <contact>

A sixth style of note handles the case in which the contact associated with the note is extracted from the body of the note:

NOTE <notepreamble> <time> <date> <time> <body> <contact> <body>.

A seventh style of note handles the case in which the user makes no reference to a contact:

NOTE <notepreamble> <time> <date> <time> <body>.

For email dispositions, priority is optional, but may be at beginning of the item or just before the body. Contacts to receive copies must immediately follow contacts who are recipients. Attached files, if any, must be listed before the body. An explicit title may precede or follow the contact list. Examples of email command patterns include:

EMAIL <preamble> <priority> <emailNoun> <title> <contact> <copyTo> <contact> <title> <priority> <attachment> <priority> <body>, EMAIL <preamble> <emailVerb> <priority> <emailNoun> <title> <contact> <copyTo> <contact> <title> <priority> <attachment> <priority> <body>, and EMAIL <preamble> <emailVerb> <existingFileName> <contact> <copyTo> <contact> <title> <priority> <title> <body>, where <emailVerb> corresponds to verbs (e.g., "send") associated with emails, <emailNoun> corresponds to nouns (e.g., "email", "message") associated with emails, and <copyTo> identifies additional contacts who are to receive a message.

Command patterns for use in creating text files include:

FILE <preamble> <fileVerb> <fileNoun> <fileName> <fileExt> <body>, and

FILE <preamble> <fileNoun> <fileName> <fileExt> <body>, where <fileVerb> corresponds to verbs (e.g., "create") associated with making a file, <fileNoun> corresponds to nouns (e.g., "file") associated with making a file, <fileName> designates a valid file name for a new or existing file, and <fileExt> designates a valid file name extension (e.g., ".TXT").

Command patterns for use in creating audio files include:

AUDIO <preamble> <audioVerb> <audioNoun> <fileName> <audioExt> <body>, and

AUDIO <preamble> <audioNoun> <fileName> <audioExt> <body>, where <audioVerb> corresponds to verbs (e.g., "record") associated with making an audio file, <audioNoun> corresponds to nouns (e.g., "an audio file") associated with making an audio file, and <audioExt> designates a valid audio file name extension (e.g., ".WAV").

A simple command pattern, in which only the contact name is entered, may be used to enter a new contact:

CONTACT <preamble> <contactVerb> <contactNoun> <contactName>, where <contactVerb> corresponds to verbs associated with adding a contact, <contactNoun> corresponds to nouns (e.g., "contact") associated with adding a contact, and <contactName> indicates a valid new contact name.

Referring to FIG. 15A, the parser processes an utterance to generate an action item disposition according to a procedure 1500. Initially, the parser retrieves the utterance (step 1502). The utterance constitutes an array of words, each of which may be designated by an index ("r"). Thus, the first word in the utterance is designated as utterance[0] and the second word is designated as utterance[1].

Next, the parser initializes variables (step 1504). The parser initializes to 0 a pointer "p" that identifies the current command pattern so as to point to the first command pattern in the set of all available command patterns. The parser then initializes to 0 a variable used to identify the best scoring command pattern ("best_scoring_pattern") and initializes to INFINITY a variable used to identify the associated score ("best_score"). Since the parser uses negative logarithmic scores, the score of INFINITY constitutes a bad score.

Next, the parser parses the utterance and the current command pattern ("patternset[p]") to determine the score ("pattern_score[p]") associated with the best mapping between the utterance and the command pattern (step 1506). The parser uses a dynamic programming procedure to generate the score. In parsing the utterance, the parser indicates that traceback is not needed. As discussed below, provisions for traceback require considerable additional processing. As such, traceback is avoided until all command patterns have been processed and the best-scoring command pattern has been identified.

If the score for the command pattern is better than the current best score, the parser saves the score as the new best score and identifies the command pattern as the best-scoring pattern (step 1508). If the current command pattern is not the last command pattern in the set (step 1510), the parser parses the next command pattern (step 1506). This continues until all command patterns have been parsed.

The parser then reparses the best scoring command pattern to obtain a traceback of the mapping between the command pattern and the utterance (step 1512). The parser accomplishes this by indicating that traceback is needed when performing the reparsing. In another implementation, the parser eliminates this step by indicating that traceback is needed in step 1506.

After reparsing the best scoring command pattern, the parser analyzes the traceback for the command pattern (step 1514). During this analysis, the parser identifies the words of the utterance associated with each field of the command pattern.

The parser then parses the words associated with each field of the command pattern to determine the contents of each field (step 1516). While the first parsing pass determined the syntactical relationship of the words to the fields of the command pattern, this pass extracts semantical information about field contents. For example, if the words "next" and "Friday" were found to correspond to the <date> field during the traceback analysis, the parser would return an indication that the <date> should correspond to the sixth day of the week following the week that includes the date on which the action item was dictated. The parser parses the words and fields using the same parsing procedure that it uses to parse the utterance and command patterns.

Finally, the parser generates the action item by populating the fields of the action item using the parsed fields of the command pattern (step 1518). Thus, in the example noted above, the parser determines the specific date for the action item by advancing the day of the week on which the action item was dictated to the following Friday. For example, if the action item were dictated on a Monday, the parser would designate the date of the action item as the dictation date plus five days (i.e., to advance to the end of the current week in view of "next", since Monday is the second day of the week) plus six days (since "Friday" is the sixth day of the week). By contrast, if the words "this" and "Friday" were found to correspond to the <date> field, and the action item were dictated on Monday, the parser would designate the date of the action item as the dictation date plus four days (i.e., the difference between Monday, which is the second day. of the week, and Friday, which is the sixth day of the week).

FIGS. 16A–16G illustrate one implementation of a dynamic programming procedure 1600 used by the parser to parse an utterance relative to a command pattern. The procedure determines the best mapping between the utterance and the command pattern, and returns a score that represents the merit of this mapping. In the procedure 1600, the fields of the command pattern are indexed by the variable "c", with the first field designated as field "0" (i.e., c equals 0). The words of the utterance are indexed by the variable "r", with the first word designated as word "0" (i.e., r equals 0). The three states associated with each field "c" are indexed by the variable "i". State 1 (i.e., i equals 1), which corresponds to the deletion node 1405, indicates that no word has yet received a score associated with the field. State 2 (i.e., i equals 2), which corresponds to the pre-node 1415, indicates that one or more words may have been pre-inserted, but none have been substituted. State 3 (i.e., i equals 3), which corresponds to the post-node 1420, indicates that a word has been substituted and zero or more post-insertions have occurred.

The best score before any insertions or substitutions involving field c, using words 0 through r−1, is represented by err1[r][c]. The score for the starting state is represented by err1[0][0]. The final score is err1[m_nr][m_nc], where m_nr represents the number of words in the utterance and m_nc represents the number of fields in the command pattern.

The best score through pre-insertions for field c using words through r−1 is err2[r][c]. The best score through all insertions and substitutions involving field c using words through r−1 is err3[r][c].

A pre-insertion causes the score for err2[r−n][c], where n equals 1 or 2, plus the penalty associated with the pre-insertion, to be transferred to err2[r][c].

A substitution causes the score for err2[r−n][c], where n equals 1, 2 or 3, plus the penalty associated with the substitution, to be transferred to err3[r][c].

A post-insertion causes the score for err3[r−n][c], where n equals 1, 2 or 3, plus the penalty associated with the post-insertion, to be transferred to err3[r][c].

A deletion (i.e., skipping a field) causes the score associated with err1[r][c], plus any penalty associated with the deletion, to be transferred to err1[r][c+1].

The score for err3[r][c] (post-insertion) is transferred to err1[r][c+1] (the deletion node for the next field) with no penalty applied. Similarly, the score for err1[r][c+1] (the deletion node) is transferred to err2[r][c+1] (the pre-insertion node) with no penalty applied.

As a first step in the procedure, the parser initializes variables and creates a priority queue (step 1602). The variables include m_nr, which corresponds to the number of words in the utterance; m_nc, which corresponds to the number of fields in the command pattern; r, which corresponds to the current word; c, which corresponds to the current field; and i, which corresponds to the current state.

The priority queue, pQueue, provides an efficient mechanism for finding the best mapping between the utterance and the command pattern. The priority queue stores all active nodes and enables the best scoring node to be removed from the queue. This ensures that the parser always proceeds with the best mapping at any given time.

To ease use of the priority queue, the parser defines a macro, NODE, which is used to place items on the priority queue (step 1604). The macro packs the relevant information for a node into a four-byte packet that may be efficiently stored in the queue. The macro accomplishes this by left-shifting the score for the node ("score") by 20 places, left-shifting the state of the node ("i") by 16 places, left shifting the word number for the node ("r") by 8 places, and adding the three shifted values to the field number ("c") for the node. By placing the score in the most significant bits of the packet, the macro ensures that the lowest-scoring node at any particular time will be the node having the lowest packet value.

The parser next initializes all scores to have bad values (step 1606). The parser does this by processing through an outer loop that varies the word number ("r") and an inner loop that varies the field number ("c"). Since the parser employs negative logarithmic scores, the parser assigns INFINITY as the scores for all combinations of word, field, and state (i.e., err1[0][0] to err3[m−nr][m−nc].

As described above, traceback is used to identify the field corresponding to each word of an utterance. This is accomplished by identifying the relationship between each word/field pair (e.g., deletion, pre-insertion, substitution, post-insertion) for the best-scoring mapping, which is achieved by assigning a "type" to each score. As noted above, maintaining the traceback information requires extra processing, and is only performed when traceback is needed. When traceback is needed, the type for each score is designated as being undefined ("TYP_UNDEFINED"). FIGS. 16A–16G show the type assignments as being optional steps. Another approach to providing optional type assignment would be to use a first procedure when traceback is needed and a second procedure when it is not, with the first procedure having mandatory type assignments and the second procedure making no reference to type. The second procedure could then be run for all command patterns to find the best-scoring command pattern, at which point the first procedure would be run on that command pattern to identify the specific word-to-field mapping.

After initializing all scores to be bad, the parser initializes the starting node to have a good score (step 1608). As shown, 0 is used as the good score. However, any non-infinite value may be employed, since all further scores will be relative to the initial score. When traceback is needed, the parser assigns a type of "TYP_START" to the starting node. The parser then places the starting node in the priority queue (step 1610).

Next, the parser begins a loop that continues until the priority queue is empty (step 1612). As a first step in the loop, the parser removes the best-scoring node from the queue and unpacks it (step 1614). In the first iteration through the loop, the best-scoring node will be the starting node. The parser unpacks the node by right-shifting the queue entry by 20 positions to generate the score ("nodeScr"); masking the queue entry and right-shifting it by 8 positions to generate the word number ("rb"); masking the queue entry to generate the field number ("cb"); and masking the queue entry and right-shifting it by 16 positions to generate the state index ("i").

The parser only processes a node if its score is the current best score for the word/field pair and its score is better than the current best final score, if a final score exists (step 1616). A score for a node is saved in association with the word/field pair whenever the node is placed in the priority queue. As such, the score for the node will always equal or exceed the current best score for the word/field pair. When the Score equals the current best score for the pair, then the node represents the best mapping up to the word/field pair and should be processed further. The score for the node exceeds the current best score when the node has been supplanted by another node that represents a better mapping. In this case, the node should not be processed further because a mapping including the node will never be able to generate a final score better than the final score generated using the current best score for the word/field pair. Similarly, if the score for the node is not better than the current best final score, then a mapping including the node will never be able to generate a final score better than the current best final score.

The parser also does not process the node if the node is an end node representing a final score (step 1618), in which case further processing is unnecessary.

To process a node, the parser initializes a score for the node and begins dynamic programming to update all nodes that can be reached from the node by deletion, insertion, or substitution (step 1620). The score ("scr") is initialized to a large value ("INFINITY") to account for situations in which scores for one state are passed to another state.

If the node is a state 3 node (i.e., i equals 3), the parser performs post-insertion processing on the node (step 1622). Initially, the parser sets the score ("scr") equal to the best score for the word/field pair ("err3[rb][cb]"), which equals the score for the node ("nodeScr"). The parser also transfers the type if traceback is needed.

The parser then determines the penalty for a single-word post-insertion involving the word/field pair (step 1624). If the sum of the penalty and the score for the node is better than the best score for the word/field pair including the next word ("rb+1") and the current field ("cb"), then the parser saves the score and inserts a node representing the new word/field pair into the priority queue (step 1626). The parser updates the type to be TYP_POSTINSERT if traceback is needed.

If enough words are available, the parser then determines the penalty for a double-word post-insertion (step 1628). If the penalty indicates that the pair of words to be post-inserted are valid double-post-insertion words, and if the sum of the penalty and the score for the node is better than the best score for the word/field pair including the pair of words ("rb+2") and the current field ("cb"), then the parser saves the score and inserts a node representing the new word/field pair into the priority queue (step 1630). The parser updates the type to be TYP_DOUBLEPOSTINSERT if traceback is needed.

Similarly, if enough words are available, the parser determines the penalty for a triple-word post-insertion (step 1632). If the penalty indicates that the three words to be post-inserted are valid triple-post-insertion words, and if the sum of the penalty and the score for the node is better than the best score for the word/field pair including the next three words ("rb+3") and the current field ("cb"), then the parser saves the score and inserts a node representing the new word/field pair into the priority queue (step 1634). The parser updates the type to be TYP_TRIPLEPOSTINSERT if traceback is needed.

As the final step in performing post-insertion processing, the parser increments the field number (step 1636). This, in effect, advances the score for the post-insertion node of the field ("err3[rb][cb]") to the deletion node of the next field ("err1[rb][cb+1]").

Next, if the node is a state 1 node or a state 3 node, the parser performs deletion processing on the node (step 1638). In performing the processing, the parser uses the smaller of the best score for the word/field pair ("err1[rb][cb]") or the current node score ("scr") (step 1640). The former will be smaller when the state equals 1, in which case the node score ("scr") will equal INFINITY (see step 1620). When the state equals 3, the node score ("scr") will equal the state 3 score for the previous field ("err3[rb][cb−1]"), which may or may not be less than the state 1 score for the current field ("err1[rb][cb]"). When the node score ("scr") is less than the state 1 score ("err1[rb][cb]"), the state 1 score ("err1[rb][cb]") is replaced with the node score ("scr").

After determining which score to use, the parser determines the penalty associated with skipping the current field ("cb") (step 1642). If the sum of the penalty and the score for the node is better than the best score for the word/field pair including the current word ("rb") and the next field ("cb+1"), then the parser saves the score and inserts a node representing the new word/field pair into the priority queue (step 1644). If traceback is needed, the parser sets the associated type to be TYP_DELETE.

Next, the parser performs pre-insertion/substitution processing on the node (step 1646). In performing the processing, the parser uses the smaller of the best score for the word/field pair ("err2[rb][cb]") or the current node score ("scr") (step 1648). The former will be smaller when the state equals 2, in which case the node score ("scr") will equal INFINITY (see step 1620). When the state equals 1 or 3, the node score ("scr") will equal the state 1 score for the word/field pair ("err1[rb][cb]"), which may or may not be less than the state 2 score for the pair ("err2[rb][eb]").

The parser then determines whether any words are available to perform substitutions or pre-insertions (i.e., whether the node represents a node other than the final node) (step 1650). The parser performs no further processing of the node if no words are available.

If a word is available, the parser determines the penalty associated with making a single word substitution (step 1652). If the sum of the penalty and the score for the node is better than the best score for the word/field pair including the next word ("rb+1") and the current field ("cb"), then the parser saves the score and inserts a node representing the new word/field pair into the priority queue (step 1654). If traceback is needed, the parser sets the associated type to be TYP_SUBST.

If a word is available, the parser also determines the penalty associated with making a single word pre-insertion (step 1654). If the sum of the penalty and the score for the node is better than the best score for the word/field pair including the next word ("rb+1") and the current field ("cb"), then the parser saves the score and inserts a node representing the new word/field pair into the priority queue (step 1656). If traceback is needed, the parser sets the associated type to be TYP_PREINSERT.

Next, the parser determines whether a pair of words is available to perform a double substitution or a double pre-insertion (step 1660). The parser performs no further processing of the node if a pair of words is not available.

If a pair of words is available, the parser determines the penalty associated with making a double word substitution (step 1662). If the penalty indicates that the pair of words to be substituted are valid double-substitution words, and if the sum of the penalty and the score for the node is better than the best score for the word/field pair including the next two words ("rb+2") and the current field ("cb"), then the parser saves the score and inserts a node representing the new word/field pair into the priority queue (step 1664). If traceback is needed, the parser sets the associated type to be TYP_DOUBLESUBST.

If a pair of words is available, the parser determines the penalty associated with making a double word pre-insertion (step 1666). If the penalty indicates that the pair of words to be pre-inserted are valid double-pre-insertion words, and if the sum of the penalty and the score for the node is better than the best score for the word/field pair including the next two words ("rb+2") and the current field ("cb"), then the parser saves the score and inserts a node representing the new word/field pair into the priority queue (step 1668). If traceback is needed, the parser sets the associated type to be TYP_DOUBLEPREINSERT.

Next, the parser determines whether three words are available to perform a triple substitution or a triple pre-insertion (step 1670). The parser performs no further processing of the node if three words are not available.

If three words are available, the parser determines the penalty associated with making a triple word substitution (step 1672). If the penalty indicates that the three words to be substituted are valid triple-substitution words, and if the sum of the penalty and the score for the node is better than the best score for the word/field pair including the next three words ("rb+3") and the current field ("cb"), then the parser saves the score and inserts a node representing the new word/field pair into the priority queue (step 1674). If traceback is needed, the parser sets the associated type to be TYP_TRIPLESUBST.

If three words are available, the parser determines the penalty associated with making a triple word pre-insertion (step 1676). If the penalty indicates that the three words to be pre-inserted are valid triple-pre-insertion words, and if the sum of the penalty and the score for the node is better than the best score for the word/field pair including the next three words ("rb+3") and the current field ("cb"), then the parser saves the score and inserts a node representing the new word/field pair into the priority queue (step 1678). If traceback is needed, the parser sets the associated type to be TYP_TRIPLEPREINSERT.

Finally, the parser determines whether any entries remain in the queue (step 1680) and repeats the loop including steps 1620–1680 until the queue is empty (i.e., all nodes are processed or discarded). When the queue is empty, the parser returns err1[m_nr][m_nc] as the final score (step 1682).

Referring again to FIG. 15A, the parser uses the type values to perform the traceback analysis (step 1514). The parser determines the type associated with err1[m_nr][m_nc]. Using this type, the parser traces back to the word/field pair that generated err1[m_nr][m_nc]. The parser then uses the type for that pair to trace back to the word/field pair that generated it. For example, if the value of the type for a field (e.g., type3[r][c]) were TYP_DOUBLESUBST, the parser would trace back two words and retrieve the new associated type (type2[r−2][c]). The parser repeats this procedure until it reaches the starting field ("err1[0][0]").

As noted above, the parser uses an instance of the procedure 1600 to parse each field of the command pattern (step 1516). To this end, the parser uses command patterns associated with each field. For example, command patterns for <date> fields include the following:

MDY <month> <dayOfMonth> <year>,
DMY <dayOfMonth> <month> <year>,
DDMY <dayOfWeek> <dayofmonth> <month> <year>, DDM <dayOfWeek> <dayofmonth> <month>,
DMD <dayOfWeek> <month> <dayofmonth>,
NEXT <next> <dayOfWeek>,
THIS <this> <dayOfWeek>,
DAYONLY <dayOfWeek>,
OFFSET <dateoffset>, and
MONTH <month>.

Thus, the command pattern for each field includes one or more elements to which the words associated with the fields are mapped.

As discussed above, the parser determines the penalty associated with each mapping of a word to a field element using probabilities. Only one probability is associated with each of the <next> and <this> field elements:

SUB1 "<next> next" 0, and
SUB1 "<this> this" 1, which means that "next" may be substituted (as indicated by "SUB1") for the <next> field element with a penalty of 0 and "this" may be substituted for the <this> field element with a penalty of 1. The difference between the penalties reflects the relatively greater likelihood that "this" may constitute misrecognition of another word.

Probabilities associated with the <dateoffset> field element include:

SUB1 "<dateoffset> today" 0, 0,
SUB1 "<dateoffset> tomorrow" 0, 1,
SUB1 "<dateoffset> yesterday" 0, -1,
SUB2 "<dateoffset> this week" 0, 1,
SUB3 "<dateoffset> day after tomorrow" 0, 2, and
SUB3 "<dateoffset> day before yesterday" 0, -2.

As shown each valid one, two, or three word substitution results in a penalty of 0. The numbers following the probability values provide semantic information used by the parser in generating the action items (step 1518). In the case of data offsets, this semantic information constitutes the offset associated with the particular word. Thus, for example, "today" provides an offset of 0, "tomorrow" provides an offset of 1 and "day before yesterday" provides an offset of -2.

Probabilities associated with the <dayOfWeek> field element include:

SUB1 "<dayOfWeek> Sunday" 0, 1,
SUB1 "<dayOfWeek> Monday" 0, 2,
SUB1 "<dayOfWeek> Tuesday" 0, 3,
SUB1 "<dayOfWeek> Wednesday" 0, 4,
SUB1 "<dayOfWeek> Thursday" 0, 5,
SUB1 "<dayOfWeek> Friday" 0, 6,
SUB1 "<dayOfWeek> Saturday" 0, 7,
SUB1 "<dayOfWeek> Sun" 0, 1,
SUB1 "<dayOfWeek> Mon" 0, 2,
SUB1 "<dayOfWeek> Tues" 0, 3,
SUB1 "<dayOfWeek> Tue" 0, 3,
SUB1 "<dayOfWeek> Wed" 0, 4,
SUB1 "<dayOfWeek> Thurs" 0, 5,
SUB1 "<dayOfWeek> Thu" 0, 5,
SUB1 "<dayOfWeek> Fri" 0, 6, and
SUB1 "<dayOfWeek> Sat" 0, 7.

The semantic information associated with the <dayOfWeek> element constitutes the position of the day in the week, with Sunday being day 1 and Saturday being day 7. Another substitution probability associated with the <dayOfWeek> includes semantic information that causes "next week" to result in "next Monday" while "this week" results in "tomorrow":

SUB1 "<dayOfWeek> week" 1, 2.

Post-insertion probabilities also are associated with the <dayOfWeek> field element:

POS1 "<dayOfWeek> morning" 1,
POS1 "<dayOfWeek> afternoon" 1,
POS1 "<dayOfWeek> evening" 1, and
POS1 "<dayOfWeek> night" 1.

In general, these post-insertions do not provide semantic content used by the parser.

Probabilities associated with the <month> field element include one pre-insertion:

PRE1 "<month> on" 3, and a number of substitutions:

SUB1 "<month> January" 0, 1,
SUB1 "<month> February" 0, 2,
SUB1 "<month> March" 0, 3,
SUB1 "<month> April" 0, 4,
SUB1 "<month> May" 0, 5,
SUB1 "<month> June" 0, 6,
SUB1 "<month> July" 0, 7,
SUB1 "<month> August" 0, 8,
SUB1 "<month> September" 0, 9,
SUB1 "<month> October" 0, 10,
SUB1 "<month> November" 0, 11,
SUB1 "<month> December" 0, 12,
SUB1 "<month> Jan" 0, 1,
SUB1 "<month> Feb" 0, 2,
SUB1 "<month> Mar" 0, 3,
SUB1 "<month> Apr" 0, 4,
SUB1 "<month> Jun" 0, 6,
SUB1 "<month> Jul" 0, 7,
SUB1 "<month> Aug" 0, 8,
SUB1 "<month> Sep" 0, 9,
SUB1 "<month> Sept" 0, 9,
SUB1 "<month> Oct" 0, 10,
SUB1 "<month> Nov" 0, 11, and
SUB1 "<month> Dec" 0, 12.

The semantic information associated with the <month> element constitutes the number of the month.

Probabilities associated with the <dayOfMonth> field element include:

SUB1 "<dayOfMonth> 1" 0, 1,
SUB1 "<dayOfMonth> 2" 0, 2,
SUB1 "<dayOfMonth> 3" 0, 3,
SUB1 "<dayOfMonth> 27" 0, 27,
SUB1 "<dayOfMonth> 28" 0, 28,
SUB1 "<dayOfMonth> 29" 0, 29,
SUB1 "<dayOfMonth> 30" 0, 30,
SUB1 "<dayOfMonth> 31" 0, 31,
SUB1 "<dayOfMonth> 1st" 0, 1,
SUB1 "<dayOfMonth> 2nd" 0, 2,
SUB1 "<dayOfMonth> 3rd" 0, 3,
SUB1 "<dayOfMonth> 4th" 0, 4,
SUB1 "<dayOfMonth> 29th" 0, 29,
SUB1 "<dayOfMonth> 30th" 0, 30, and
SUB1 "<dayOfMonth> 31st" 0, 31.

The semantic information associated with the <dayOf-Month> element constitutes the numerical value of the day of the month.

Finally, probabilities associated with the <year> field element include:

SUB1 "<year> 1998" 0, 1998,

SUB1 "<year> 1999" 0, 1999,

SUB1 "<year> 2000" 0, 2000,

SUB1 "<year> 2001" 0, 2001,

SUB1 "<year> 98" 0, 1998, and

SUB1 "<year> 99" 0, 1999.

The semantic information associated with the <year> element constitutes the numerical value of the year.

Some implementations may permit the use of certain words to force a item to be of a particular disposition type. Referring to FIGS. 15B and 15C, the parser of such an implementation processes an utterance to generate an action item disposition according to a procedure 1550. Initially, the parser retrieves the utterance (step 1552). As noted above, the utterance constitutes an array of words, each of which may be designated by an index ("r"). The parser sets the index ("r") equal to 0 to point to the first word in the utterance and designates a constant ("m_nr") as equalling the number of words in the utterance (step 1554). The parser then skips the first word or words of the utterance if they correspond to the item identifier (e.g., "Jabberwocky") (step 1556).

The parser then begins to look for designated disposition forcing words, which include "create", "schedule", "remember", and words identifying particular disposition types (e.g., "meeting" or "task"). The user may provide additional forcing words using the keywords dialog.

If the next word in the utterance is "create", then the parser looks for forcing words associated with "create" and forces the disposition accordingly (step 1558). These words include "meeting", "appointment", "task", "to-do", "call", "email", "e-mail", "text", "document", "audio", "recording", "note", "history" and "contact". For example, the parser forces the disposition to be an appointment if the first forcing word found is "meeting" or "appointment". The parser forces an item to be of a certain disposition type by processing only command patterns associated with that disposition type. If the parser does not find a forcing word associated with "create", then the parser performs an unrestricted parsing of the item using the full set of command patterns. In either case, the parser proceeds to step 1504 and parses the utterance as discussed above with reference to FIG. 15A.

If the next word in the utterance is "schedule", then the parser looks for forcing words associated with "schedule" and forces the disposition accordingly (step 1560). These words include "meeting", "appointment", "task", "to-do" and "call". The parser forces an appointment when "meeting" or "appointment" is the first forcing word encountered and forces a task when "task", "to-do" or "call" is the first forcing word encountered. If the parser does not find a forcing word associated with "schedule", then the parser performs an unrestricted parsing of the item using the full set of command patterns. In either case, the parser proceeds to step 1504 and parses the utterance as discussed above with reference to FIG. 15A.

If the next word in the utterance is "remember", then the parser forces a task disposition (step 1562). Finally, if the next word in the utterance is a disposition type, the parser forces the appropriate disposition type (step 1564).

Parser Variations

As discussed above, the parser of FIG. 15A parses an utterance by scoring the utterance against each command pattern in a set of command patterns. Similarly, the parser of FIGS. 15B and 15C scores the utterance against each command pattern in a subset of command patterns corresponding to a forced disposition.

Further variations may be used to enhance the efficiency of the parser. These variations are discussed below with respect to the parser of FIG. 15A. However, it should be understood that they also are applicable to the parser of FIGS. 15B and 15C.

Referring to FIG. 17, a first variation stops processing a command pattern when the best-scoring entry on the priority queue for the command pattern is no better than the score for the best scoring pattern ("best_score"). This variation employs the action item generation procedure 1500 and the command pattern parsing procedure 1600 described above, with the command pattern parsing procedure modified as shown in FIG. 17. In particular, the portion of the procedure 1600 illustrated in FIG. 16B is modified by inserting a step 1700 before step 1616. Step 1700 compares the score for the node ("nodeScr") to the score for the best scoring pattern ("best_score") and stops processing the pattern if the score for the node is no better than the score for the pattern. This variation provides considerable reductions in the processing associated with parsing an utterance, particularly when an early command pattern scores well.

Referring to FIG. 18, a further variation processes all of the command patterns simultaneously using a single priority queue. In this variation, the priority queue is initialized with an entry for the starting field of each pattern, and processing stops when the end field for any pattern is reached. This variation substantially reduces the processing associated with parsing an utterance since only a single command pattern is parsed to completion. Other command patterns are parsed only to a level sufficient to ensure that they will not score as well as the best-scoring pattern.

As shown in FIG. 18, this variation may be implemented with a procedure 1800 that replaces steps 1504–1510 of procedure 1500 with a call (step 1805) to a combined parsing procedure that implements the combined priority queue and returns the identity of the best scoring pattern.

Referring to FIGS. 19A–19F, the combined parsing procedure 1900 operates in the same way as the procedure 1600 used to implement the parsing procedure. The combined parsing procedure 1900 does not employ traceback. Other differences between the procedures merely account for the overhead associated with processing all of the patterns simultaneously. Thus, for example, step 1902 of procedure 1900 corresponds to step 1602 of procedure 1600, with the step modified to store a variable "m_np" corresponding to the number of command patterns in the pattern set, to zero a variable "p" used as the index into the pattern set, to implement the variable "m_nc[m_np]" as an array of values corresponding to the different patterns, with each entry identifying the number of fields in the corresponding pattern, and to initialize variables used to represent the best final score (bestscore) and the corresponding pattern (bestpattern).

As in step 1604 of procedure 1600, the parser defines a macro, NODE, which is used to place items on the priority queue (step 1904). This macro differs from the macro of procedure 1600 in that it adds an identifier for the pattern associated with the item placed on the queue.

The parser next initializes all scores to have bad values (step 1906). The parser does this by processing through an outer loop that varies the pattern ("p") and inner loops that vary the word number ("r") and the field number ("c").

After initializing all scores to be bad, the parser initializes the starting node for each pattern to have a good score (step 1908). After initializing each starting node score, the parser places the starting node in the priority queue (step 1910).

Next, the parser begins a loop that continues until the priority queue is empty (step 1912). As a first step in the loop, the parser removes the best-scoring node from the queue and unpacks it (step 1914). The parser unpacks the node by right-shifting the queue entry by 28 positions to generate the score ("nodeScr"); masking the queue entry and right-shifting it by 16 positions to generate the pattern number ("pb"); masking the queue entry and right-shifting it by 8 positions to generate the word number ("rb"); masking the queue entry to generate the field number ("cb"); and masking the queue entry and right-shifting it by 24 positions to generate the state index ("i").

The parser only processes a node if its score is the current best score for the word/field pair and its score is better than the current best final score for the best scoring pattern, if a final score exists (step 1916). The parser also does not process the node if the node is an end node representing a final score (step 1918), in which case further processing is unnecessary.

To process a node, the parser initializes a score for the node and begins dynamic programming to update all nodes that can be reached from the node by deletion, insertion, or substitution (step 1920). If the node is a state 3 node (i.e., i equals 3), the parser performs post-insertion processing on the node (step 1922).

The parser then determines the penalty for a single-word post-insertion involving the word/field pair (step 1924). If the sum of the penalty and the score for the node is better than the best score for the word/field pair including the next word ("rb+1") and the current field ("cb"), then the parser saves the score and inserts a node representing the new word/field pair into the priority queue (step 1926).

If enough words are available, the parser then determines the penalty for a double-word post-insertion (step 1928). If the penalty indicates that the pair of words to be post-inserted are valid double-post-insertion words, and if the sum of the penalty and the score for the node is better than the best score for the word/field pair including the pair of words ("rb+2") and the current field ("cb"), then the parser saves the score and inserts a node representing the new word/field pair into the priority queue (step 1930).

Similarly, if enough words are available, the parser determines the penalty for a triple-word post-insertion (step 1932). If the penalty indicates that the three words to be post-inserted are valid triple-post-insertion words, and if the sum of the penalty and the score for the node is better than the best score for the word/field pair including the next three words ("rb+3") and the current field ("cb"), then the parser saves the score and inserts a node representing the new word/field pair into the priority queue (step 1934).

As the final step in performing post-insertion processing, the parser increments the field number (step 1936). This, in effect, advances the score for the post-insertion node of the field ("err3[pb][rb][cb]") to the deletion node of the next field ("err1[pb][rb][cb+1]").

Next, if the node is a state 1 node or a state 3 node, the parser performs deletion processing on the node (step 1938). In performing the processing, the parser uses the smaller of the best score for the word/field pair ("err1[pb][rb][cb]") or the current node score ("scr") (step 1940).

After determining which score to use, the parser determines the penalty associated with skipping the current field ("cb") (step 1942). If the sum of the penalty and the score for the node is better than the best score for the word/field pair including the current word ("rb") and the next field ("cb+1"), then the parser saves the score and inserts a node representing the new word/field pair into the priority queue (step 1944). If the score is a final score (rb=m__nr[pb] and cb=m__nc) and is better than the final score for the best scoring pattern (err1[pb][rb][cb+1]<bestscore), then the score is saved as the final score for the best scoring pattern, and the associated pattern is identified as the best scoring pattern (step 1945).

Next, the parser performs pre-insertion/substitution processing on the node (step 1946). In performing the processing, the parser uses the smaller of the best score for the word/field pair ("err2[pb][rb][cb]") or the current node score ("scr") (step 1948).

The parser then determines whether any words are available to perform substitutions or pre-insertions (i.e., whether the node represents a node other than the final node) (step 1950). The parser performs no further processing of the node if no words are available.

If a word is available, the parser determines the penalty associated with making a single word substitution (step 1952). If the sum of the penalty and the score for the node is better than the best score for the word/field pair including the next word ("rb+1") and the current field ("cb"), then the parser saves the score and inserts a node representing the new word/field pair into the priority queue (step 1954).

If a word is available, the parser also determines the penalty associated with making a single word pre-insertion (step 1954). If the sum of the penalty and the score for the node is better than the best score for the word/field pair including the next word ("rb+1") and the current field ("cb"), then the parser saves the score and inserts a node representing the new word/field pair into the priority queue (step 1956).

Next, the parser determines whether a pair of words is available to perform a double substitution or a double pre-insertion (step 1960). The parser performs no further processing of the node if a pair of words is not available.

If a pair of words is available, the parser determines the penalty associated with making a double word substitution (step 1962). If the penalty indicates that the pair of words to be substituted are valid double-substitution words, and if the sum of the penalty and the score for the node is better than the best score for the word/field pair including the next two words ("rb+2") and the current field ("cb"), then the parser saves the score and inserts a node representing the new word/field pair into the priority queue (step 1964).

If a pair of words is available, the parser determines the penalty associated with making a double word pre-insertion (step 1966). If the penalty indicates that the pair of words to be pre-inserted are valid double-pre-insertion words, and if the sum of the penalty and the score for the node is better than the best score for the word/field pair including the next two words ("rb+2") and the current field ("cb"), then the parser saves the score and inserts a node representing the new word/field pair into the priority queue (step 1968).

Next, the parser determines whether three words are available to perform a triple substitution or a triple pre-insertion (step 1970). The parser performs no further processing of the node if three words are not available.

If three words are available, the parser determines the penalty associated with making a triple word substitution (step 1972). If the penalty indicates that the three words to be substituted are valid triple-substitution words, and if the sum of the penalty and the score for the node is better than the best score for the word/field pair including the next three words ("rb+3") and the current field ("cb"), then the parser saves the score and inserts a node representing the new word/field pair into the priority queue (step 1974).

If three words are available, the parser determines the penalty associated with making a triple word pre-insertion (step 1976). If the penalty indicates that the three words to be pre-inserted are valid triple-pre-insertion words, and if the sum of the penalty and the score for the node is better than the best score for the word/field pair including the next three words ("rb+3") and the current field ("cb"), then the parser saves the score and inserts a node representing the new word/field pair into the priority queue (step 1978).

Finally, the parser determines whether any entries remain in the queue (step 1980) and repeats the loop including steps 1920–1980 until the queue is empty (i.e., all nodes are processed or discarded). When the queue is empty, the parser returns bestpattern as the best scoring pattern (step 1982).

FIG. 20 illustrates parsing procedure 2000, which is yet another variation that uses a single priority queue to parse all of the command patterns. As noted above, use of a single priority queue eliminates processing of at least the ends of patterns not scoring as well as the best-scoring pattern.

The procedure 2000 provides further processing reductions by eliminating redundant processing of overlapping pattern components. For example, when the patterns "<A><B><C><D><E>" and "<A><B><C><X><Y>" are scored, a significant amount of identical computation (associated with scoring fields "<A><B><C>") is performed twice. Procedure 2000 avoids this identical computation by not scoring the second pattern until, and unless, scoring of the first pattern reaches the point at which the patterns diverge. At this point, the score for the initial fields ("<A><B><C>") of the first pattern can be used to initiate a score for the initial fields of the second pattern.

Procedure 2000 achieves this reduction in computation by finding all patterns that share a common prefix. To avoid loops, the procedure 2000 orders the patterns lexicographically (step 2005). The procedure then initializes an array (pattern_tree) (step 2010) and uses a recursive procedure (buildtree) to populate the array to build the tree (step 2015). The steps of ordering the patterns and building the tree (steps 2005–2015) only need to be performed once. In general, the tree can be used, without modification, for each utterance.

Referring to FIGS. 21A and 21B, one implementation of the tree building procedure 2100 (buildtree) receives an ordered list of patterns and returns an array partitioning the patterns based on their relationship to the first pattern in the list. The procedure 2100 designates the first pattern in the list (root) as the root of the pattern tree (step 2105). The procedure then partitions the remaining patterns according to the length, n, of their common prefix with root:

Root: <A><B><C><D><E>
3: <A><B><C><E><F>
3: <A><B><C><X><Y>
2: <A><B><E><F>
2: <A><B><F><G>
1: <A><X><Y><Z>
1: <A><X><Y><D>
0: <C><E><F><A>.

Thus, for example, the pattern "<A><B><E><F>" is in the n=2 partition, since it shares the first two fields ("<A><B>") of the root pattern ("<A><B><C><D><E>"). The procedure establishes for each partition a pointer from the corresponding node of the root pattern to the first pattern in the partition to establish a tree for the root pattern. The procedure then generates a sub-tree for each partition, with the first pattern in the partition designated as the root for that sub-tree.

After designating the first pattern as the root (step 2105), the procedure 2100 initializes variables (step 2110). First, the procedure 2100 initializes a variable (last_p) used to identify the last pattern being processed to equal the pattern index (i.e., the position in the sorted pattern set) of the last pattern provided to the procedure. In the first call to the procedure, which transfers the entire pattern set, last_p will designate the last pattern in the sorted pattern set, and root_p, which designates the root pattern, will designate the first pattern in the sorted pattern set (root_p=0). Later calls to the procedure 2100 will use only a subset of the sorted pattern set.

The procedure 2100 also initializes a field count (root_m_nc) to equal the number of fields in the root pattern. The procedure sets a partition identifier (partition_num) equal to the field count, so that the procedure will first check for patterns that match every field of the root pattern. Finally, the procedure sets a pattern pointer (p) to point to the pattern following the root pattern.

Next, the procedure initializes a pointer array (root_array) for the root pattern (step 2115). The array is initialized to have one more entry than there are fields in the root pattern to permit a partition for patterns that match each field of the root pattern and an additional partition for patterns that do not match any field of the root pattern.

The procedure then partitions the patterns based on the prefixes that they share with the root pattern (step 2120). The procedure accomplishes this by repeating a loop until the last pattern is partitioned (p>last_p) or a pattern that does not match any field of the root pattern is found (partition_num=0).

The procedure designates the current pattern (sorted_patternset[p]) as the first pattern for a partition if the first "n" fields of the current pattern, where "n" equals the partition number, match the root pattern (step 2125). Thus, for partition number 2, the first two fields (fields 0 and 1) of the current pattern would need to match the first two fields of the root pattern. The procedure designates a pattern as the first pattern in a partition by setting the appropriate entry of the pointer array to point to the current pattern.

After finding the first pattern in a partition, the procedure finds the last pattern in the partition (step 2130). The procedure does this by comparing subsequent patterns to the root pattern until the last pattern is reached or a pattern that does not match the portion of the root pattern corresponding to the partition is found. The procedure then builds a sub-tree for the patterns of the partition (step 2135).

If the current pattern does not match the portion of the root pattern corresponding to the partition (step 2125), the procedure reduces the size of the partition by one field (step 2140) and checks again (step 2120). This decrementing of the partition size continues until the partition includes no fields.

If there are any patterns that do not match the root pattern at all, the procedure places these patterns in partition "0" for the root pattern and builds a sub-tree for the partition (step 2145).

After processing all of the patterns, the procedure returns the pointer array (step 2150).

Referring again to FIG. 20, after building the pattern tree (step 2015), the procedure 2000 retrieves an utterance (step 2020) and parses the utterance using a parsing procedure (treeparse) that uses the pattern tree to identify the best scoring pattern (step 2025). The procedure 2000 then parses the best scoring pattern using traceback (step 2030), analyzes the traceback (step 2035), parses each field of the best-scoring pattern (step 2040), and generates an action item (step 2045). The procedure performs these last steps (steps 2030–2045) identically to the way in which procedure 1500 performs the steps 1512–1518, as discussed above.

Referring to FIGS. 22A–22B, the tree-based parsing procedure 2200 operates almost identically to the combined parsing procedure 1900. The two differences between the procedures, both of which correspond to portions of the procedure 1900 illustrated in FIGS. 19A and 19B, are described below. Steps of the procedure 2200 identical to those of the procedure 1900 are identified by the same step number used in the procedure 1900.

The procedure 2200 first diverges from the procedure 1900 at steps 2208 and 2210, where the procedure 2200 puts only a node for the first pattern of the tree in the priority queue. By contrast, the procedure 1900 placed a node for each pattern in the priority queue.

The only other difference between the procedures is that the procedure 2200, after determining that a node is to be processed (steps 1916 and 1918), then determines whether a node for another pattern from the tree should be added to the priority queue. In particular, the procedure 2200 adds a new node to the priority queue when a node is a state 1, and the pattern to which the node corresponds has a populated partition for the current field number. When these conditions are met, the procedure 2200 adds a node for the first pattern of the partition. The procedure sets the score, word and field for the new node to the score, word and field for the current node, the state for the new node to one, and the pattern for the new node to the first pattern of the partition.

As noted above, the steps of the procedure 2000 associated with building the pattern tree (steps 2005–2015) do not need to be repeated for each utterance. This is true so long as each utterance is processed using the same pattern set. When a subset of the pattern set is employed, such as when an utterance is processed according to a forced disposition, a new pattern tree may be built for that subset of the pattern set.

A more efficient approach uses the original pattern tree and designates each pattern as legal (a pattern included in the subset) or illegal (a pattern not included in the subset). When an illegal pattern is encountered (in step 2210 or step 2219), a node for that pattern is not added to the priority queue. Instead, nodes for any legal children of the illegal pattern are added to the priority queue. This is accomplished by searching each path (i.e., each partition) from the illegal pattern until the path ends or a legal pattern is encountered for that path. A node is added to the priority queue for each legal pattern encountered in the search.

Speech Recognizer

Figure 23:
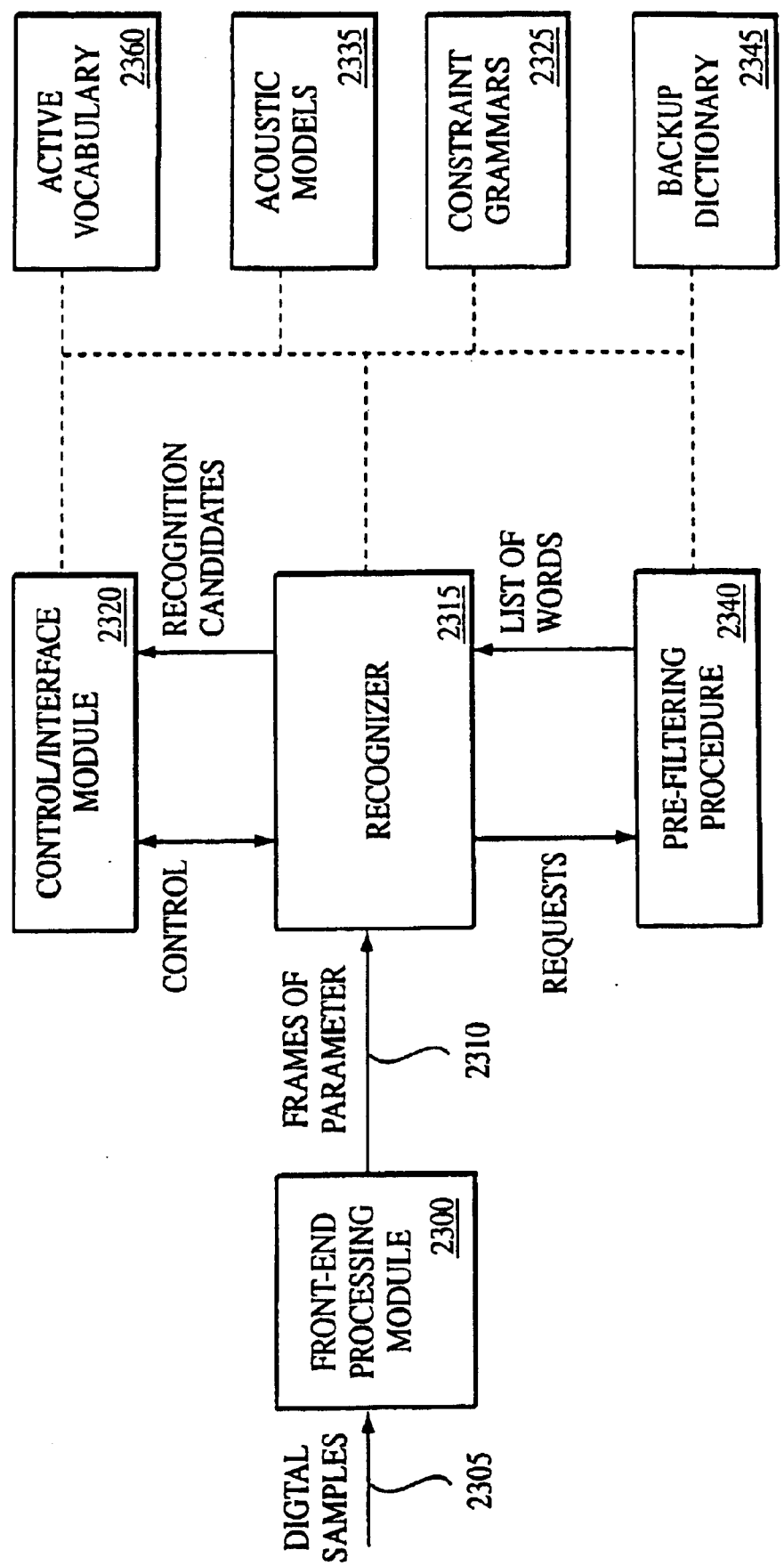
FIG. 23 is a block diagram of speech recognition software of the system of FIG. 3.

FIG. 23 illustrates components of the speech recognition software 360 of FIG. 3. The software 360 is discussed in terms of a general purpose recognizer providing a user interface and application control. It should be understood that the user interface and other aspects of the system are unnecessary when the software 360 is operated by the interface software 380. For ease of discussion, the following description indicates that the components carry out operations to achieve specified results. However, it should be understood that each component actually causes the processor 330 to operate in the specified manner.

Initially, a front end processing module 2300 converts the digital samples 2305 representing speech into frames of parameters 2310 that represent the frequency content of an utterance. Each frame includes 24 parameters and represents a short portion (e.g., 10 milliseconds) of the utterance.

Figure 24:
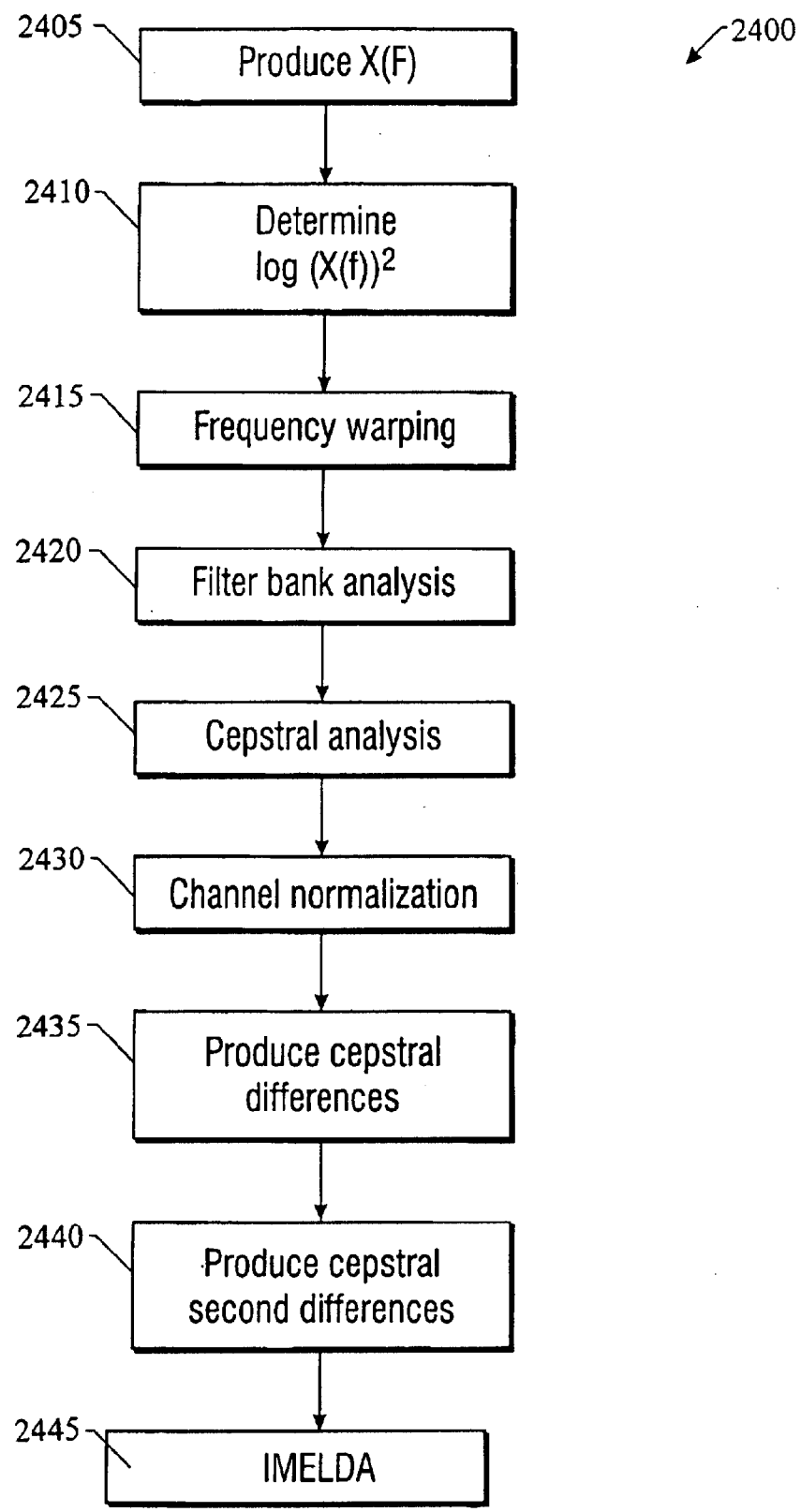
FIG. 24 is a flow chart of a signal processing procedure performed by the software of FIG. 23.

As shown in FIG. 24, the front end processing module 2300 produces a frame from digital samples according to a procedure 2400. The module first produces a frequency domain representation X(f) of the portion of the utterance by performing a Fast Fourier Transform (FFT) on the digital samples (step 2405). Next, the module determines $\log(X(f))^2$ (step 2410). The module may then perform frequency warping (step 2415) and a filter bank analysis (step 2420) to achieve speaker normalization. See S. Wegmann et al., "Speaker Normalization on Conversational Speech," *Proc. 1996 ICASSP*, pp. I.339–I.341, which is incorporated by reference.

From the normalized results, the module performs cepstral analysis to produce twelve cepstral parameters (step 2425). The module generates the cepstral parameters by performing an inverse cosine transformation on the logarithms of the frequency parameters. Cepstral parameters and cepstral differences (described below) have been found to emphasize information important to speech recognition more effectively than do the frequency parameters. After performing channel normalization of the cepstral parameters (step 2430), the module produces twelve cepstral differences (i.e., the differences between cepstral parameters in successive frames) (step 2435) and twelve cepstral second differences (i.e., the differences between cepstral differences in successive frames) (step 2440). Finally, the module performs an IMELDA linear combination transformation to select the twenty four most useful parameters from the twelve cepstral parameters, the twelve cepstral differences, and the twelve cepstral second differences (step 2445).

Referring again to FIG. 23, a recognizer 2315 receives and processes the frames of an utterance to identify text corresponding to the utterance. The recognizer entertains several hypotheses about the text and associates a score with each hypothesis. The score reflects the probability that a hypothesis corresponds to the user's speech. For ease of processing, scores are maintained as negative logarithmic values. Accordingly, a lower score indicates a better match (a high probability) while a higher score indicates a less likely match (a lower probability), with the likelihood of the match decreasing as the score increases. After processing the utterance, the recognizer provides the best-scoring hypotheses to the control/interface module 2320 as a list of recognition candidates, where each recognition candidate corresponds to a hypothesis and has an associated score. Some recognition candidates may correspond to text while other recognition candidates correspond to commands. Commands may include words, phrases, or sentences. When the software 360 is called by the interface software 380, the control/interface module 720 returns the best-scoring candidate to the interface software 380.

The recognizer 2315 processes the frames 2310 of an utterance in view of one or more constraint grammars 2325. A constraint grammar, also referred to as a template or restriction rule, may be a limitation on the words that may correspond to an utterance, a limitation on the order or grammatical form of the words, or both. For example, a constraint grammar for menu-manipulation commands may include only entries from the menu (e.g., "file", "edit") or command words for navigating through the menu (e.g., "up", "down", "top", "bottom"). Similarly, a constraint grammar associated with the interface software 380 may require utterances to comply with available command templates, may require file names to be selected from a list of existing file names, or may require all proper names to be found on a list of contacts. Different constraint grammars may be active at different times. For example, a constraint grammar associated with the interface software 380 may be activated when the user runs the interface software 380 and deactivated when the user exits the software. The recognizer 2315 discards any hypothesis that does not comply with an active constraint grammar. In addition, the recognizer 2315 may adjust the score of a hypothesis associated with a particular constraint grammar based on characteristics of the constraint grammar.

Figure 25A:
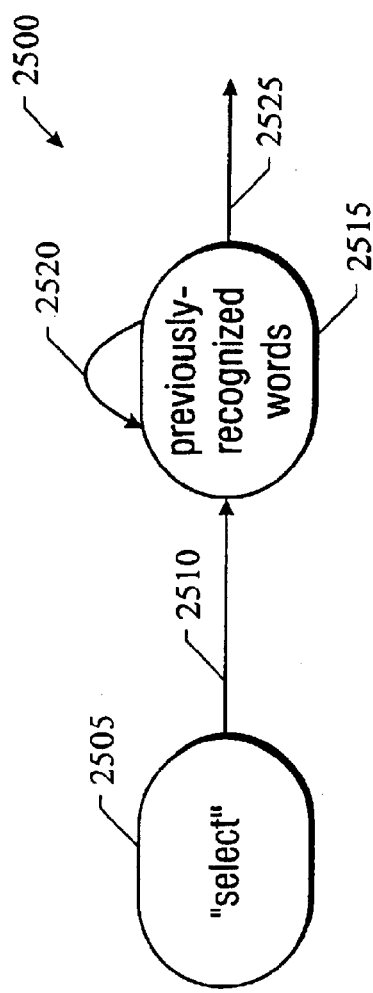
FIGS. 25A and 25B are state diagrams of a constraint grammar.
Figure 25B:
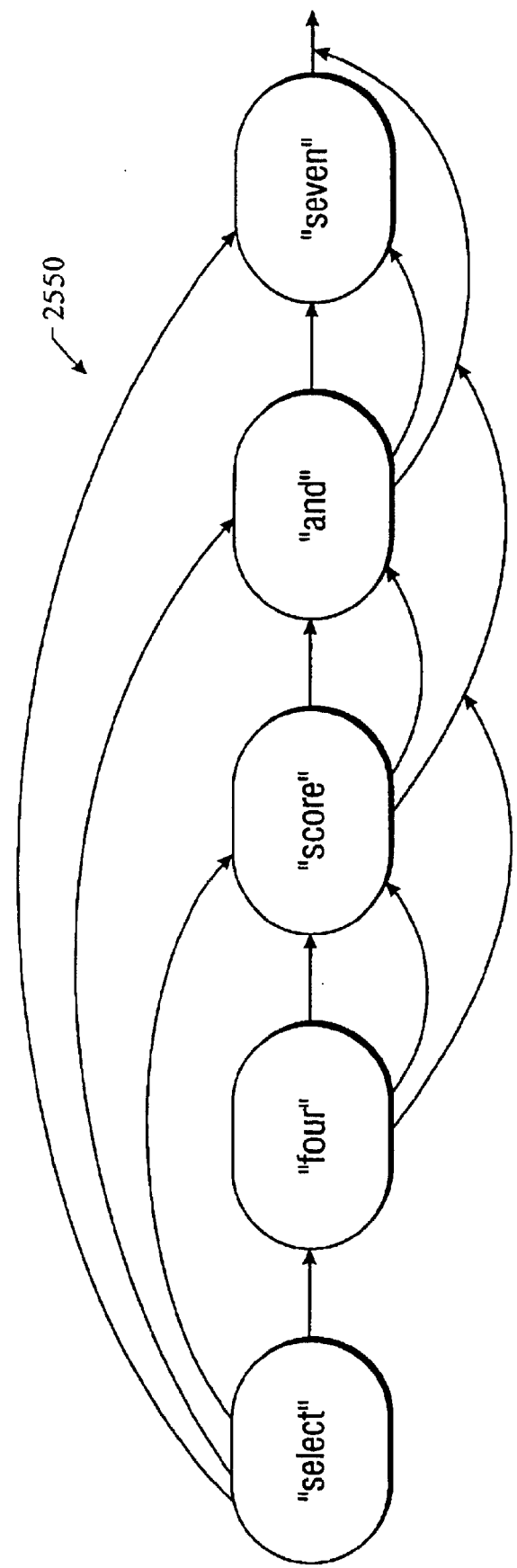

FIG. 25A illustrates an example of a constraint grammar for a "select" command used to select previously recognized text. As shown, a constraint grammar may be illustrated as a state diagram 2500. The "select" command includes the word "select" followed by one more previously-recognized words, with the words being in the order in which they were previously recognized. The first state 2505 of the constraint grammar indicates that the first word of the select command must be "select". After the word "select", the constraint grammar permits a transition along a path 2510 to a second state 2515 that requires the next word in the command to be a previously-recognized word. A path 2520, which returns to the second state 2515, indicates that the command may include additional previously-recognized words. A path 2525, which exits the second state 2515 and completes the command, indicates that the command may include only previously-recognized words. FIG. 25B illustrates the state diagram 2550 of the constraint grammar for the select command when a previously-recognized utterance is "four score and seven". This state diagram could be expanded to include words from additional utterances. The "select" command and techniques for generating its constraint grammar are described further in U.S. application Ser. No. 08/556, 280, entitled "CONTINUOUS SPEECH RECOGNITION" and filed Nov. 13, 1995, which is incorporated by reference.

The constraint grammar also may be expressed in Backus-Naur Form (BNF) or Extended BNF (EBNF). In EBNF, the grammar for the "Select" command is:

<recognition result> ::= Select <words>,
where
<words> ::= [PRW$^1$[PRW$^2$[PRW$^3$ ... PRW$^n$]]] |
[PRW$^2$[PRW$^3$ ... PRW$^n$]] | ... | [PRW$^n$],
"PRW" is the previously-recognized word i,
[ ] means optional,
< > means a rule,
| means an OR function, and
::= means "is defined as" or "is".

As illustrated in FIGS. 25A and 25B, this notation indicates that "select" may be followed by any ordered sequence of previously-recognized words. This grammar does not permit optional or alternate words. In some instances, the grammar may be modified to permit optional words (e.g., an optional "and" to permit "four score and seven" or "four score seven") or alternate words or phrases (e.g., "four score and seven" or "eighty seven"). Constraint grammars are discussed further in U.S. application Ser. No. 08/559,207, entitled "CONTINUOUS RECOGNITION OF SPEECH AND COMMANDS" and filed Nov. 13, 1995, which is incorporated by reference.

Another constraint grammar 1825 that may be used by the speech recognition software 360 is a large vocabulary dictation grammar. The large vocabulary dictation grammar identifies words included in the active vocabulary 1830, which is the vocabulary of words known to the software. The large vocabulary dictation grammar also indicates the frequency with which words occur. A language model associated with the large vocabulary dictation grammar may be a unigram model that indicates the frequency with which a word occurs independently of context, or a bigram model that indicates the frequency with which a word occurs in the context of a preceding word. For example, a bigram model may indicate that a noun or adjective is more likely to follow the word "the" than is a verb or preposition.

Other constraint grammars 1825 include an in-line dictation macros grammar for dictation commands, such as "CAP" or "Capitalize" to capitalize a word and "New-Paragraph" to start a new paragraph; the select X Y Z grammar discussed above and used in selecting text; an error correction commands grammar; a dictation editing grammar; an application command and control grammar that may be used to control a particular application program; a global command and control grammar that may be used to control the operating system and the speech recognition software; a menu and dialog tracking grammar that may be used to manipulate menus; and a keyboard control grammar that permits the use of speech in place of input devices, such as the keyboard or the mouse.

The active vocabulary 1830 uses a pronunciation model in which each word is represented by a series of phonemes that comprise the phonetic spelling of the word. Each phoneme may be represented as a triphone that includes three nodes. A triphone is a context-dependent phoneme. For example, the triphone "abc" represents the phoneme "b" in the context of the phonemes "a" and "c", with the phoneme "b" being preceded by the phoneme "a" and followed by the phoneme "c".

One or more vocabulary files may be associated with each user. The vocabulary files contain all of the words, pronunciations and language model information for the user. Dictation and command grammars may be split between vocabulary files to optimize language model information and memory use, and to keep each single vocabulary file under 64,000 words. There also is a set of system vocabularies.

Separate acoustic models 1835 are provided for each user of the system. Initially speaker-independent acoustic models of male or female speech are adapted to a particular user's speech using an enrollment program. The acoustic models may be further adapted as the system is used. The acoustic models are maintained in a file separate from the active vocabulary 1830.

The acoustic models 1835 represent phonemes. In the case of triphones, the acoustic models 1835 represent each triphone node as a mixture of Gaussian probability density functions ("PDFs"). For example, node "i" of a triphone "abc" may be represented as ab$^i$c:

$$ab^ic = \sum_k w_k N(\mu_k, c_k),$$

where each $w_k$ is a mixture weight, $$\sum_k w_k = 1,$$

$\mu_k$ is a mean vector for the probability density function ("PDF") $N_k$, and $c_k$ is the covariance matrix for the PDF $N_k$. Like the frames in the sequence of frames, the vectors $\mu_k$ each include twenty four parameters. The matrices $c_k$ are twenty four by twenty four matrices. Each triphone node may be represented as a mixture of up to, for example, sixteen different PDFs.

A particular PDF may be used in the representation of multiple triphone nodes. Accordingly, the acoustic models 1835 represent each triphone node as a collection of mixture weights $w_k$ associated with up to sixteen different PDFs $N_k$ and separately represent each PDF $N_K$ using a mean vector $\mu_k$ and a covariance matrix $c_k$. Use of a particular PDF to represent multiple triphone nodes permits the models to include a smaller number of PDFs than would be required if each triphone node included entirely separate PDFs. Since the English language may be roughly represented using 43 different phonemes, there may be up to 79,507 ($43^3$) different triphones, which would result in a huge number of PDFs if each triphone node were represented by a separate set of PDFs. Representing multiple nodes with common PDFs also may remedy or reduce a data sparsity problem that results because some triphones (e.g., "tzp" in the English language) rarely occur. These rare triphones may be represented by having closely-related triphones share the same set of PDFs.

A large vocabulary dictation grammar may include multiple dictation topics (e.g., "medical" or "legal"), each having its own vocabulary file and its own language model. A dictation topic includes a set of words which represents the active vocabulary 1830. In a typical example, a topic may include approximately 30,000 words that are considered for normal recognition.

A complete dictation vocabulary consists of the active vocabulary 1830 plus a backup vocabulary 1845. The backup vocabulary may include files that contain user-specific backup vocabulary words and system-wide backup vocabulary words.

User-specific backup vocabulary words include words which a user has created while using the speech recognition software. These words are stored in vocabulary files for the user and for the dictation topic, and are available as part of the backup dictionary for the dictation topic regardless of user, and to the user regardless of which dictation topic is being used. For example, if a user is using a medical topic and adds the word "ganglion" to the dictation vocabulary, any other user of the medical topic will have immediate access to the word "ganglion". In addition, the word will be written into the user-specific backup vocabulary. Then, if the user says "ganglion" while using a legal topic, the word "ganglion" will be available during correction from the backup dictionary.

In addition to the user-specific backup vocabulary noted above, there is a system-wide backup vocabulary. The system-wide backup vocabulary contains all the words known to the system, including words which may currently be in an active vocabulary.

Referring again to FIG. 18A, the recognizer 1815 may operate in parallel with a pre-filtering procedure 1840. Upon initiating processing of an utterance, the recognizer 1815 requests from the pre-filtering procedure 1840 a list of words that may have been spoken as the first word of the utterance (i.e., words that may correspond to the first and subsequent frames of the utterance). The pre-filtering procedure 1840 performs a coarse comparison of the sequence of frames with the active vocabulary 1830 to identify a subset of the vocabulary for which a more extensive comparison using the recognizer is justified.

Figure 26:
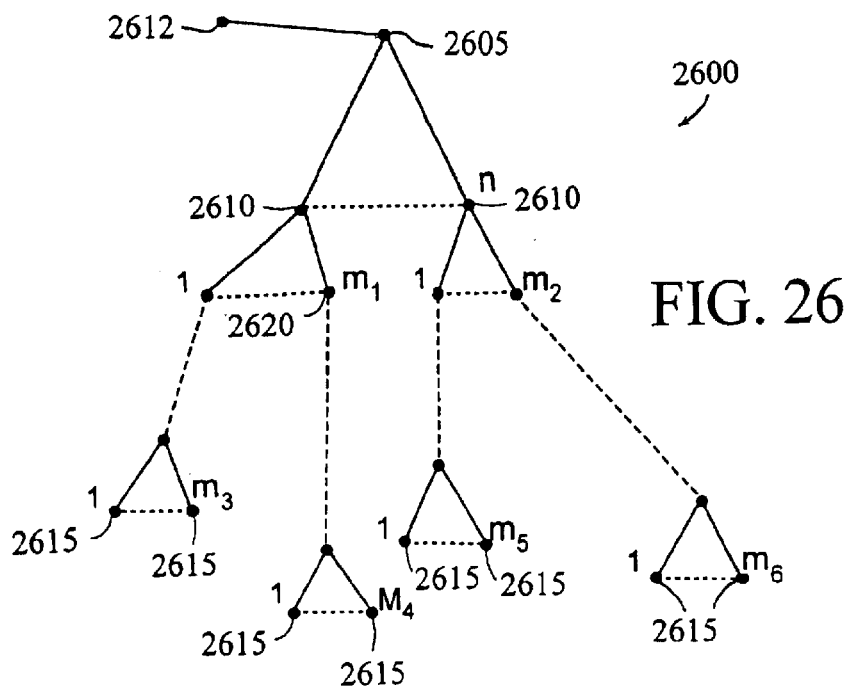
FIG. 26 is a graph of a lexical tree.
Figure 27:
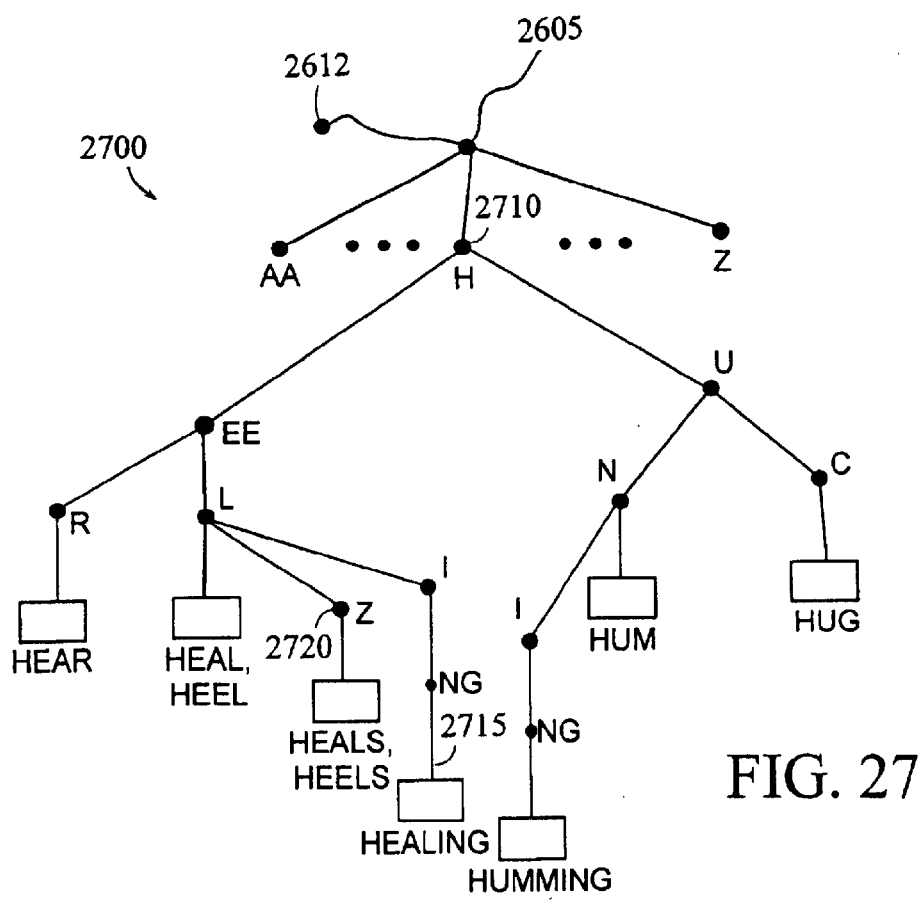
FIG. 27 is a graph of a portion of the lexical tree of FIG. 26.

Referring to FIGS. 26 and 27, the pre-filtering procedure 1840 uses a lexical tree 2600 that is initialized before processing begins. The lexical tree represents the active vocabulary 1830 based on the phonetic relationships between words in the vocabulary. The lexical tree includes a root node 2605 that represents new words entering the lexical tree. From the root node 2605, the tree expands to a group 2610 of nodes that correspond to phonemes with which words start. A silence node 2612 that represents silence also may be reached from the root node 2605.

Each node in the group 2610 represents a phoneme that appears at the beginning of one or more words. For example, in the portion 2700 of the lexical tree 2600 illustrated in FIG. 27, a node 2710 corresponds to all words in the vocabulary that start with the phoneme "H". Together, the nodes in the group 2610 include representations of the starting phoneme of every word in the vocabulary.

The lexical tree continues to expand until it reaches leaf nodes 2615 that represent the actual words of the vocabulary. For example, as indicated by the square marker, leaf node 2715 of FIG. 27 corresponds to the word "healing". An internal node of the tree also may represent a word of the vocabulary. For example, the node 2620 might represent a particular vocabulary word in addition to representing the first two phonemes of other vocabulary words. Similarly, the leaf node 2720 of FIG. 27 corresponds to the words "heal" and "heel" while also corresponding to the first three phonemes of the words "heals", "heels" and "healing". Node 2720 also illustrates that, since multiple words may have the same phonetic spelling, a leaf node may correspond to more than one word. As illustrated in FIG. 27, leaf nodes may appear at different levels within the lexical tree. Leaf nodes also may correspond to commands. For example, a leaf node may correspond to the word "select" and to the command "SELECT". As noted above, commands may be associated with particular constraint grammars 1825.

Figure 28:
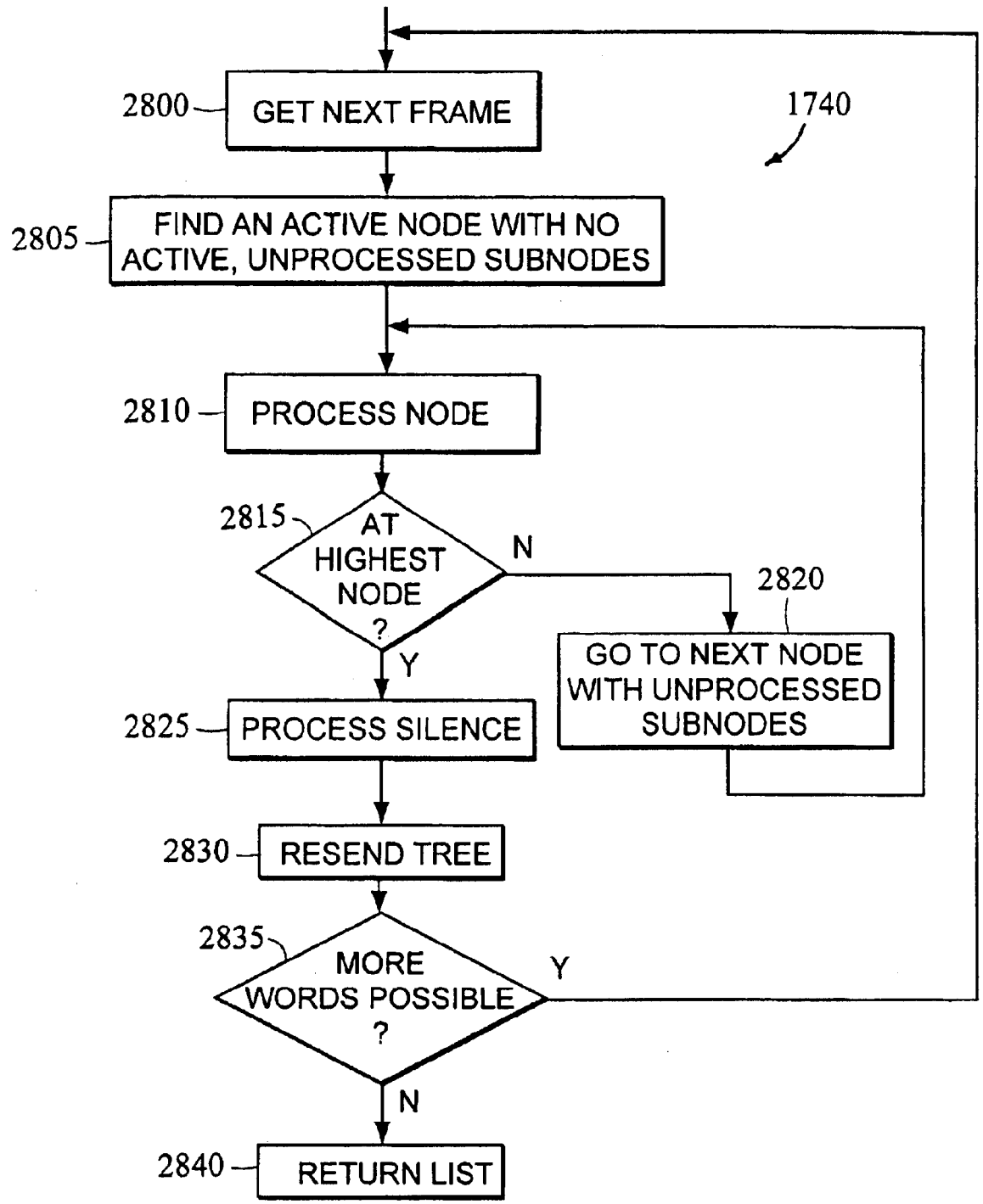
FIG. 28 is a flow chart of a pre-filtering procedure performed by the software of FIG. 23.

Operation of the pre-filtering procedure 1840 is illustrated in FIG. 28. The pre-filtering procedure begins by retrieving the next frame of parameters for an utterance (step 2800). Immediately after initialization, the next frame will be the first frame for the utterance. Thereafter, the next frame will be the frame following the last frame that was processed by the pre-filtering procedure when the pre-filtering procedure was last called. The pre-filtering procedure does not reinitialize the lexical tree between requests for list of words. Accordingly, the state of the lexical tree when a list of words is requested corresponds to the state of the lexical tree after a previous list of words was returned.

After retrieving a frame of data, the pre-filtering procedure finds an active node in the tree with no unprocessed active successors (step 2805). Successors of a node also may be referred to as subnodes of the node. When the lexical tree is initialized, the silence node 2612 is the only active node.

Next, the pre-filtering procedure processes the current node (step 2810) according to a node-processing procedure 1100 that is discussed below with reference to FIG. 11. The node-processing procedure determines whether the node should spawn additional active nodes and whether the node should be rendered inactive. If the node is a leaf node, the node-processing procedure also determines whether the word corresponding to the node should be added to a word list for a time associated with the node.

After processing the node (step 2810), the pre-filtering procedure determines whether the node is the highest node in the tree (i.e., the root node) (step 2815). If the node is not the highest node, then the pre-filtering procedure goes to the next node having no unprocessed active subnodes (step 2820) and processes that node (step 2810). When searching for the next node to process, the pre-filtering procedure considers inactive nodes having active subnodes or active siblings.

If the processed node is the highest active node (step 2815), then the pre-filtering procedure processes the silence node 2612 (step 2825). In general, the silence node is processed by comparing a frame to a model for silence and adding the resulting score to the minimum of the current score for the silence node and the score for the root node 2605.

Next, the pre-filtering procedure reseeds the lexical tree (step 2830). The pre-filtering procedure reseeds the tree whenever the silence node 2612 is active or a word was produced by a leaf node of the lexical tree, regardless of whether the word was added to the list of words. The pre-filtering procedure reseeds the tree by replacing the score for the root node 2605 with the minimum of the score for the silence node 2612 and the scores for any words produced by leaf nodes of the lexical tree for the current frame. If the silence node is inactive and no leaf node has produced a word, then the pre-filtering procedure replaces the score for the root node 2605 with a bad score (i.e., a score having a value larger than a pruning threshold).

Next, the pre-filtering procedure determines whether more words may be added to the word list for the requested time (step 2835). If there are no active nodes in the lexical tree corresponding to speech that started at, before, or slightly after the start time for which the list was requested, and if the last frame to be processed corresponds to a time that is slightly after the start time for which the list was requested, then no more words may be added to the word list. A word produced by the lexical tree is added to the list of words corresponding to the start time of the word and to lists of words corresponding to times that precede and follow the start time of the word. It is for this reason that the pre-filtering procedure waits until there are no active nodes in the tree corresponding to speech that started slightly after the start time for the list of words. If more words may be added, then the pre-filtering procedure retrieves the next frame of parameters (step 2800) and repeats the steps discussed above.

If words cannot be added to the word list (step 2835), then the pre-filtering procedure returns the word list (step 2840) to the recognizer 1815. If the word list includes more than a predefined number of words, then the pre-filtering procedure removes words from the list prior to returning the list. The pre-filtering procedure removes the words that are least likely to correspond to the user's speech and removes enough words to reduce the number of words on the list to the predefined number. The procedure also deletes any lists of words for times prior to the requested start time.

Figure 29A:
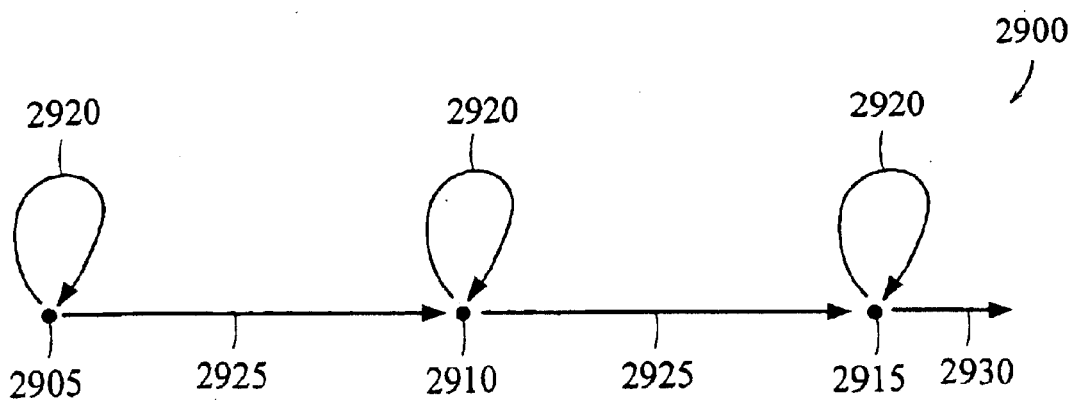
FIGS. 29A–29C are state graphs representing nodes of the lexical tree of FIG. 26.

Each node of the lexical tree 2600 (FIG. 26) represents a sequence of states for a particular phoneme. For example, FIG. 29A illustrates a node 2900 that includes a first state 2905, a second state 2910, and a third state 2915. A comparison with a frame of parameters may cause the score in a particular state to remain in the state (through a path 2920). A score remains in the state when the score, after being adjusted based on a comparison with a model for the state, is better than a score passed from a preceding state or node, or when no score is passed from a preceding state or node. The comparison also may cause the score to be passed to a subsequent state through a path 2925. A score is passed to a subsequent state when the score, after being adjusted based on a comparison with a model for the subsequent state, is better than the score in the subsequent state, or when no score is associated with the subsequent state. The score for the third state 2915 may be passed to one or more subsequent nodes through a path 2930.

Figure 29B:
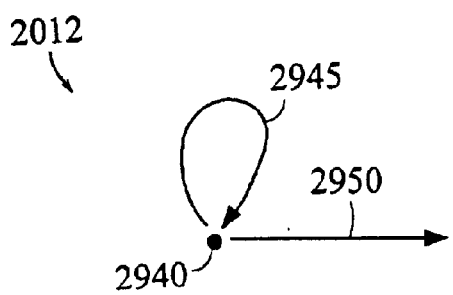

Referring to FIG. 29B, the node 2612 that corresponds to silence is represented by a single state 2940. Each comparison with a frame of parameters may cause a score in the node to remain in the state 2940 (through the path 2945) and also may cause the score to be passed to the root node 2605 through a path 2950.

Figure 29C:
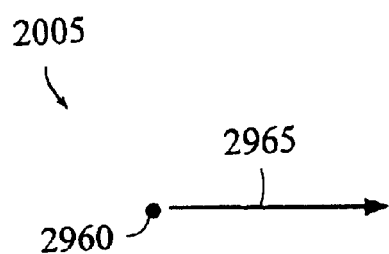

Referring to FIG. 29C, the root node 2605 is represented by a single state 2960. Comparison with a frame causes the score in the node to be passed to one or more subsequent nodes (including the silence node 2612) through a path 2965.

Each state of a node may be represented by four values: a score, a starting time, a leaving penalty, and a staying penalty. The score represents the likelihood that a series of frames has placed the lexical tree in the state (i.e., the probability that the series of frames corresponds to the word or portion of a word to which the state corresponds). The scores are maintained as negative logarithmic values.

The starting time identifies the hypothesized time at which the user began to speak the word or words represented by the state. In particular, the starting time identifies the time at which the score associated with the state entered the lexical tree (i.e., the time at which the score was passed from the state 2940 along the path 2950).

The leaving and staying penalties are fixed values associated with the state. The staying penalty is added to any score that stays in the state. The staying penalty is related inversely to the length of the sound represented by the state and to the length of the phoneme represented by the node to which the state belongs. For example, the staying penalty could be proportional to $-\log(1-1/d_{avg})$, where $d_{avg}$ is the average duration, in frames, of the sound represented by the state. Thus, the staying penalty has a relatively large value when the sound corresponding to the state occurs for only a small amount of time and a relatively small value when the sound corresponding to the state occurs for a large amount of time.

The leaving penalty is added to any score that exits the state, and includes a duration component and a language model component. The duration component is related directly to the length of the sound represented by the state and to the length of the phoneme represented by the node to which the state belongs. For example, the duration component of the leaving penalty could be proportional to $-\log(1/d_{avg})$. Thus, the duration component of the leaving penalty has a relatively large value when the sound corresponding to the state occurs for a large amount of time and a relatively small value when the sound corresponding to the state occurs for a small amount of time.

The language model components of the leaving penalties for all states in a particular node together represent a language model score for the phoneme associated with that node. The language model score represents the likelihood that a word including the phoneme will occur in speech. The language model score included in the leaving penalties for a node is the increase in the best language model score for the branch of the lexical tree that begins with the node relative to the branch of the lexical tree that begins with the node's parent.

The following discussion assumes that there are no leaving or staying penalties associated with the state 2940 or the state 2960. The same result could be achieved by setting the leaving and staying penalties for states 2940 and 2960 equal to zero. The following discussion also assumes that the first frame is the first frame that may correspond to speech instead of silence.

FIG. 30 provides a simplified example of how scores propagate through the lexical tree. Before the first frame is retrieved (row 3000), state 2940 (which corresponds to silence) has a score of 0 and no other nodes are active. The score of 0 means that there is a one hundred percent probability that the system is starting from silence.

After the first frame is retrieved (row 3005), the score for the state 2940 ($S_{A1}$) is set equal to the acoustic score ($A_{A1}$) resulting from an acoustic match of the first frame with an acoustic model corresponding to the state 2940 (i.e., the acoustic model for silence). Thus, the score for the state 2940 ($S_{A1}$) is set equal to the likelihood that the first frame corresponds to silence.

Retrieval of the first frame also causes the state 2905 to become an active state. Assuming that the node 2900 corresponds to a phoneme that starts a word, the score for the state 2905 ($S_{B1}$) is set equal to the acoustic score ($A_{B1}$) resulting from an acoustic match of the first frame with the acoustic model corresponding to the state 2905. Thus, the score for the state 2905 ($S_{B1}$) is set equal to the likelihood that the first frame corresponds to the state 2905. The starting time for the state 2905 is set equal the time associated with the first frame. This value for the starting time indicates that the score at state 2905 represents a word that started at a time corresponding to the first frame. The starting time moves with the score as the score propagates through the lexical tree.

After the second frame is retrieved (row 3010), the score for the state 2940 ($S_{A2}$) is set equal to the sum of the previous score for the state ($S_{A1}$) and the acoustic score ($A_{A2}$) resulting from an acoustic match of the second frame with the acoustic model for silence:

$$S_{A2}=S_{A1}+A_{A2}=A_{A1}+A_{A2}.$$

As noted above, each of the scores corresponds to a negative logarithmic probability. Accordingly, adding scores together corresponds to multiplying the probabilities. Thus, the score for the state 2940 ($S_{A2}$) equals the likelihood that both of the first and second frames correspond to silence. This process is repeated for subsequent frames (e.g., lines 3015 and 3020) so that the score for the state 2940 at a frame "n" ($S_{An}$) equals:

$$S_{An} = S_{An-1} + A_{An} = \sum_{m=1}^{n} A_{Am}.$$

This expression assumes that the silence node 2612 is not reseeded from the root node 2605. If reseeding occurs at a frame n, then the value of $S_{An-1}$ would be replaced by the score in the root node 2605 for the frame n−1.

After the second frame is retrieved, the score for the state 2905 ($S_{B2}$) is set equal to:

$$S_{B2}=\min(S_{B1}+\text{stay}_B, S_{A1})+A_{B2},$$

where $A_{B2}$ is the acoustic score resulting from an acoustic match of the second frame with the acoustic model corresponding to state 2905 and $\text{stay}_B$ is the staying penalty for state 2905. The score for state 2905 ($S_{B2}$) corresponds to the more likely of two alternatives: (1) the first frame was silence and the second frame was the sound represented by the state 2905 or (2) both of the first and second frames were the sound represented by the state 2905. The first alternative corresponds to a transition from state 2940 to state 2905 along the path 2950. The second alternative corresponds to a transition from state 2905 back to state 2905 along path 2920. When the first alternative is the more likely, the starting time corresponding to the first frame that was stored previously for the state 2905 is replaced by a value corresponding to the second frame. This value indicates that the score at state 2905 represents a word that started with the second frame.

After the second frame is retrieved, the state 2910 becomes an active state. The score for the state 2910 ($S_{C2}$) is set equal to:

$$S_{C2}=S_{B1}+\text{leave}_B+A_{C2},$$

where $A_{C2}$ is the acoustic score resulting from an acoustic match of the second frame with the acoustic model corresponding to state 2910 and $\text{leave}_B$ is the leaving penalty for the state 2905. Similarly, $\text{leave}_C$ and $\text{leave}_D$ are leaving penalties for, respectively, states 2910 and 2915. The sum of language model components of $\text{leave}_B$, $\text{leave}_C$ and $\text{leave}_D$ represents the language model score for the phoneme represented by the node 2900.

The methodology for determining state scores for states other than the silence state can be expressed more generally as:

$$S_{i,j}=\min(S_{i,j-1}+\text{stay}_i, S_{i-1,j-1}+\text{leave}_{j-1})+A_{i,j}.$$

for i greater than zero (where i equals zero corresponds to silence), and with the boundary condition that the score for an inactive state equals infinity or some sufficiently large value. The starting time for the state may be represented as:

$$t_{i,j}=t_{i,j-1} \text{ for } S_{i,j-1}+\text{stay}_i \leq S{i-1},j-1+\text{leave}_{j-},$$

or $$t_{i,j}=t_{i-1,j-1} \text{ for } S_{i,j-1}+\text{stay}_i > S{i-1},j-1+\text{leave}_{j-1},$$

for i and j greater than zero and with the boundary condition that the time value for a newly active state represents the frame at which the state became active. As previously noted, state scores for the silence state may be determined as:

$$S_{0,j} = S_{0,j-1} + A_{0,j} = \sum_{m=1}^{j} A_{0,m},$$

with the boundary condition that $S_{0,0}$ equals zero. An even more general form, in which the scores are expressed as functions of the various parameters, is illustrated in FIG. 31.

Figure 32:
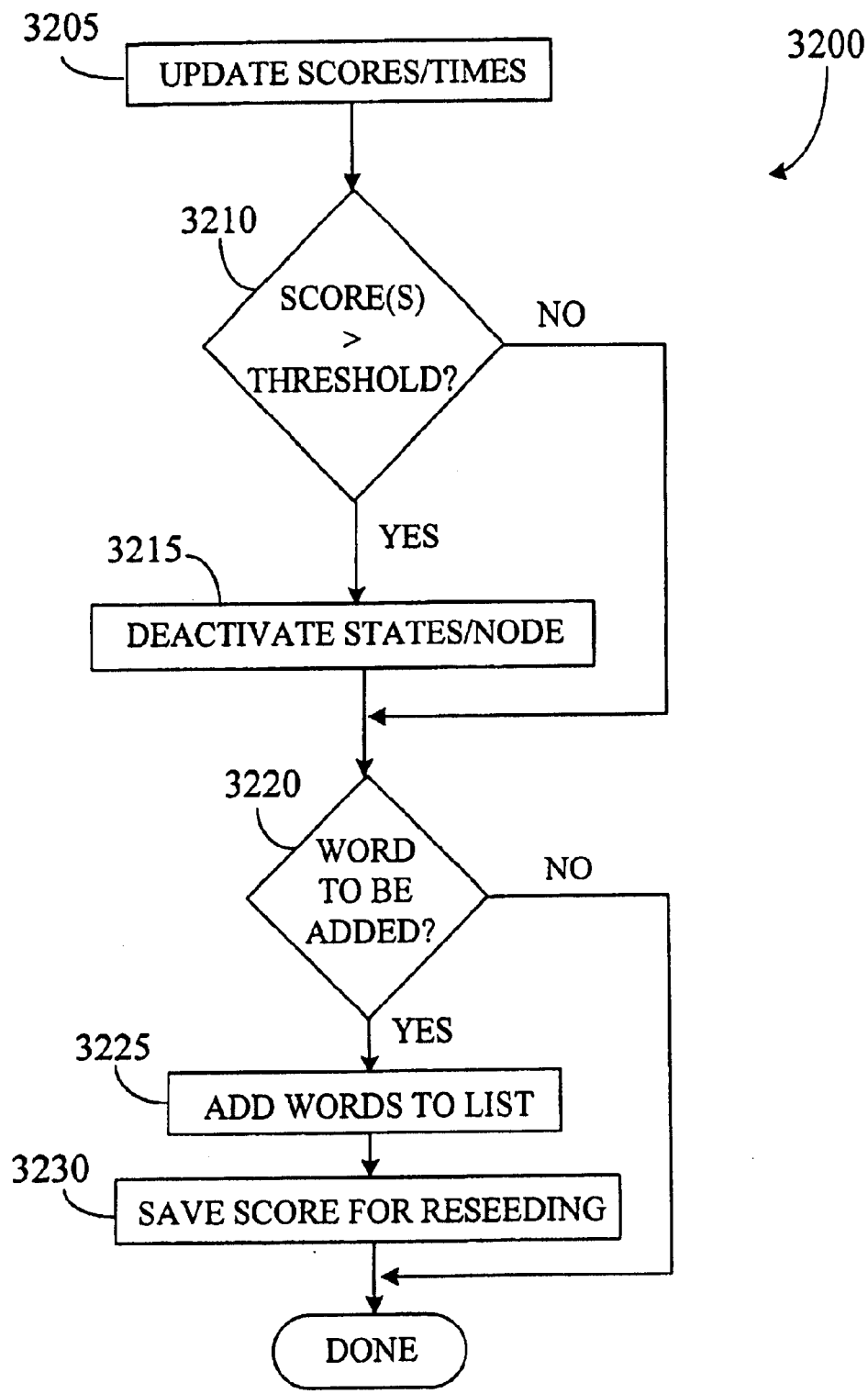
FIG. 32 is a flow chart of a procedure for processing nodes of a lexical tree.

Referring to FIG. 32, a node may be processed according to a node-processing procedure 3200. Initially, the node-processing procedure updates the scores and time values for each state of the node (step 3205). The node-processing procedure updates the scores and time values by generating acoustic scores and using the equations discussed above.

When the last state of the node was active prior to updating the scores for the node, the node-processing procedure uses the score for the last state to generate scores for any inactive subnodes of the node. If the generated score for a subnode does not exceed a pruning threshold, then the node-processing procedure activates that subnode and provides the subnode with the generated score.

Next, the node-processing procedure determines whether the score of any state of the node exceeds the pruning threshold (step 3210). When a score exceeds the pruning threshold, the likelihood that the word represented by the score was spoken is deemed to be too small to merit further consideration. For this reason, the procedure prunes the lexical tree by deactivating any state having a score that exceeds the pruning threshold (step 3215). If every state of the node is deactivated, then the node-processing procedure also deactivates the node. The node-processing procedure may deactivate a node or state by deleting a record associated with the node or state, or by indicating in the record that the node or state is inactive. Similarly, the node-processing procedure may activate a node or state by creating a record and associating the record with the node or state, or by indicating in an existing record that the node or state is active. The procedure may use a dynamic pruning threshold that accounts for variations in the average or best score in the lexical tree at any given time.

Next, the node-processing procedure determines whether a word is to be added to a list of words (step 3220). A word is added to the list of words when the node being processed corresponds to the last phoneme of a word, a score has been propagated out of the last state of the node, and the score is less than a list threshold. Before comparing the score to the list threshold, the node-processing procedure adds a language model score to the score. The language model score corresponds to the difference between the language model score for the word and the incremental language model score that is already included in the score. In general, the list threshold has a lower value than the pruning threshold. If the node being processed corresponds to the last phoneme of multiple words having the same phonetic spelling, then all of the words to which the node corresponds are added to the list of words.

If the noted conditions are met, the node-processing procedure adds the word or words to the list (step 3225). A word is stored in the list of words along with the score propagated out of the last state. If the word is on the list already, then the node-processing procedure stores with the list the better of the score already stored with the list or the score propagated out of the last state. The scores for words in a list of words are returned along with the list of words. The recognizer 1815 uses these scores in making the detailed match.

The node-processing procedure also adds the word to lists of words for times that precede or follow the starting time to account for possible inaccuracies in the starting time of the word that may result from selecting the better of a score that remains in a state or a score propagated from a prior state. Spreading the word across multiple lists ensures that these inaccuracies will not impinge on the accuracy of the speech recognition system. The node-processing procedure spreads the word across multiple lists based on the length of the word.

After adding a word to the list of words (step 3225), the node-processing procedure saves the score associated with the word as a reseeding score for use in reseeding the tree (step 3230). Production of a word by the lexical tree means that the current frame may correspond to the last frame of the word (with the probability of such a correspondence being reflected by the score associated with the word). This means that the next frame may correspond to the beginning of a word or to silence resulting, from a pause between words. The pre-filtering procedure reseeds the tree (step 2830 of FIG. 28) to account for this possibility.

For a given frame, multiple nodes may produce words. However, the tree only needs to be reseeded once. To account for this, the node-processing procedure only saves the score associated with a word ($S_w$) as the reseeding score ($S_{RS}$) if the word is the first word to be generated by the tree for the current frame of if the word score is less than the score for all other words generated by previously-processed nodes for the current frame ($S_{RS}'$):

$S_{RS} = \min(S_w, S_{RS}')$.

Saving only the lowest score (i.e., the score indicating the highest probability that the current frame was the last frame of a word) ensures that the tree will be reseeded using the highest probability that the next frame is the first frame of a new word.

To reseed the tree (step 2830 of FIG. 28), the pre-filtering procedure activates the root node 2605 and associates the minimum of the reseeding score ($S_{RS}$) and the score for the silence node 2612 with the root node. During processing of the next frame, the active root node 2605 may be used to activate nodes in the group 2610 or to activate the silence node 2612.

Processing of the node is complete after the node-processing procedure saves a score for use in reseeding the tree (step 3230), or if no word is to be added to the list of words (step 3220). The lexical tree pre-filtering procedure is discussed in detail in U.S. application Ser. No. 08/701,393, entitled "LEXICAL TREE PRE-FILTERING IN SPEECH RECOGNITION" and filed Aug. 22, 1996, which is incorporated by reference.

After the pre-filtering procedure responds with the requested list of words, the recognizer initiates a hypothesis for each word from the list and compares acoustic models for the word to the frames of parameters representing the utterance. The recognizer uses the results of these comparisons to generate scores for the hypotheses. Hypotheses having excessive scores are eliminated from further consideration. As noted above, hypotheses that comply with no active constraint grammar also are eliminated.

When the recognizer determines that a word of a hypothesis has ended, the recognizer requests from the pre-filtering procedure a list of words that may have been spoken just after the ending-time of the word. The recognizer then generates a new hypotheses for each word on the list, where each new hypothesis includes the words of the old hypothesis plus the corresponding new word from the list.

In generating the score for a hypothesis, the recognizer uses acoustic scores for words of the hypothesis, a language model score that indicates the likelihood that words of the hypothesis are used together, and scores provided for each word of the hypothesis by the pre-filtering procedure. The scores provided by the pre-filtering procedure include components corresponding to a crude acoustic comparison and a language model score indicative of the likelihood that a word is used, independently of context. The recognizer may eliminate any hypothesis that is associated with a constraint grammar (e.g., a command hypothesis), but does not comply with the constraint grammar.

Figure 33:
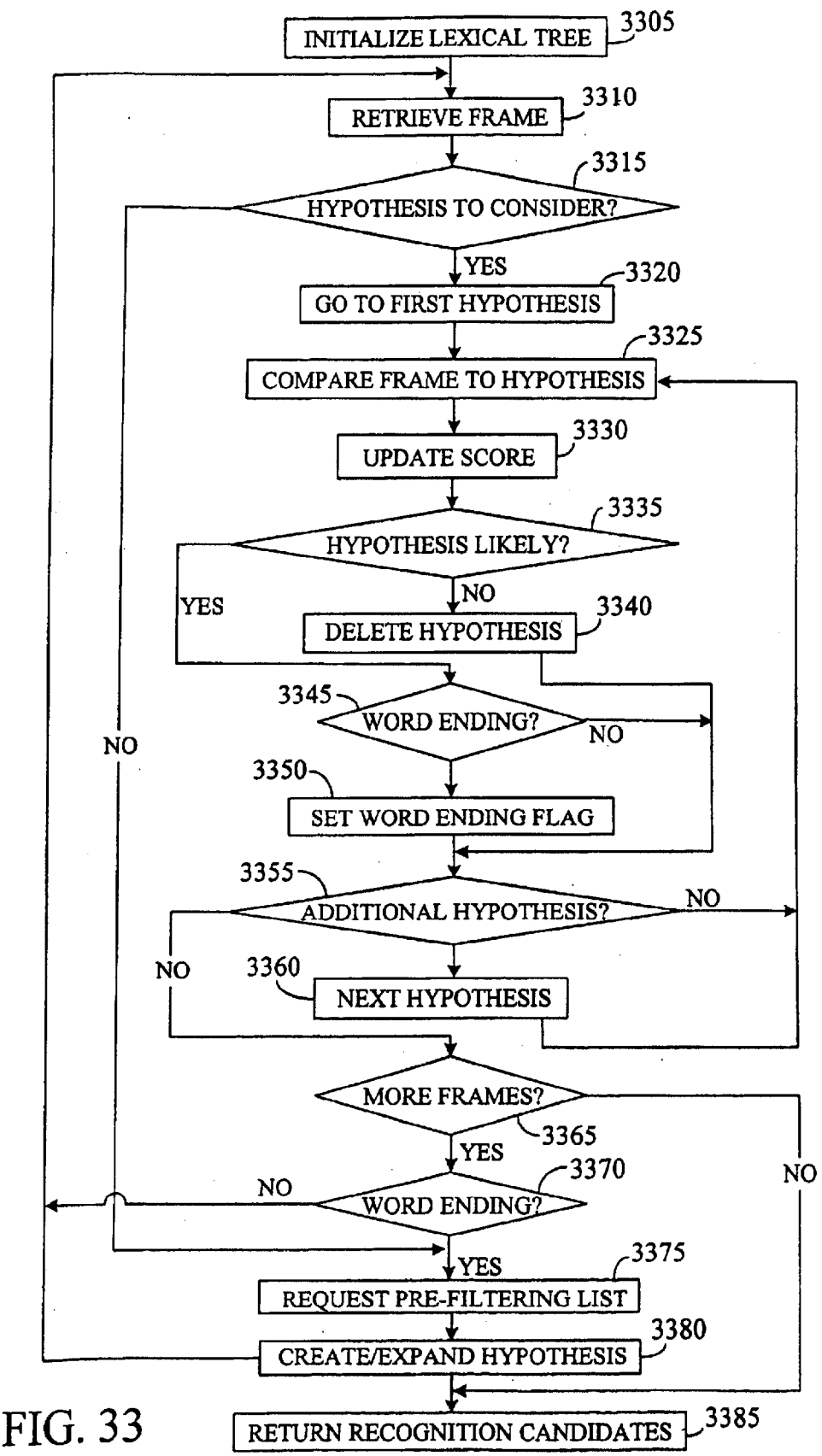
FIG. 33 is a flow chart of a speech recognition procedure.

Referring to FIG. 33, the recognizer 1815 operates according to a procedure 3300. First, prior to processing, the recognizer 1815 initializes the lexical tree 2600 as described above (step 3305). The recognizer 1815 then retrieves a frame of parameters (step 3310) and determines whether there are hypotheses to be considered for the frame (step 3315). The first frame always corresponds to silence so that there are no hypotheses to be considered for the first frame.

If hypotheses need to be considered for the frame (step 3315), the recognizer 1815 goes to the first hypothesis (step 3320). The recognizer then compares the frame to acoustic models 1835 for the last word of the hypothesis (step 3325) and, based on the comparison, updates a score associated with the hypothesis (step 3330).

After updating the score (step 3330), the recognizer determines whether the user was likely to have spoken the word or words corresponding to the hypothesis (step 3335). The recognizer makes this determination by comparing the current score for the hypothesis to a threshold value. If the score exceeds the threshold value, then the recognizer 1815 determines that the hypothesis is too unlikely to merit further consideration and deletes the hypothesis (step 3340).

If the recognizer determines that the word or words corresponding to the hypothesis were likely to have been spoken by the user, then the recognizer determines whether the last word of the hypothesis is ending (step 3345). The recognizer determines that a word is ending when the frame corresponds to the last component of the model for the word. If the recognizer determines that a word is ending (step 3345), the recognizer sets a flag that indicates that the next frame may correspond to the beginning of a word (step 3350).

If there are additional hypotheses to be considered for the frame (step 3355), then the recognizer selects the next hypothesis (step 3360) and repeats the comparison (step 3325) and other steps. If there are no more hypotheses to be considered for the frame (step 3355), then the recognizer determines whether there are more frames to be considered for the utterance (step 3365). The recognizer determines that there are more frames to be considered when two conditions are met. First, more frames must be available. Second, the best scoring node for the current frame or for one or more of a predetermined number of immediately preceding frames must have been a node other than the silence node (i.e., the utterance has ended when the silence node is the best scoring node for the current frame and for a predetermined number of consecutive preceding frames).

If there are more frames to be considered (step 3365) and the flag indicating that a word has ended is set (step 3370), or if there were no hypotheses to be considered for the frame (step 3315), then the recognizer requests from the pre-filtering procedure 1840 a list of words that may start with the next frame (step 3375).

Upon receiving the list of words from the pre-filtering procedure, the recognizer uses the list of words to create hypotheses or to expand any hypothesis for which a word has ended (step 3380). Each word in the list of words has an associated score. Prior to adding a list word to a hypothesis, the recognizer modifies the list score ($S_L$) for the word to produce a modified list score ($S_{ML}$) as:

$$S_{ML} = S_L + L_C - L_L,$$

where $L_C$ is a language model score that represents the frequency with which the pair of words that includes the list word and the immediately preceding word in the hypothesis are used together in speech, and $L_L$ is a language model score included in the list score and corresponds to the frequency with which the list word is used in speech, without reference to context. The recognizer then adds the modified list score to the score for the hypothesis and compares the result to a threshold value. If the result is less than the threshold value, then the recognizer maintains the hypothesis. Otherwise, the recognizer determines that the hypothesis does not merit further consideration and abandons the hypothesis. As an additional part of creating or expanding the hypotheses, the recognizer compares the hypotheses to the active constraint grammars 1825 and abandons any hypothesis that corresponds to no active constraint grammar. The recognizer then retrieves the next frame (step 3310) and repeats the procedure.

If there are no more speech frames to process, then the recognizer 1815 provides the most likely hypotheses to the control/interface module 1820 as recognition candidates (step 3385).

The control/interface module 1820 controls operation of the speech recognition software and provides an interface to other software or to the user. The control/interface module receives the list of recognition candidates for each utterance from the recognizer. Recognition candidates may correspond to dictated text, speech recognition commands, or external commands. When the best-scoring recognition candidate corresponds to dictated text, the control/interface module provides the text to an active application, such as a word processor. The control/interface module also may display the best-scoring recognition candidate to the user through a graphical user interface. When the best-scoring recognition candidate is a command, the control/interface module 1820 implements the command. For example, the control/interface module may control operation of the speech recognition software in response to speech recognition commands (e.g., "wake up", "make that"), and may forward external commands to the appropriate software.

The control/interface module also controls the active vocabulary, acoustic models, and constraint grammars that are used by the recognizer. For example, when the speech recognition software is being used in conjunction with a particular application (e.g., Microsoft Word), the control/interface module updates the active vocabulary to include command words associated with that application and activates constraint grammars associated with the application.

Other functions provided by the control/interface module 1820 include a vocabulary customizer and a vocabulary manager. The vocabulary customizer optimizes the language model of a specific topic by scanning user supplied text. The vocabulary manager is a developer tool which is used to browse and manipulate vocabularies, grammars and macros. Each such function of the control/interface module 1820 may be implemented as an executable program that is separate from the main speech recognition software. Similarly, the control/interface module 1820 also may be implemented as a separate executable program.

The control/interface module 1820 also may provide an enrollment program that uses an enrollment text and a corresponding enrollment grammar to customize the speech recognition software to a specific user. The enrollment program may operate in an interactive mode that guides the user through the enrollment process, or in a non-interactive mode that permits the user to enroll independently of the computer. In the interactive mode, the enrollment program displays the enrollment text to the user and the user reads the displayed text. As the user reads, the recognizer 1815 uses the enrollment grammar to match a sequence of utterances by the user to sequential portions of the enrollment text. When the recognizer 1815 is unsuccessful, the enrollment program prompts the user to repeat certain passages of the text. The recognizer uses acoustic information from the user's utterances to train or adapt acoustic models 1835 corresponding to the matched portions of the enrollment text. The interactive enrollment program is discussed in U.S. application Ser. No. 08/825,536, entitled "ENROLLMENT IN SPEECH RECOGNITION" and filed Mar. 28, 1997, which is incorporated by reference.

In the non-interactive mode, the user reads the text without prompting from the computer. This offers the considerable advantage that, in addition to reading text displayed by the computer, the user can read from a printed text independent of the computer. Thus, the user could read the enrollment text into a portable recording device and later download the recorded information into the computer for processing by the recognizer. In addition, the user is not required to read every word of the enrollment text, and may skip words or paragraphs as desired. The user also may repeat portions of the text. This adds substantial flexibility to the enrollment process.

The enrollment program may provide a list of enrollment texts, each of which has a corresponding enrollment grammar, for the user's selection. Alternatively, the user may input an enrollment text from another source. In this case, the enrollment program may generate the enrollment grammar from the input enrollment text, or may employ a previously generated enrollment grammar.

The control/interface module 1820 also implements error correction and cursor/position manipulation procedures of the speech recognition software 360. Error correction procedures include a "make that" command and a "spell that" command. Cursor/position manipulation procedures include the "select" command discussed above and variations thereof (e.g, "select [start] through [end]"), "insert before/after" commands, and a "resume with" command.

During error correction, word searches of the backup vocabularies start with the user-specific backup dictionary and then check the system-wide backup dictionary. The backup dictionaries also are searched when there are new words in text that a user has typed.

Figure 34A:
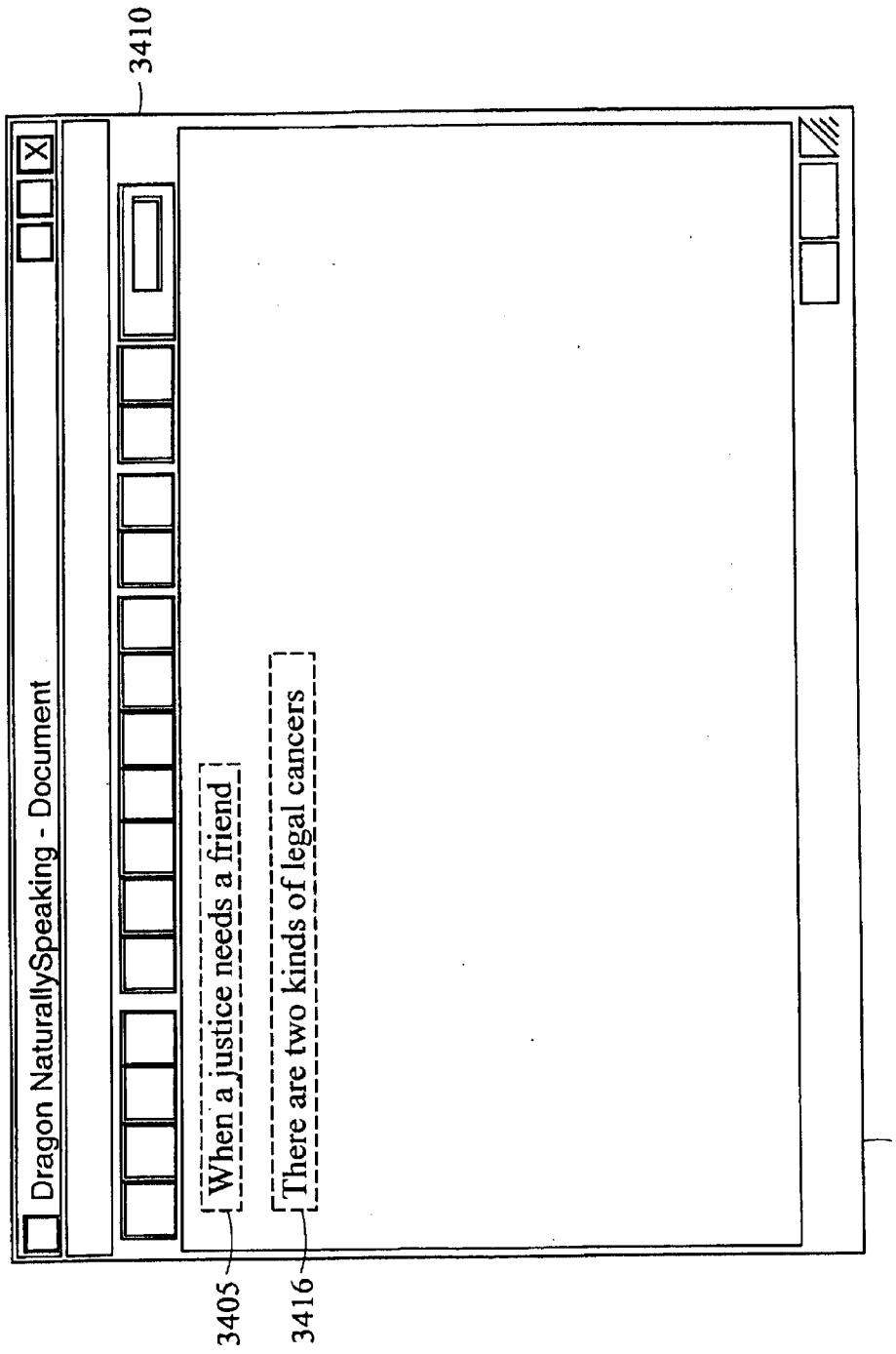
FIGS. 34A–34N are screen displays of a user interface of the speech recognition software of FIG. 23.

When the system makes a recognition error, the user may invoke an appropriate correction command to remedy the error. FIGS. 34A–34N illustrate a user interface provided by the control/interface module 1820 in response to a sequence of interspersed text and commands. As shown in FIG. 34A, the recognizer 1815 correctly recognizes a first utterance 3400 ("When a justice needs a friend New-Paragraph") and the control/interface module 1820 displays the results 3405 ("When a justice needs a friend") of recognizing the utterance in a dictation window 3410. The module 1820 displays text 3405 ("When a justice needs a friend") corresponding to a text portion of the utterance and implements the formatting command ("New-Paragraph") included in the utterance.

The recognizer 1815 incorrectly recognizes a second utterance 3415 ("there are two kinds of legal kibitzers") by incorrectly recognizing the word "kibitzers" as "cancers". The control/interface module 1820 displays this incorrect result 3416 ("There are two kinds of legal cancers") in the dictation window 3410. The control/interface module also displays the results of recognizing the current utterance, which, in this case, is the second utterance, in a display field 3420 at the bottom of the window 3410.

Figure 34B:
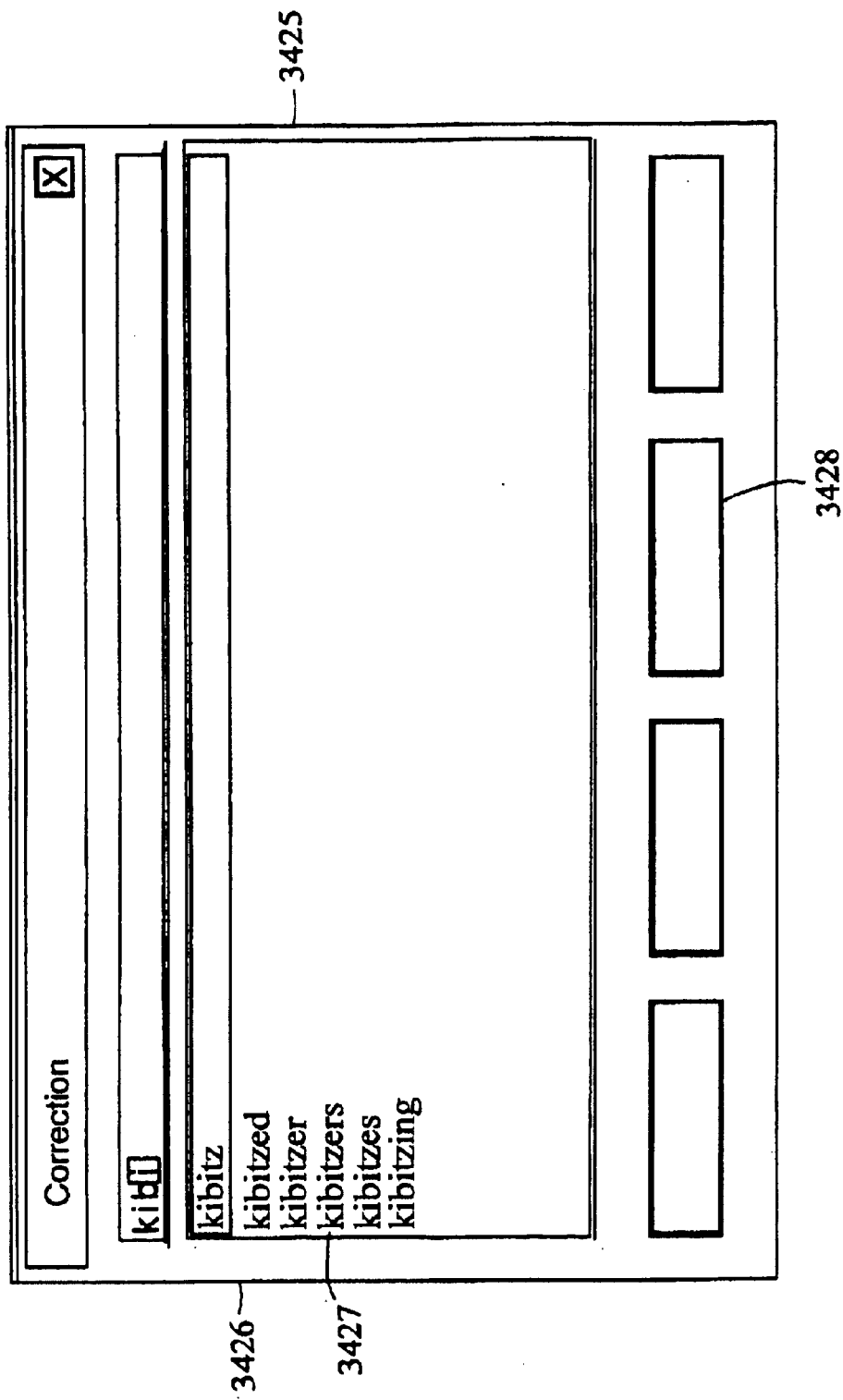

As shown in FIG. 34B, the user corrects the incorrect recognition by selecting the word "cancers" using the mouse 310 and saying "Spell That k i b i". The control/interface module responds to recognition of the "Spell That" command by displaying a correction dialog box 3425, such as is illustrated in FIG. 34B. The box 3425 displays a numbered list of words 3426 starting with the indicated letters ("kibi"). Instead of using the mouse 310 to select the word "cancer", the user could have verbally selected the word using a "Select" command by saying "Select cancer". Similarly, instead of saying "Spell That k i b i", the user could have typed the letters "k i b i".

Figure 34C:
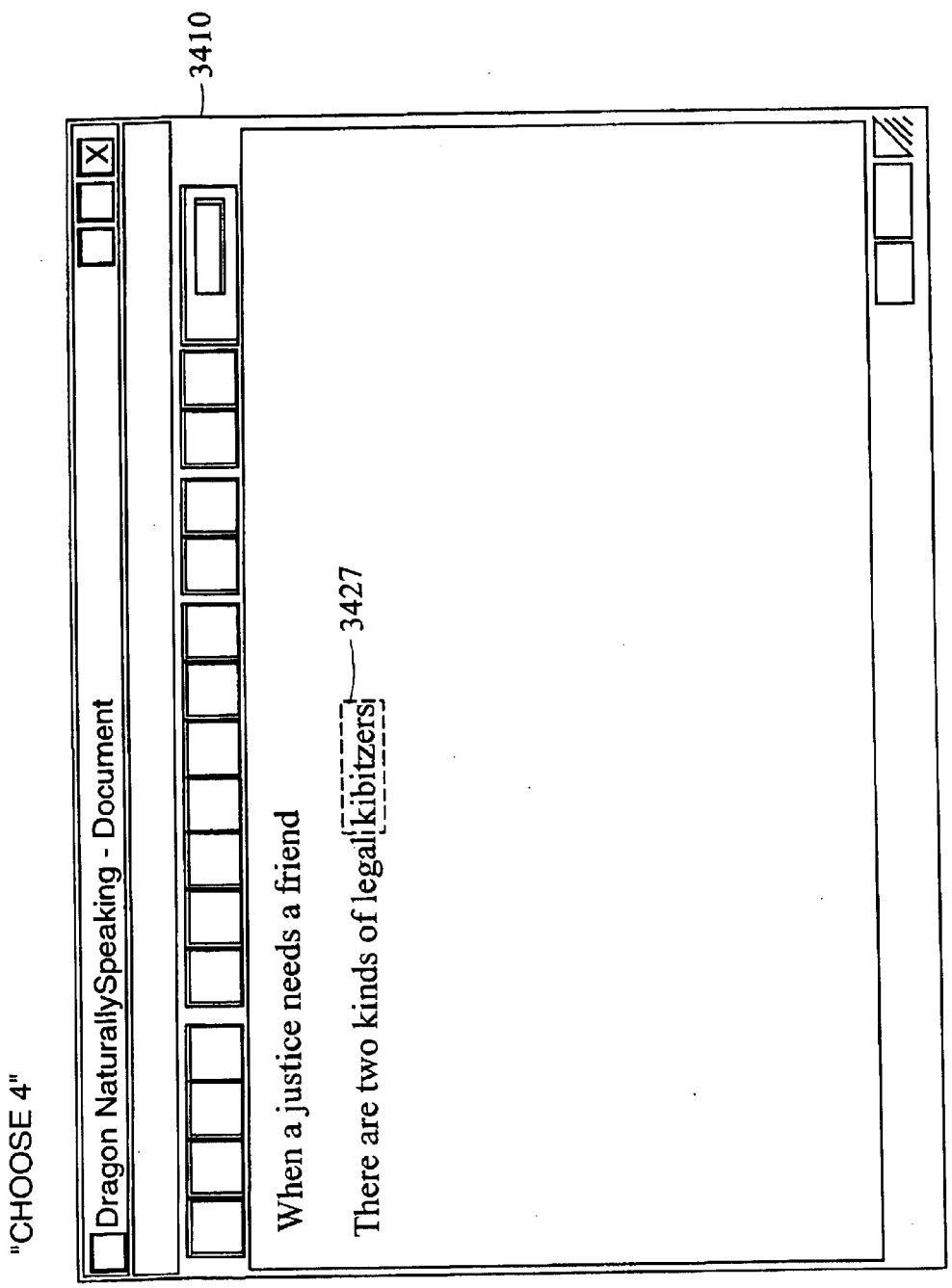

The user selects the correct word 3427 ("kibitzers") by saying "Choose 4", where "kibitzers" is the fourth word on the choice list. As shown in FIG. 34C, the control/interface module 1820 responds by replacing the incorrect word ("cancers") with the selected word 3427 in the dictation window 3410.

Referring again to FIG. 34B, the correction dialog box 3425 includes a "Train" button 3428. When the user selects this button, the control/interface module responds by prompting the user through a training session to obtain one or more samples from the user of the word or words to be trained. The recognizer uses these samples to adapt acoustic models for the words to the user's speech patterns.

Figure 34D:
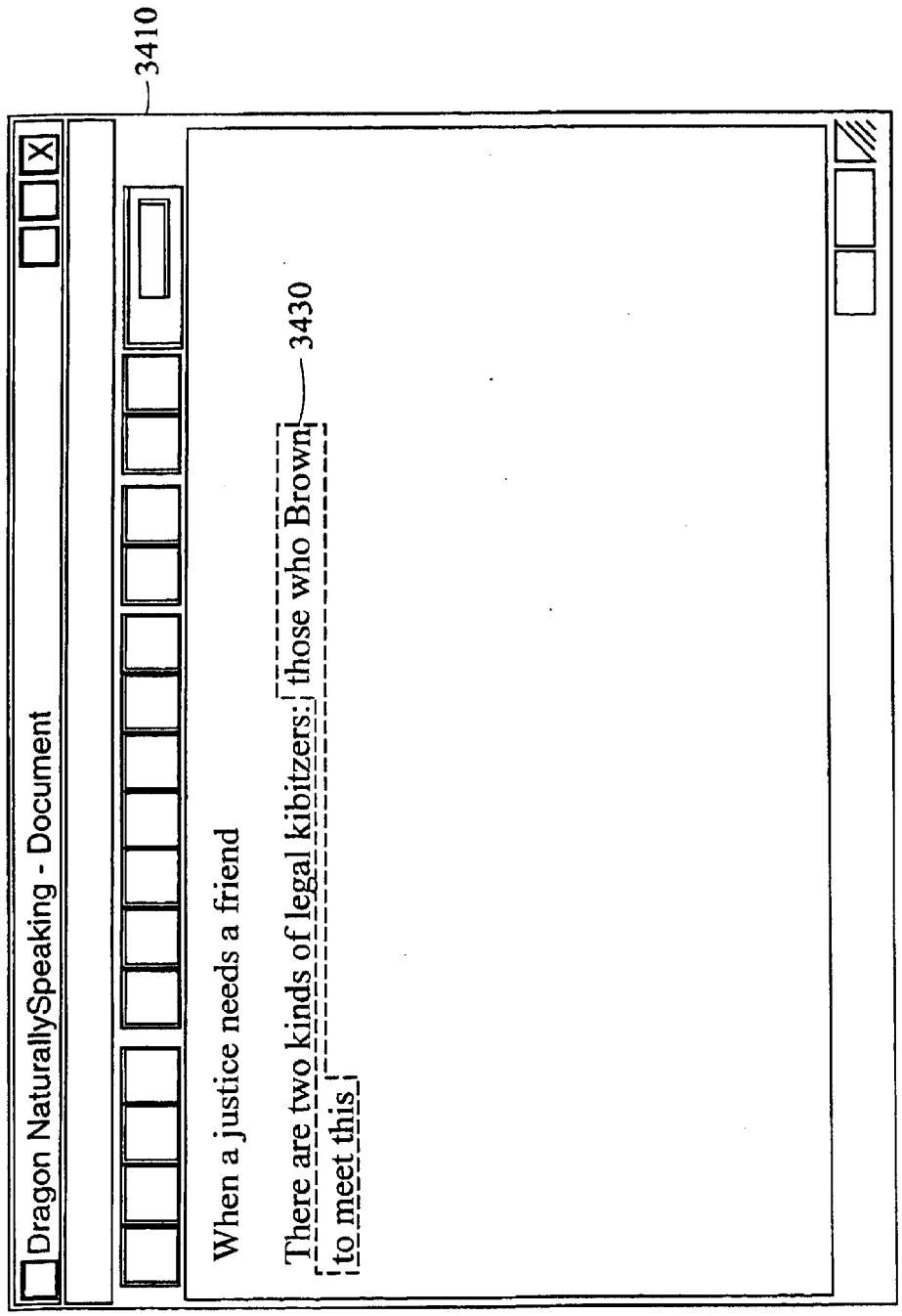
Figure 34E:
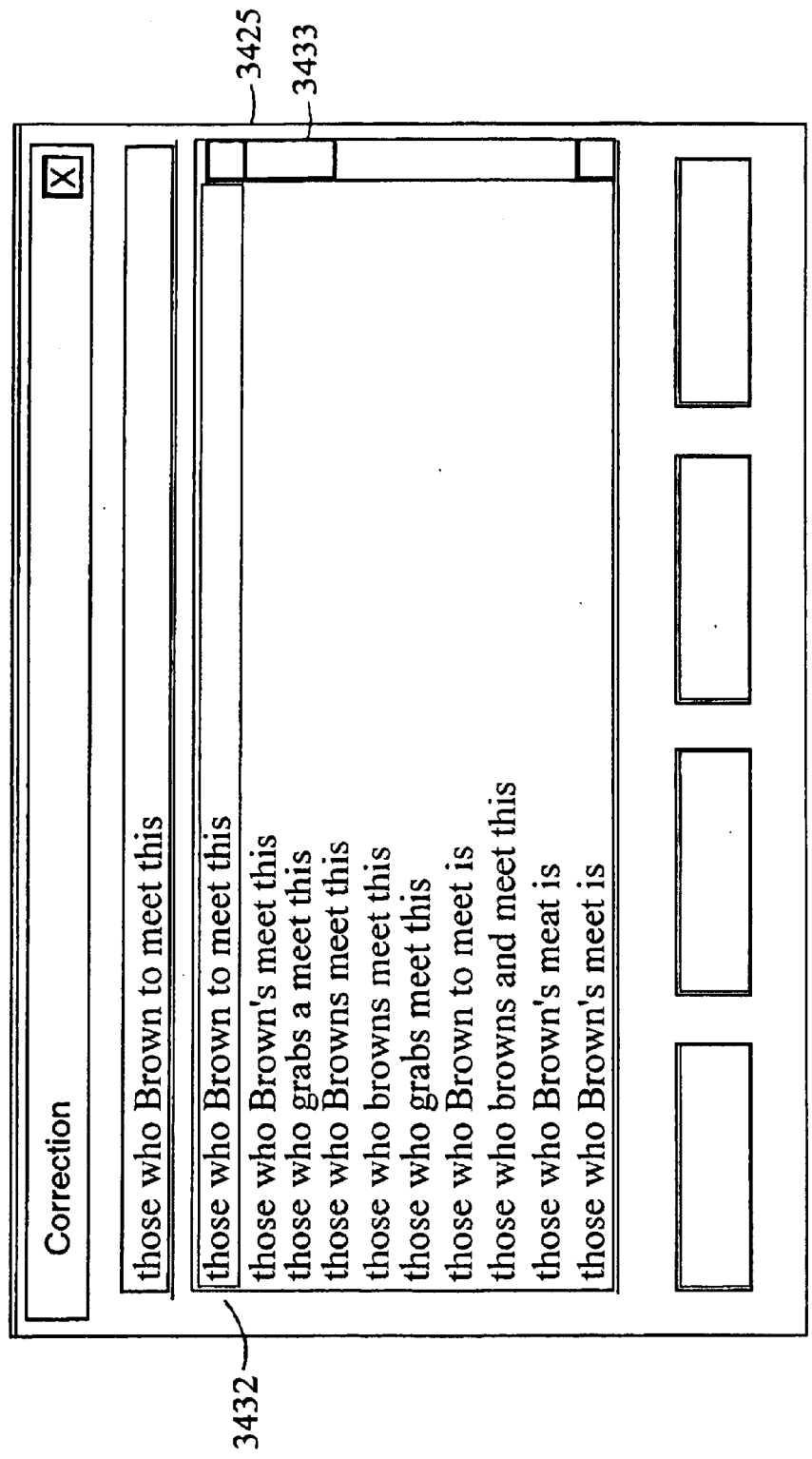

As shown in FIG. 34D, the recognizer 1815 next misrecognizes a third utterance 3429 ("those who pronounce amicus") and the control/interface module 1820 responds by inserting the incorrect text 3430 ("those who Brown to meet this") in the dictation window 3410. As shown in FIG. 34E, the user causes the control/interface module 1820 to generate the correction dialog box 3425 by saying the "Correct That" command 3431. The correction dialog box 3425 includes a list 3432 of recognition candidates for the entire utterance 3429. Though the dialog box 3425 permits only ten recognition candidates to be displayed at a single time, the list 3432 may include more than ten entries. Additional entries may be accessed using a scroll bar 3433.

Figure 34F:
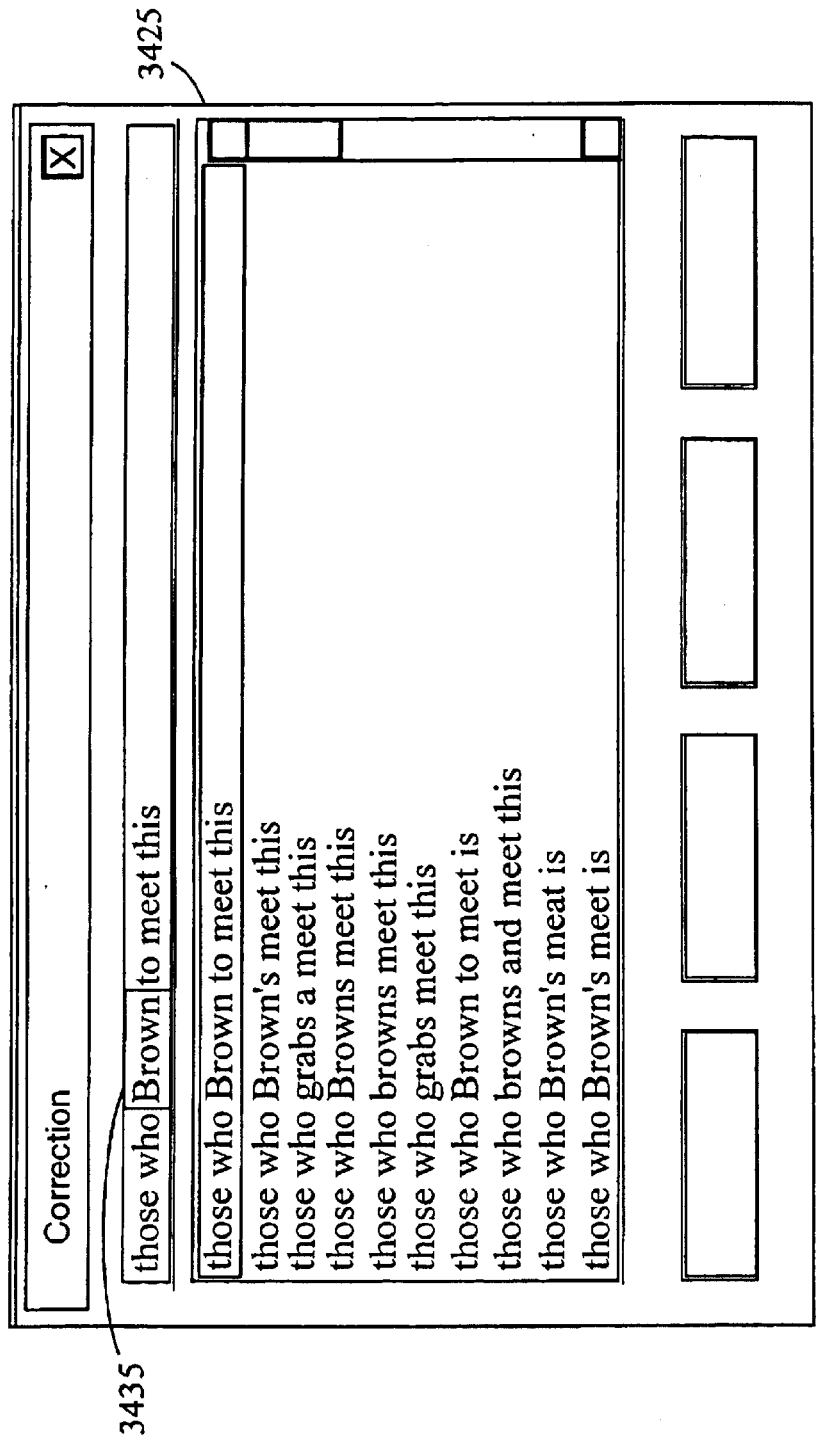
Figure 34G:
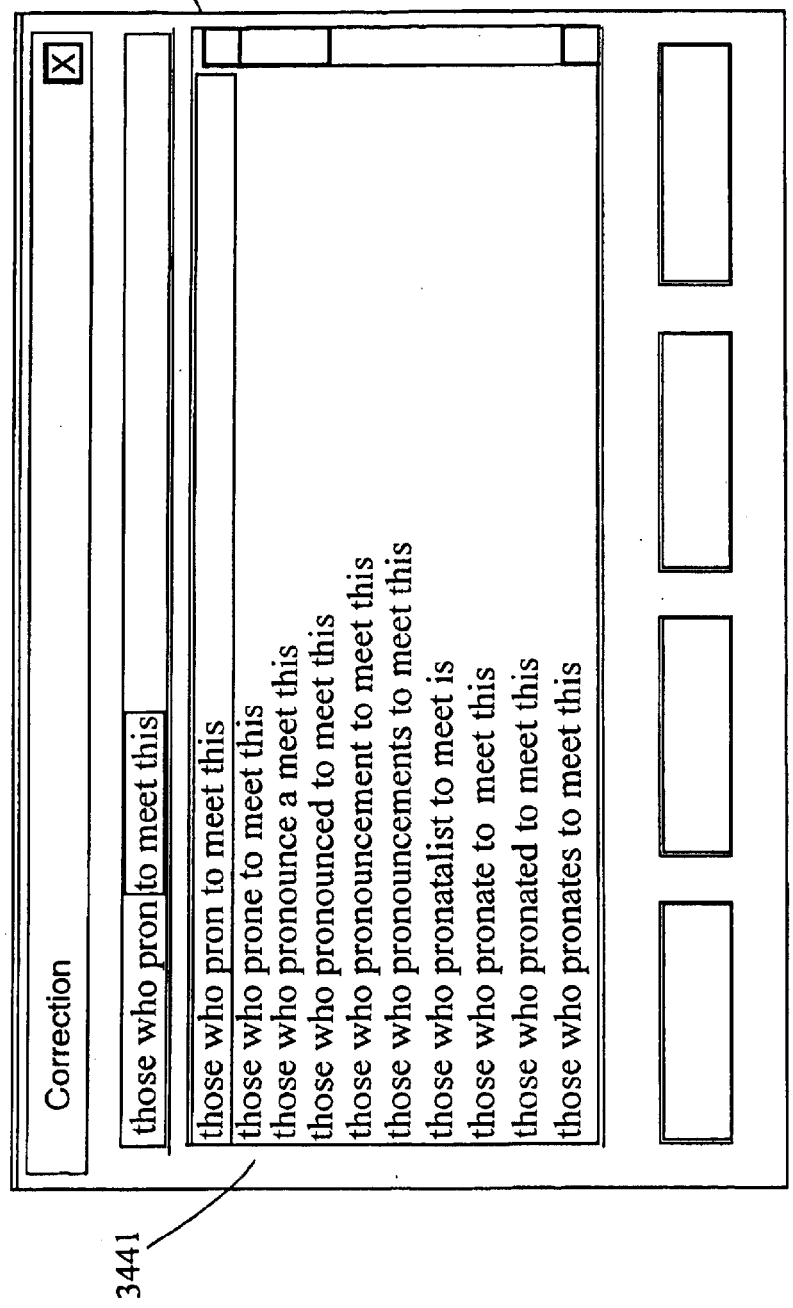

As shown in FIG. 34F, the user selects the word "Brown" 3435 using the mouse 310. As noted above, the user could also select the word "Brown" by using the voice command "Select Brown". As shown in FIG. 34G, the user then says "p r o n" 3440 to indicate that the word Brown should be replaced with a word starting with the letters "pron". The user could achieve the same result by typing the letters "pron". The control/interface module 1820 responds by producing an updated list 3441 of recognition candidates, where each recognition candidate includes a word starting with "pron" in the position previously occupied by the word "Brown". Each of the recognition candidates includes the correctly-recognized words that preceded "Brown" ("those who") and the words that followed "Brown" ("to meet this").

Figure 34H:
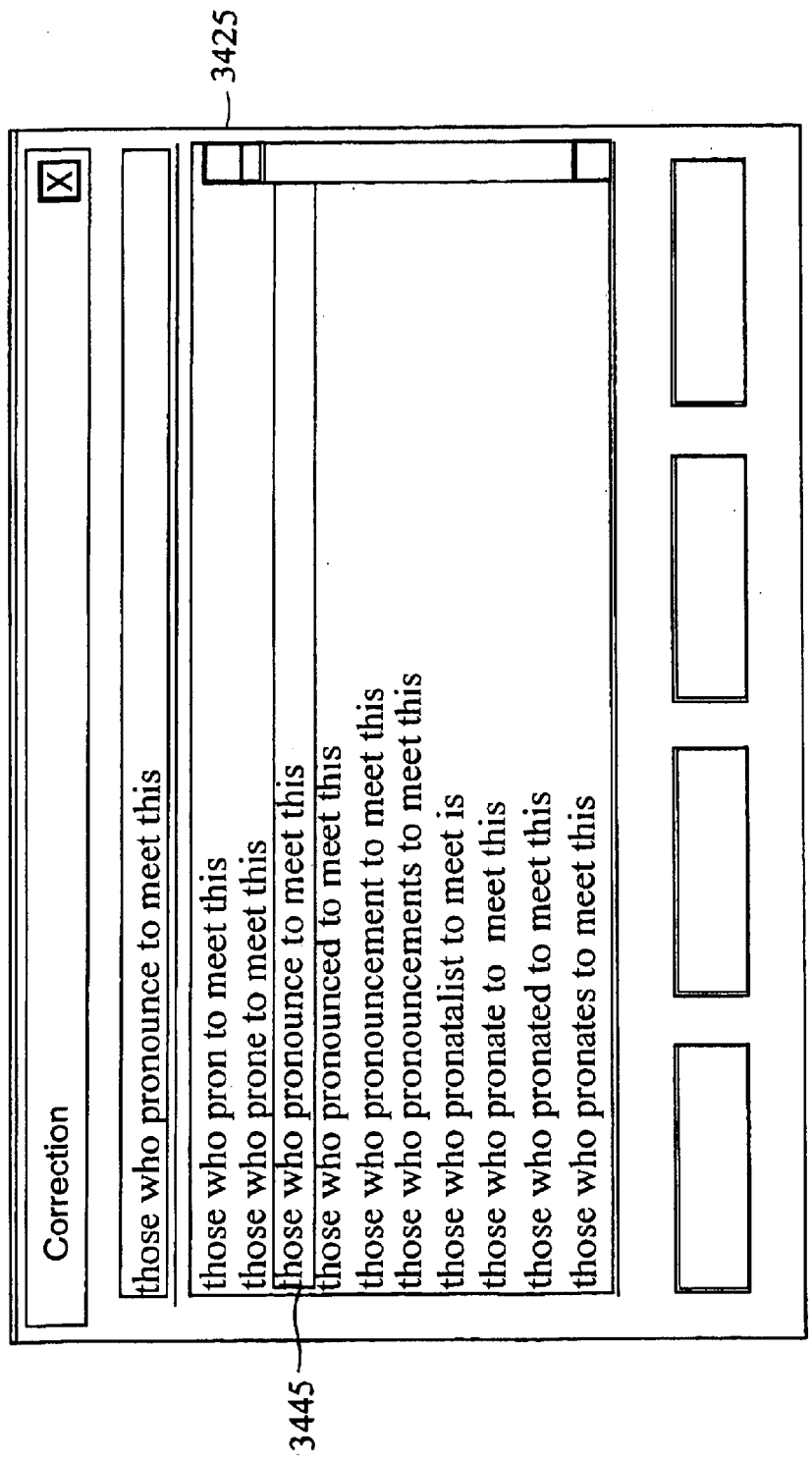

As shown in FIG. 34H, the user selects the recognition candidate 3445 that includes the word "pronounce" by using the mouse to select the third entry in the list. The user could achieve the same result by saying "Choose 3".

Figure 34I:
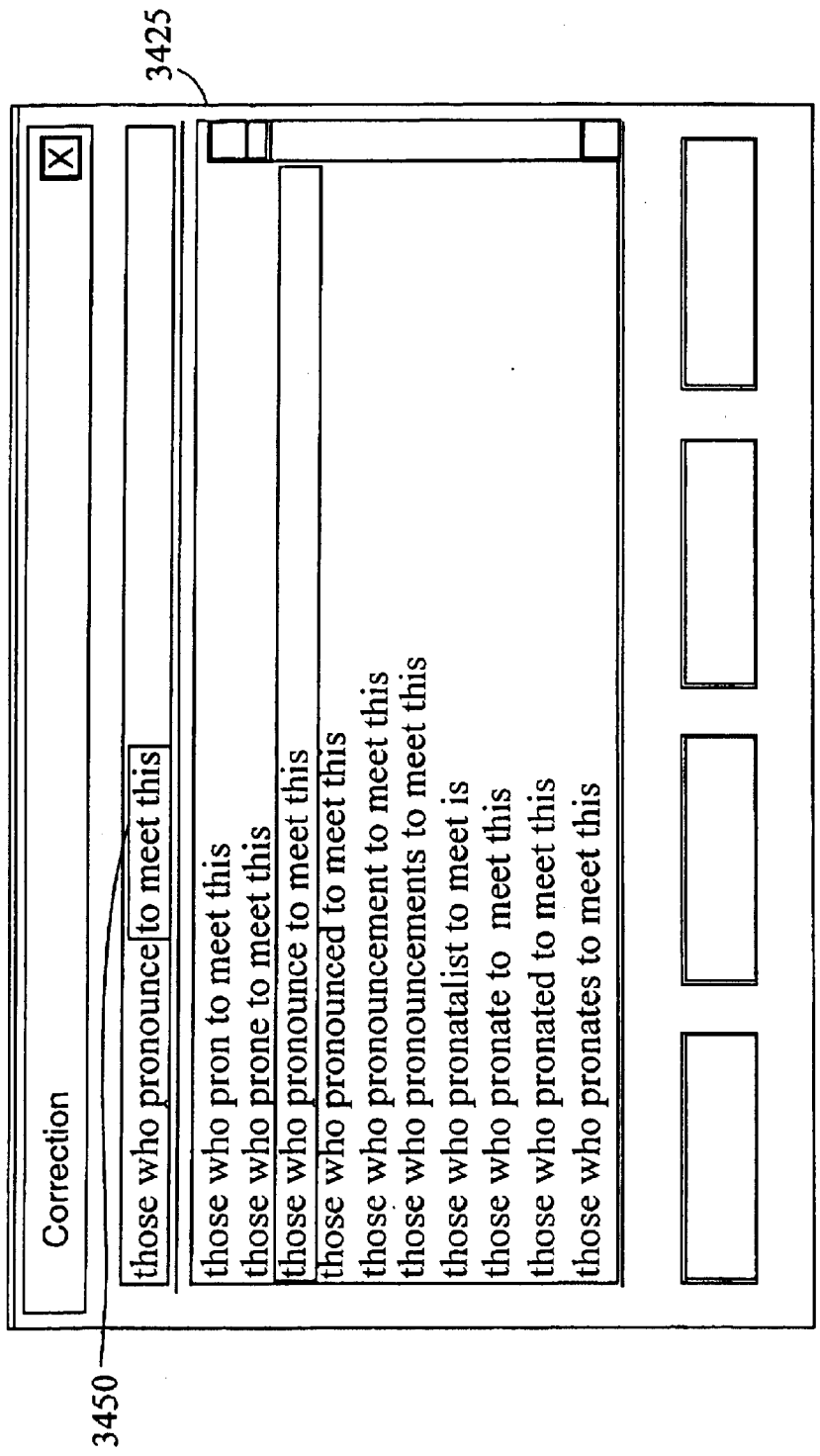
Figure 34J:
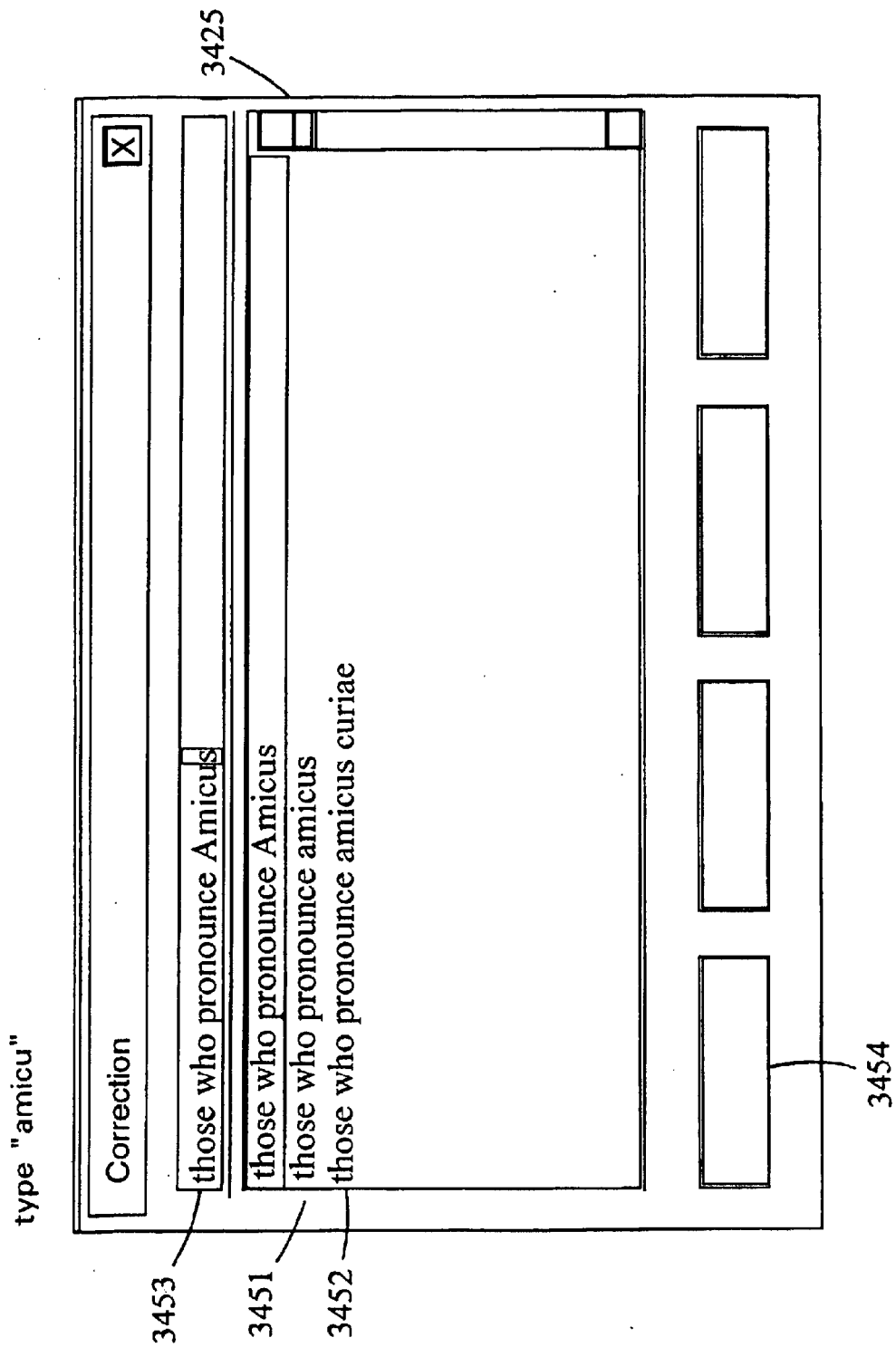
Figure 34K:
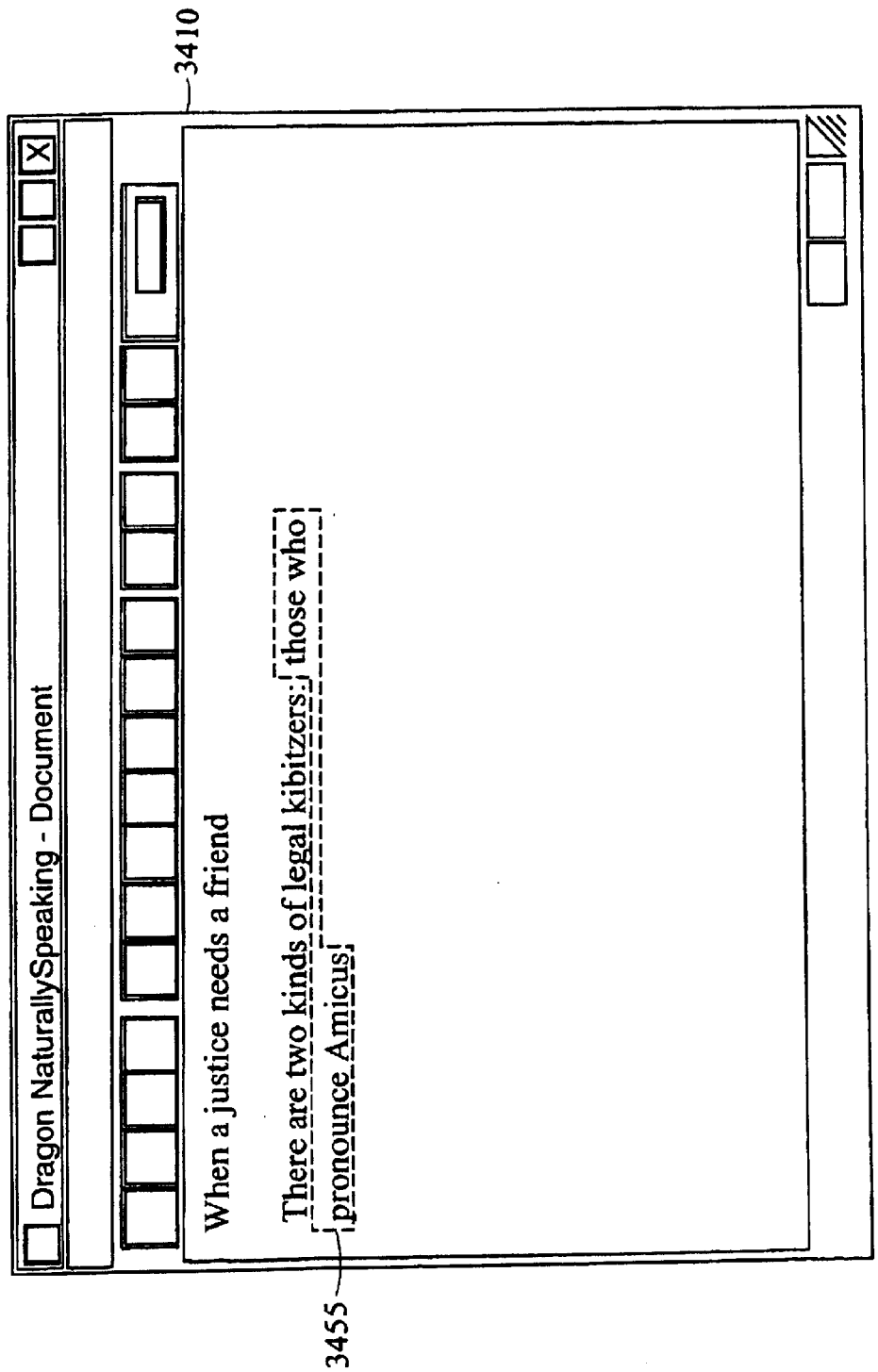

As shown in FIG. 34I, the user then uses the mouse to select the words "to meet this" 3450. Then, as shown in FIG. 34J, the user types the letters "amicu", and the control/interface module 1820 responds by producing an updated list 3451 of recognition candidates that start with the words "those who pronounce" and include a word starting with the letters "amicu". An entry 3452 of the list includes a phrase "amicus curiae" that starts with the letters "amicu". Since the first entry 3453 is the correct entry, the user clicks on an "OK" button 3454 at the bottom of the correction dialog box 3425. As shown in FIG. 34K, the control/interface module 1820 responds by placing the correct version 3455 of the utterance in the dictation window 3410. As discussed above, all of the correction steps for the utterance are performed within the same correction dialog box 3425.

Figure 34L:
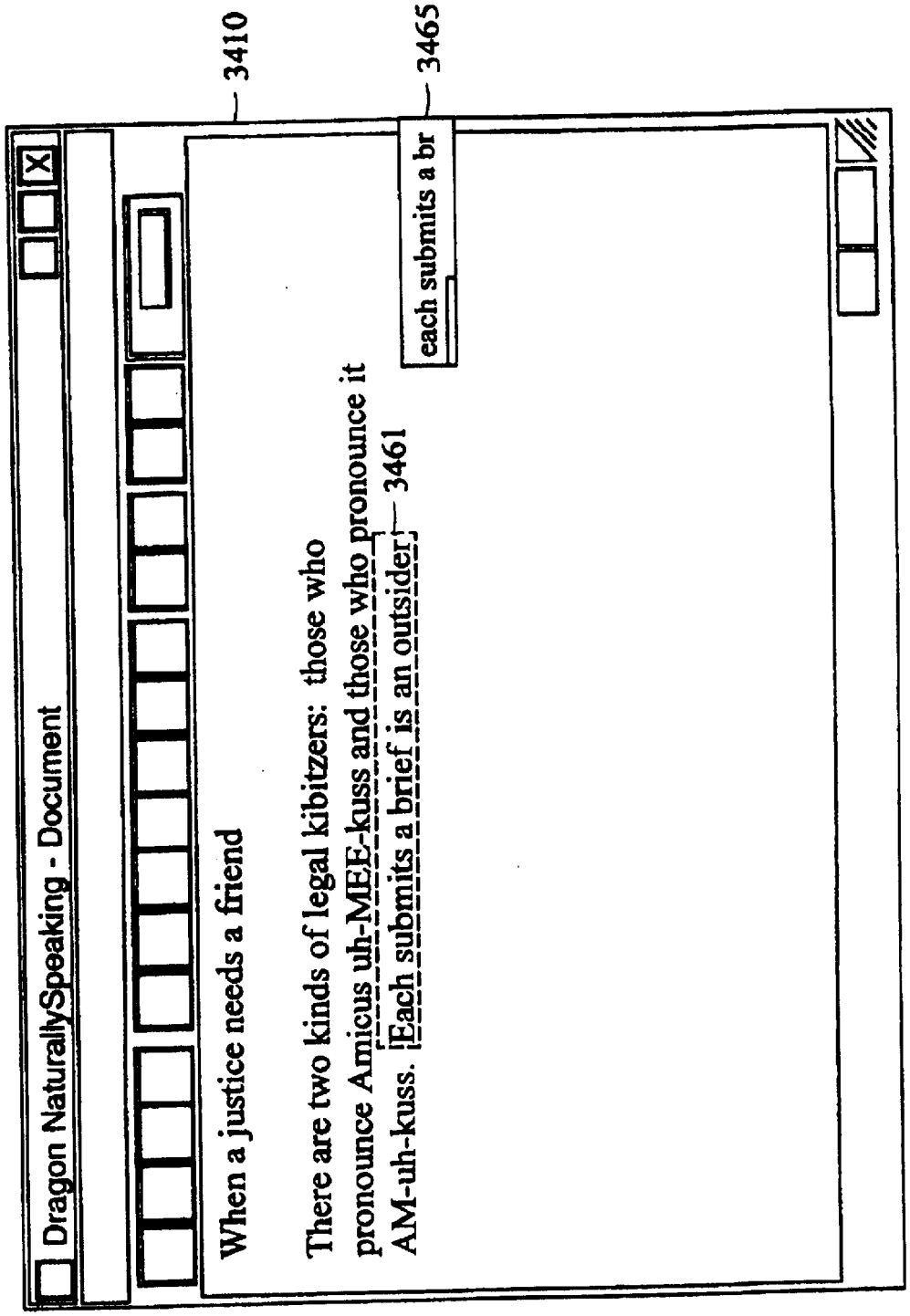
Figure 34M:
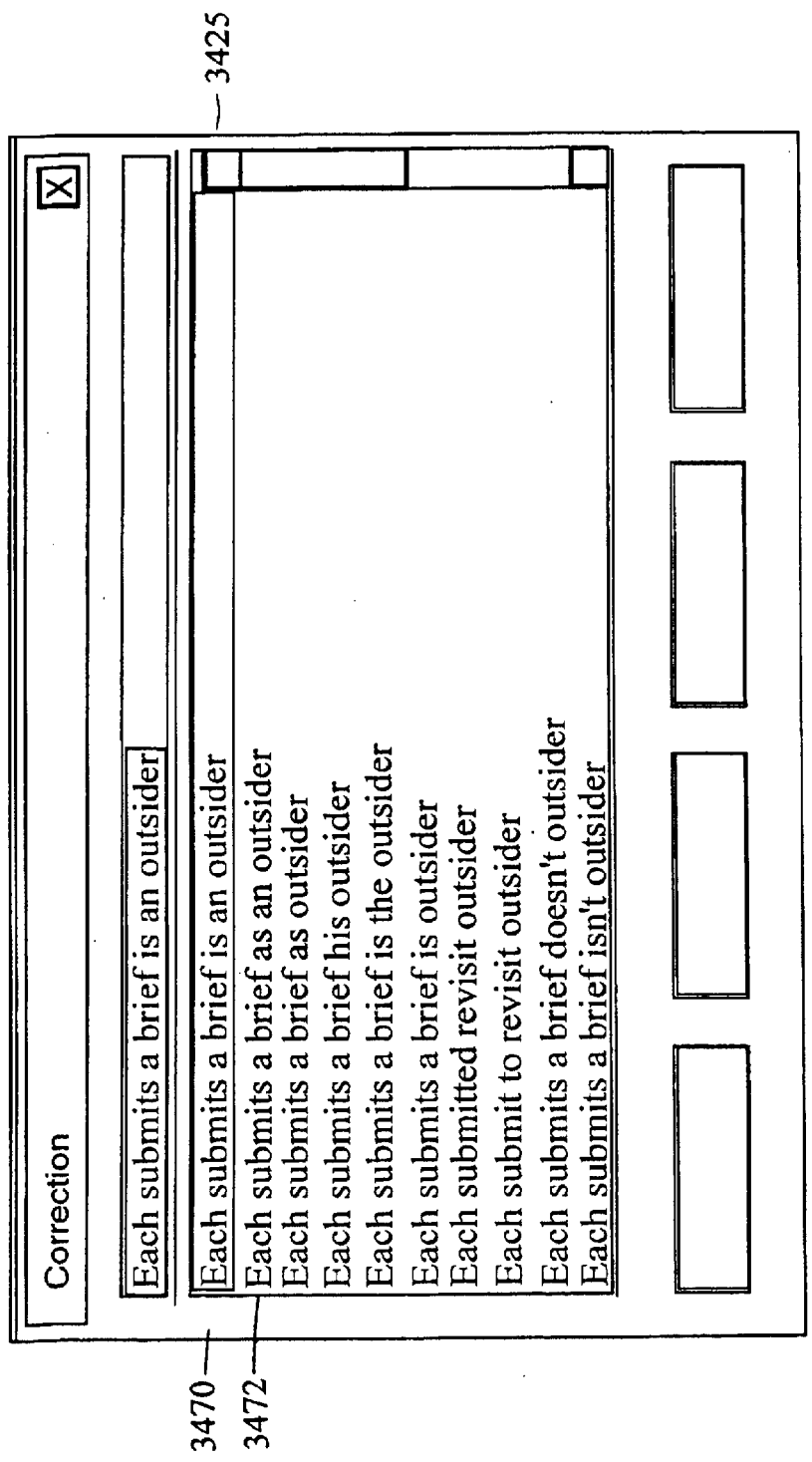
Figure 34N:
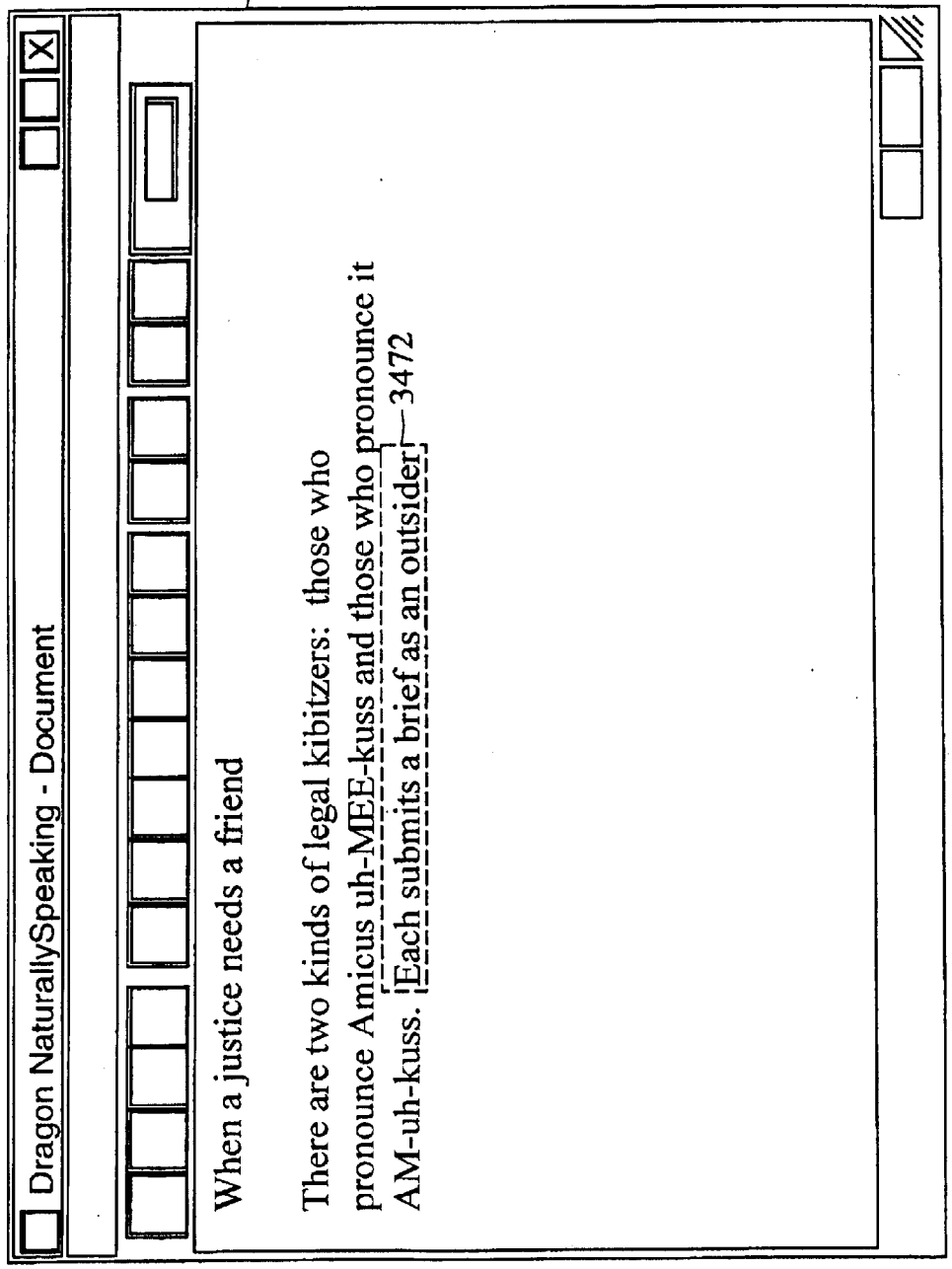

As shown in FIG. 34L, the recognizer 1815 next misrecognizes an utterance 3460 ("Each submits a brief as an outsider") and the control/interface module 1820 responds by inserting the incorrect text 3461 ("Each submits a brief is an outsider") in the dictation window 3410. FIG. 34L also illustrates another feature of the interface. As an utterance is being recognized, the control/interface module 1820 may display a partial recognition candidate 3465 for the utterance. This partial candidate represents the best scoring hypotheses for the utterance at a point in time before the recognizer completes processing of the utterance. Display of the partial candidate is useful for long utterances that may require an extended time for processing. As shown in FIG. 34M, the user again causes the control/interface module 1820 to generate the correction dialog box 3425 by saying the "Correct That" command 3431. The correction dialog box 3425 includes a list 3470 of recognition candidates for the entire utterance 3431. Since the text of the utterance 3460 appears as the second entry 3472 on the list 3470, the user selects the text by saying "Choose 2". As shown in FIG. 34N, the control/interface module 1820 responds by placing the text 3472 in the dialog box 3410.

Figure 35:
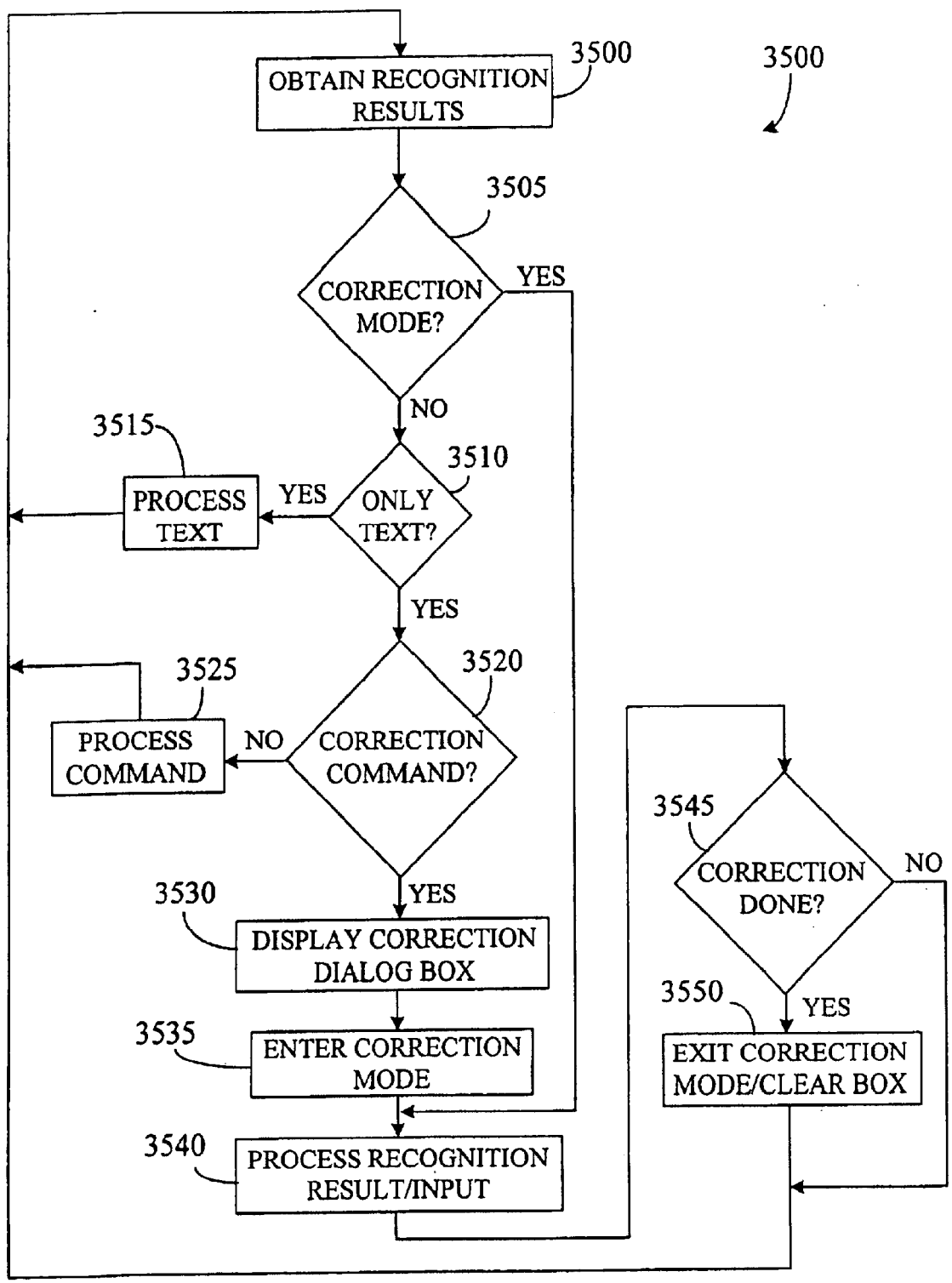
FIGS. 35, 36, and 37 are flow charts of procedures implemented by a control/interface module of the software of FIG. 23.

Referring to FIG. 35, the control/interface module 1820 may process recognition results according to a procedure

3500. Initially, the control/interface module 1820 receives recognition results for an utterance from the recognizer 1815 (step 3505). If the speech recognition software is not operating in correction mode (i.e., the correction dialog box 3425 is not displayed) (step 3505), the control/interface module determines whether the best-scoring recognition candidate includes only text (step 3510). If so, the control/interface module processes the text (step 3515). For example, the control/interface module may insert the text into a dictation window 3410.

If the best-scoring recognition candidate includes something other than text (step 3510), the control/interface module determines whether the candidate includes a correction command (step 3520). Correction commands activate the correction dialog box 3425 and include the "Select", "Spell That", and "Correct That" commands noted above, and an additional correction command, referred to as the "Make That" command.

If the best-scoring recognition candidate does not include a correction command (step 3520), the control/interface module processes any other command included in the best-scoring recognition candidate (step 3525). For example, as shown in FIG. 34A, if the best-scoring recognition candidate includes text and a formatting command such as New-Paragraph, then the control/interface module processes the text portion of the candidate and performs the formatting command.

If the best-scoring recognition candidate includes a correction command (step 3520), then the control/interface module displays the correction dialog box 3425 (step 3530) and enters the correction mode (step 3535).

Next, the control/interface module processes the best-scoring recognition candidate as a correction command (step 3540). The control/interface module also processes the best-scoring recognition candidate as a correction command if the software already is operating in the correction mode when the recognition results are received (i.e., the correction dialog box is already displayed).

In general, the control/interface module responds to correction commands by displaying a choice list in the correction dialog box 3425. For the "Correct That" command, if no portion of the best-scoring recognition candidate has been selected previously using the mouse 310, keyboard 315, or the "Select" command, the choice list includes the recognition candidates provided by the recognizer 1815, with the candidates being ordered according to their associated scores. If a portion of the best-scoring recognition candidate has been selected previously, then the choice list includes versions of the original recognition candidate in which the selected portion varies. These versions of the original candidate may be generated by having the recognizer 1815 perform a re-recognition of the utterance using a constraint grammar that only permits the selected portion of the original candidate to vary from the original candidate.

Similarly, for the "Spell That" command, if no portion of the original candidate has been selected previously, then the choice list includes only entries that begin with the letters following "Spell That" in the "Spell That" command. If a portion of the original candidate has been selected previously, then the choice list includes versions of the original candidate in which the selected portion starts with the letters provided in the "Spell That" command.

The "Make That" command includes the words "Make That" followed by one or more replacement words. If no portion of the original candidate has been selected previously, then the choice list includes entries corresponding to recognition of the replacement words, so that the entire original candidate is replaced with the replacement words. Alternatively, the software could identify automatically a portion of the original candidate to be replaced with the replacement words and list recognition candidates that include different versions of that portion. If a portion of the original candidate has been selected previously, then the choice list includes versions of the original candidate in which the selected portion has been replaced with different recognition candidates for the replacement words.

After processing the best-scoring recognition candidate (step 3540), the control/interface module determines whether the command included in the candidate has completed the correction session (step 3545). If so, the control/interface module exits the correction mode and removes the correction dialog box (step 3550). In either case, the control/interface module then waits for receipt of the next set of recognition candidates (step 3500). The control/interface module also waits for such receipt after processing a text-only candidate (step 3515) or a candidate that includes no correction commands (step 3525).

As noted above, the user may choose either to speak a correct word or words using the "Make That" command or to verbally spell a correct word or portion of a word using the "Spell That" command. When the user invokes the "Make That" command, the recognizer 1815 performs speech recognition on the utterance that includes the command and returns the results in the form of a list of ordered groups of phonemes (i.e., recognition candidates). For example, the recognition candidate for "Make That Apple" could include the phonemes corresponding to "Make That a pull" while the second recognition candidate could include the phonemes corresponding to "Make That apple".

The control/interface module 1820 may expand on the list of recognition candidates provided by the recognizer 1815 by finding "confused pronunciation" matches for the phonemes following "Make That" in each of the recognition candidates. Confused pronunciation is based on the observation that phonemes having similar characteristics are commonly confused with one another. The control/interface module 1820 then creates a list of words corresponding to the confused pronunciation results and uses those words to populate the choice list in the correction dialog box 3425.

The software 360 also may be configured so that the "Make That" and "Spell That" commands do not use a correction dialog box. When the software is so configured, the control/interface module replaces an utterance, a selected portion of the utterance, or an automatically determined portion of the utterance with the text portion of the best-scoring result of the "Make That" or "Spell That" commands. The control/interface module may perform the replacement by instructing the recognizer 1815 to perform a re-recognition of the utterance using a constraint grammar that requires the results of the re-recognition to include an entry from the list.

When the user invokes the "Spell That" command, the recognizer 1815 recognizes the spelling of the word in the context of a spelling constraint grammar that permits recognition of only letters. The recognition candidates provided by the recognizer 1815 are in the form of a list of ordered groups of letters, with each group being a probable recognition result for the word or portion of a word spelled by the user. The control/interface module may then find "confused spelling" matches for the groups of letters in the list of results. The confused spelling match is similar to the confused pronunciation match, and is based on the observation that letters having similar pronunciation are often confused with one another. The results of the confused spelling match are then used in the same manner as the results of the confused pronunciation match to correct previously-misrecognized text.

Generally, the system performs the confused pronunciation or confused spelling matches by searching a dictionary. If the word used to correct the previously misrecognized word is absent from the active vocabulary, then the recognizer 1815 could not have avoided misrecognizing the word during the original recognition. To avoid repetition of the misrecognition, the control/interface module "activates" the word from the backup dictionary by adding the word to the active vocabulary 1830.

Figure 36:
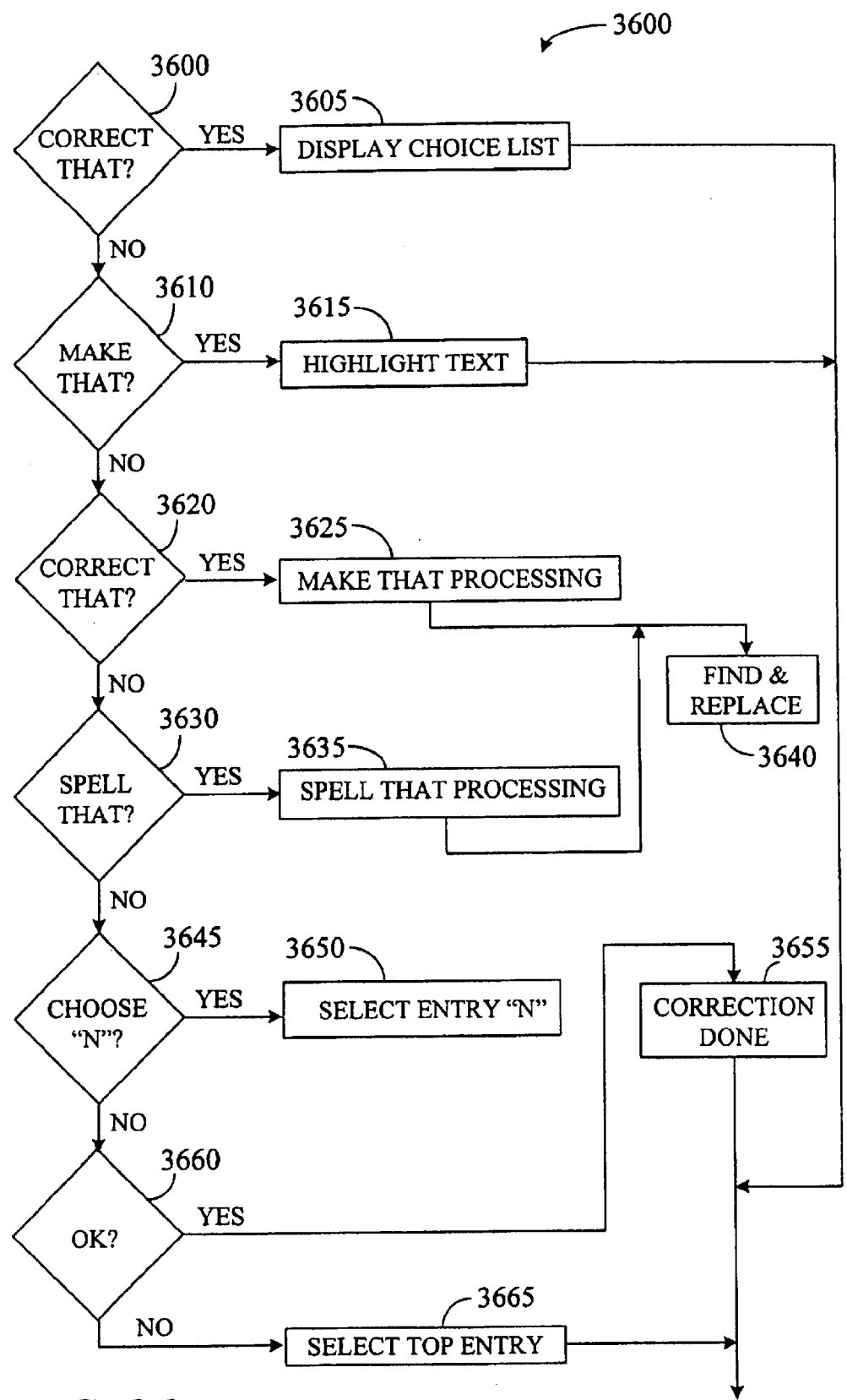

Referring to FIG. 36, the control/interface module 1820 implements correction commands according to a procedure 3600. If the command corresponds to the "Correct That" command (step 3602), then the control/interface module displays a choice list as described above (step 3605).

If the command does not correspond to the "Correct That" command (step 3602), and instead corresponds to the "Select" command or a variation of that command (e.g., "Select [start] through [end]") (step 3610), then the control/interface module finds and highlights the word or words identified by the select command (step 3615). Thus, for the basic "Select" command, the module highlights the word or words following "Select". Similarly, for the "Select [start] through [end]" command, the module highlights the block of text starting with the word corresponding to "[start]" and ending with the word corresponding to "[end]". These words are identified by the recognizer 1815 through implementation of the constraint grammar corresponding to the expanded "Select" command, which may be expressed as:

<recognition result> ::= Select

[<words>] |

[<words> Through <words> {ordered}] |

[From <words> To <words> {ordered}] |

[From <words> Through <words> {ordered}] |

[That] |

[Again], where

<words> ::= [$PRW^1[PRW^2[PRW^3 \ldots PRW^n]]$] |
[$PRW^2[PRW^3 \ldots PRW^n]] | \ldots [PRW^n]$], and "$PRW^i$" is the previously-recognized word i.

In general, the command considers all of the previously-recognized words that are displayed on the display 320.

The illustrated constraint grammar provides for a "Select [word(s)]" command, a "Select [start] Through [end]" command, a "Select From [start] To [end]" command, a "Select From [start] Through [end]" command, a "Select That" command, and a "Select Again" command. Other variations also could be provided.

The notation {ordered} indicates that words in the first instance of <words> in the command appear in the text before words in the second instance of <words>. Use of {ordered} in the constraint grammar provides considerable processing savings relative to an approach that requires the second instance of <words> to differ depending upon the words included in the first instance. The {ordered} operator may be implemented by permitting both instances of <words> to include any words from the previously-recognized text, and throwing out any hypotheses that include out-of-order results (i.e., results in which the "starting" word actually follows the "ending" word of the block to be selected. Thus, the constraint grammar employs positional information to eliminate nonsensical results.

The "Select That" command provides for a quick and efficient way to select and highlight the user's previous utterance. In particular, the control/interface module highlights the words corresponding to the previous utterance in response to the "Select That" command.

The "Select Again" command provides for a quick and efficient way to select a particular instance of a word when a word appears multiple times in a passage. For example, if the word "speech" had occurred three times in the text displayed on the screen, and the system had highlighted the first occurrence (or a passage beginning or ending with the first occurrence), the user could move to the next occurrence by saying "Select Again". User-selectable parameters may be used to designate whether the select commands look for word occurrences located before or after the cursor position.

In generating hypotheses that correspond to the select command, the recognizer 1815 may be configured to score homophones equally. Thus, if the displayed text included the word "triphones" and the phrase "try phones", the recognizer would use the score of the best scoring of the two elements in generating hypotheses that include each of the two elements.

The constraint grammar for <words> may be updated incrementally as the displayed text changes. For example, as text scrolls off the top of the display and new text is added at the bottom, the removed text may be eliminated from the beginning of the grammar while the new text is added to the end of the grammar.

Selecting a portion of previously-recognized results is discussed further in U.S. application Ser. No. 08/556,280, entitled "CONTINUOUS SPEECH RECOGNITION" and filed Nov. 13, 1995, which is incorporated by reference. The results of the "Select" command also may be achieved by using the mouse 310 or keyboard 315 to select a desired portion of the utterance.

If the command does not correspond to the "Correct That" command (step 3602) or the "Select" command (step 3610), the control/interface module determines whether the command corresponds to the "Make That" command (step 3620). The recognizer 1815 identifies the "Make That" command using a constraint grammar similar to the constraint grammar for the "Select" command. In particular, the constraint grammar requires the words "make that" to be followed by one or more words from the recognition vocabulary. This constraint grammar may be expressed as:

<recognition result> ::= Make That <phonemes>, where

<phonemes> ::= <phonemes> <phoneme> and

<phoneme> is any valid phoneme.

If the user has invoked the "Make That" command (step 3620), the control/interface module performs a MAKETHAT correction procedure (step 3625). Operation of the MAKETHAT correction procedure is described further in U.S. application Ser. No. 08/825,534, entitled "ERROR CORRECTION IN SPEECH RECOGNITION" and filed Mar. 28, 1997, which is incorporated by reference.

If the command does not correspond to the "Correct That" command (step 3602), the "Select" command (step 3610), or the "Make That" command (step 3620), the control/interface module determines whether the command corresponds to the "Spell That" command (step 3630). The recognizer 1815 identifies the "Spell That" command using the following constraint grammar:

<recognition result> ::= Spell That <letters>, where

<letters> ::= <letters> <letter> and

<letter> is any letter of the alphabet.

If the user has invoked the "Spell That" command (step 3630), the control/interface module performs the SPELLTHAT correction procedure (step 3635). Operation of the SPELLTHAT correction procedure is described further in U.S. application Ser. No. 08/825,534. From the dialog box, the user also may invoke the "Spell That" command by typing or speaking a series of letters.

Following performing one of the MAKETHAT (step 3625) or SPELLTHAT (step 3635) correction procedures, the control/interface module performs a procedure identified as FIND&REPLACE (step 3640). This procedure replaces some of the previously-recognized text with text produced by the MAKETHAT or SPELLTHAT correction procedures. Briefly, if a portion of an utterance has been selected using the "Select" command or other means, the control/interface module 1820 instructs the recognizer 1815 to perform a re-recognition to replace the selected word or words. If no selection has been made, then the control/interface module either replaces the entire utterance with text produced by the MAKETHAT or SPELLTHAT correction procedures, or re-recognizes speech frames for the previously-recognized words to replace a word or words in the previous recognition results. Operation of the FIND&REPLACE procedure is described further in U.S. application Ser. No. 08/825,534.

If the correction command is the "Choose N" command (step 3645), the control/interface module selects entry "N" from the list displayed in the correction dialog box 3425 (step 3650) and indicates that correction is done (step 3655). If the correction command is "OK" or some other affirmative response (step 3660), then the control/interface module selects the top entry in the correction dialog box 3425 (step 3665) and indicates that correction is done (step 3655).

Figure 37:
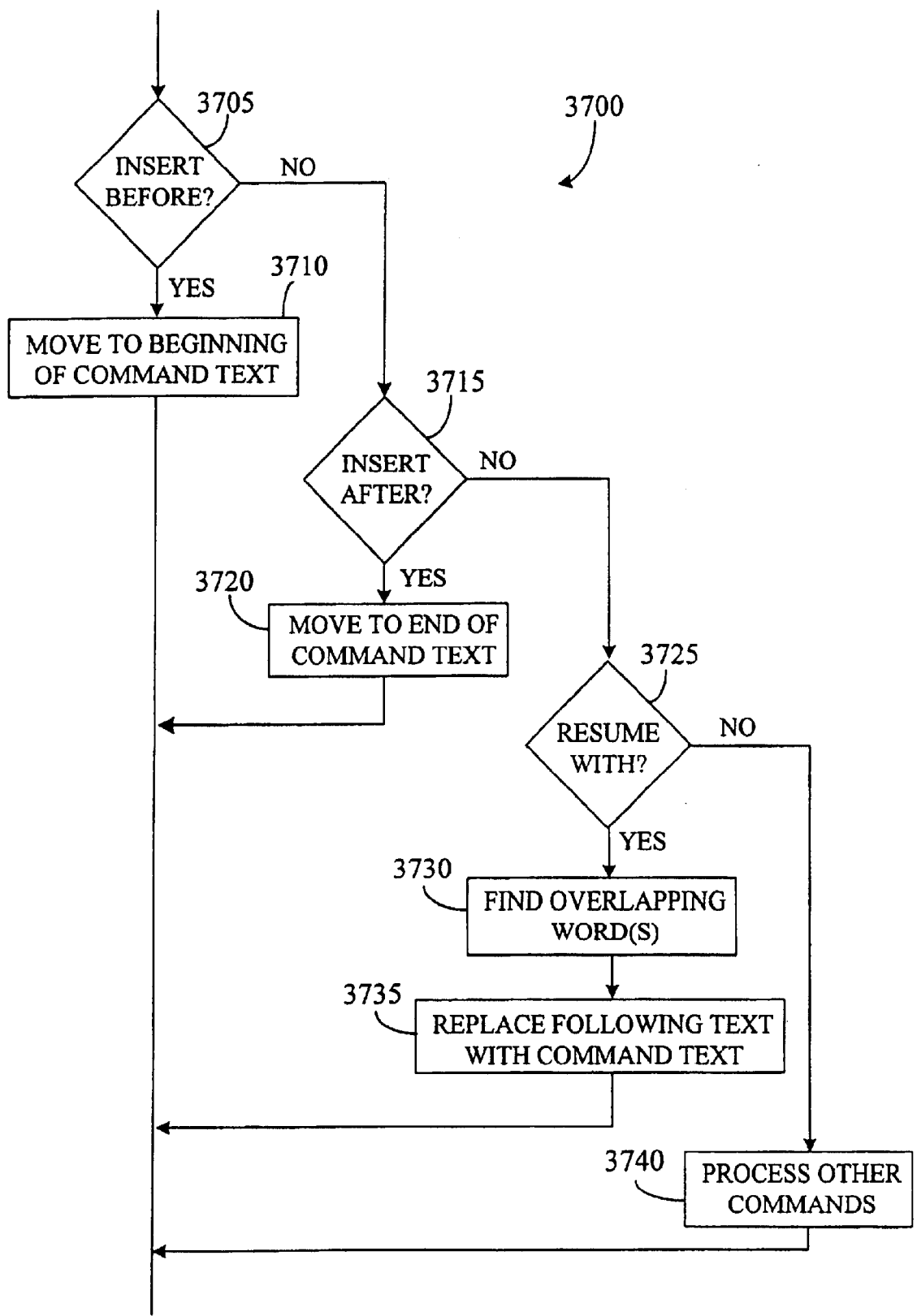

FIG. 37 illustrates a procedure 3700 used by the control/interface module to perform cursor/position manipulation commands and other commands included in the best-scoring recognition candidate (step 3525). Particular commands illustrated in FIG. 37 include an "Insert Before" command, an "Insert After" command, and a "Resume With" command.

If the command is an "Insert Before" command (step 3705), the module moves the cursor/action position to a position preceding the text identified in the command (step 3710). Similarly, if the command is an "Insert After" command (step 3715), the module moves the cursor/action position to a position following the text identified in the command (step 3720).

The "Insert Before/After" commands provide a simple way for the user to move to a desired position in the text. The recognizer 1815 identifies these commands using an "Insert" constraint grammar, which may be expressed as:

<recognition result> ::= Insert
    [Before <words>] |
    [After <words>] |
    [Before That] |
    [After That],
where
    <words> ::= [PRW$^1$[PRW$^2$[PRW$^3$ ... PRW$^n$]]] |
    [PRW$^2$[PRW$^3$ ... PRW$^n$]] | ... [PRW$^n$], and
    "PRW$^i$" is the previously-recognized word i.

The "Insert Before That" and "Insert After That" commands provide quick and efficient ways to move to the beginning or end of the user's previous utterance or to a previous selection by the user. When the user has not previously selected text, the control/interface module responds to this command by moving the cursor/action position to a location before or after the previous utterance, as appropriate. Thus, if a user neglected to put a word at a beginning of an utterance, the user could say "Insert Before That" to move to the beginning of the utterance. After speaking the missing word, the user could say "Insert After That" to move back to the end of the utterance.

When the user has previously selected text, the control interface module responds to the "Insert Before/After That" command by moving the cursor/action position to a location before or after the selection. Thus, the user could select a passage by saying for example, "Select [start] Through [end]", and could then move to the beginning of the passage by saying "Insert Before That".

If the command is a "Resume With" command (step 3725), the module finds in the text the word or words identified by the command and overlapping the text (step 3730) and replaces any following text with the word or words identified in the command (step 3735). Thus, if the user had said "Today, I saw a giraffe at the zoo" followed by "Resume With saw an elephant at the circus", the module would cause the system to display "Today, I saw an elephant at the circus". In this example, "saw" would be the overlapping word.

Similarly, if the user had said "Today, I saw a giraffe at the zoo PERIOD" followed by "The giraffe had a long neck PERIOD" followed by "Resume With saw an elephant at the circus", the module would cause the system to display "Today, I saw an elephant at the circus". Thus, most of the first sentence and all of the second sentence of the original dictation would be overwritten by the text in the "Resume With" command. As also shown, the "Resume with" command may be used to overwrite multiple utterances. In some implementations, the user is required to pause before reciting the "Resume With" command. This is not required in other implementations.

The "Resume With" command does not rely on the presentation of information on the display. For that reason, the command is particularly useful when the user records speech using a portable recording device, such as an analog or digital recorder, and subsequently transfers the recorded speech to the speech recognition system for processing. In that context, the "Resume With" command provides the user with a simple and efficient way of redirecting the dictation and eliminating erroneously-spoken words.

The recognizer 1815 identifies the "Resume With" command using a "Resume With" constraint grammar, which may be expressed as:

<recognition result> ::= Resume With <words> [<newwords>]
where
    <words> ::= [PRW$^1$[PRW$^2$[PRW$^3$ ... PRW$^n$]]] |
    [PRW$^2$[PRW$^3$ ... PRW$^n$]] | ... [PRW$^n$],
    "PRW$^i$" is the previously-recognized word i, and
    <newwords> ::= any word or sequence of words from the active vocabulary.

If the command is not an "Insert" command or a "Resume With" command, the module processes the command accordingly (step 3740).

Other embodiments are within the scope of the following claims. For example, the techniques described here are not limited to any particular hardware or software configuration; they may find applicability in any computing or processing environment that may be used for speech recognition. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A computer-implemented method for performing recorded actions, the method comprising:
   at a computer, receiving recorded spoken utterances identifying actions;
   performing speech recognition on at least two of the recorded spoken utterances to generate texts identifying the actions;
   parsing the texts to determine properties of the actions;
   permitting a user to indicate that the user has reviewed properties of one or more actions; and
   automatically carrying out the one or more actions indicated as having been reviewed by the user.

2. The method of claim 1, further comprising recording spoken utterances to produce the recorded spoken utterances.

3. The method of claim 2, wherein:
   recording the spoken utterances comprises using a portable recorder, and
   receiving the recorded spoken utterances comprises transferring the recorded spoken utterances from the portable recorder to the computer.

4. The method of claim 3, wherein the portable recorder comprises a digital recorder and recording a spoken utterance comprises generating a digital data file.

5. The method of claim 3, further comprising using the portable recorder to generate a time stamp indicative of a date and time at which the recorded spoken utterance was produced.

6. The method of claim 5, further comprising transferring time stamps associated with the recorded spoken utterances from the portable recorder to the computer.

7. The method of claim 6, wherein parsing the texts to determine properties of the actions comprises using the associated time stamps.

8. The method of claim 7, wherein, when a text includes a relative date, parsing the text comprises evaluating the relative date relative to the date of the time stamp associated with the action.

9. The method of claim 3, wherein the portable recorder comprises an analog recorder.

10. The method of claim 2, wherein performing speech recognition comprises performing speech recognition on a recorded spoken utterance immediately after the utterance has been spoken.

11. The method of claim 2, wherein recording a spoken utterance comprises using a telephone.

12. The method of claim 1, wherein performing speech recognition comprises performing speech recognition on multiple recorded spoken utterances without user interaction.

13. The method of claim 1, wherein, when the text of an action includes a relative date, parsing the text comprises evaluating the relative date relative to a current date.

14. The method of claim 1, wherein one property of an action comprises an action type.

15. The method of claim 14, further comprising storing an electronic calendar in the computer, wherein carrying out an action for which the action type is an appointment comprises scheduling an appointment in the electronic calendar.

16. The method of claim 15, wherein:
    another property of an action is a list of one or more contacts associated with the action, and
    scheduling the appointment comprises identifying the list of contacts in the electronic calendar.

17. The method of claim 16, wherein:
    another property of an action is that an e-mail confirmation should be sent, and
    carrying out an action for which the action type is an appointment comprises sending an e-mail confirmation of the appointment to the associated list of one or more contacts.

18. The method of claim 1, wherein the receiving, performing, and parsing steps are performed for multiple actions in response to a single command from the user and without further user intervention.

19. The method of claim 18, wherein the carrying out step is performed for multiple actions in response to a single command from the user and without further user intervention.

20. The method of claim 1, wherein the carrying out step is performed for multiple actions in response to a single command from the user and without further user intervention.

21. The method of claim 1, further comprising saving unreviewed actions for later review.

22. The method of claim 1, further comprising, after parsing the texts for multiple actions, visually displaying the properties of the actions for review by the user.

23. The method of claim 22, further comprising changing a way in which an action item is displayed when the user indicates that the action item has been reviewed.

24. The method of claim 23, wherein changing the way in which the action item is displayed comprises changing a color in which the action item is displayed.

25. The method of claim 1, wherein a text includes multiple words and parsing the text comprises:
    performing a syntactic parsing of the text to assign different words to different properties of the action; and
    performing a semantic parsing of the words assigned to each property of the action to generate a value for the associated property.

26. The method of claim 25, wherein performing the syntactic parsing of the text comprises evaluating the text relative to a set of patterns representative of different types of actions.

27. The method of claim 26, further comprising permitting a user to force an action to be of a particular type by stating a designated word at or near the beginning of a spoken utterance for the action.

28. The method of claim 27, wherein parsing the text further comprises:
  looking for the designated word at or near the beginning of the text; and
  when the designated word is found, performing the syntactic parsing using only a subset of the set of command patterns, the subset including only command patterns associated with the action type corresponding to the designated word.

29. The method of claim 26, wherein a pattern includes multiple elements corresponding to the different properties of an action.

30. The method of claim 25, wherein performing the syntactic parsing of the text comprises using a priority queue.

31. The method of claim 30, wherein performing the syntactic parsing of the text comprises stopping evaluation of a pattern when a best-scoring entry in the priority queue for the pattern does not score as well as a previously-considered pattern.

32. The method of claim 30, wherein performing the syntactic parsing of the text comprises evaluating all of the patterns simultaneously using a single priority queue.

33. The method of claim 30, wherein performing the syntactic parsing of the text comprises evaluating all of the patterns simultaneously using a single priority queue, finding all patterns that share a common prefix, and scoring the prefix portion of only one of the patterns.

34. The method of claim 1, further comprising permitting a user to force an action to be of a particular type by stating a designated word at or near the beginning of a spoken utterance for the action.

35. A computer-implemented method for performing a dictated action, the method comprising:
  at a computer, receiving from a communications device a recorded spoken utterance identifying an action;
  performing speech recognition on the recorded spoken utterance to generate text identifying the action;
  parsing the text to determine properties of the action;
  providing an audible indication of the properties of the action using the communications device;
  permitting a user to use the communications device to indicate that the user has reviewed properties of the action; and
  automatically carrying out the action after the user indicates that the user has reviewed properties of the action.

36. The method of claim 35, further comprising permitting the user to correct properties of the action using the communications device.

37. The method of claim 36, further comprising permitting the user to correct properties of the action using spoken commands.

38. The method of claim 36, wherein the communications device includes keys, the method further comprising permitting the user to correct properties of the action using the keys.

39. The method of claim 35, wherein the communications device comprises a telephone.

40. Computer software, residing on a computer-readable storage medium, comprising instructions for causing a computer to:
  receive recorded spoken utterances identifying actions;
  perform speech recognition on at least two of the recorded spoken utterances to generate texts identifying the actions;
  parse the texts to determine properties of the actions;
  permit a user to indicate that the user has reviewed properties of one or more actions; and
  automatically carry out the actions indicated as having been reviewed by the user.

41. The computer software of claim 40, further comprising instructions for causing the computer to transfer the recorded spoken utterances from a portable recorder to the computer.

42. The computer software of claim 41, further comprising instructions for causing the computer to transfer date and time stamps associated with the recorded spoken utterances from the portable recorder to the computer.

43. The computer software of claim 42, wherein the instructions for causing the computer to parse the texts to determine properties of the actions use the associated time stamps.

44. The computer software of claim 43, wherein, when the text of an action includes a relative date, the instructions for parsing the text comprise instructions for evaluating the relative date relative to the date of the time stamp associated with the action.

45. A system for performing recorded actions, comprising:
  an input device for receiving recorded spoken utterances of multiple actions; and
  a processor configured to:
  perform speech recognition on at least two of the recorded spoken utterances to generate texts identifying the actions;
  parse the texts to determine properties of the actions;
  permit a user to indicate that the user has reviewed properties of one or more actions; and
  automatically carry out the actions indicated as having been reviewed by the user.

* * * * *